(12) United States Patent
Yamamoto et al.

(10) Patent No.: US 8,929,191 B2
(45) Date of Patent: Jan. 6, 2015

(54) BASE STATION DEVICE FOR WIRELESS COMMUNICATION OF OFDM SIGNAL INCLUDING A SYNCHRONIZATION CONTROL UNIT

(75) Inventors: Takashi Yamamoto, Osaka (JP); Yoji Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 601 days.

(21) Appl. No.: 13/003,189

(22) PCT Filed: Jun. 12, 2009

(86) PCT No.: PCT/JP2009/060756
§ 371 (c)(1),
(2), (4) Date: Jan. 7, 2011

(87) PCT Pub. No.: WO2010/004830
PCT Pub. Date: Jan. 14, 2010

(65) Prior Publication Data
US 2011/0170527 A1    Jul. 14, 2011

(30) Foreign Application Priority Data

| | | |
|---|---|---|
| Jul. 7, 2008 | (JP) | 2008-176920 |
| Jul. 7, 2008 | (JP) | 2008-177164 |
| Jul. 29, 2008 | (JP) | 2008-194494 |
| Nov. 12, 2008 | (JP) | 2008-289895 |
| Mar. 6, 2009 | (JP) | 2009-053414 |
| Mar. 17, 2009 | (JP) | 2009-064711 |
| Mar. 31, 2009 | (JP) | 2009-085727 |
| May 20, 2009 | (JP) | 2009-122060 |
| May 20, 2009 | (JP) | 2009-122157 |

(51) Int. Cl.
*H04J 11/00* (2006.01)
*H04L 27/26* (2006.01)
*H04W 56/00* (2009.01)

(52) U.S. Cl.
CPC ........ *H04L 27/2657* (2013.01); *H04L 27/2655* (2013.01); *H04L 27/2675* (2013.01); *H04W 56/0015* (2013.01); *H04W 56/0035* (2013.01)
USPC ............................ 370/203; 370/338; 370/350

(58) Field of Classification Search
None
See application file for complete search history.

(56) References Cited

U.S. PATENT DOCUMENTS

| | | | | |
|---|---|---|---|---|
| 5,448,570 | A * | 9/1995 | Toda et al. | 370/337 |
| 5,596,582 | A * | 1/1997 | Sato et al. | 370/509 |
| 5,826,197 | A | 10/1998 | Nagata et al. | |
| 6,021,110 | A * | 2/2000 | McGibney | 370/208 |
| 7,319,660 | B2 * | 1/2008 | Kim et al. | 370/208 |
| 7,706,823 | B2 * | 4/2010 | Buda et al. | 455/502 |
| 2004/0116145 | A1 * | 6/2004 | Smolyar et al. | 455/524 |
| 2005/0220051 | A1 * | 10/2005 | Lavean | 370/330 |
| 2006/0215605 | A1 * | 9/2006 | Srikrishna et al. | 370/329 |
| 2006/0252437 | A1 | 11/2006 | Konegger et al. | |
| 2006/0281419 | A1 * | 12/2006 | Peplinski et al. | 455/83 |
| 2007/0140203 | A1 * | 6/2007 | Qiao | 370/342 |
| 2007/0140395 | A1 * | 6/2007 | Laroia et al. | 375/355 |
| 2008/0144539 | A1 * | 6/2008 | Sperlich et al. | 370/278 |
| 2008/0152059 | A1 | 6/2008 | Suemitsu et al. | |
| 2009/0003493 | A1 * | 1/2009 | Gunturi et al. | 375/344 |

FOREIGN PATENT DOCUMENTS

| | | |
|---|---|---|
| JP | 59-006642 | 1/1984 |
| JP | 04-287532 B2 | 10/1992 |
| JP | 05-063633 A | 3/1993 |
| JP | 07-046659 A | 2/1995 |
| JP | 08-289359 | 11/1996 |
| JP | 10-190562 | 7/1998 |
| JP | 11-055152 | 2/1999 |
| JP | 2000-299656 | 10/2000 |
| JP | 2002-164837 | 6/2002 |
| JP | 2002-165269 | 6/2002 |
| JP | 2003-505977 | 2/2003 |
| JP | 2007-208333 | 8/2007 |
| WO | 96/01545 A1 | 1/1996 |

| | | |
|---|---|---|
| WO | WO 00/35117 | 6/2000 |
| WO | WO 01/08344 A2 | 2/2001 |
| WO | WO 2006/082628 A1 | 8/2006 |

OTHER PUBLICATIONS

Japanese Office Action issued in Japanese Patent Application No. JP 2008-194494 dated May 22, 2012.
Japanese Office Action for JP Application No. 2011-179486 dated Jul. 23, 2013, with English translation, 8 pages.
Japanese Office Action for JP Application No. 2009-122060 dated Oct. 1, 2013, with English translation, 5 pages.
Decision of Refusal issued in Japanese Application No. 2009-122060 dated Apr. 22, 2014, w/English translation.

\* cited by examiner

*Primary Examiner* — Andrew Chriss
*Assistant Examiner* — Salvador E Rivas

(74) *Attorney, Agent, or Firm* — McDermott Will & Emery LLP

(57) ABSTRACT

While a clock generated by a built-in clock generator is used as a reference signal for determining a carrier frequency of a transmit signal, carrier frequency synchronization is achieved between base stations. A base station device is configured to perform wireless communication with a terminal device. In the base station device, accuracy of a carrier frequency of an OFDM signal is affected by accuracy of a clock frequency generated by a built-in clock generator 18. The base station device receives an OFDM signal transmitted from another base station device while transmission to the terminal device is stopped, estimates a carrier frequency offset of the OFDM signal, and corrects a carrier frequency of an OFDM signal to be transmitted to the terminal device.

14 Claims, 68 Drawing Sheets

FIG. 30

| PRIORITY LEVEL L | FIRST KNOWN SIGNAL (PRIMARY CODE) n | SECOND KNOWN SIGNAL (SECONDARY CODE) m |
|---|---|---|
| 1 | 0 | 0 |
| 2 | 0 | 1 |
| ⋮ | ... | ⋮ |
| 168 | 0 | 167 |
| 169 | 1 | 0 |
| ⋮ | ... | ⋮ |
| 336 | 1 | 167 |
| 337 | 2 | 0 |
| ⋮ | ... | ⋮ |
| 504 | 2 | 167 |

BASE STATION DEVICE FOR WIRELESS COMMUNICATION OF OFDM SIGNAL INCLUDING A SYNCHRONIZATION CONTROL UNIT

RELATED APPLICATIONS

This application is the U.S. National Phase under 35 U.S.C. §371 of International Application No. PCT/JP2009/060756, filed on Jun. 12, 2009, which in turn claims the benefit of Japanese Application Nos. JP 2008-177164, filed on Jul. 7, 2008, JP 2008-176920, filed on Jul. 7, 2008, JP 2008-194494, filed on Jul. 29, 2008, JP 2008-289895, filed on Nov. 12, 2008, JP 2009-053414, filed on Mar. 6, 2009; JP 2009-064711, filed on Mar. 17, 2009, JP 2009-085727, filed on Mar. 31, 2009, JP 2009-122060, filed on May 20, 2009 and JP 2009-122157, filed on May 20, 2009, the disclosures of which Applications are incorporated by reference herein.

TECHNICAL FIELD

The present invention relates to a base station device.

BACKGROUND ART

In a wireless communication system where mobile terminals can perform communication, such as WiMAX (Worldwide Interoperability for Microwave Access), large numbers of base stations are installed at various locations. Mobile terminals present in an area (cell) covered by a base station can perform communication with the base station that covers the area.

With the movement of a mobile terminal, a base station which is a communication partner of the mobile terminal changes. Upon the change of the base station, the mobile terminal simultaneously receives signals transmitted from two base stations (a serving base station and a target base station).

Hence, in order to smoothly perform base-station-to-base-station movement of the mobile terminal, inter-base-station synchronization where transmission timings coincide with each other between adjacent base stations needs to be ensured.

When inter-base-station synchronization is achieved, upon base-station-to-base-station movement of the mobile terminal, the mobile terminal can simultaneously receive signals transmitted from two base stations and thus base-station-to-base-station movement (handover) can be performed smoothly.

Here, for techniques for achieving timing synchronization between base stations, there is one described in, for example, Patent Document 1.

Patent Document 1 discloses a technique in which each base station receives a GPS signal from a GPS satellite and achieves timing synchronization based on the GPS signal.

CITATION LIST

Patent Document

Patent Document 1: Japanese Unexamined Patent Publication No. 59-6642

SUMMARY OF INVENTION

Solution to Problem

WiMAX adopts an OFDM (Orthogonal Frequency Division Multiplexing) system. In an OFDM signal, since subcarriers are arranged densely and subcarrier spacings are small, when there is a large error in carrier frequency between the signal transmitting and receiving sides, OFDM demodulation characteristics deteriorate. Hence, the carrier frequency error is required to be small.

Therefore, it is essential to achieve carrier frequency synchronization between communication devices, between which communication is commonly assumed to be performed, such as between a base station and a mobile terminal. Such carrier frequency synchronization is attained by the receiving side detecting a carrier frequency error from a receive signal and correcting the carrier frequency error of the receive signal. In this case, the detection and correction of a carrier frequency error of a receive signal are performed by an AFC (Automatic Frequency Control) circuit provided in a receiving circuit.

Meanwhile, the inventors of the present invention have reached findings that, considering base-station-to-base-station movement of a mobile terminal (handover), premised on the OFDM system, carrier frequency synchronization is also required between base stations. Note, however, that the carrier frequency synchronization based on the findings by the inventors indicates that the carrier frequencies of signals transmitted from base stations to mobile terminals present in their respective areas are allowed to match each other between the base stations, and thus, differs from carrier frequency synchronization where a receiving unit of a base station or terminal detects a carrier frequency error to demodulate a signal from its communication partner and corrects the carrier frequency error of the receive signal.

In order for base stations serving as the signal transmitting side to allow the carrier frequencies of transmit signals to match each other, the base stations need to operate using a common reference signal (clock).

However, since there are variations in accuracy of a clock generator (crystal resonator) built in each base station, even if each base station transmits a signal at a predetermined carrier frequency using, as a reference signal, a clock generated by the built-in clock generator of each base station, due to the difference in the accuracy of clock frequency, carrier frequencies inevitably turn out to differ between the base stations.

Accordingly, it is generally considered that a clock generated by the built-in clock generator is not suitable as a reference signal for allowing the carrier frequencies of transmit signals to match between base stations.

Here, in the case in which, as in Patent Document 1, each base station can receive a GPS signal from a GPS satellite, by using a clock signal included in the GPS signal as a reference signal for a carrier frequency, the base stations can allow the carrier frequencies of transmit signals to match each other. The GPS signal is a signal that can be used by the base stations in a shared manner, and thus is suitable as a reference signal for allowing the carrier frequencies of transmit signals to match each other between the base stations.

However, in the case of using a GPS signal, each base station needs to include a GPS receiver, resulting in an increase in size and cost. In addition, in the case of a base station that is installed in an environment where a GPS signal cannot be received, such as the interior of a room, reception of a GPS signal is impossible.

In addition, in the case in which an upper network connected to each base station is a communication line that can supply a clock, such as ISDN, each base station obtains a clock from the ISDN and uses the clock as a reference signal, whereby the carrier frequencies of transmit signals can match each other between the base stations.

However, in a communication system where the Internet is assumed to be used as an upper network, such as WiMAX, a clock cannot be obtained from the upper network.

An object of the present invention is therefore to achieve carrier frequency synchronization between base stations while a clock generated by a built-in clock generator, which is generally considered to be inappropriate, is used as a reference signal for determining a carrier frequency of a transmit signal.

When communication between a base station device and a terminal device is performed by a frequency-division duplex system, since a transmit frequency is different from a receive frequency, there is no need to consider interference between a transmit signal and a receive signal and thus it is common that a plurality of base station devices operate asynchronously.

However, the inventors have come up with an idea that, even when the frequency-division duplex system is adopted, it is desirable in some cases that a plurality of base station devices be synchronized with each other.

For example, the case will be considered in which, as shown in FIG. 24(a), broadcast transmission where information of the same content is simultaneously transmitted from a plurality of base station devices BS1 and BS2 to numbers of terminal devices MS1, MS2, and MS3 is performed. In this case, when, as shown in FIG. 24(b), there is a mismatch between the broadcast frame transmission timings of the plurality of base station devices BSs, for the terminal device MS2 that receives signals of the same content from the plurality of base station devices BS1 and BS2, a signal from one base station device BS1 is interfered by a signal from the other base station device BS2.

In addition, when the terminal device MS2 performs macrodiversity or spatial multiplexing transmission using signals transmitted from the plurality of base station devices BS1 and BS2, if the transmission timings of the base station devices BS1 and BS2 do not coincide with each other, the effect decreases.

Therefore, in a case such as that described above, even when the frequency-division duplex system is used, it is better that synchronization be achieved between base station devices.

To achieve synchronization between base station devices, it is considered to achieve synchronization using a wireless communication signal instead of using a GPS signal such as that described in Patent Document 1. In this case, it is considered that a base station device that attempts to achieve synchronization receives a signal transmitted from another base station device to a terminal device and detects transmission timing of the another base station device, and thereby, achieves synchronization with the another base station device. Note that in the following a system in which a base station device achieves synchronization using a transmit signal transmitted from another base station device is called "over-the-air synchronization".

However, in the case of a base station device using the frequency-division duplex system, a receiving unit of the base station device is configured to be compatible with a frequency $f_u$ of an uplink signal (signal transmitted from a terminal device to the base station device) and a transmitting unit is configured to be compatible with a frequency $f_d$ of a downlink signal (signal transmitted from the base station device to a terminal device).

Hence, even if a certain base station device attempts to receive a downlink signal which is transmitted from another base station device to a terminal device, since the frequency of the downlink signal that the base station device wishes to receive is $f_d$, a receiving unit configured to be compatible with the frequency $f_u$ of an uplink signal cannot receive the downlink signal.

As such, conventionally, a base station device using the frequency-division duplex system is not provided with means for performing over-the-air synchronization.

Another object of the present invention is therefore to provide means for performing over-the-air synchronization in a base station device using the frequency-division duplex system.

Here, when a certain base station device (the origin of synchronization) autonomously determines another base station device serving as the target of synchronization for over-the-air synchronization, the base station device selects one base station device serving as the target of synchronization from among a plurality of base station devices present near the base station device serving as the origin of synchronization.

However, if each base station device is allowed to freely select a base station device serving as the target of synchronization, a situation may occur in which, as shown in FIG. 33, a plurality of base station devices (BSs) refer to each other as their targets of synchronization. This case is not desirable because the synchronization timings of the base station devices are likely to fluctuate.

In view of this, it is desirable to determine the target of synchronization such that with respect to one base station device serving as a reference device (master base station device), other base station devices (slave base station devices) take a tree-like hierarchical structure. In this case, a plurality of slave base station devices can allow their timings to coincide with that of one master base station device serving as a reference device.

To take the above-described hierarchical structure, a base station device that attempts to determine the target of synchronization needs to recognize the hierarchies of other base station devices.

A still another object of the present invention is therefore to provide a technique for allowing a base station device that attempts to determine the target of synchronization to recognize the hierarchies of other base station devices.

Solution to Problem

According to the present invention, there is provided a base station device configured to perform wireless communication of an OFDM signal with a terminal device and including a built-in clock generator that generates an operating clock, in which accuracy of a carrier frequency of the OFDM signal is affected by accuracy of a clock frequency generated by the built-in clock generator, the base station device including: means for receiving a radio signal transmitted from another base station device while transmission to the terminal device is stopped; estimation means for determining, based on an OFDM signal received while transmission to the terminal device is stopped, an estimated value of a carrier frequency offset of the OFDM signal; and frequency correction means for correcting a carrier frequency of an OFDM signal to be transmitted to the terminal device, based on the estimated value.

According to the present invention, in the base station device, the accuracy of the carrier frequency of an OFDM signal is affected by the accuracy of a clock frequency generated by the built-in clock generator. However, the base station device receives an OFDM signal transmitted from another base station device, and estimates a difference (carrier frequency offset) between the carrier frequency of the base station device and the carrier frequency of another base station device.

Then, the base station device corrects the carrier frequency of an OFDM signal to be transmitted to a terminal device, based on the estimated value. Therefore, the carrier frequency of a transmit signal transmitted from the base station device achieves synchronization with the carrier frequency of a transmit signal transmitted from another base station device.

Hence, according to the present invention, while a clock generated by the built-in clock generator is used as a reference signal for determining the carrier frequency of a transmit signal, carrier frequency synchronization can be achieved between the base stations.

Moreover, when the base station device performs communication with a terminal device by time-division duplex, in a time period during which the base station device is in a receive state, another base station device is also in a receive state and in a time period during which the base station device is in a transmit state, another base station device is also in a time period during which a transmit state occurs. Hence, the base station device cannot receive an OFDM signal transmitted from another base station device.

However, since the base station device stops transmission to a terminal device and receives an OFDM signal transmitted from another base station device while transmission to the terminal device is stopped, even if time-division duplex is used, the base station device can receive an OFDM signal transmitted from another base station device.

Note that in the present invention OFDM, of course, includes OFDMA (Orthogonal Frequency-Division Multiple Access) which is extended OFDM. Note also that the present invention can be applied not only to OFDM signals but also to radio signals that require the accuracy of carrier frequency, such as a multicarrier system using carrier signals of a plurality of frequencies.

It is preferred that the estimation means is configured to determine, based on an OFDM signal received while transmission to the terminal device is stopped, an estimated value of a communication timing offset of the OFDM signal and determines an estimated value of a carrier frequency offset of the OFDM signal, based on the estimated value of the communication timing offset.

Further, it is preferred that the estimation means includes: amount-of-phase-rotation calculation means for calculating an amount of phase rotation of an OFDM signal occurring between a first transmission stop time point and a second transmission stop time point, based on a difference between a first estimated value of a communication timing offset and a second estimated value of a communication timing offset, the first estimated value being determined at the first transmission stop time point and the second estimated value being determined at the second transmission stop time point which is a time point different from the first transmission stop time point; and clock error calculation means for calculating an error in the clock frequency, based on the amount of phase rotation, and determines an estimated value of the carrier frequency offset, based on the calculated error in the clock frequency.

It is preferred that the base station device further includes means for correcting a communication frame timing based on the estimated value of the communication timing offset.

It is preferred that an OFDM signal received from another base station device while transmission to the terminal device is stopped is a preamble signal transmitted from the another base station device to a terminal device.

It is preferred that the frequency correction means correct the carrier frequency of a received OFDM signal, based on the estimated value of the carrier frequency offset.

In addition, it is preferred that transmission to the terminal device be stopped periodically. In this case, the cycle in which transmission to the terminal device is stopped may be fixed or may vary.

According to another aspect of the present invention, there is provided a base station device that performs communication with the terminal device by frequency-division duplex where a frequency of an uplink signal is different from a frequency of a downlink signal, the base station device further including: a first receiving unit that performs uplink signal reception from the terminal device at the frequency of an uplink signal; a transmitting unit that performs downlink signal transmission to the terminal device at the frequency of a downlink signal; and a second receiving unit that performs downlink signal reception from another base station device at the frequency of a downlink signal, and an OFDM signal transmitted from another base station device is received by the second receiving unit while transmission to the terminal device is stopped. More specifically, the base station device includes a synchronization error detecting unit that detects, based on a downlink signal from another base station device which is received by the second receiving unit, a synchronization error between the another base station device and the device; and a correcting unit that corrects the synchronization error based on the synchronization error detected by the synchronization error detecting unit.

According to the above-described invention, the base station device includes a second receiving unit that performs downlink signal reception from another base station device at the frequency of a downlink signal, in addition to a first receiving unit that performs uplink signal reception from the terminal device at the frequency of an uplink signal.

Therefore, even if the base station device adopts a frequency-division duplex system, the base station device can receive an uplink signal from the terminal device and can also receive, for over-the-air synchronization, a downlink signal transmitted from another base station device.

Then, the base station device can achieve over-the-air synchronization with another base station device, based on the downlink signal from another base station device which is received by the second receiving unit.

In a communication system including a plurality of the above-described base station devices, the plurality of base station devices can be configured to simultaneously transmit information of the same content to terminal devices. In frequency-division duplex, also, by achieving synchronization between base station devices, even if the plurality of base station devices transmit information of the same content to terminal devices at once, the terminal devices can receive the information without any trouble. Accordingly, broadcast transmission from a plurality of base station devices, or macrodiversity or spatial division multiplexing transmission using signals transmitted from a plurality of base station devices can be performed.

In the case of a base station device including a distortion compensating unit that performs distortion compensation for an amplifier included in the transmitting unit, it is preferred that the base station device include switching means for switching between a first state in which the distortion compensating unit obtains, through the second receiving unit, a downlink signal outputted from the amplifier and a second state in which the estimation means (synchronization error detecting unit) receives, through the second receiving unit, a downlink signal transmitted from another base station device.

In this case, a circuit that provides, for distortion compensation, an output from the amplifier in the transmitting unit, to the distortion compensating unit and a circuit that provides, for over-the-air synchronization, a downlink signal with a downlink frequency from another base station device, to the estimation means (synchronization error detecting unit) can be formed as one common unit.

Here, the distortion compensating unit obtains a signal outputted from the amplifier included in the transmitting unit and thereby grasps the nonlinear characteristics of the amplifier and performs distortion compensation. Since the output signal from the amplifier included in the transmitting unit serves as a downlink signal, the circuit that provides the output signal from the amplifier, to the distortion compensating unit is configured to be compatible with the frequency of a downlink signal.

Hence, in the present invention, using the fact that the second receiving unit is configured to be compatible with the frequency of a downlink signal, the second receiving unit is also used as the circuit that provides the output signal from the amplifier, to the distortion compensating unit, whereby the circuits are formed as one common unit. By forming the circuits as one common unit, even if the second receiving unit is provided, an increase in circuit size can be suppressed.

In the case of a base station device in which, in addition to distortion compensation, a signal processing device that generates a signal to be inputted to the transmitting unit receives feedback of a downlink signal generated by the transmitting unit, it is preferred that the base station device include switching means for switching between a first state in which the signal processing device receives, through the second receiving unit, feedback of a downlink signal generated by the transmitting unit and a second state in which the estimation means (synchronization error detecting unit) receives, through the second receiving unit, a downlink signal transmitted from another base station device.

Since the second receiving unit is configured to be compatible with the frequency of a downlink signal, by using the second receiving unit also as a circuit that feeds back a downlink signal generated by the transmitting unit, the circuits can be formed as one common unit. By forming the circuits as one common unit, even if the second receiving unit is provided, an increase in circuit size can be suppressed.

It is preferred that a frequency converting unit is provided in at least one of the first receiving unit and the second receiving unit, the frequency converting unit converting a frequency of at least one of signals, including an uplink signal from the terminal device and a downlink signal from another base station device, to allow frequencies of the two signals to match each other, and the first receiving unit and the second receiving unit are configured such that the two signals whose frequencies have matched each other are processed by a common unit which is shared between the first receiving unit and the second receiving unit. In this case, even if both the first receiving unit and the second receiving unit are provided as receiving units, the circuit configuration can be simplified.

It is preferred that the common unit includes an A/D converting unit that A/D converts the two signals.

It is preferred that an array antenna including a plurality of antennas be provided, each of the plurality of antennas be provided with the first receiving unit and the transmitting unit, and one or each of the plurality of antennas be provided with the second receiving unit. In an array antenna system, also, the second receiving unit can be provided in one or a plurality of antenna systems in the array antenna system.

According to another aspect of the present invention, there is provided a base station device that performs communication with a terminal device by frequency-division duplex where a frequency of an uplink signal is different from a frequency of a downlink signal, the base station device including: a first receiving unit that performs uplink signal reception from the terminal device at the frequency of an uplink signal; a transmitting unit that performs downlink signal transmission to the terminal device at the frequency of a downlink signal; a second receiving unit that performs downlink signal reception from another base station device at the frequency of a downlink signal; a synchronization error detecting unit that detects, based on a downlink signal from another base station device which is received by the second receiving unit, a synchronization error between the another base station device and the device; and a frequency correcting unit that estimates a frequency offset of the base station device based on the synchronization error detected by the synchronization error detecting unit, and corrects the frequency of an uplink signal or the frequency of a downlink signal. In this case, frequency can also be corrected by over-the-air synchronization.

According to still another aspect of the present invention, there is provided a base station device that transmits a downlink signal including a first known signal which can take a plurality of patterns and a second known signal which can take a plurality of patterns, to the terminal device, the base station device further including: a recognizing unit that recognizes, when receiving a downlink signal including the first known signal and the second known signal which is transmitted from another base station device, a hierarchical level at which the another base station device is located in a hierarchical structure for inter-base-station-device synchronization, by a combination of a pattern of the received first known signal and a pattern of the received second known signal.

According to the above-described invention, the hierarchical level of another base station device can be recognized by a combination of a pattern of the first known signal and a pattern of the second known signal.

It is preferred that the recognizing unit includes: a first recognizing unit that pattern-recognizes which one of the plurality of patterns that can be taken by the first known signal the pattern of the received first known signal is; and a second recognizing unit that pattern-recognizes which one of the plurality of patterns that can be taken by the second known signal the pattern of the received second known signal is. In this case, the patterns of the first known signal and the second known signal can be recognized independently.

It is preferred that the base station device is configured to: perform a first pattern recognition by one of the first recognizing unit and the second recognizing unit that recognizes a pattern of a known signal with a small number of patterns that can be taken by the signal; and perform, after a pattern is recognized by the first pattern recognition, a second pattern recognition by one of the first recognizing unit and the second recognizing unit that recognizes a pattern of a known signal with a large number of patterns that can be taken by the signal. In this case, pattern recognition can be performed easily or rapidly.

It is preferred that the base station device includes a pattern setting unit that sets a pattern of a first known signal and a pattern of a second known signal which are transmitted included in a downlink signal, from the base station device, wherein the pattern setting unit sets the pattern of the first known signal and the pattern of the second known signal such that the patterns indicate a hierarchical level lower than a hierarchical level of another base station device which serves as a target of synchronization in inter-base-station-device synchronization. In this case, even if each base station device autonomously determines the target of synchronization, a hierarchical structure can be naturally constructed.

BRIEF DESCRIPTION OF THE DRAWINGS

FIG. 30 is a diagram showing a relationship between a hierarchical level and a first known signal pattern and a second known signal pattern.

DESCRIPTION OF EMBODIMENTS

Preferred embodiments of the present invention will be described below with reference to the accompanying drawings.

[Chapter 1 Regarding Frequency Correction]

Figure 1:
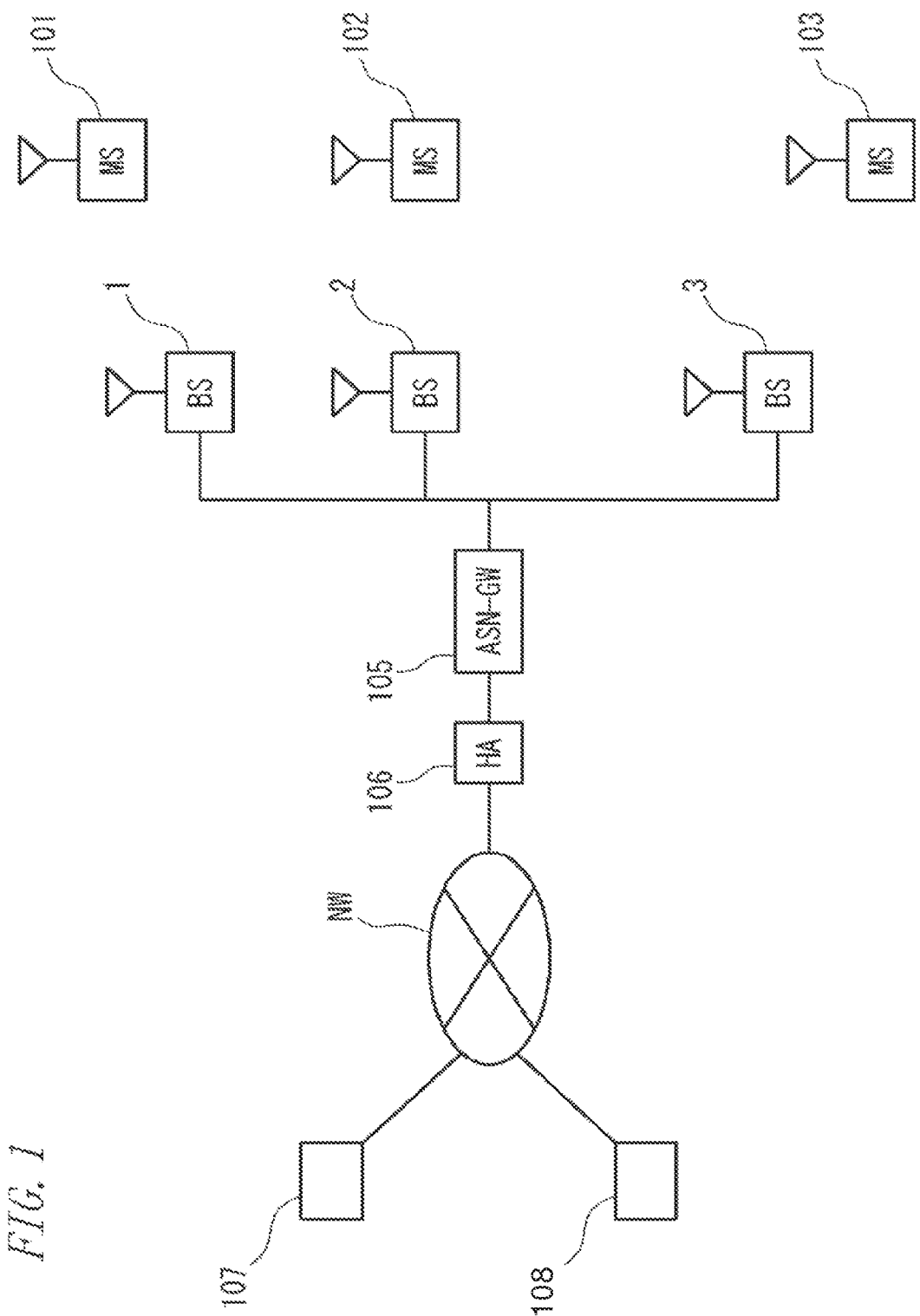
FIG. 1 is a diagram showing a mobile wireless communication system which uses the Internet NW as an upper network.

FIG. 1 shows a mobile wireless communication system which uses a TCP/IP network NW, such as the Internet, as an upper network.

The communication system includes a plurality of base station devices (BSs; Base Stations) 1, 2, and 3 that perform wireless communication with mobile terminals (MSs; Mobile Stations) 101, 102, and 103 which are terminal devices. The plurality (several thousands) of base stations 1, 2, and 3 are connected to an ASN-GW (Access Service Network Gateway) 105 serving as an access control device. The ASN-GW 105 is connected to the upper network NW, such as the Internet, through an HA (Home Agent) 106.

Therefore, packets (downlink data) to be transmitted to the terminals from servers 107 and 108 on the upper network NW such as the Internet are transmitted to the terminal devices 101, 102, and 103 via the base station devices 1, 2, and 3.

The wireless communication system adopts, for example, a "WiMAX" (mobile WiMAX) system complying with IEEE 802.16 which supports an Orthogonal Frequency Division Multiple Access (OFDMA) system, to implement wide-band wireless communication.

The base station devices 1, 2, and 3 can perform communication with the terminal devices (mobile terminals) 101, 102, and 103 present in areas (cells) covered by the base station devices 1, 2, and 3, respectively.

Figure 2:
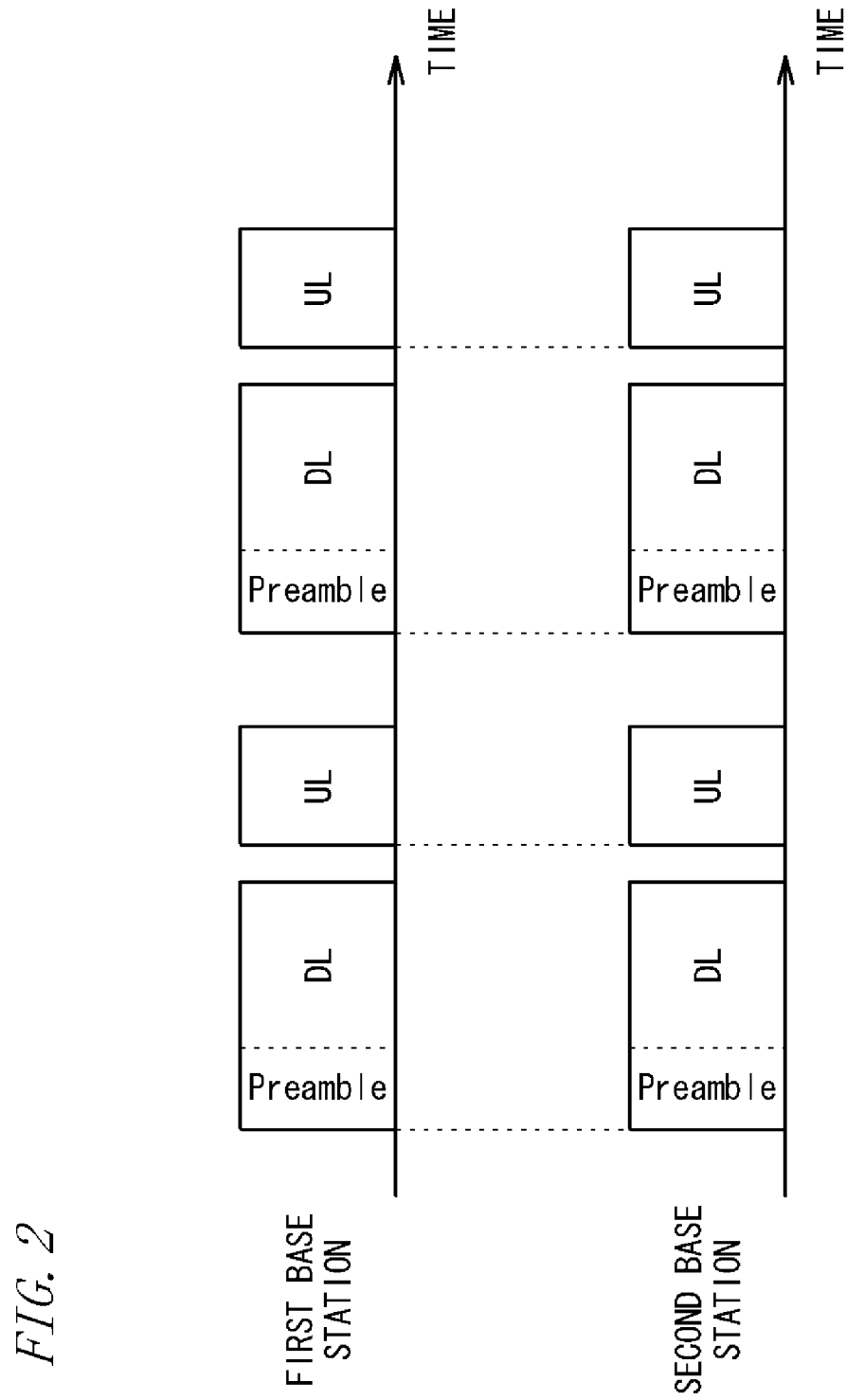
FIG. 2 is a diagram showing the state of WiMAX frames for when inter-base-station synchronization is achieved.

As shown in FIG. 2, WiMAX is a communication system in which in one basic frame a downlink subframe (the signal transmission time of the base station device) and an uplink subframe (the signal reception time of the base station device) are arranged side by side in a time direction, and transmission and reception duplexing are performed by TDD (Time-Division Duplex). Note that the duplex system is not limited to TDD and may be FDD (Frequency-Division Duplex).

The length of one basic frame is 5 msec. The downlink subframe is a time period during which the base station devices 1, 2, and 3 transmit signals to the terminal devices 101, 102, and 103 present in their respective areas, and the uplink subframe is a time period during which the base station devices 1, 2, and 3 receive signals transmitted from the terminal devices 101, 102, and 103 present in their respective areas.

Note that the downlink subframe includes, at the beginning thereof, a preamble which is a known signal.

Figure 3:
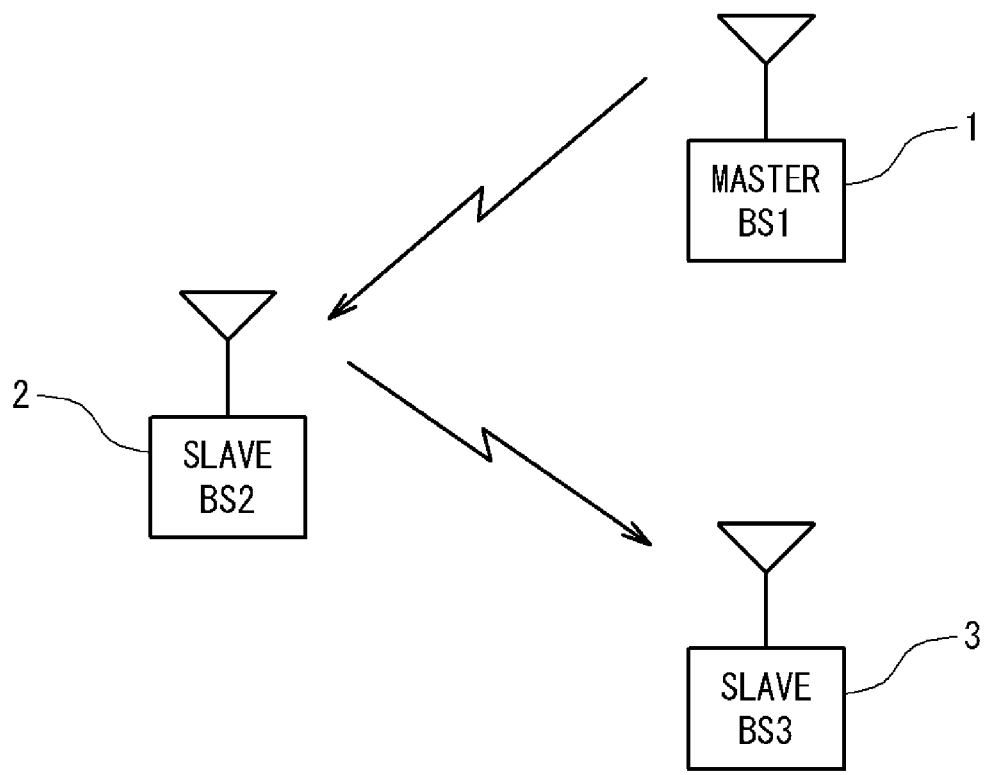
FIG. 3 is a diagram showing a master base station device and slave base station device in a wireless communication system.

As shown in FIG. 3, the plurality of base station devices 1, 2, and 3 in the wireless communication system include at least one master base station device (master BS) 1 and a plurality of slave base station devices (slave BSs) 2 and 3.

In the wireless communication system, the processes of achieving frame timing synchronization and carrier frequency synchronization are performed between the base station devices 1, 2, and 3. The master base station device 1 serves as a reference station for frame timing and a carrier frequency, and the slave base station devices 2 and 3 achieve frame timing synchronization and carrier frequency synchronization with the master base station device 1 directly or indirectly through the other slave base station device.

The frame timing synchronization is to achieve synchronization such that communication frames from the respective base station devices 1, 2, and 3 are transmitted at the same timing. That is, by the frame timing synchronization, the communication timings of the base station devices 1, 2, and 3 can coincide with one another such that, as shown in FIG. 2, during a time period (time period for downlink subframes) during which a certain base station device (first base station) performs transmission to a terminal device, another base station device (second base station) also performs transmission to a terminal device, and during a time period (time period for uplink subframes) during which the certain base station device (first base station) performs reception from a terminal device, the another base station device (second base station) also performs reception from a terminal device.

By frame timing synchronization being achieved between the base station devices, even when a terminal device gets into a state of performing communication with a plurality of base station devices at handover, etc., the terminal device can smoothly perform communication with each of the base station devices.

In addition, the carrier frequency synchronization is to allow the carrier frequencies of signals (OFDM(A) signals) which are transmitted to terminal devices from the respective base station devices 1, 2, and 3 to match between the base station devices.

By carrier frequency synchronization being achieved between the base station devices, even when a terminal device gets into a state of performing communication with a plurality of base station devices at handover, etc., the terminal device can smoothly perform communication with each of the base station devices.

Here, each terminal device has an AFC (Automatic Frequency Control) function of detecting an error in the carrier frequency of an OFDM signal received from a base station device and correcting the carrier frequency error in the received OFDM signal (the difference in carrier frequency between the transmitting side and the receiving side).

Therefore, even if there is an error in the carrier frequency of an OFDM signal received from a base station device, each terminal device can correct the error and then perform OFDM demodulation.

However, when a terminal device gets into a state of performing communication with a plurality of base station devices at handover, etc., if carrier frequency synchronization is not achieved between the base stations, it is very difficult for the terminal device to correct a carrier frequency error even if using the AFC function.

Namely, when carrier frequency synchronization is not achieved between the base stations, since, from a perspective of a certain terminal device, a carrier frequency error for one base station device differs from a carrier frequency error for another base station device, when the terminal device gets into a state of simultaneously performing communication with such a plurality of base station devices, the terminal device cannot correct a carrier frequency error.

Since the master base station device 1 is a reference station for frame timing and a carrier frequency, the master base station device 1 does not need to obtain a signal for achieving frame timing synchronization or carrier frequency synchronization between base stations, from another base station device.

For example, the master base station device 1 can be configured as a free-running master base station device that determines by itself the transmission timing of a signal, based on a clock generated by a built-in clock generator (crystal resonator) of the master base station device 1. Note that the master base station device 1 may include a GPS receiver and determine the transmission timing of a signal using a GPS signal.

On the other hand, the slave base station devices 2 and 3 obtain a signal for achieving frame timing synchronization or carrier frequency synchronization between base stations, from another base station device (the master base station device or the other slave base station device).

Figure 4:
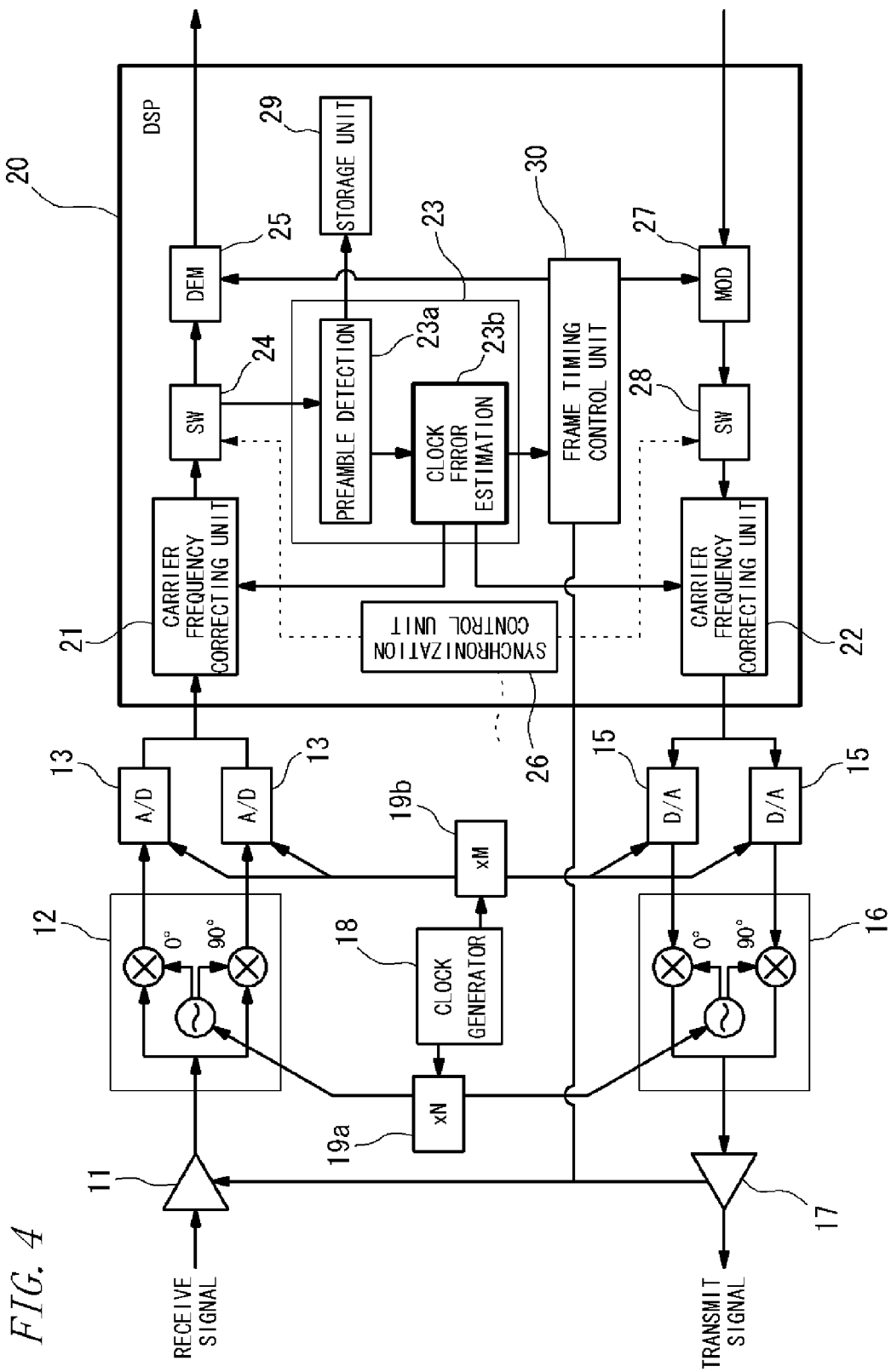
FIG. 4 is a functional block diagram of a base station device.

FIG. 4 shows a configuration of the slave base station devices 2 and 3.

The base station devices 2 and 3 have, for signal reception, an amplifier 11 that amplifies a receive signal; an orthogonal demodulator 12 that performs an orthogonal demodulation (orthogonal detection) process on the receive signal outputted from the amplifier 11; and A/D converting units 13 that perform A/D conversion on the receive signal outputted from the orthogonal demodulator 12. The receive signal having been converted to a digital signal is provided to a DSP (digital signal processing processor) 20.

In addition, the base station devices 2 and 3 have, for signal transmission, D/A converting units 15 that perform D/A conversion on a digital transmit signal; an orthogonal modulator 16 that performs an orthogonal modulation process on the transmit signal outputted from the D/A converting units 15; and an amplifier 17 that amplifies the transmit signal outputted from the orthogonal modulator 16.

Note that operating clocks for the orthogonal demodulating unit 12, the A/D converting units 13, the D/A converting units 15, and the orthogonal modulating unit 16 are provided from a built-in clock generator (reference signal generator) 18. The built-in clock generator 18 includes a crystal resonator, etc., and generates an operating clock with a predetermined frequency. Note that the clock generated by the clock generator 18 is provided to the A/D converting units 13, etc., through multiplying units 19*a* and 19*b*.

The operating clock generated by the built-in clock generator 18 is also provided to the DSP 20 and thus also serves as the operating clock of the DSP 20.

Figure 5:
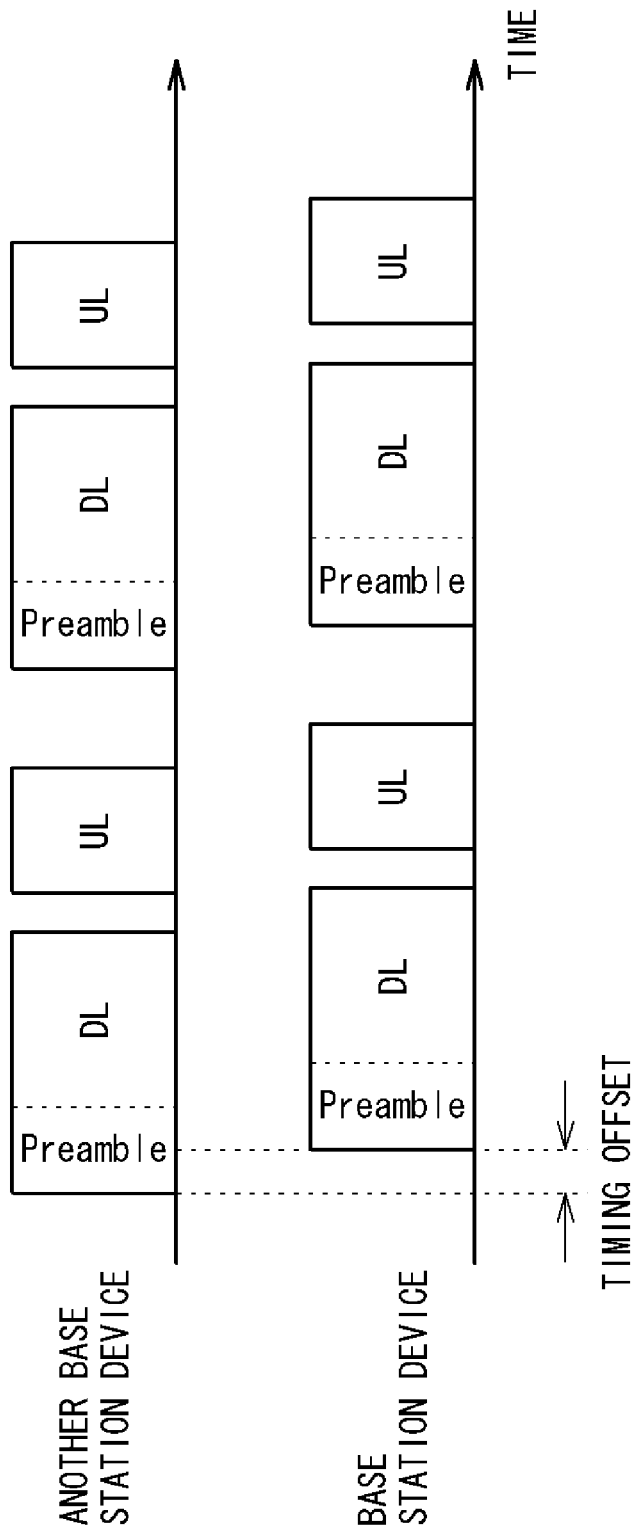
FIG. 5 is a diagram showing frames between which a timing offset occurs.

Here, the accuracy of the operating clock provided to the D/A converting units 15 affects the accuracy of the time length of a transmit frame (downlink subframe). Therefore, if the accuracy of the clock generator 18 varies between base station devices, then the time length of a transmit frame to be generated slightly varies between the base station devices. Then, when frame transmission is repeated, the difference in frame time length is accumulated, causing a mismatch in frame timing between the base station devices (communication frame timing offset) (see FIG. 5).

The DSP (signal processing unit) 20 performs signal processing on a receive signal and/or a transmit signal.

The main functions of the DSP 20 include a function as an OFDM demodulator for a receive signal, a function as an OFDM modulator for a transmit signal, a function of switching between transmission and reception (a transmit frame and a receive frame), a function of achieving frame timing synchronization between base stations, and a function of achieving carrier frequency synchronization between base station devices. In FIG. 4, blocks shown in the DSP 20 indicate these functions.

A carrier frequency correcting unit 21 in FIG. 4 corrects the carrier frequency of a receive signal. In addition, a carrier frequency correcting unit 22 that corrects the carrier frequency of a transmit signal is also provided.

The carrier frequency correcting units 21 and 22 correct the carrier frequencies of a receive signal and/or a transmit signal, based on a carrier frequency offset estimated by an estimating unit 23.

The output from the carrier frequency correcting unit 21 for a receive signal is provided to a demodulating unit (DEM) 25 through a switching switch 24. The demodulating unit 25 performs a demodulation (OFDM demodulation) process on the receive signal having been subjected to carrier frequency correction.

The switching switch 24 is to provide a receive signal to the side of the demodulating unit 25 during a communication mode in which signals from terminal devices can be received, and to provide a receive signal to the estimating unit 23 in a synchronous mode in which the communication mode is stopped (suspended).

Note that switching of the switch 24 is performed by a synchronization control unit 26. Note also that the communication mode and the synchronous mode will be described later.

The DSP 20 also includes a modulating unit (MOD) 27 that performs a modulation (OFDM modulation) process on a transmit signal. Note that the carrier frequency of a signal generated by the modulating unit 27 is determined by the orthogonal modulator 16, based on the clock frequency generated by the clock generator 18. Note also that, since a carrier frequency error in the orthogonal modulator 16 is the same as that in the orthogonal demodulator 12, by, as will be described later, shifting by the carrier frequency correcting unit 22 the carrier frequency in an opposite direction by an amount corresponding to a carrier frequency error which is estimated from a receive signal by the estimating unit 23, the carrier frequencies of transmit signals from base stations precisely match each other.

The transmit signal outputted from the modulating unit 27 is provided to the carrier frequency correcting unit 22 through a switching switch 28.

The switching switch 28 provides a transmit signal to the D/A converting units 15 during a communication mode in which signals can be transmitted to terminal devices, and does not provide a transmit signal to the D/A converting units 15 in a synchronous mode in which the communication mode is suspended.

Switching of the switch 28 is also performed by the synchronization control unit 26.

The estimating unit 23 detects a preamble which is a synchronizing signal from a receive signal, and estimates a communication frame timing offset between the base station device and another base station device and a carrier frequency offset between the base station device and another base station device.

Therefore, the estimating unit 23 has a preamble detecting unit 23a that detects a preamble included in a receive signal; and a clock error estimating unit 23b that estimates a clock error between another base station device and the device.

In the present embodiment, a preamble included at the beginning of a downlink subframe DL which is transmitted from another base station device 2 is used as a synchronizing signal for inter-base-station synchronization. Hence, the detecting unit 23a detects timing of a preamble included at the beginning of a downlink subframe DL which is transmitted from another base station device 2.

Note that, for the synchronizing signal, a midamble, a pilot signal, etc., may be used.

The base station devices 2 and 3 have, in their memories, preamble patterns which are likely to be used by their corresponding another base station devices 1 and 2, as known patterns. The detecting units 23a of the respective base station devices 2 and 3 detect timing of a preamble, etc., using these known preamble patterns.

Here, since a preamble is a known signal, the signal waveform of the preamble is also known. When a receive signal after sampling is X(t) and a signal in the discrete-time region of a preamble is P(n) (n=0, ..., N−1), a sliding correlation of P(n) is taken in a time direction with respect to a receive wave X(t) shown in (a) of FIG. 6, based on the following equation:

$$\sum_{n=0}^{N-1} X(t+n) \times \overline{P(n)} \quad \text{[Equation 1]}$$

Figure 6:
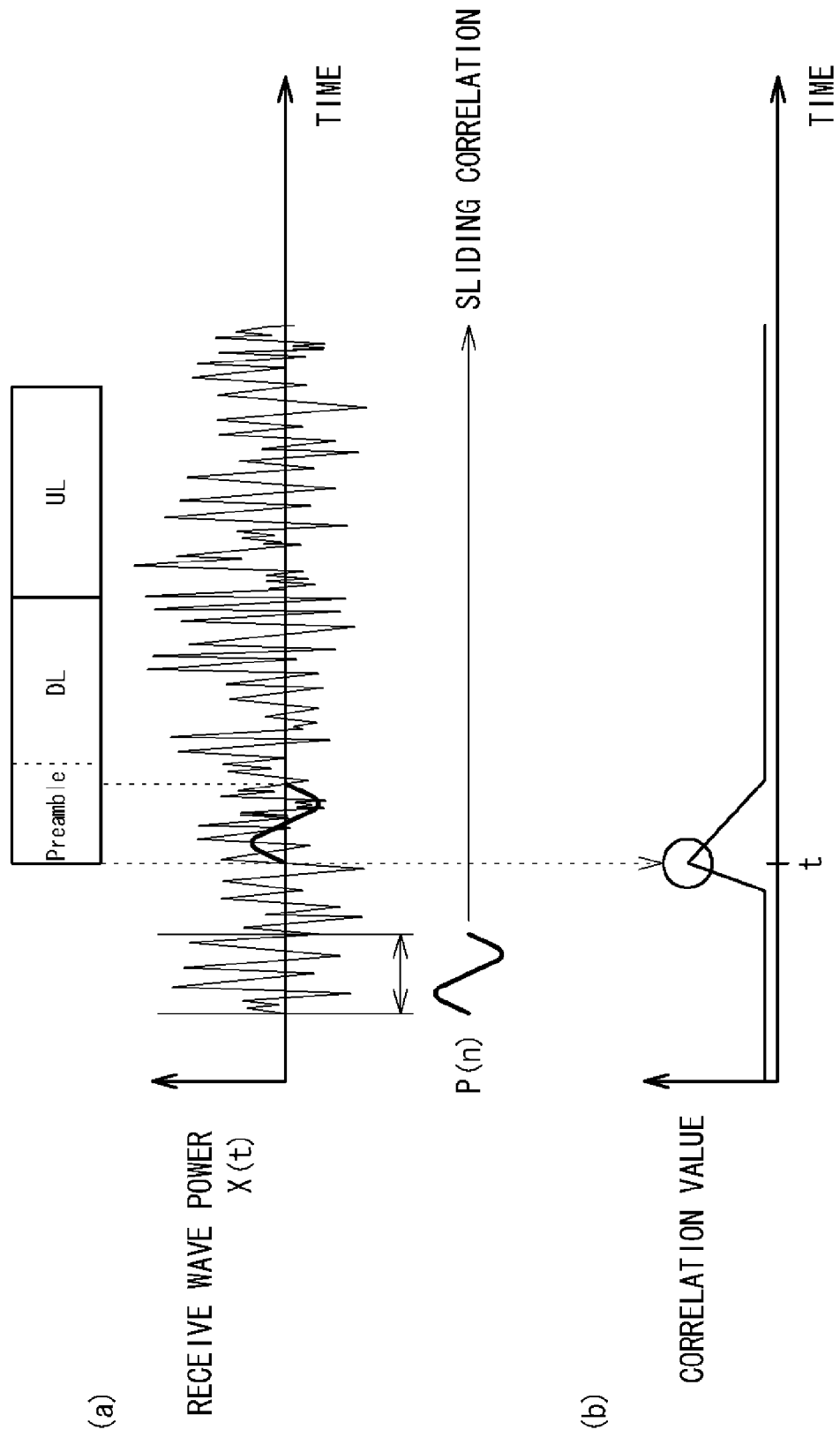
FIG. 6 is an explanatory diagram for detecting timing of a preamble.

Then, as shown in (b) of FIG. 6, the position in which the correlation value between the receive wave X(t) and the known preamble pattern P(n) reaches a peak can be detected as the timing t of the preamble.

The detecting unit 23a detects a difference between the transmission timing of the device 2, 3 and the detected preamble timing t, as an estimated value of a communication timing offset (synchronization timing error). The communication timing offset (communication frame timing offset) is provided to a storage unit 29 each time it is detected, and is accumulated in the storage unit 29.

The communication frame timing offset detected by the detecting unit 23a is provided to a frame timing control unit 30. The frame timing control unit (TDD control unit) 30 performs control to switch between transmission and reception.

The frame timing control unit 30 having received the communication frame timing offset shifts the transmission timing (transmit subframe timing) of the device in the right direction by an amount corresponding to the detected communication frame timing offset. In this manner, the transmission timing of the device coincides with the transmission timing of another base station device, enabling to achieve frame timing synchronization between the base station devices.

Note that, by allowing transmission timing to coincide with the transmission timing of another base station device, naturally, reception timings also coincide with each other. Namely, the base station device is in a state in which frame timing synchronization is achieved with another base station device.

Note also that, in the present embodiment, since a communication mode in which communication is performed with terminal devices is stopped and then synchronization is achieved using a synchronizing signal (preamble) transmitted from another base station device to a terminal device, synchronization can be achieved even if there is no control channel for achieving synchronization.

The clock error estimating unit 23b estimates a difference (clock frequency error) between a clock frequency generated by the built-in clock generator 18 of the device, the receiving side, and a clock frequency generated by the built-in clock generator 18 of another base station device, the transmitting side, based on the communication frame timing offset detected by the preamble detecting unit 23a.

The clock error estimating unit 23b estimates, under circumstances where a synchronous mode is performed periodically, a clock error based on a communication frame timing offset t1 detected in the last synchronous mode and a communication frame timing offset t2 detected in the current synchronous mode. Note that the last timing offset t1 can be obtained from the storage unit 29.

Figure 7:
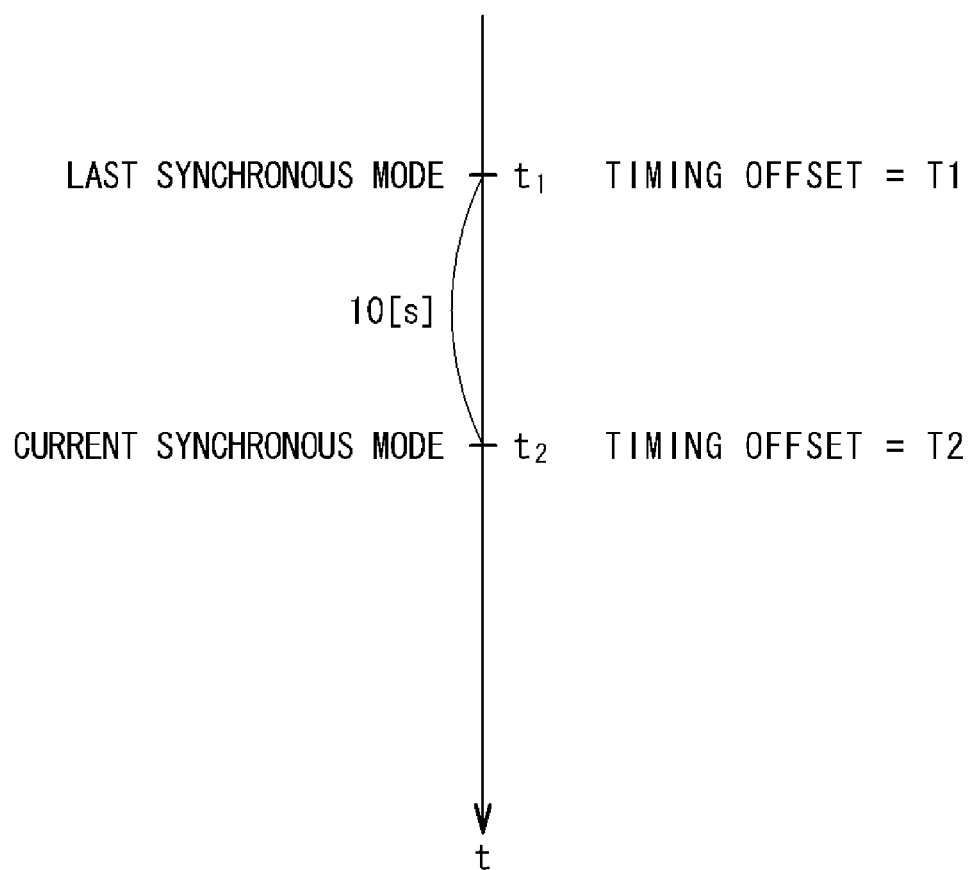
FIG. 7 is an explanatory diagram showing the amount of a timing offset between the last and current synchronous modes.

For example, it is assumed that, when the carrier frequency is 2.6 [GHz], as shown in FIG. 7, T1 is detected as a timing offset in the last synchronous mode (synchronization timing=t1) and timing is modified by an amount corresponding to T1. The timing offset after the modification is 0 [msec]. Then, it is assumed that also in the current synchronous mode (synchronization timing=t2) performed T=10 seconds later, a timing offset is detected again and the timing offset is T2=0.1 [msec].

At this time, a timing offset of 0.1 [msec] having occurred in 10 seconds is an accumulated value of the error between the clock period of a base station serving as the origin of synchronization, and the clock period of a base station serving as the target of synchronization.

Namely, the following equality is established between the timing offset and the clock period:

the clock period of the base station serving as the origin of synchronization:the clock period of the base station serving as the origin of synchronization=T:(T+T2)=10:(10+0.0001).

Then, since the clock frequency is the reciprocal of the clock period, $$\text{(the clock frequency of the base station serving as the origin of synchronization} - \text{the clock frequency of the base station serving as the target of synchronization)} =$$
$$\text{the clock frequency of the base station serving as the origin of synchronization} \times T2/(T+T2) \approx$$
$$\text{the clock frequency of the base station serving as the origin of synchronization} \times 0.00001.$$

Therefore, in this case, there is an error of 0.00001=10 [ppm] between the clock frequency of another base station device, the transmitting side, and the clock frequency of the base station device, the receiving side. The clock error estimating unit 23b estimates a clock frequency error in the above-described manner.

Then, since the carrier frequency and the timing offset are shifted in the same manner, a mismatch of an amount corresponding to 10 [ppm], i.e., a mismatch of 2.6 [GHz]×1× $10^{-5}$=26 [kHz], also occurs in the carrier frequency. In this manner, the clock error estimating unit 23b can also estimate a carrier frequency error (carrier frequency offset) from the clock frequency error.

The carrier frequency error estimated by the clock error estimating unit 23b is provided to the carrier frequency correcting units 21 and 22. In the present embodiment, not only the carrier frequency of a receive signal is corrected, as does a normal AFC (Automatic Frequency Control) function, but also the carrier frequency of a transmit signal can be corrected.

That is, an estimated value of a carrier frequency error of an OFDM signal transmitted from another base station device is also provided to the carrier frequency correcting unit 22 on the transmitting side, and the carrier frequency correcting unit 22 corrects the carrier frequency of a transmit signal to be transmitted to a terminal device. As a result, even if there is a clock frequency error, the carrier frequencies of transmit signals substantially match each other between the device and another base station device.

In addition, in the present embodiment, instead of estimating a carrier frequency error of a receive signal using a normal AFC function, an estimated value of a communication frame timing offset which is required to achieve frame timing synchronization is determined and then a carrier frequency error is estimated using the estimated value, and thus, it is advantageous in terms of configuration.

Note that an estimated value of a carrier frequency error of an OFDM signal transmitted from another base station device may be determined using a normal AFC function and the estimated value may be provided to the carrier frequency correcting unit 22 on the transmitting side.

Although in the present embodiment, for simplification of description, a direct conversion transceiver configuration that directly receives and generates an RF (Radio Frequency) signal using an analog orthogonal modulator-demodulator is employed, a superheterodyne transceiver configuration that receives and generates an IF (Intermediate Frequency) signal instead of an RF signal from an orthogonal modulator-demodulator may be employed. Alternatively, it is also possible that direct conversion is used for transmission and a superheterodyne configuration is used for reception or its other-way-around configuration may be employed. Furthermore, the configuration may be such that an orthogonal modulator-demodulator is implemented by a digital circuit and an IF frequency is directly sampled by an A/D and generated by a D/A.

Returning to FIG. 4, the synchronization control unit 26 controls, as described above, the cycle (synchronization timing) in which a communication mode is suspended, and allows the device to perform a synchronous mode.

The synchronous mode is performed in the following manner.

First, the slave base station devices 2, 3 select, at startup, one base station device from among other base station devices (the master base station device or the other slave base station device) as a source base station device, and detects a receive wave (source receive wave) of a signal (a preamble; a known signal; a synchronizing signal) transmitted from the source base station device to achieve frame timing synchronization and carrier frequency synchronization between the base station devices.

Note that a process for inter-base-station synchronization which is performed when the base station device starts up is referred to as an initial synchronous mode. The initial synchronous mode is performed at startup, as described above. More specifically, the initial synchronous mode is performed during a period between when the base station device starts up and when communication with terminal devices starts.

After the initial synchronous mode is performed, the base station device can perform communication with terminal devices present in an area of the base station device.

However, since there are variations in clock accuracy between the base station devices, mismatches occur in frame timing and carrier frequency between the base station devices with the passage of time.

Hence, the slave base station devices 2, 3 suspend (stop), at predetermined timing, communication with terminal devices (transmit signals; downlink subframes) and go into a synchronous mode for resolving synchronization mismatches (a synchronous mode in which communication is suspended).

Figure 8:
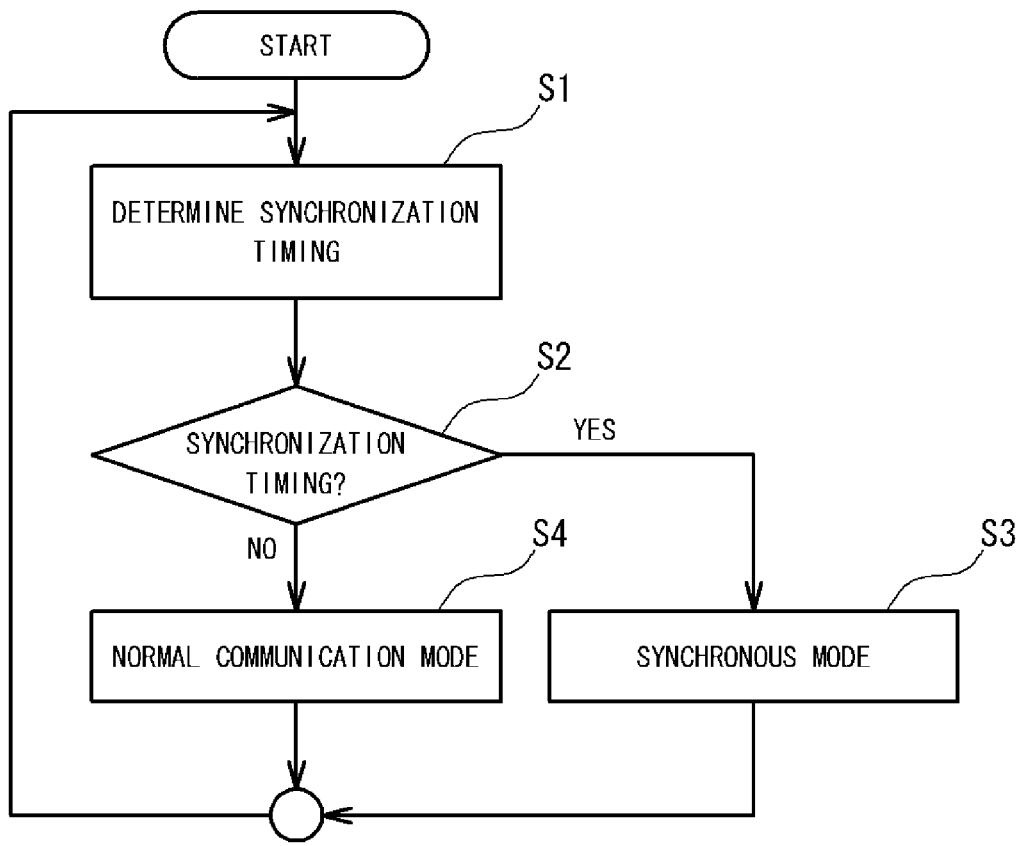
FIG. 8 is a flowchart showing switching between a normal communication mode and a synchronous mode.

FIG. 8 is a flowchart for allowing the base station devices 2, 3 to be switched from a (normal) communication mode in which communication is performed with terminal devices, to a synchronous mode in which a signal transmitted from another base station device (the master base station device or a slave base station device) is received.

As shown in FIG. 8, the base station devices 2, 3 determine whether synchronization timing at which the devices 2 and 3 should go into a synchronous mode has come (step S1). The synchronization timing is set as, for example, a cycle in which the devices 2, 3 go into a synchronous mode (every predetermined time or every predetermined number of frames). When the cycle is set using time, the cycle can be set to, for example, about 5 minutes.

If it is determined that, when the devices 2, 3 are in a normal communication mode in which communication is performed with terminal devices, timing to transition to a synchronous mode has come (step S2), then the base station devices 2, 3 transition to a synchronous mode (step S3). When the synchronous mode is terminated, the devices 2, 3 return to a normal communication mode again (step S4).

The base station devices 2, 3 perform a synchronous mode periodically or at any time as necessary while performing communication with terminal devices, whereby even if synchronization mismatches occur, the synchronization mismatches can be resolved.

When the base station devices 2, 3 go into a synchronous mode, communication with terminal devices (downlink subframe transmission) is stopped (suspended), and the devices 2, 3 are in a state of receiving a signal even at the time that is originally intended for a downlink subframe.

In the synchronous mode, a signal (OFDM signal) transmitted from another base station device 2 to a terminal device is received. In the present embodiment, a preamble which is included at the beginning of a downlink subframe DL transmitted from another base station device 2 is used as a synchronizing signal for inter-base-station synchronization, to achieve frame timing synchronization and carrier frequency synchronization.

When the above synchronous mode is terminated, the base station devices 2 and 3 return to a normal communication mode from the synchronous mode and get into a state in which the devices 2 and 3 can perform communication with terminal devices.

The synchronization control unit 26 has the function of changing the cycle in which a communication mode is suspended. That is, the cycle control unit 26 can set the cycle in which a communication mode is suspended to, for example, 5 minutes on one occasion and 6 minutes on another occasion. That is, the cycle control unit 26 can perform adaptive control of the cycle (synchronization timing) in which a communication mode is suspended.

The adaptive control of the cycle in which a communication mode is suspended (synchronization timing interval) is such that, under circumstances where a synchronization mismatch (timing offset or carrier frequency offset) is likely to become large, the cycle in which a communication mode is suspended, or the like, is reduced to frequently perform a synchronous mode to prevent the synchronization mismatch from becoming large, and under circumstances where a synchronization mismatch does not occur much, the cycle in which a communication mode is stopped (suspended), or the like, is increased to reduce the occurrence of performing a synchronous mode.

In the present embodiment, the synchronization control unit 26 changes the cycle based on a past synchronization mismatch(es) (timing offset(s)).

The storage unit 20 can store synchronization mismatch history information for a past predetermined period (past one or a plurality of timing offsets).

The synchronization control unit 26 computes information (statistic) indicating the past trend of a synchronization mismatch, based on the synchronization mismatch history information, and changes the cycle (rate of occurrence) in which a synchronous mode is performed, according to the magnitude of the information (statistic). That is, if the past synchronization mismatch is large then the cycle is reduced (the frequency is increased), and if the past synchronization mismatch is small then the cycle is increased (the rate of occurrence is reduced).

Note that information (statistic) indicating the past trend of a synchronization mismatch may be an average of the past synchronization mismatches or may be a variance value, a standard deviation, or a square average value of the past synchronization mismatches.

Note that a change to the cycle (interval) in which the device goes into a synchronous mode may be made based on other information that affects a synchronization mismatch. For example, since an ambient temperature affects the accuracy of a clock frequency, the base station device may be provided with a temperature sensor to obtain temperature information and the synchronous mode cycle (interval) may be changed based on the temperature information. Specifically, control can be performed such that if the change in temperature detected by the temperature sensor is large then the synchronous mode cycle (interval) is reduced, and if the change in temperature is small then the synchronous mode cycle (interval) is increased.

Alternatively, since synchronization accuracy is also affected by the stage number from the master base station device 1, the synchronous mode cycle may be changed according to the stage number from the master base station device 1. Here, the stage number from the master base station device 1 refers to that, when the master base station device 1 is in the first stage, as shown in FIG. 3, the slave base station device 2 whose source base station is the master base station device 1 is in the second stage, and the slave base station device 3 whose source base station is the base station device 2 in the second stage is in the third stage. In a base station device with a larger stage number from the master base station device 1 the synchronization accuracy decreases and thus the synchronous mode cycle can be reduced, and in a base station device with a smaller stage number the synchronous mode cycle can be increased.

Note that the stage number from the master base station device 1 may be set in advance in each base station device, or a device may obtain a stage number of another base station device (source base station device) when in a synchronous mode and add 1 to the stage number obtained to set a value as the stage number of the device. To obtain a stage number of another base station device (source base station device), for example, in the case of WiMAX, since a plurality of types of preamble patterns are defined, such patterns can be used. Specifically, by allocating in advance a predetermined preamble pattern to each stage, a base station device that performs a synchronization process can grasp the stage number of another base station device (source base station device) by identifying a preamble pattern.

[Chapter 2 Over-the-air Synchronization for Frequency-Division Duplex]

In base station devices which are described in this Chapter 2, the techniques for base station devices described in Chapter 1 are employed within the consistent scope. In this Chapter 2, for those points that are not particularly described, the matters described in Chapter 1 are incorporated.

[2.1 First Embodiment]

Figure 9:
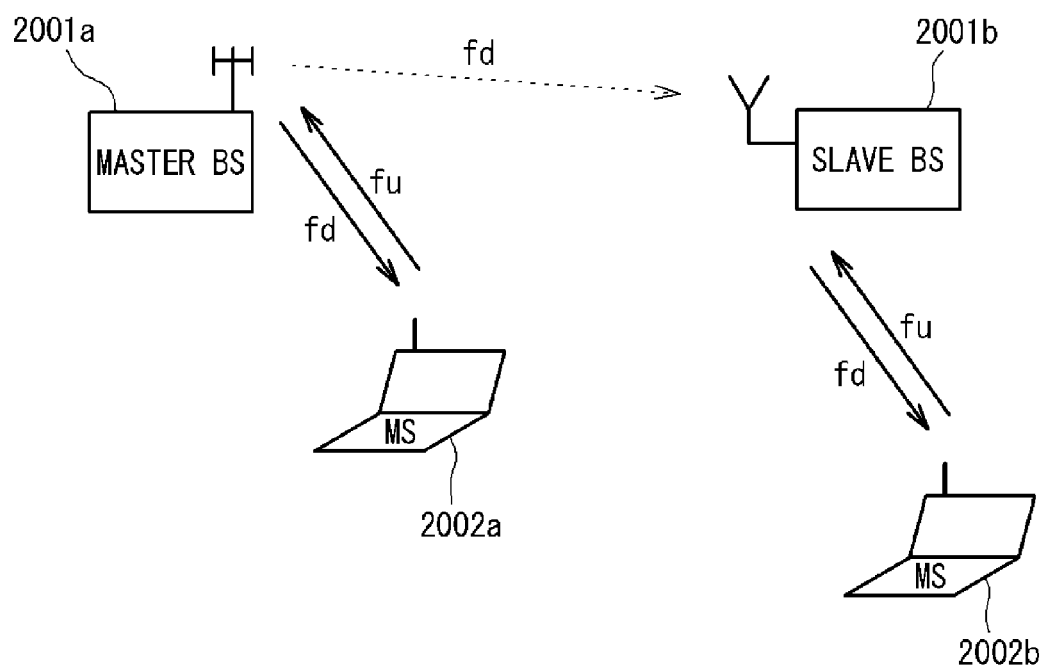
FIG. 9 is an overall view of a wireless communication system according to Chapter 2.

FIG. 9 shows a communication system in which wireless communication is performed between base station devices 2001*a* and 2001*b* and terminal devices (mobile terminals; MSs; Mobile Stations) 2002*a* and 2002*b*. In the communication system, the plurality of base station devices (BSs; Base Stations) 2001*a* and 2001*b* are installed and can perform communication with the terminal devices 2002*a* and 2002*b* present in their respective cells.

In the communication system, frequency-division duplex is adopted as a duplex system. In the frequency-division duplex, uplink communication and downlink communication are simultaneously performed by making the frequency $f_u$ of an uplink signal (a transmit signal from a terminal device to a base station device) different from the frequency $f_d$ of a downlink signal (a transmit signal from the base station device to the terminal device). Such a communication system includes, for example, mobile phone systems such as LTE (Long-Term Evolution), WCDMA, and CDMA2000.

In the communication system in the present embodiment, while the frequency-division duplex system is adopted, inter-base-station synchronization where frame timing synchronization is achieved between the plurality of base station devices 2001*a* and 2001*b* is performed. In the present embodiment, inter-base-station synchronization is performed by "over-the-air synchronization" where synchronization is achieved such that a signal which is transmitted from the base station device serving as a master (hereinafter, referred to as the "master BS") 2001*a* to the terminal device 2002*a* in a cell of the master BS 2001*a* is received by another base station device (hereinafter, referred to as the "slave BS") 2001*b*.

Note that the master BS may further achieve over-the-air synchronization with another base station device or may determine frame timing by any other method than over-the-air synchronization, e.g., determining frame timing using a GPS signal.

Figure 10:
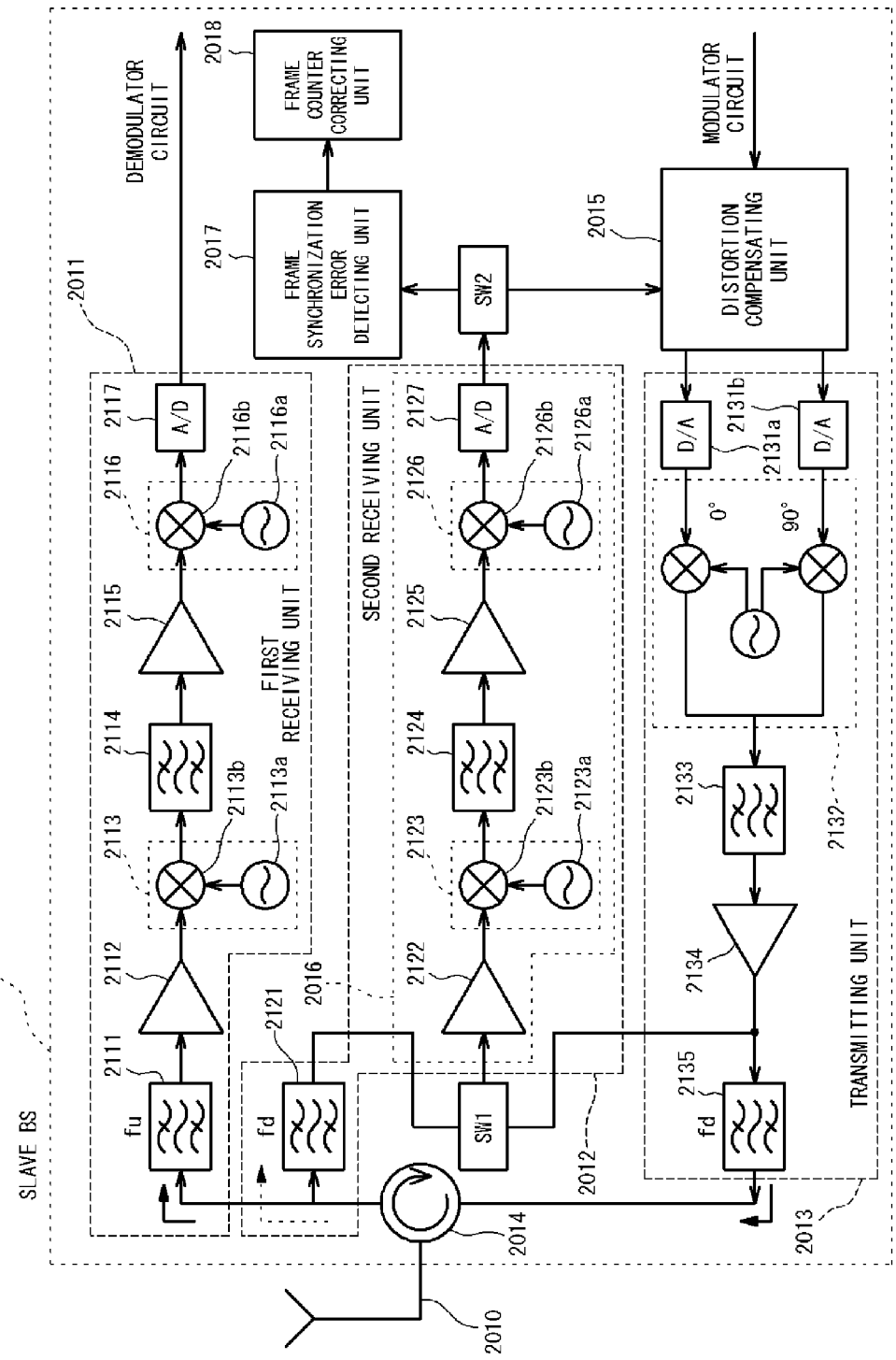
FIG. 10 is a configuration diagram of transmitting and receiving circuits of a slave BS (base station device) according to a first embodiment in Chapter 2.

FIG. 10 shows a configuration of the slave BS 2001*b*. The slave BS 2001*b* can receive a signal transmitted from the master BS 2001*a*, to perform over-the-air synchronization. The slave BS 2001*b* includes an antenna 2010, a first receiving unit 2011, a second receiving unit 2012, and a transmitting unit 2013. The most part of the second receiving unit 2012 also serves as a detection circuit 2016 that detects an output from an amplifier 2134 included in the transmitting unit 2013, which will be described later.

In addition, the slave BS 2001b includes a circulator 2014. The circulator 2014 is to provide receive signals from the antenna 2010, to the side of the first receiving unit 2011 and the second receiving unit 2012 and to provide a transmit signal outputted from the transmitting unit 2013, to the side of the antenna 2010. By the circulator 2014 and a fourth filter 2135 in the transmitting unit 2013, a receive signal from the antenna 2010 is prevented from being conveyed to the side of the transmitting unit 2013. In addition, by the circulator 2014 and a first filter 2111 in the first receiving unit, a transmit signal outputted from the transmitting unit 2013 is prevented from being conveyed to the first receiving unit 2011. Furthermore, by the circulator 2014 and a fifth filter 2121, a transmit signal outputted from the transmitting unit 2013 is prevented from being conveyed to the second receiving unit 2012.

The first receiving unit 2011 is to receive an uplink signal from the terminal device 2002b. The first receiving unit 2011 is configured as a superheterodyne receiver and is configured to perform IF (Intermediate Frequency) sampling. More specifically, the first receiving unit 2011 includes the first filter 2111, a first amplifier 2112, a first frequency converting unit 2113, a second filter 2114, a second amplifier 2115, a second frequency converting unit 2116, and an A/D converting unit 2117.

The first filter 2111 is to allow only an uplink signal from the terminal device 2002b to pass therethrough, and is configured by a band-pass filter that allows only the frequency $f_u$ of an uplink signal to pass therethrough. The receive signal having passed through the first filter 2111 is amplified by the first amplifier (high-frequency amplifier) 2112 and is then subjected to conversion from the frequency $f_u$ to a first intermediate frequency by the first frequency converting unit 2113. Note that the first frequency converting unit 2113 is configured by an oscillator 2113a and a mixer 2113b.

The output from the first frequency converting unit 2113 passes through the second filter 2114 that allows only the first intermediate frequency to pass therethrough and is then amplified again by the second amplifier (intermediate frequency amplifier) 2115. The output from the second amplifier 2115 is converted from the first intermediate frequency to a second intermediate frequency by the second frequency converting unit 2116 and is further converted to a digital signal by the A/D converting unit 117. Note that the second frequency converting unit 2116 is also configured by an oscillator 2116a and a mixer 2116b.

The output from the A/D converting unit 2117 (output from the first receiving unit 2011) is provided to a demodulator circuit and a demodulation process for the receive signal from the terminal device 2002b is performed.

As such, the first receiving unit 2011 converts an analog uplink signal received by the antenna 2010 to a digital signal and provides the digital uplink signal to the demodulator circuit configured as a digital signal processing device.

The transmitting unit 2013 receives, through a distortion compensating unit 2015, modulating signals I and Q which are outputted from a modulator circuit and transmits the signals from the antenna 2010, and is configured as a direct conversion transmitter. The transmitting unit 2013 includes D/A converters 2131a and 2131b, an orthogonal modulator 2132, a third filter 2133, the third amplifier (high power amplifier; HPA) 2134, and the fourth filter 2135.

The distortion compensating unit 2015 performs distortion compensation for the third amplifier 2134 included in the transmitting unit, and performs distortion compensation on modulating signals I and Q outputted from the modulator circuit and then provides the modulating signals I and Q to the transmitting unit. Note that the distortion compensating unit 2015 is configured as a digital signal processing device. Note that the digital signal processing device also includes the modulator circuit that generates modulating signals I and Q.

The D/A converters 2131a and 2131b perform D/A conversion on the modulating signals I and Q, respectively. The outputs from the D/A converters 2131a and 2131b are provided to the orthogonal modulator 2132, and a transmit signal whose carrier wave frequency is $f_d$ (downlink signal frequency) is generated by the orthogonal modulator 2132.

The output from the orthogonal modulator 2132 passes through the third filter 2133 that allows only the frequency $f_d$ to pass therethrough and is then amplified by the third amplifier 2134 and further passes through the fourth filter 2135 that allows only the frequency $f_d$ to pass therethrough and is then transmitted from the antenna 2010, serving as a downlink signal to the terminal device 2002b.

In order to perform, by the distortion compensating unit 2015, distortion compensation for the third amplifier (HPA) 2134 included in the transmitting unit 2013, there is required the detection circuit 2016 that detects an output from the third amplifier 2134, which is an output from the transmitting unit 2013, and provides the output to the distortion compensating unit 2015. The detection circuit 2016 is connected to the output side of the third amplifier 2134 through a directional coupler (not shown). The detection circuit 2016 performs amplification, frequency conversion, A/D conversion, etc., on a detected signal in the output from the third amplifier 2134 and then provides (feeds back) the detected signal to the distortion compensating unit (signal processing device) 2015.

More specifically, the detection circuit 2016 includes a fourth amplifier (high-frequency amplifier) 2122, a third frequency converting unit 2123, a sixth filter 2124, a fifth amplifier (intermediate frequency amplifier) 2125, a fourth frequency converting unit 2126, and an A/D converting unit 2127.

The fourth amplifier (high-frequency amplifier) 2122 amplifies a detected signal in the output from the third amplifier 2134, and the output from the fourth amplifier 2122 is subjected to conversion from the downlink signal frequency $f_d$ to the first intermediate frequency by the third frequency converting unit 2123. Note that the third frequency converting unit 2123 is configured by an oscillator 2123a and a mixer 2123b.

The output from the third frequency converting unit 2123 passes through the sixth filter 2124 that allows only the first intermediate frequency outputted from the third frequency converting unit 2123 to pass therethrough and is then amplified again by the fifth amplifier (intermediate frequency amplifier) 2125. The output from the fifth amplifier 2125 is converted from the first intermediate frequency to the second intermediate frequency by the fourth frequency converting unit 2126 and is further converted to a digital signal by the A/D converting unit 2127. Note that the fourth frequency converting unit 2126 is also configured by an oscillator 2126a and a mixer 2126b.

The output from the A/D converting unit 2127 (output from the detection circuit 2016) is provided to the distortion compensating unit 2015 and is used for a distortion compensation process.

As such, the detection circuit 2016 configures a feedback unit for feeding back an analog downlink signal generated by the transmitting unit 2013 to the distortion compensating unit (signal processing device) 2015.

The above-described first receiving unit 2011, transmitting unit 2013, and detection circuit 2016 serve the functions required to perform communication with a terminal device, but in the case of the frequency-division duplex system, over-the-air synchronization cannot be performed only with these functions.

That is, in order to achieve, by the slave BS 2001b, synchronization with the master BS 2001a by over-the-air synchronization, the slave BS 2001b needs to receive a downlink signal transmitted from the master BS 2001a. However, since the frequency of a downlink signal is $f_d$ and thus is different from the frequency $f_u$ of an uplink signal, the downlink signal cannot be received by the first receiving unit 2011.

That is, since the first receiving unit 2011 includes the first filter 2111 that allows only a signal with the frequency $f_u$ to pass therethrough and the second filter 2114 that allows only the first intermediate frequency having been converted from the frequency $f_u$ to pass therethrough, even if a signal with a frequency other than the frequency $f_u$ (the frequency $f_d$ of a downlink signal) is provided to the first receiving unit 2011, the signal cannot pass through the first receiving unit 2011.

Namely, the first receiving unit 2011 is compatible with reception of a signal with the uplink signal frequency $f_u$ by the presence of the filters 2111 and 2114 included in the first receiving unit 2011 and thus cannot receive signals with other frequencies.

Hence, the slave BS 2001b in the present embodiment includes, separately from the first receiving unit 2011, the function (second receiving unit 2012) of performing reception of a downlink signal with the frequency $f_d$ which is transmitted from the master BS 2001a.

Here, the transmitting unit 2013 is to transmit a downlink signal and since the frequency of the downlink signal is $f_d$, the detection circuit is compatible with the frequency $f_d$ of a downlink signal.

That is, both the circuit (second receiving unit 2012) for performing reception of a downlink signal which is transmitted from the master BS 2001a and the detection circuit (feedback unit) 2016 that detects a transmit signal outputted from the transmitting unit 2013 are compatible with the frequency $f_d$ of a downlink signal. The function of the detection circuit 2016 is to convert a detected signal to a digital signal and thus is similar to the function of a receiving unit that converts a received signal to a digital signal.

Hence, in the present embodiment, the detection circuit (feedback unit) 2016 also functions as the second receiving unit 2012 for performing reception of a downlink signal with the frequency $f_d$ which is transmitted from the master BS 2001a.

To use the detection circuit 2016 also as the second receiving unit 2012, in the present embodiment, switching switches SW1 and SW2 are provided to the input side and the output side of the detection circuit 2016, respectively. The first switching switch SW1 is disposed on the input side of the fourth amplifier 2122 in the detection circuit 2016. By switching these switching switches SW1 and SW2, a circuit including from the fourth amplifier 2122 to the A/D converting unit 2127 can be used as the second receiving unit 2012 and as the detection circuit 2016.

Note that the most part of a signal outputted from the transmitting unit 2013 is outputted to the side of the antenna 2010 by the circulator 2014 and thus the signal is not provided to the side of the second receiving unit 2012.

The first switching switch SW1 selectively provides an output from the third amplifier 2135 in the transmitting unit 2013 and a receive signal outputted from the circulator 2014, to the fourth amplifier 2122. The fifth filter 2121 that allows only a signal with the frequency $f_d$ to pass therethrough is disposed between the circulator 2014 and the first switching switch SW1, and outputs only a downlink signal with the frequency $f_d$ among receive signals which are outputted from the circulator 2014, to the side of the first switching switch SW1.

The second switching switch SW2 selectively provides an output from the A/D converting unit 2127 in the detection circuit 2016 (second receiving unit 2012), to the distortion compensating unit 2015 or a frame synchronization error detecting unit 2017.

When the circuit including from the fourth amplifier 2122 to the A/D converting unit 2127 is used as the detection circuit (feedback unit) 2016, the first switching switch SW1 is switched such that an output from the third amplifier 2134 in the transmitting unit 2013 is provided to the fourth amplifier 2122, and the second switching switch SW2 is switched such that an output from the A/D converting unit 2127 is provided to the distortion compensating unit 2015. This state is called a first state.

On the other hand, when the circuit including from the fourth amplifier 2122 to the A/D converting unit 2127 is used as the second receiving unit 212, the first switching switch SW1 is switched such that a signal received by the antenna 2010 is provided to the fourth amplifier 2122, and the second switching switch SW2 is switched such that an output from the A/D converting unit 2127 is provided to the frame synchronization error detecting unit 2017. Note that this state is called a second state.

Figure 11:
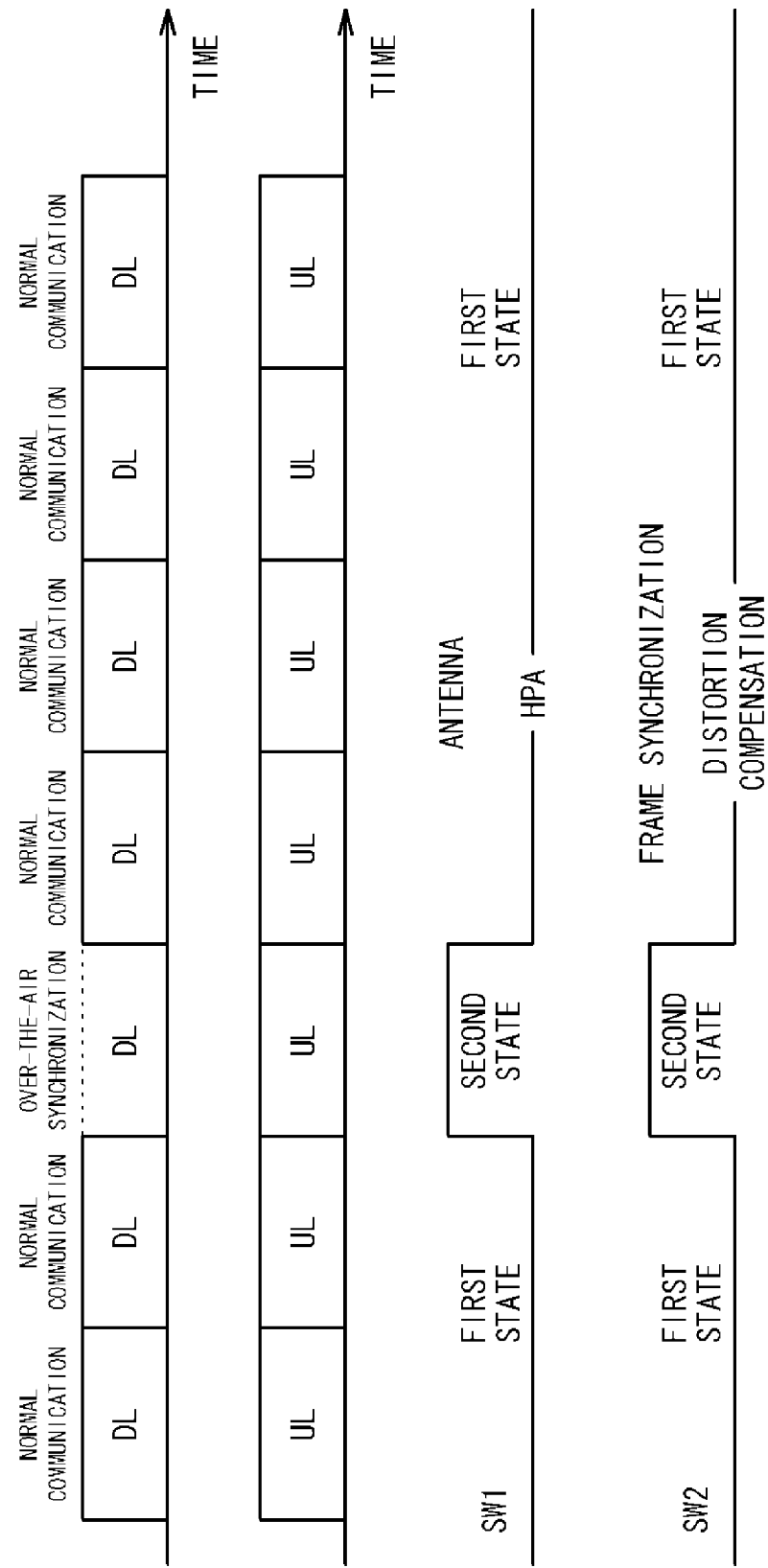
FIG. 11 is a diagram showing over-the-air synchronization timing.

Switching control of the first and second switching switches SW1 and SW2 is performed by a control unit (not shown) of the slave BS 2001b. FIG. 11 shows how to control the first and second switching switches SW1 and SW2. The slave BS 1b is in a normal communication state (first state) at all times in which communication with the terminal device 2b is performed, but periodically goes into an over-the-air synchronization state (second state) in which over-the-air synchronization is performed.

As shown in FIG. 11, in the over-the-air synchronization state, the first switching switch SW1 is switched to the side of the antenna 2010 and the second switching switch SW2 is switched to the side of the frame synchronization error detecting unit 2017.

Accordingly, the frame synchronization error detecting unit 2017 can obtain a downlink signal transmitted from the master BS 2001a. The frame synchronization error detecting unit 2017 detects frame transmission timing of the master BS 2001a using a known signal such as a preamble included in the downlink signal, and detects an error (frame synchronization error) between the detected frame transmission timing and frame transmission timing of the device 2001b. Specifically, the slave BS 2001b detects timing of a known signal present at a predetermined location in the received downlink signal frame, and thereby detects frame transmission timing of the master BS 2001a. Then, the slave BS 2001b compares the detected frame transmission timing of the master BS 2001a with frame transmission timing of the device 2001b to detect a frame synchronization error.

The detected frame synchronization error is provided to a frame counter correcting unit 2018. The frame counter correcting unit 2018 corrects the value of a frame counter which determines frame transmission timing, according to the detected frame synchronization error. In this manner, the slave BS 2001b can be synchronized with the master BS 2001a. Note that the target for detection and correction of a synchronization error is not limited to frame timing and may be symbol timing or slot timing.

When the over-the-air synchronization is completed, the first switching switch SW1 is switched to the side of the third amplifier (HPA) 2134 and the second switching switch SW2 is switched to the side of the distortion compensating unit 2015. Accordingly, the slave BS 2001b returns to a normal communication state. Note that although in FIG. 11 over-the-air synchronization is performed using the amount of time corresponding to a single downlink frame, over-the-air synchronization may be performed using the amount of time corresponding to a plurality of frames.

Figure 12:
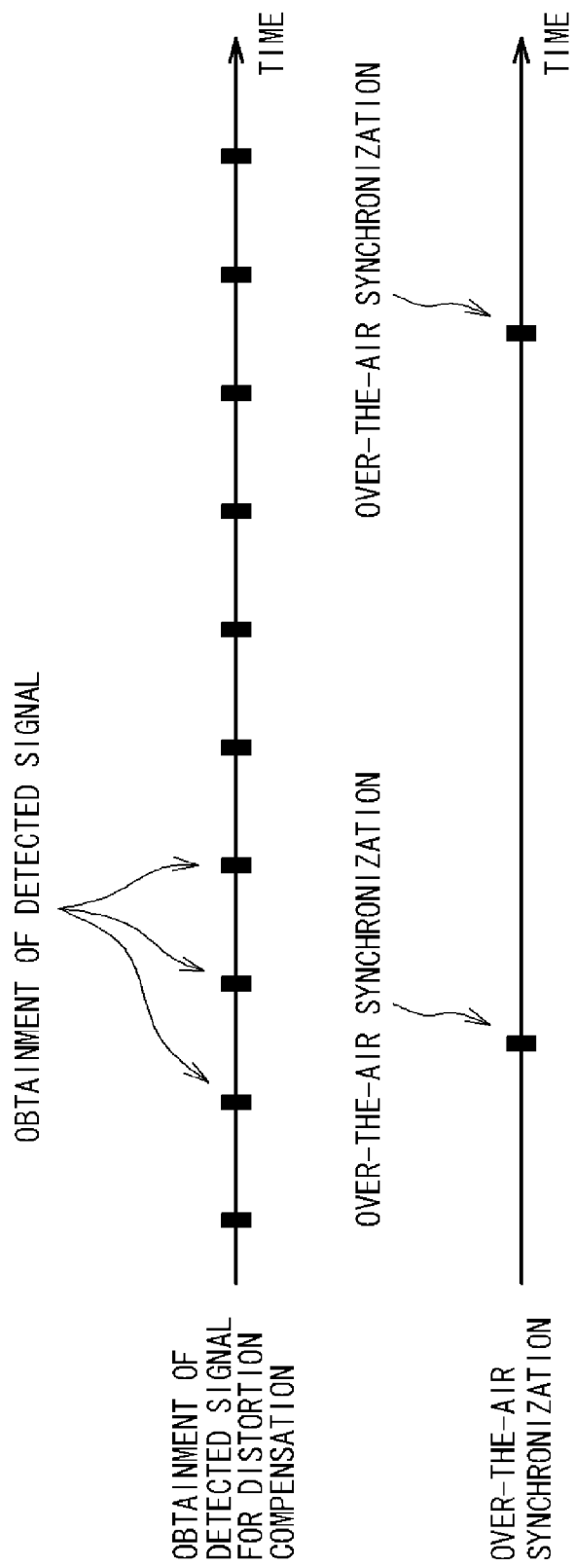
FIG. 12 is a diagram showing a relationship between detected signal obtaining timing for distortion compensation and over-the-air synchronization timing.

As described above, a detect signal of an output from the third amplifier 2134 is provided to the distortion compensating unit 2015 all the time except for during over-the-air synchronization, but the distortion compensating unit 2015 does not need an output from the third amplifier 2134 at all times. As shown in FIG. 12, the distortion compensating unit 2015 periodically obtains a detected signal of an output from the third amplifier 2134. Note that distortion compensation by the distortion compensating unit 2015 itself is performed at all times.

A detected signal obtaining process for distortion compensation and an over-the-air synchronization process are completely different controls and thus are performed at their own timings. In the present embodiment, since the detection circuit 2016 and the second receiving unit 2012 are formed as one common unit, it is necessary that the two processes not be performed simultaneously.

Hence, in a control unit (not shown) of the slave BS 2001b, as shown in FIG. 12, the timings at which a detected signal obtaining process for distortion compensation and an over-the-air synchronization process are performed are set such that the two processes are not performed simultaneously.

In FIG. 12, it is premised that the cycles in which a detected signal obtaining process for distortion compensation and an over-the-air synchronization process are performed are both fixed. However, when the cycle (s) in which any one or both of the processes is (are) performed is (are) not fixed, there is a possibility that the two processes may be performed simultaneously. In this case, the above-described control unit performs an over-the-air synchronization exclusion process in FIG. 13 so as to prevent the cycles in which a detected signal obtaining process for distortion compensation and an over-the-air synchronization process are performed from being performed simultaneously.

Figure 13:
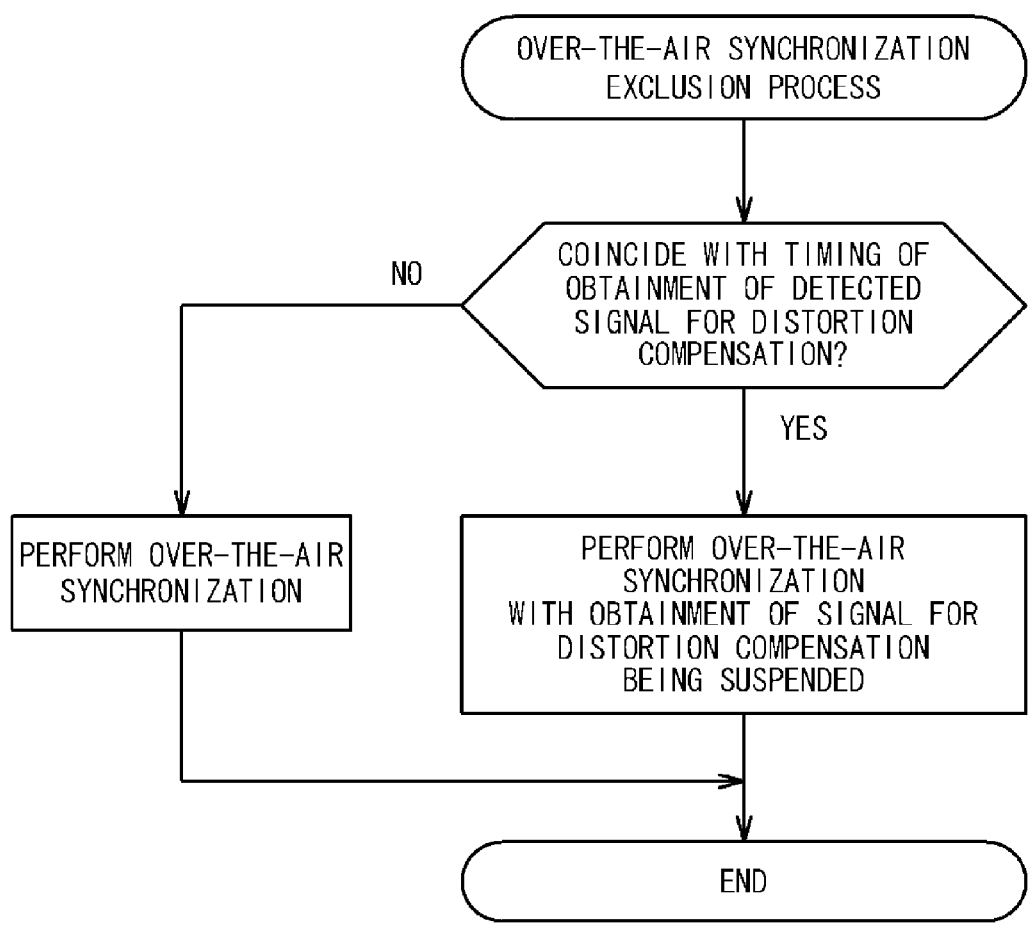
FIG. 13 is a flowchart of an over-the-air synchronization exclusion process.

In the over-the-air synchronization exclusion process, as shown in FIG. 13, when over-the-air synchronization is attempted to be performed, it is determined in advance whether the timing thereof coincides with the timing of obtainment of a detected signal for distortion compensation. If the timings do not coincide, then the first and second switches SW1 and SW2 are switched to a second state and over-the-air synchronization is performed. If the timings coincide, then the obtainment of a detected signal by the distortion compensating unit 2015 is suspended and then the first and second switches SW1 and SW2 are switched to a second state and over-the-air synchronization is performed. In this manner, parameters for distortion compensation can be prevented from being calculated with the distortion compensating unit 2015 being unable to obtain a detected signal, and accordingly, a reduction in the accuracy of distortion compensation thereafter can be prevented.

Note that when, as shown in FIG. 12, obtainment of a detected signal for distortion compensation is performed more frequently than over-the-air synchronization, by giving a high priority to the over-the-air synchronization of a lower frequency of occurrence, the influence exerted on the two processes can be suppressed. However, when over-the-air synchronization is performed more frequently than obtainment of a detected signal for distortion compensation, distortion compensation may be given a high priority and over-the-air synchronization may be suspended.

When synchronization is achieved between the master BS 2001a and the slave BS 2001b in the above-described manner, even if broadcast transmission where information of the same content is simultaneously transmitted to numbers of terminal devices from the two base station devices 2001a and 2001b is performed, signals from the two base station devices 2001a and 2001b can be prevented from interfering with each other.

In addition, since synchronization between the two base station devices 2001a and 2001b is achieved, by transmitting signals of the same content from the two base station devices 2001a and 2001b, macrodiversity or spatial multiplexing transmission can be performed on the side of the terminal devices 2001a and 2001b.

[2.2 Second Embodiment]

Figure 14:
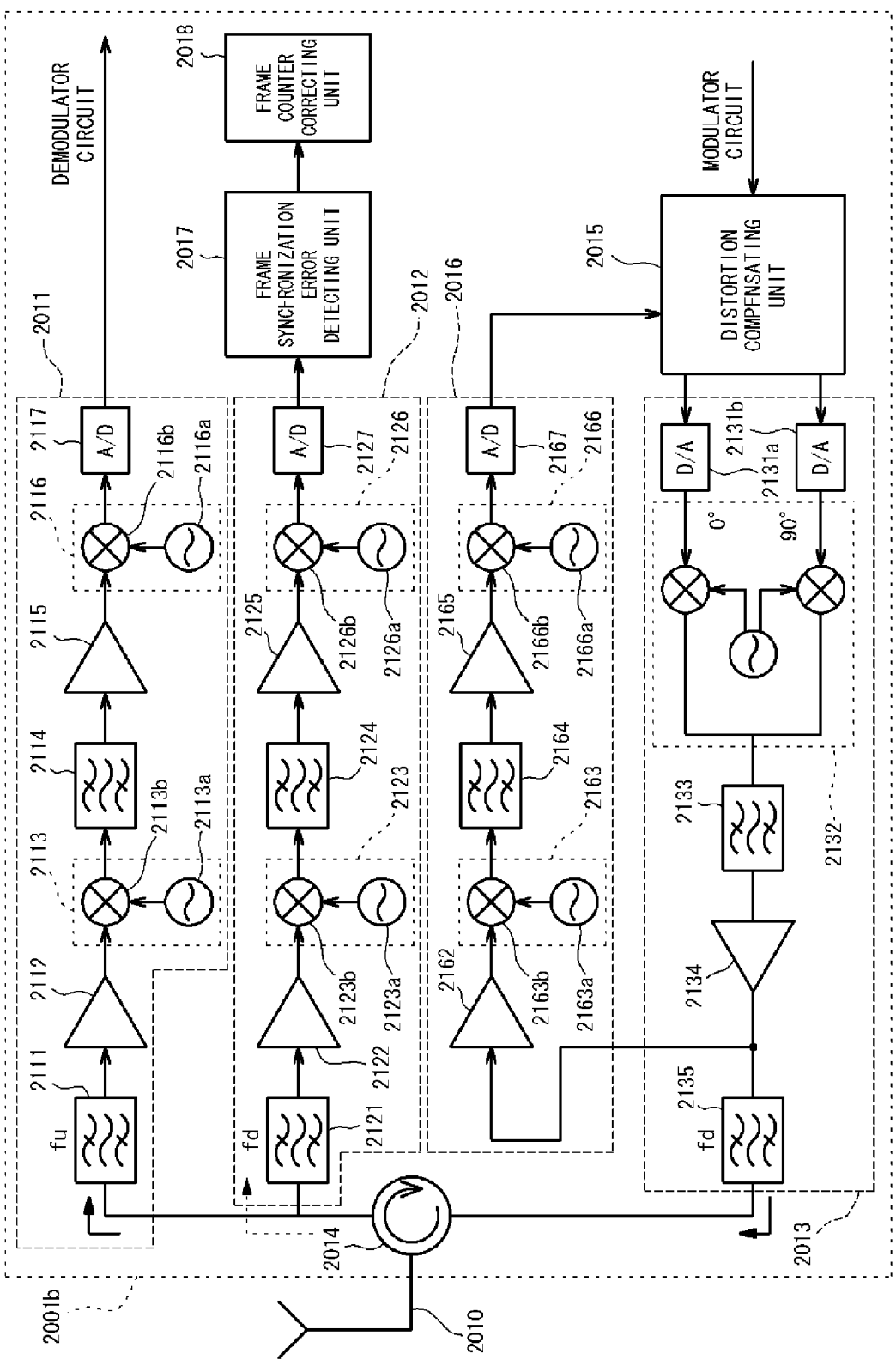
FIG. 14 is a configuration diagram of transmitting and receiving circuits of a slave BS according to a second embodiment in Chapter 2.

FIG. 14 shows a configuration of a slave BS 2001b according to a second embodiment. In the second embodiment, a second receiving unit 2012 and a detection circuit 2016 are formed as separate circuits instead of being formed as a common unit. Elements 2162 to 2167 in the detection circuit 2016 are the same as the elements 2122 to 2127 in the second receiving unit 2012. In addition, in a variant, those configurations common to those of the circuits in FIG. 2 are denoted by the same reference numerals.

According to this variant, reception for over-the-air synchronization and obtainment of a detected signal for distortion compensation can be performed simultaneously. Note that the detection circuit 2016 and a distortion compensating unit 2015 may be removed and modulating signals I and Q which are outputted from a modulator circuit may be directly provided to D/A converting units 2131a and 2131b.

[2.3 Third Embodiment]

Figure 15:
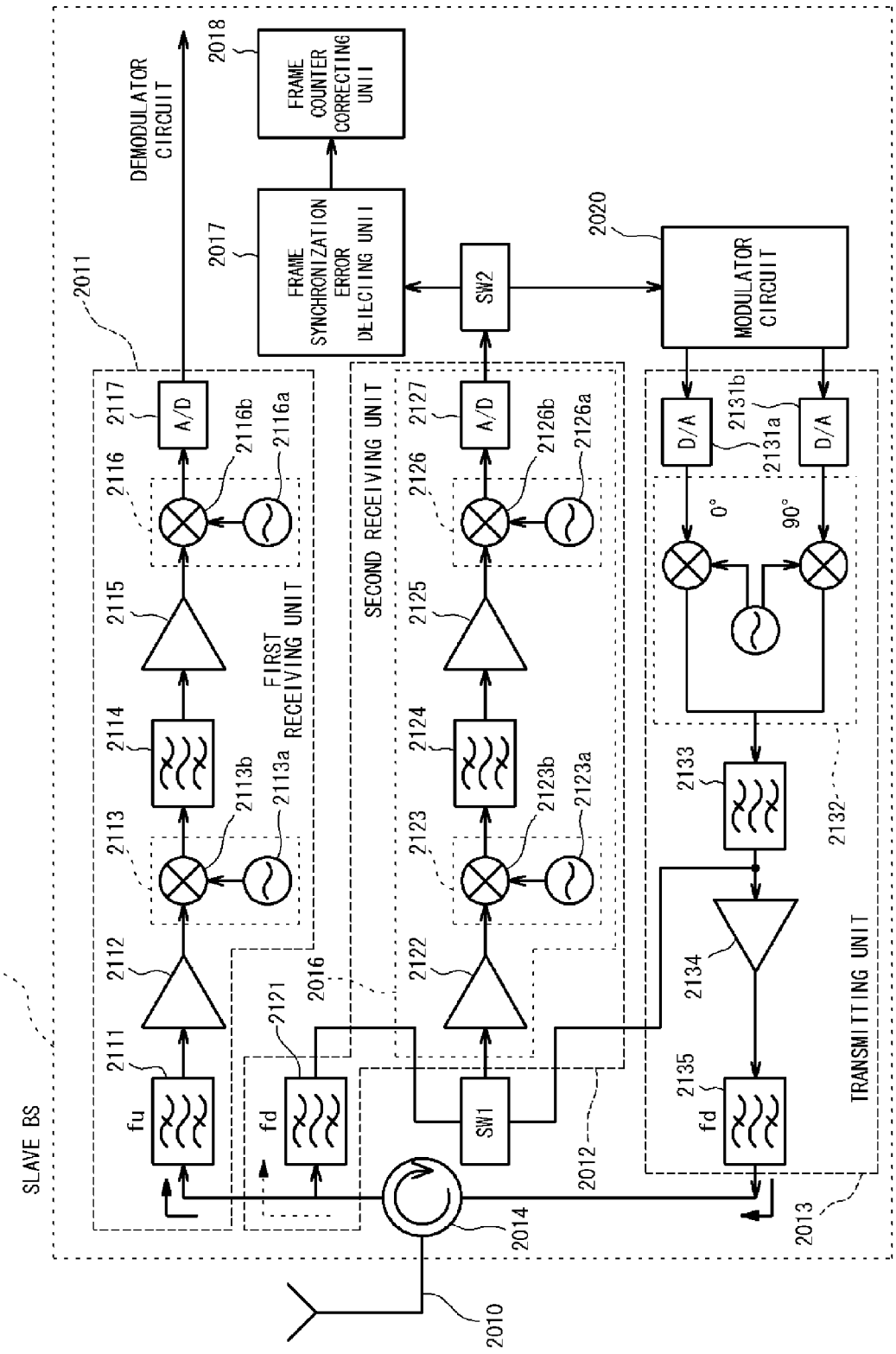
FIG. 15 is a configuration diagram of transmitting and receiving circuits of a slave BS according to a third embodiment in Chapter 2.

FIG. 15 shows a configuration of a slave BS 2001b according to a third embodiment. In the third embodiment, the configuration is such that, in the circuits in the first embodiment shown in FIG. 10, a distortion compensating unit 2015 is removed, and an output from a detection circuit (feedback unit) 2016 is provided to a modulator circuit (digital signal processing device) 2020, whereby a downlink signal generated by a transmitting unit 2013 is fed back to the modulator circuit (digital signal processing device) 2020.

Downlink signal feedback is, for example, to modify a timing error of modulating signals I and Q generated by the modulator circuit 2020, etc., according to the amount of feedback. Note, however, that the purpose of downlink signal feedback is not particularly limited and it is sufficient if a detected value of an analog downlink signal generated by the transmitting unit 2013 is fed back when the digital signal processing device 2020 generates signals (modulating signals I and Q) which are provided to the input side of the transmitting unit 2013, and the amount of the feedback (detected value) is used for the generation of signals (modulating signals I and Q) which are provided to the input side of the transmitting unit 2013.

In the third embodiment, a downlink signal which is provided to the detection circuit (feedback unit) 2016 is not the one outputted from a third amplifier 2134 but is the one outputted from a third filter 2133 (the one inputted to the third amplifier 2134).

Here, when, as in the first embodiment, downlink signal feedback is performed for distortion compensation for the third amplifier 2134, a detected signal of an output from the third amplifier 2134 needs to be provided to a distortion compensating unit 2020.

Meanwhile, if the purpose is not distortion compensation for the amplifier, then it is sufficient that a signal detected in an output from the third filter 2133 (output from an orthogonal modulator 2132) is provided to the modulator circuit (signal processing device) 2020. Note that, even when the purpose is not distortion compensation for the amplifier, a detected signal of an output from the third amplifier 2134 may be provided to the modulator circuit (signal processing device) 2020.

In the third embodiment, as in the first embodiment, at all times except for during over-the-air synchronization, in order for the device to go into a first state (normal communication state) in which a detected signal in a downlink signal generated by the transmitting unit 2013 is provided to the modulator circuit 2020, a first switching switch SW1 is switched to the side of the transmitting unit 2013 and a second switching switch SW2 is switched to the side of the modulator circuit (signal processing device) 2020.

During over-the-air synchronization, the first switching switch SW1 is switched to the side of an antenna 2010 and the second switching switch SW2 is switched to the side of a frame synchronization error detecting unit 2017.

Accordingly, the frame synchronization error detecting unit 2017 can obtain a downlink signal transmitted from a master BS 2001a.

Note that those points that are not particularly described in the third embodiment are the same as those in the first embodiment.

[2.4 Fourth Embodiment]

Figure 16:
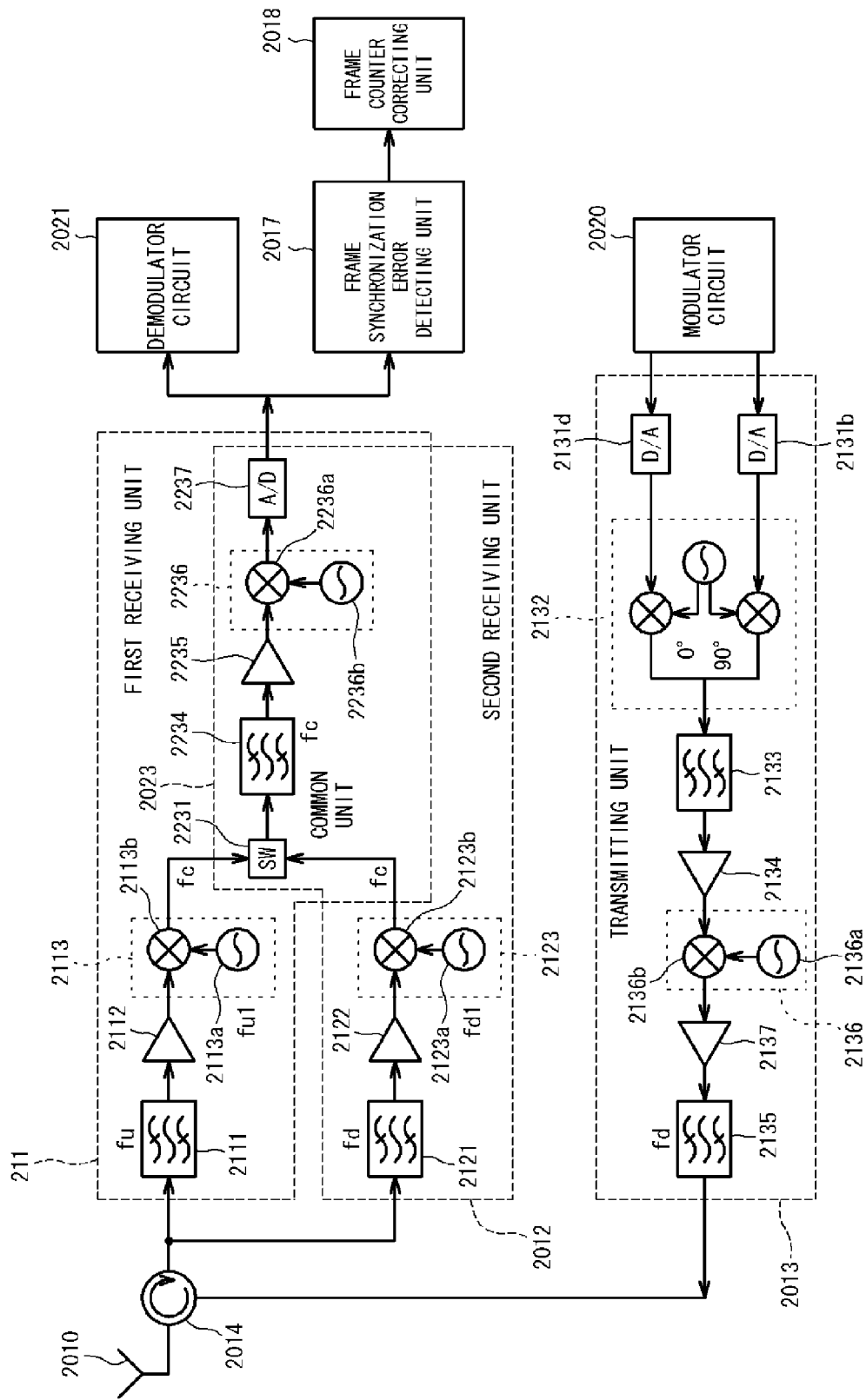
FIG. 16 is a configuration diagram of transmitting and receiving circuits of a slave BS according to a fourth embodiment in Chapter 2.

FIG. 16 shows a configuration of a slave BS 2001b according to a fourth embodiment. As with slave BSs 2001b according to the already described embodiments, this slave BS 2001b can also receive a signal transmitted from a master BS 2001a, to perform over-the-air synchronization. The slave BS 2001b includes an antenna 2010, a first receiving unit (superheterodyne receiver) 2011, a second receiving unit (superheterodyne receiver) 2012, and a transmitting unit 2013. In addition, the slave BS 2001b includes a circulator 2014. Note that those points that are not particularly described in the fourth embodiment are the same as those in the already described embodiments.

As such, the basic configuration of the slave BS 2001b in the fourth embodiment is the same as that of slave BSs 2001b according to the already described embodiments. Particularly, the slave BS 2001b in the fourth embodiment is similar to the slave BS 2001b according to the second embodiment in FIG. 14. Note, however, that in the fourth embodiment, instead of the first receiving unit 2011 and the second receiving unit 2012 being provided independently of each other as in the second embodiment in FIG. 14, the first receiving unit 2011 and the second receiving unit 2012 share some of their circuit configurations. That is, the first receiving unit 2011 and the second receiving unit 2012 have a common unit 2023 which is used by both the first receiving unit 2011 and the second receiving unit 2012.

Here, the first receiving unit 2011 is to receive an uplink signal (frequency $f_u$) transmitted from a terminal device 2002b, and the second receiving unit 2012 is to receive a downlink signal (frequency $f_d$) transmitted from the master BS 2001a.

That is, the first receiving unit 2011 includes, as circuit elements specific to the first receiving unit 2011, a filter (band-pass filter) 2111 that allows only a signal with the frequency $f_u$ to pass therethrough; and an amplifier 2112 that amplifies the signal outputted from the filter 2111.

The second receiving unit 2012 includes, as circuit elements specific to the second receiving unit 2012, a filter (band-pass filter) 2121 that allows only a signal with the frequency fd to pass therethrough; and an amplifier 2122 that amplifies the signal outputted from the filter 2121.

As described above, the frequencies of signals that can pass through the two receiving units 2011 and 2012 differ from each other. In order to allow the common unit 23 in a subsequent stage, which is a common circuit, to process two signals with different frequencies, the first receiving unit 2011 and the second receiving unit 2012 further include frequency converting units 2113 and 2123, respectively. The frequency converting unit 2113 in the first receiving unit 2011 frequency-converts an uplink signal with the frequency $f_u$ to a signal with a common frequency $f_c$. The frequency converting unit 2123 in the second receiving unit 2012 frequency-converts a downlink signal with the frequency $f_d$ to a signal with the common frequency $f_c$. These frequency converting units 2113 and 2123 are configured by oscillators 2113a and 2123a and mixers 2113b and 2123b, respectively.

The common frequency $f_c$ is $f_c = f_u - f_{u1} = f_d - f_{d1}$ where $f_{u1}$ is the frequency of the oscillator 2113a in the frequency converting unit 2113 in the first receiving unit 2011, and $f_{d1}$ is the frequency of the oscillator 2123a in the frequency converting unit 2123 in the second receiving unit 2012. By thus appropriately setting the frequencies of the respective oscillators 2113a and 2123a in the frequency converting units 2113 and 2123, signals with the common frequency $f_c$ can be outputted from the frequency converting units 2113 and 2123.

The common unit 2023 is such that a portion including a filter 2114, an amplifier 2115, a frequency converting unit 2116, and an A/D converting unit 2117 in a first receiving unit 2011 in the second embodiment in FIG. 14 and a portion including a filter 2124, an amplifier 2125, a frequency converting unit 2126, and an A/D converting unit 2127 in a second receiving unit 2012 in the second embodiment in FIG. 14 are formed as one common unit, and includes a filter 2234, an amplifier 2235, a frequency converting unit 2236, and an A/D converting unit 2237.

The filter 2234 in the common unit 2023 is configured as a band-pass filter that allows only a signal with the common frequency (first intermediate frequency) fc to pass therethrough. The output from the filter 2234 is amplified by the amplifier 2235, and the output from the amplifier 2235 is converted to another frequency (second intermediate frequency) by the frequency converting unit 2236 and is further converted to a digital signal by the A/D converting unit 2237. Note that the frequency converting unit 2236 is also configured by an oscillator 2236a and a mixer 2236b.

Note that the amplifier 2235 and the frequency converting unit 2236 in the common unit 2023 may be removed. Note also that the filter 2235 may be removed. That is, the configuration may be such that the first receiving unit 2011 and the second receiving unit 2012 share only the A/D converting unit 2237.

Furthermore, the common unit 2023 includes a switching switch 2231 for selectively accepting an output (frequency $f_c$) from the frequency converting unit 2113 in the first receiving unit 2011 and an output (frequency $f_c$) from the frequency converting unit 2123 in the second receiving unit 2012.

When the switching switch 2231 in the common unit 2023 is switched to the side of the frequency converting unit 2113 in the first receiving unit 2011, an uplink signal (frequency $f_c$) is processed by the elements in the common unit 2023, such as the filter 2234. When the switching switch 2231 is switched to the side of the frequency converting unit 2123 in the second receiving unit 2012, a downlink signal (frequency $f_c$) is processed by the elements in the common unit 2023, such as the filter 2234.

An output from the A/D converting unit 2237 in the common unit 2023 is provided to a demodulator circuit 2021 and a frame synchronization error detecting unit 2017. The demodulator circuit having accepted the output from the A/D converting unit 2237 performs a demodulation process for an uplink signal at timing at which the switching switch 2231 is switched to accept an uplink signal (a normal communication state other than over-the-air synchronization; a first state), but suspends a demodulation process at timing at which the switching switch 2231 is switched to accept a downlink signal (an over-the-air synchronization state; a second state).

Meanwhile, the frame synchronization error detecting unit 17 having accepted the output from the A/D converting unit 23 performs a frame synchronization error detection process at timing at which the switching switch 231 is switched to accept a downlink signal (an over-the-air synchronization state; a second state), but suspends a frame synchronization error detection process at timing at which the switching switch 231 is switched to accept an uplink signal (a normal communication state other than over-the-air synchronization; a first state).

Figure 17:
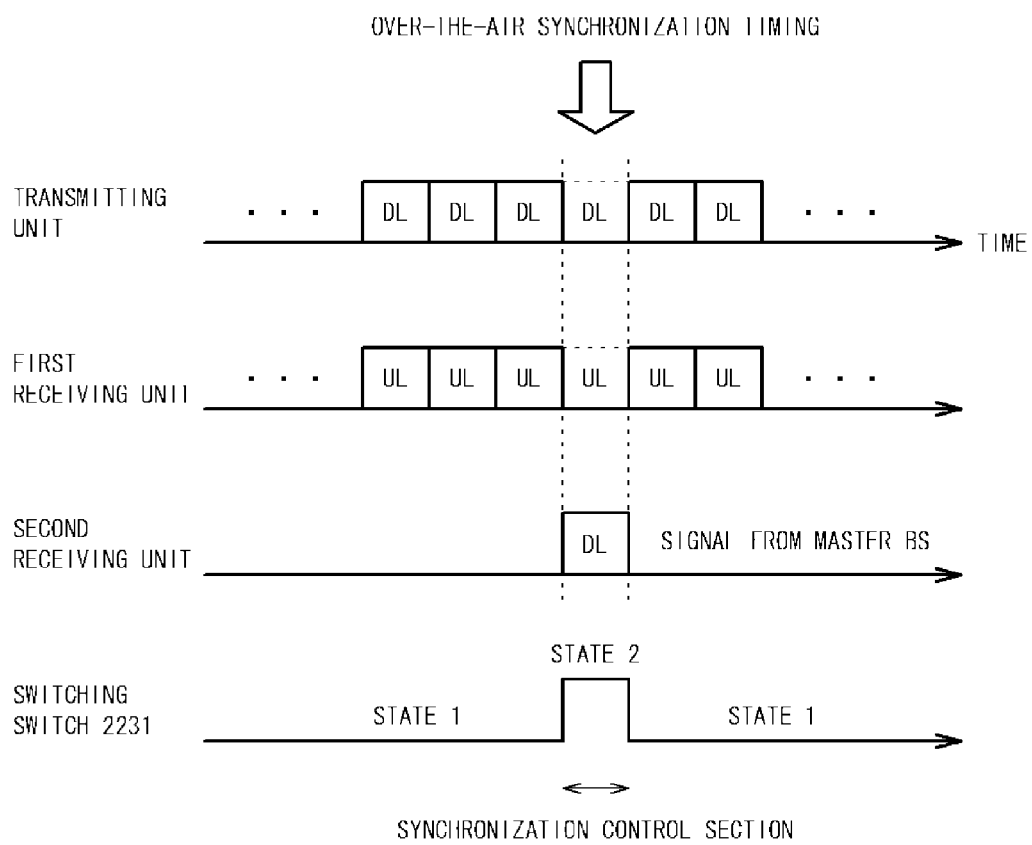
FIG. 17 is a diagram showing over-the-air synchronization timing of a slave BS according to the fourth embodiment in Chapter 2.

FIG. 17 shows switching timing of the switching switch 2231. Note that this switching is performed by a control unit (not shown) of the slave BS 2001b. At over-the-air synchronization timing (second state), the switching switch 2231 is switched to the second receiving unit side, and a downlink signal transmitted from the master BS 20001a is received and the detection and correction of a synchronization error are performed by the synchronization error detecting unit 2017 and a correcting unit 2018.

Note that, as shown in FIG. 17, at over-the-air synchronization timing, the transmitting unit 2013 and/or a modulator circuit 2020 are controlled such that a downlink signal from the transmitting unit 2013 is not sent out. In addition, at over-the-air synchronization timing, the slave BS 2001b performs user allocation on the terminal device 2002b so as to prevent an uplink signal from being transmitted from the terminal device 2002b that performs communication with the slave BS 2001b.

Note that the transmitting unit 2013 in the fourth embodiment is such that a frequency converting unit 2136 and an amplifier 2137 are added to a transmitting unit 2013 in the second embodiment shown in FIG. 14 but may have the same configuration as that in FIG. 14.

[2.5 Fifth Embodiment]

Figure 18:
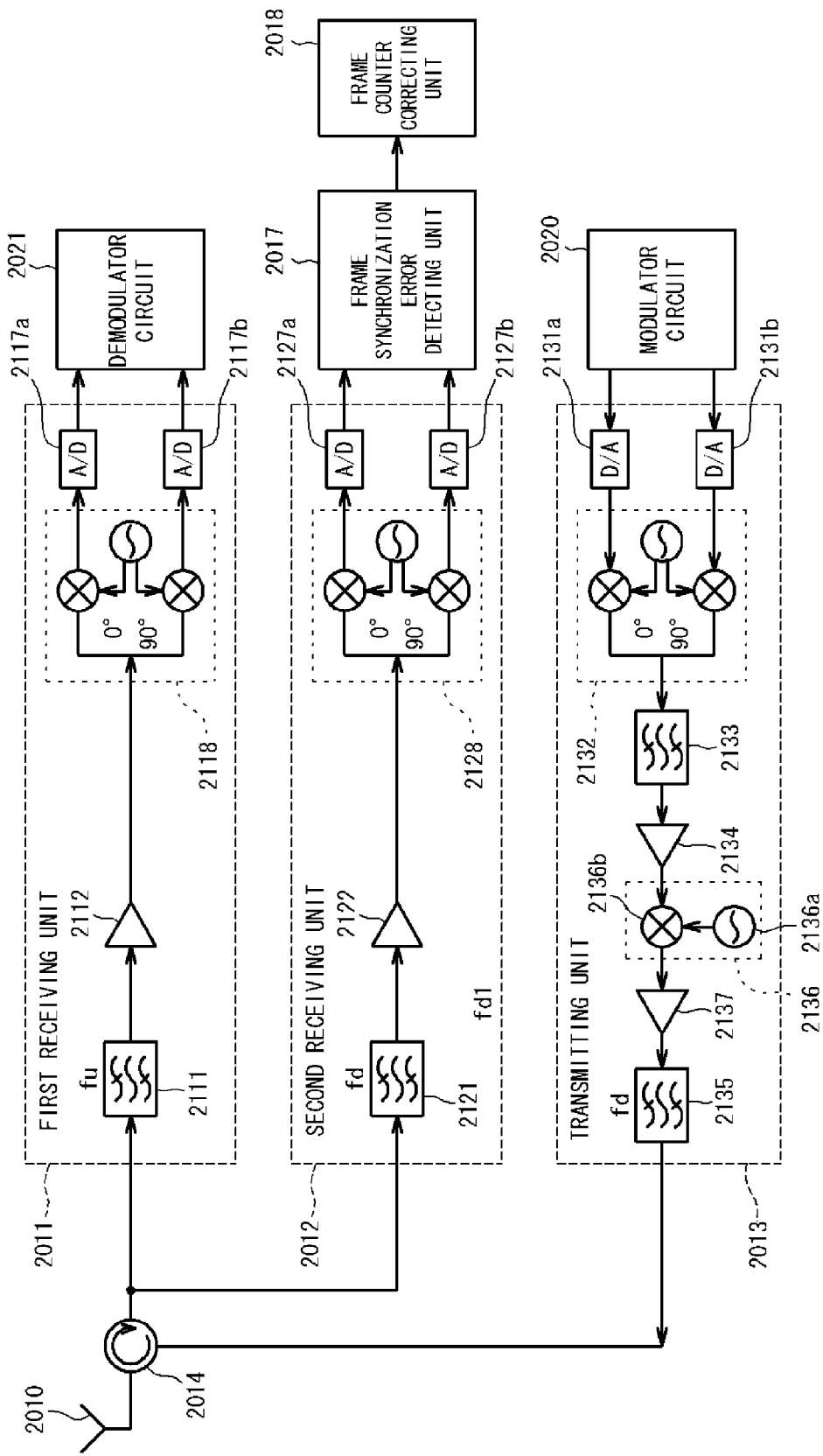
FIG. 18 is a configuration diagram of transmitting and receiving circuits of a slave BS according to a fifth embodiment in Chapter 2.

FIG. 18 shows a configuration of a slave BS 2001b according to a fifth embodiment. In the fifth embodiment, as with the slave BS 2001b in the second embodiment shown in FIG. 14, a first receiving unit 2011 and a second receiving unit 2012 are provided independently of each other, and the first receiving unit 2011 and the second receiving unit 2012 are configured as direct conversion receivers. That is, the first receiving unit 2011 and the second receiving unit 2012 include bandpass filters 2111 and 2121 that allow only an uplink signal or a downlink signal received by an antenna 2010 to pass therethrough; and amplifiers 2112 and 2122 that amplify the signals having passed through the filters 2111 and 2121. Furthermore, the first receiving unit 2011 and the second receiving unit 2012 include orthogonal demodulators 2118 and 2128 that demodulate the outputs from the amplifiers 2112 and 2122 into demodulated signals I and Q; and A/D converting units 2117a, 2117b, 2127a, and 2127b that convert the demodulated signals I and Q to digital signals. These modulating signals I and Q are provided to a demodulator circuit 2021 or a synchronization error detecting unit 2017.

As such, the types of the first receiving unit 2011 and the second receiving unit 2012 are not particularly limited.

Note that a transmitting unit 2013 in the fifth embodiment is the same as the transmitting unit 2013 in the fourth embodiment shown in FIG. 16.

[2.6 Sixth Embodiment]

Figure 19:
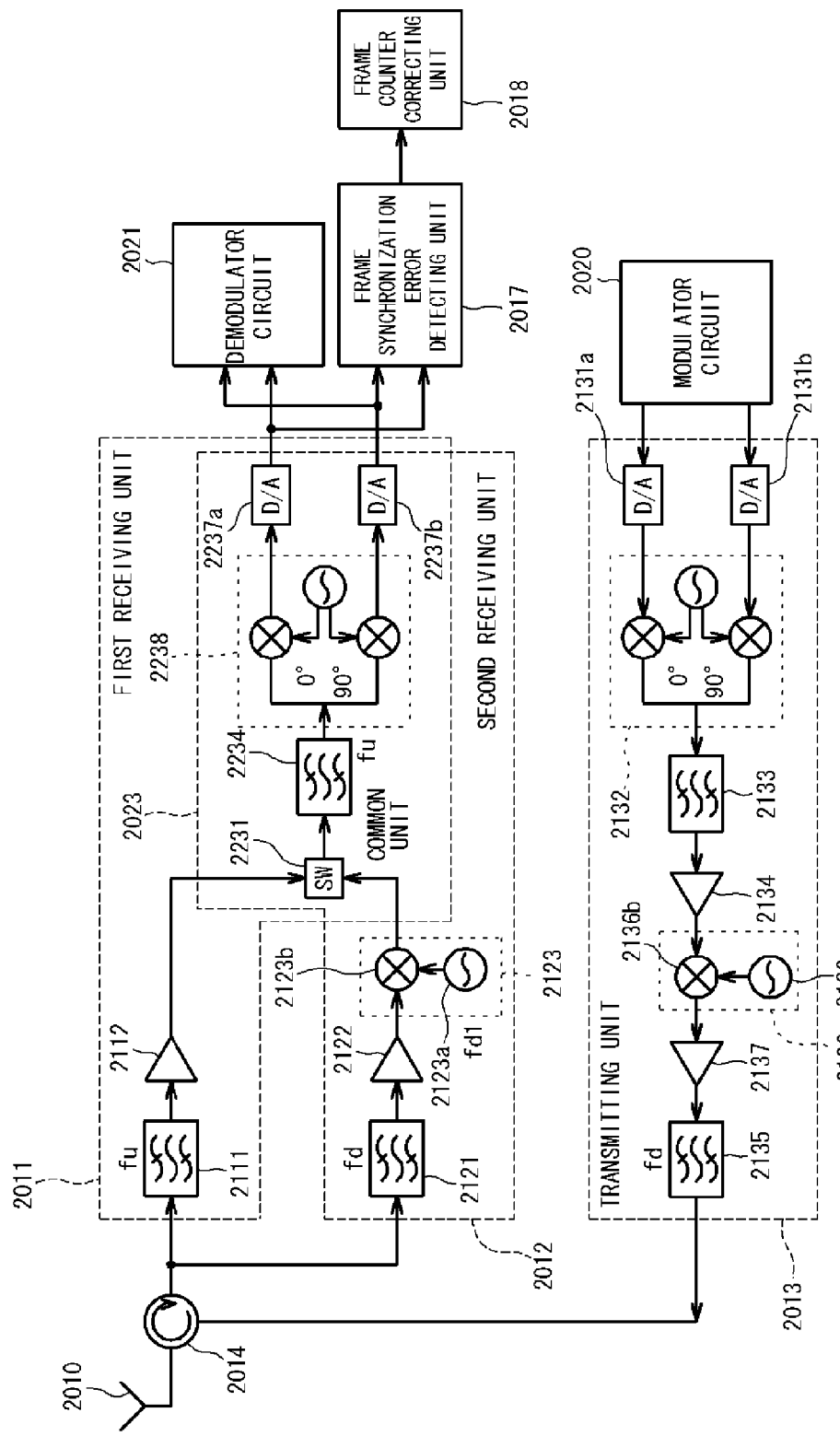
FIG. 19 is a configuration diagram of transmitting and receiving circuits of a slave BS according to a sixth embodiment in Chapter 2.

FIG. 19 shows a configuration of a slave BS 2001b according to a sixth embodiment. In the sixth embodiment, a common unit 2023 which is similar to the common unit 2023 in the first receiving unit 2011 and the second receiving unit 2012 in the fourth embodiment shown in FIG. 16 is provided in the first receiving unit 2011 and the second receiving unit 2012 which are of a direct conversion system in the fifth embodiment shown in FIG. 18.

A first receiving unit 2011 in the sixth embodiment includes, as circuit elements specific to the first receiving unit 2011, a filter (band-pass filter) 2111 that allows only a signal with the frequency $f_u$ to pass therethrough; and an amplifier 2112 that amplifies the signal outputted from the filter 2111.

A second receiving unit 2012 includes, as circuit elements specific to the second receiving unit, a filter (band-pass filter) 2121 that allows only a signal with the frequency $f_d$ to pass therethrough; and an amplifier 2122 that amplifies the signal outputted from the filter 2121.

The second receiving unit 2012 further includes a frequency converting unit 2123 for converting a signal with the frequency $f_d$ to a signal with the frequency $f_u$. The frequency $f_{d1}$ of an oscillator 2123a in the frequency converting unit 2123 is set such that $f_u = f_d - f_{d1}$. By the frequency converting unit 2123, the frequency of a downlink signal in the second receiving unit 2012 matches the frequency $f_u$ of an uplink signal in the first receiving unit 2011. That is, in the sixth embodiment, the frequency $f_u$ serves as a common frequency and a signal with the common frequency $f_u$ is provided to the common unit 2023.

The common unit 2023 in the sixth embodiment includes a switching switch 2231; a band-pass filter 2234 that allows only the common frequency $f_u$ to pass therethrough; an orthogonal demodulator 2238 that generates demodulated signal I and Q from the output from the filter 2234; and A/D converters 2237a and 2237b that respectively convert the demodulated signals I and Q to digital signals. The outputs from the A/D converters 2237a and 2237b are provided to a demodulator circuit 2021 and a synchronization error detecting unit 2017.

Then, switching of the switching switch 2231 and other processes are performed in the same manner as in the fifth embodiment.

[2.7 Seventh Embodiment]

Figure 20:
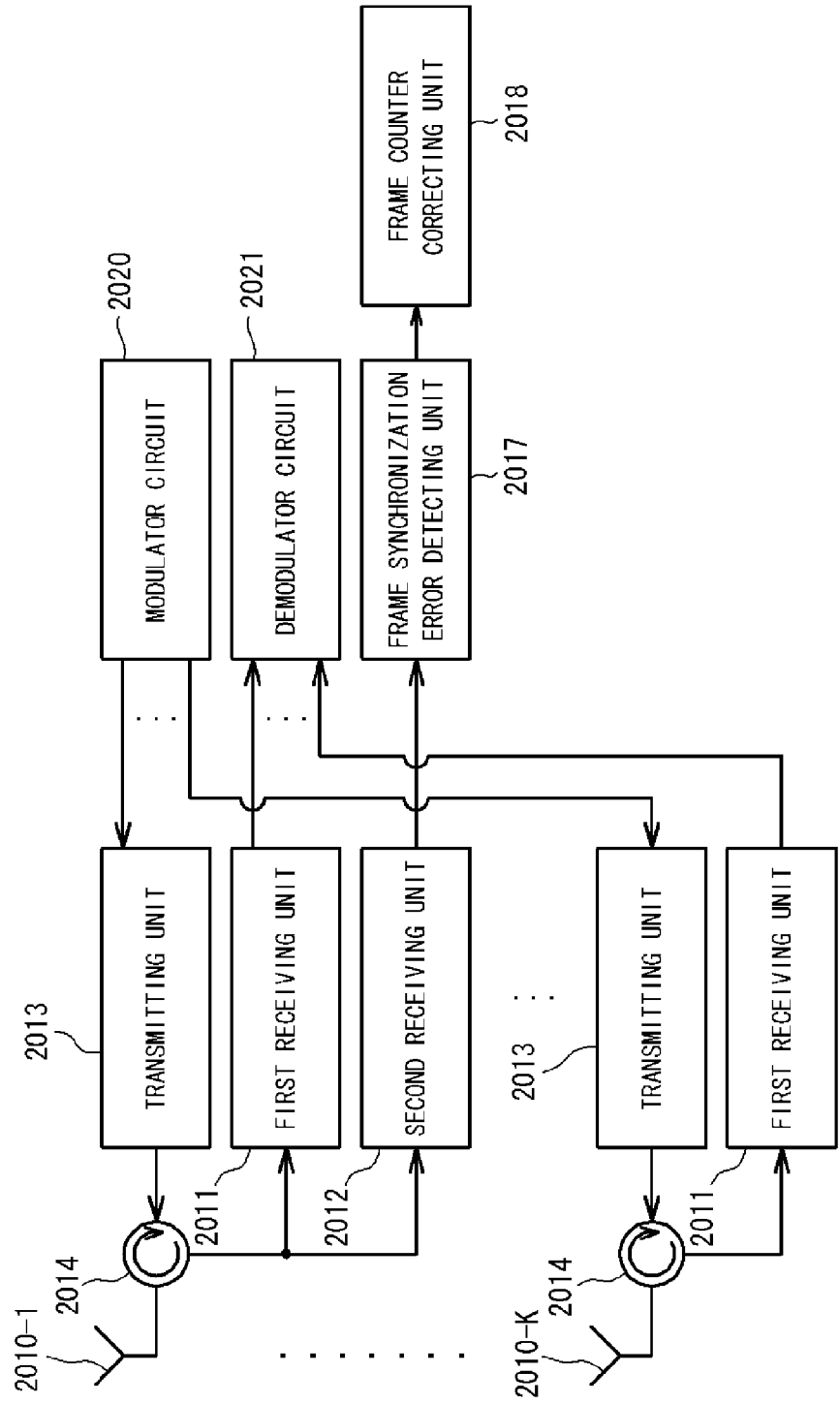
FIG. 20 is a configuration diagram of transmitting and receiving circuits of a slave BS according to a seventh embodiment in Chapter 2.

FIG. 20 shows a slave BS 2001b according to a seventh embodiment. The slave BS 2001b includes an array antenna having a plurality of (K) antennas 2010-1 to 2010-K. Each of the plurality of antennas is provided with a transmitting unit 2013 and a first receiving unit 2011 for normal communication (downlink signal transmission and uplink signal transmission), whereby each antenna can perform transmission and reception. Note that modulating signals are provided to the transmitting units 2013, respectively, from a modulator circuit 2020 and receive signals which are outputted from the first receiving units 2013, respectively, are provided.

In the seventh embodiment, of a plurality of antenna transmission and reception systems, only one transmission and reception system of the antenna 2010-1 is provided with a second receiving unit 2012 and other antenna transmission and reception systems are not provided with a second receiving unit 2012. Note that, for the configurations of the first receiving units 2011, the second receiving unit 2012, and the transmitting units 2013, any configuration in the already described embodiments can be employed. Note also that although in FIG. 20 the first receiving unit 2011 and the second receiving unit 2012 are depicted separately, a common unit 2023 may be provided as in FIGS. 16 and 19.

In the case of an array antenna system, since a slave BS 1200b has a plurality of antennas 2010-1 to 2010-K, providing a second receiving unit 2012 in all antenna systems increases cost. However, by providing a second receiving unit 2012 in only one antenna system or only a plurality of antenna systems which are some of all the antennas, an increase in cost can be suppressed.

[2.8 Eighth Embodiment]

Figure 21:
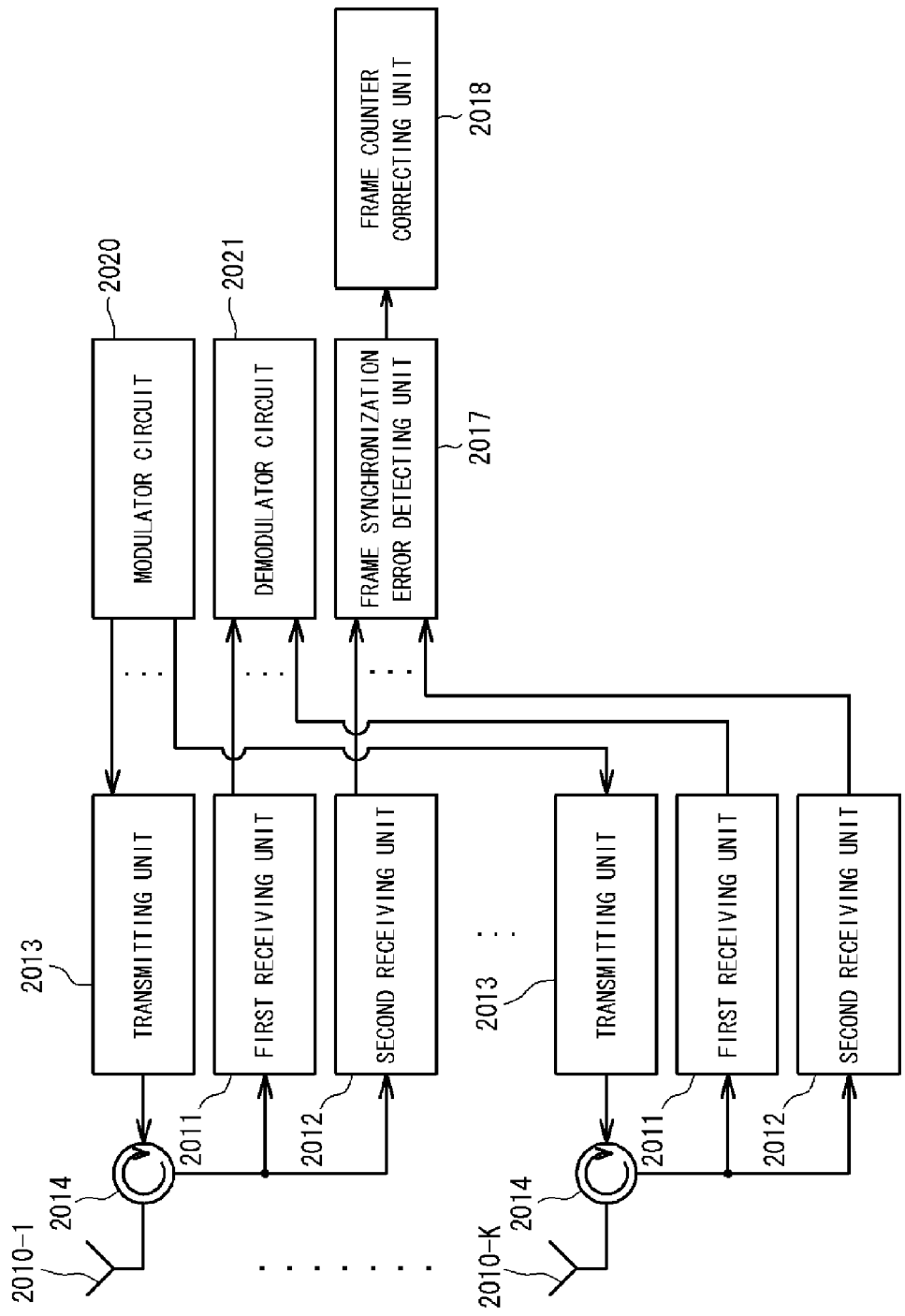
FIG. 21 is a configuration diagram of transmitting and receiving circuits of a slave BS according to an eighth embodiment in Chapter 2.

A slave BS 2001b according to an eighth embodiment in FIG. 21 is, unlike the seventh embodiment, provided with second receiving units 2012 in all antenna systems in an array antenna system. By providing second receiving units 2012 in all antenna systems or a plurality of antenna systems which are some of all antennas, diversity reception of a downlink signal from a master BS 2001a is enabled, improving synchronization error detection accuracy. Note that, for a reception diversity implementation system, selective diversity, maximum ratio combining, etc., can be employed.

When the slave BS 2001b is of an array antenna system, as in the seventh embodiment and the eighth embodiment, there is an advantage that even at timing at which over-the-air synchronization is performed, normal communication (reception from a terminal device) can continue without being suspended.

Figure 22:
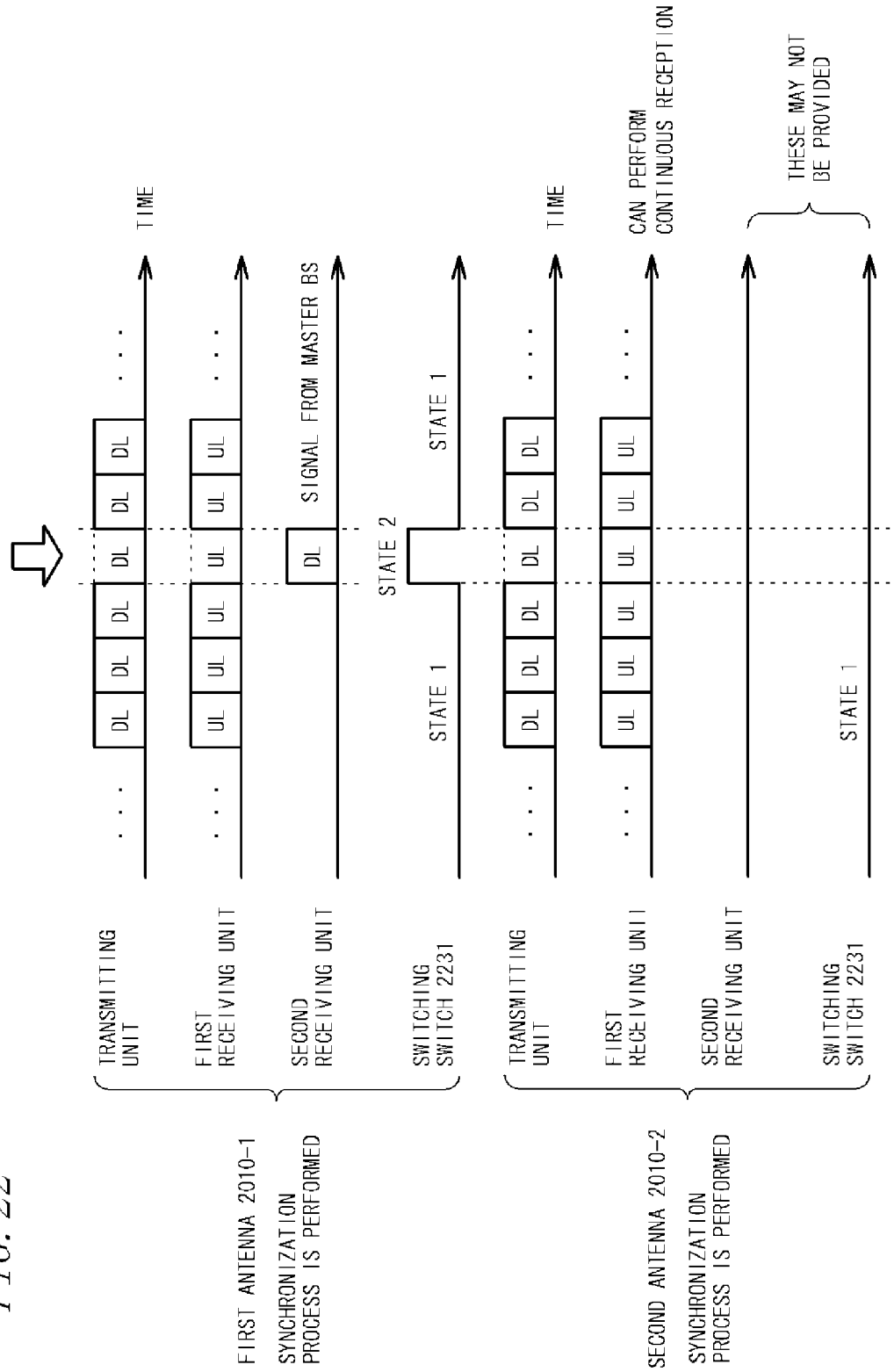
FIG. 22 is a diagram showing over-the-air synchronization timing of a slave BS according to the eighth embodiment in Chapter 2.

For example, as shown in FIG. 22, of a plurality of antennas 2010-1 to 2010-K in an array antenna system, a second receiving unit 2012 is provided in a system of the first antenna 2010-1. During over-the-air synchronization, a downlink signal from the master BS 201a can be received by the system of the first antenna 2010-1, and at the same time, an uplink signal from a terminal device 2002b can also be received by a first receiving unit 2011 in a system of the second antenna 2010-2 (a second receiving unit 2012 may or may not be provided).

Note that although FIG. 22 is depicted in association with FIG. 17 showing the processing timing of the slave BS 2001b in the fourth embodiment shown in FIG. 16, the above-described advantage of the array antenna system is not limited to that in the fourth embodiment.

[2.9 Ninth Embodiment]

Figure 23:
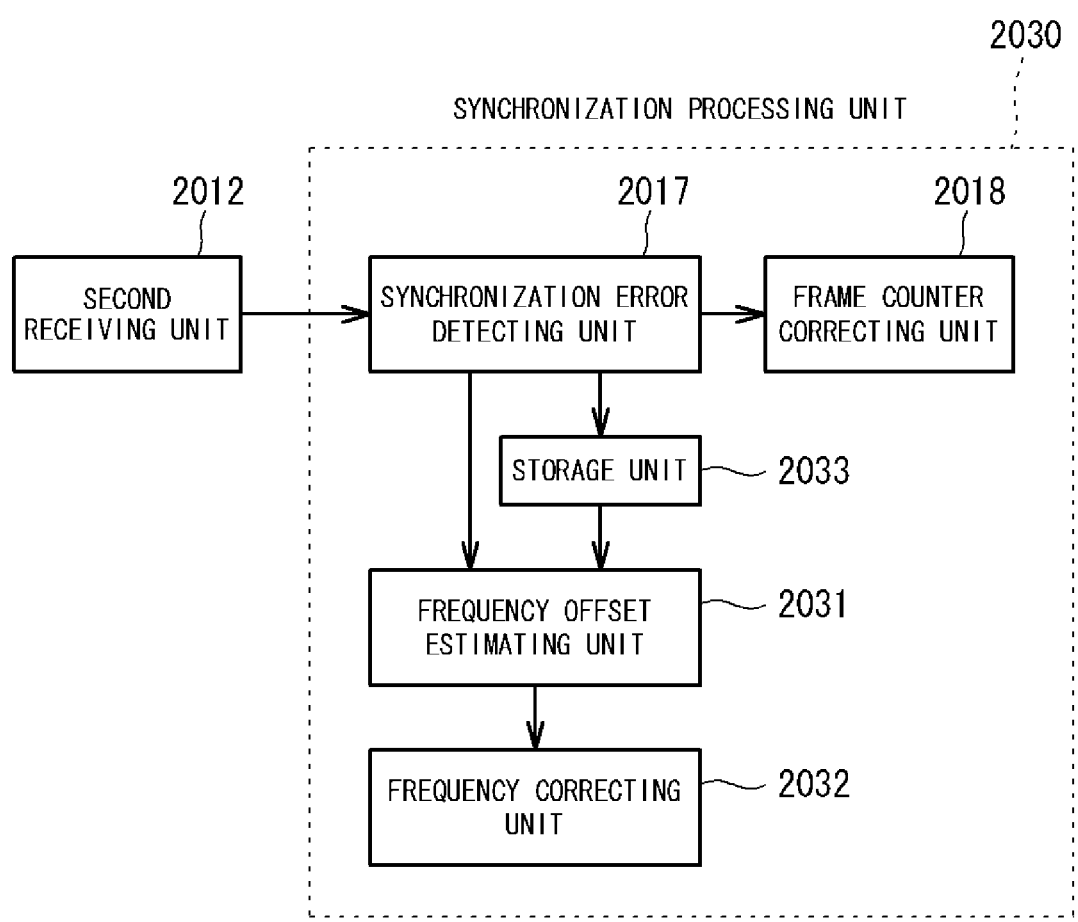
FIG. 23 is a block diagram of a synchronization processing unit of a slave BS according to a ninth embodiment in Chapter 2.
Figure 24:
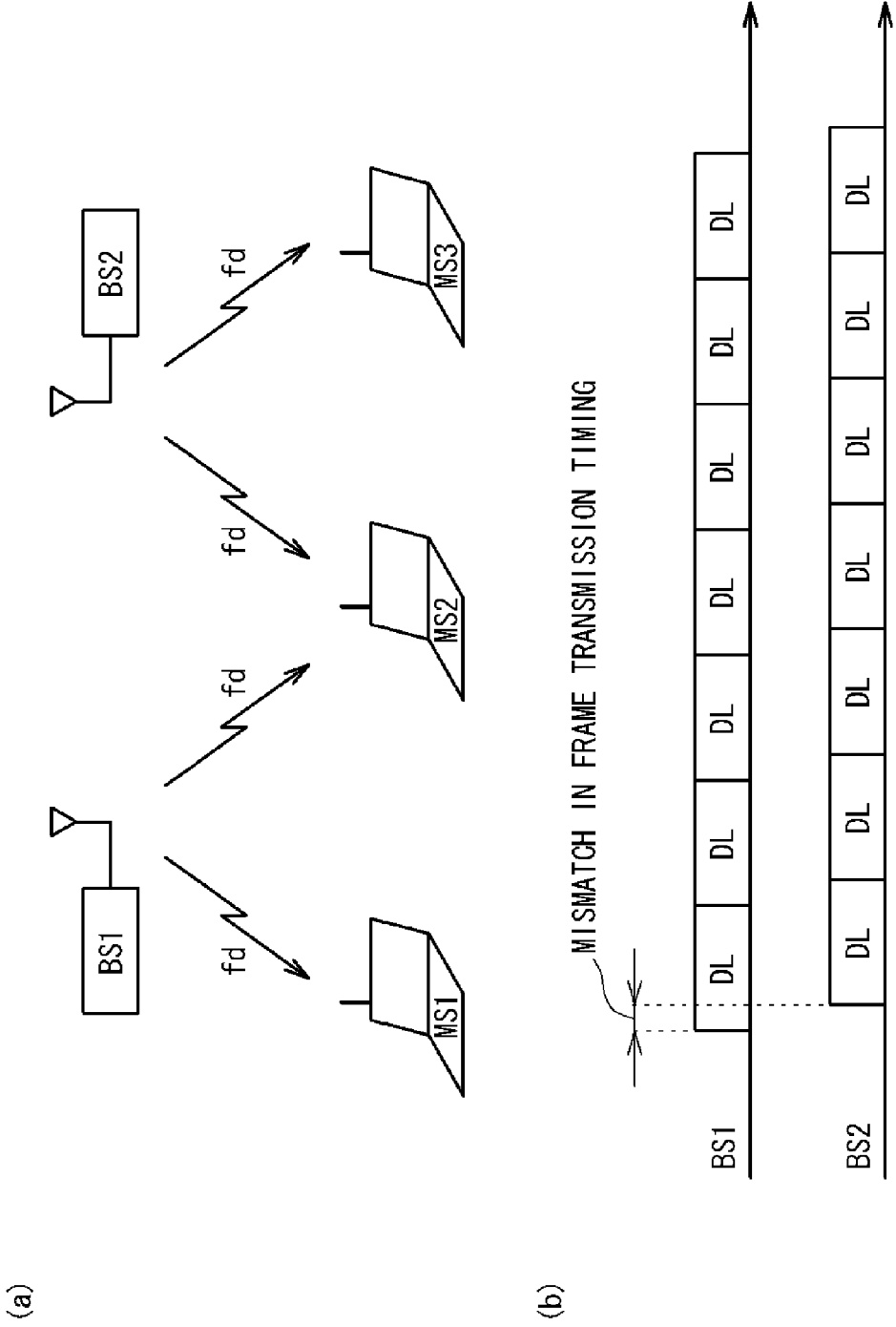
FIGS. 24(a) and 24(b) are diagrams illustrating synchronization between a plurality of base station devices in a frequency-division duplex system.

FIG. 23 shows a ninth embodiment. FIG. 23 shows a variant of a synchronization processing unit 2030 (corresponding to a frame synchronization error detecting unit 2017 and a frame counter correcting unit 2018 in other embodiments) that performs a synchronization process based on a downlink signal from a master BS 2001a which is outputted from a second receiving unit 2012. The synchronization processing unit 2030 can be adopted in all other embodiments.

The synchronization processing unit 2030 includes a frequency offset estimating unit 2031, a frequency correcting unit 2032, and a storage unit 2033, in addition to a frame synchronization error detecting unit 2017 and a frame counter correcting unit 2018 which are provided in other embodiments.

The frame synchronization error detecting unit 2017 detects frame transmission timing of the master BS 2001a, using a known signal such as a preamble included in a downlink signal, and detects an error (a frame synchronization error; a communication timing offset) between the frame transmission timing and frame transmission timing of a device 2001b.

The synchronization error detected by the frame synchronization error detecting unit 2017 is provided to the frame counter correcting unit 2018 and is used for frame synchronization error correction. In addition, the synchronization error is provided to the storage unit 2033 each time it is detected, and is accumulated in the storage unit 2033.

The frequency offset estimating unit 2031 estimates, based on the synchronization error detected by the detecting unit 2017, a difference (clock frequency error) between a clock frequency of a built-in clock generator (not shown) included in the slave BS 2001b, the receiving side, and a clock frequency of a built-in clock generator of the master BS 2001a, the transmitting side, and estimates a carrier frequency error (carrier frequency offset) from the clock frequency error.

The frequency offset estimating unit 2031 estimates, under circumstances where over-the-air synchronization is periodically performed, a clock error based on a frame synchronization error t1 detected in the last over-the-air synchronization and a frame synchronization error t2 detected in the current over-the-air synchronization. Note that the last frame synchronization error t1 can be obtained from the storage unit 2029.

For example, it is assumed that, when the carrier frequency is 2.6 [GHz], T1 is detected as a frame synchronization error at the last over-the-air synchronization timing (synchronization timing=t1) and timing is modified by an amount corresponding to T1. The synchronization error (timing offset) after the modification is 0 [msec]. Then, it is assumed that also at the current over-the-air synchronization timing which is T=10 seconds later (synchronization timing=t2), a synchronization error (timing offset) is detected again and the synchronization error (timing offset) is T2=0.1 [msec].

At this time, a synchronization error (timing offset) of 0.1 [msec] having occurred in 10 seconds is an accumulated value of the error between the clock period of the master BS 2001a and the clock period of the slave BS 2001b.

That is, the following equality is established between the synchronization error (timing offset) and the clock period:

the clock period of the base station serving as the origin of synchronization:the clock period of the base station serving as the origin of synchronization=T:(T+T2)=10:(10+0.0001).

Then, since the clock frequency is the reciprocal of the clock period, (the clock frequency of the base station serving as the origin of synchronization−the clock frequency of the base station serving as the target of synchronization)=the clock frequency of the base station serving as the origin of synchronization×$T2/(T+T2)$≈the clock frequency of the base station serving as the origin of synchronization×0.00001.

Therefore, in this case, there is an error of 0.00001=10 [ppm] between the clock frequency of the master BS 2001a, the transmitting side, and the clock frequency of the slave BS 2001b, the receiving side. The frequency offset estimating unit 31 estimates a clock frequency error in the above-described manner.

Then, since the carrier frequency and the synchronization error (timing offset) are shifted in the same manner, a mismatch of an amount corresponding to 10 [ppm], i.e., a mismatch of 2.6 [GHz]×1×10$^{-5}$=26 [kHz], also occurs in the carrier frequency. In this manner, the frequency offset estimating unit 31 can also estimate a carrier frequency error (carrier frequency offset) from a clock frequency error.

The carrier frequency error estimated by the frequency offset estimating unit 2031 is provided to the carrier frequency correcting unit 2032. A carrier frequency correction can be made not only to the carrier frequency of an uplink signal but also to the carrier frequency of a downlink signal.

[Chapter 3 Hierarchy Recognition by a Base Station Device]

In base station devices which are described in this Chapter 3, the techniques for base station devices described in Chapter 1 or 2 are employed within the technically consistent scope. In this Chapter 3, for those points that are not particularly described, the matters described in Chapters 1 and 2 are incorporated.

[3.1 Configuration of a Communication System]

Figure 25:
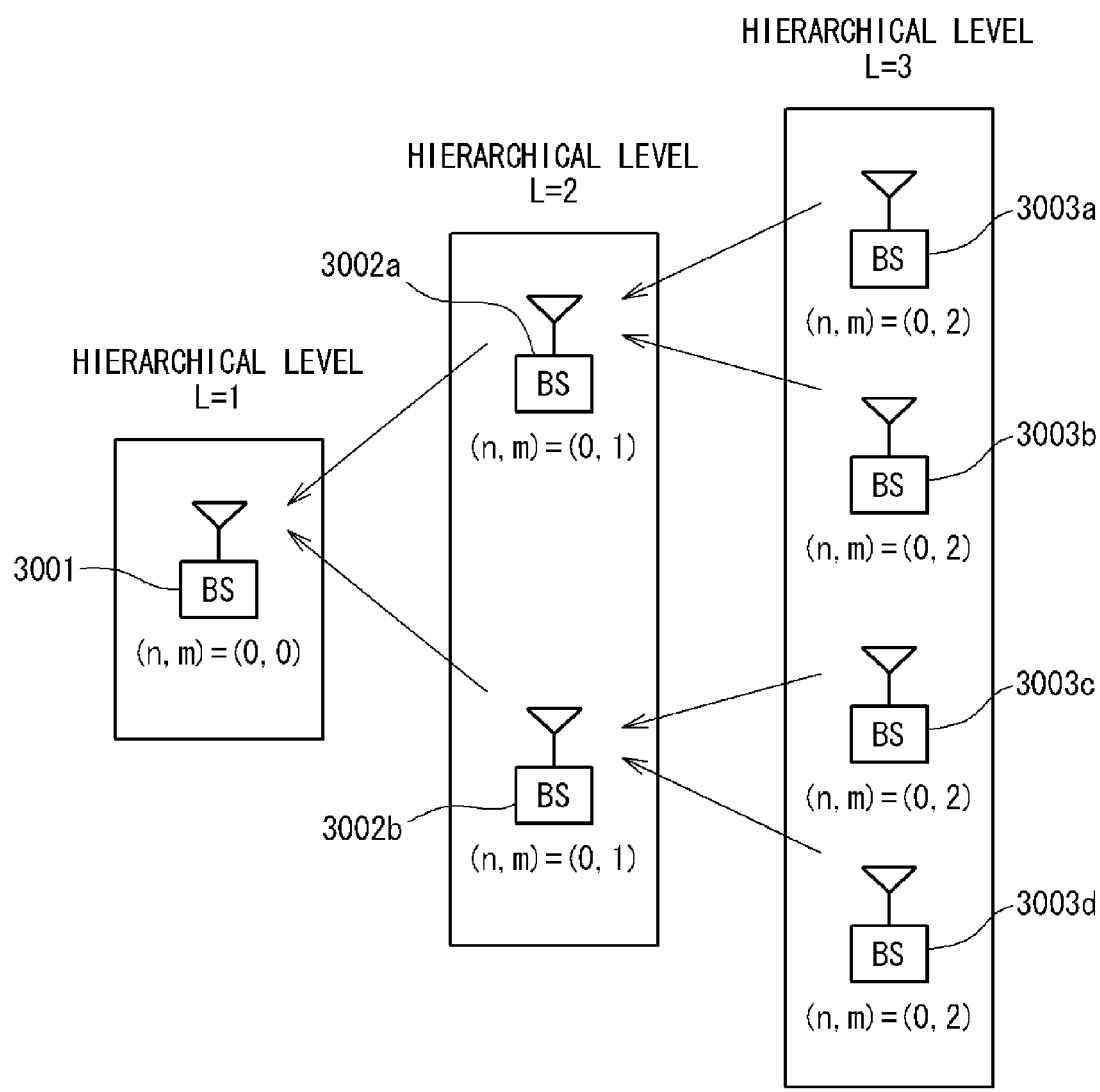
FIG. 25 is a diagram showing a hierarchical structure for synchronization between base station devices.

FIG. 25 shows a wireless communication system having a plurality of base station devices (Base Stations) 3001*a*, 3002*a*, 3002*b*, 3003*a*, 3003*b*, 3003*c*, and 3003*d*. Each base station device can perform communication with terminal devices (mobile terminals; MSs; Mobile Stations), which are not shown, present in a communication area (cell) of the base station device.

The communication system is, for example, a mobile phone system to which LTE (Long Term Evolution) is applied. In LTE, frequency-division duplex (FDD) can be adopted. In the following, the communication system in Chapter 3 is described assuming that a frequency-division duplex system is adopted. Note that, for the duplex system, time-division duplex may be adopted. In addition, for the communication system, not only LTE but also WCDMA or CDMA2000 may be adopted.

In the communication system in Chapter 3, inter-base-station synchronization where synchronization is achieved between a plurality of base station devices is performed. Inter-base-station-device synchronization is performed by "over-the-air synchronization" where synchronization is achieved such that a signal which is transmitted from a base station device serving as the target of synchronization to a terminal device in a cell of the base station device is received by another base station device.

In the communication system in Chapter 3, at least one base station device 3001 does not depend on another base station device and determines communication timing, etc., by any other method than over-the-air synchronization, e.g., the use of a clock of the base station device 3001 or a GPS signal. Such a base station device 3001 is hereinafter referred to as "master BS". Other base station devices (hereinafter, referred to as "slave BSs") 3002*a*, 3002*b*, 3003*a*, 3003*b*, and 3003*c* directly or indirectly achieve synchronization with the master BS 3001.

FIG. 25 also shows a hierarchical structure for such over-the-air synchronization. In FIG. 25, the base station device 3001 serves as a master BS and the hierarchical level L of the master BS1 is 1. In addition, there are two slave BSs 3002*a* and 3002*b* whose targets of synchronization are the master BS 3001, and the hierarchical level L of the slave BSs 3002*a* and 3002*b* is 2. Furthermore, there are four slave BSs 3003*a*, 3003*b*, 3003*c*, and 3003*d* whose targets of synchronization are either one of the two slave BSs 3002*a* and 3002*b*, and the hierarchical level L of the slave BSs 3003*a*, 3003*b*, 3003*c*, and 3003*d* is 3.

By a plurality of base station devices taking a tree-like hierarchical structure with the master BS 3001 being at the top, such as that shown in FIG. 25, synchronization can be prevented from becoming unstable due to the targets of synchronization for the plurality of base station devices being connected in a loop.

[3.2 Frame Structure for LTE]

In frequency-division duplex that can be adopted in LTE with which the communication system in the present embodiment complies as described above, by making the frequency $f_u$ of an uplink signal (a transmit signal from a terminal device to a base station device) different from the frequency $f_d$ of a downlink signal (a transmit signal from the base station device to the terminal device), uplink communication and downlink communication are simultaneously performed.

Figure 26:
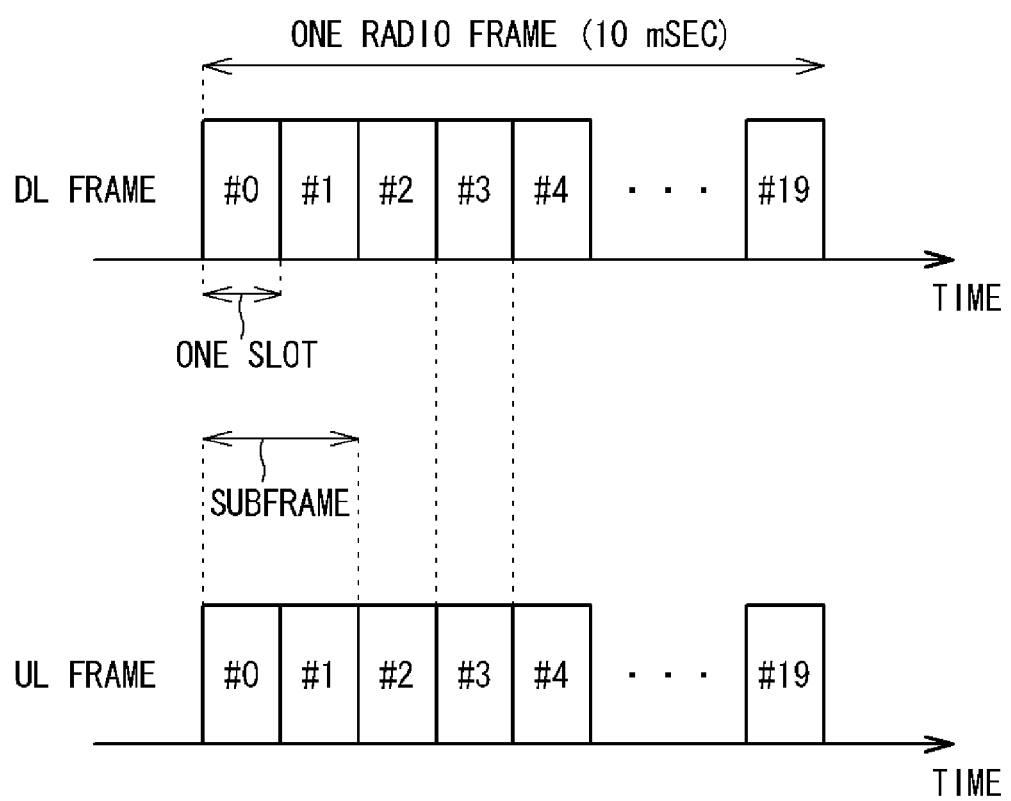
FIG. 26 is a frame configuration diagram for LTE.

FIG. 26 shows uplink and downlink frame structures for LTE. Each of a downlink frame (DL frame) and an uplink frame (UL frame) for LTE has a time length of 10 milliseconds and consists of 20 slots, #0 to #19. In LTE, a combination of two slots is referred to as a subframe. Note that the timings of these downlink and uplink frames coincide with each other.

In base station device synchronization, the timings of these frames are caused to be synchronized with each other between base station devices and the frequency $f_u$ of an uplink signal and the frequency $f_d$ of a downlink signal are caused to be synchronized with each other between base station devices.

Figure 27:
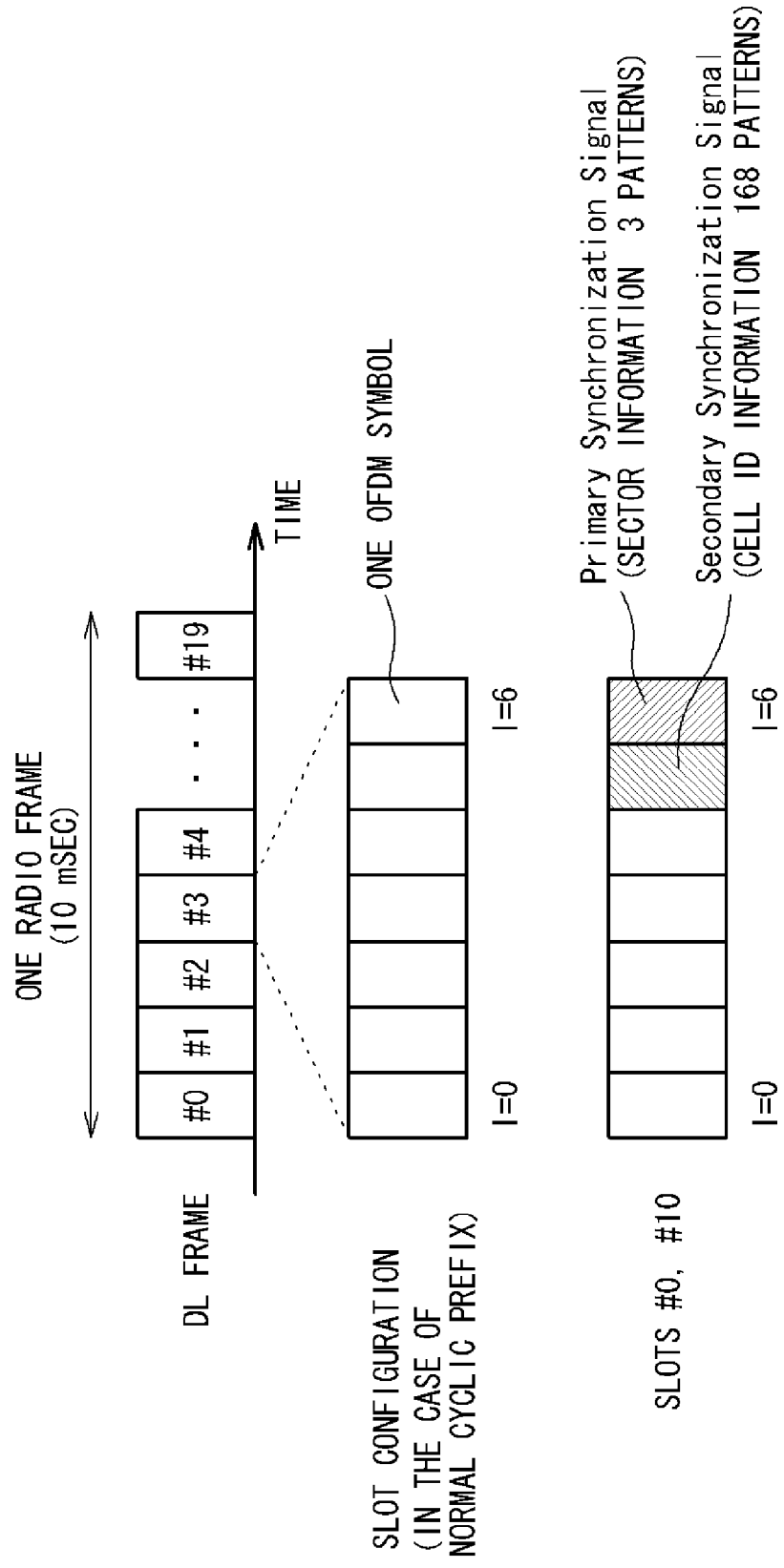
FIG. 27 is a DL frame configuration diagram for LTE.

As shown in FIG. 27, each of slots that form a downlink frame (DL frame) consists of seven (I=0 to 6) OFDM symbols (in the case of Normal Cyclic Prefix).

Then, of 20 slots #0 to #19 forming the downlink frame, each of the 0th (#0) and 10th (#10) slots is provided with a Primary Synchronization Signal and a Secondary Synchronization Signal, as identification codes as a base station device.

The Primary Synchronization Signal is arranged in the last one (I=6) of the seven OFDM symbols forming a slot. This Signal is information originally provided for a terminal device to identify each of a plurality of (3) sectors into which the communication area (cell) of a base station device is divided, and has 3 patterns.

The Secondary Synchronization Signal is arranged in the second last (I=5) of the seven OFDM symbols forming a slot. This Signal is information originally provided for a terminal device to identify each of communication areas (cells) of a plurality of base station devices, and has 168 patterns.

By the two signals, the Primary Synchronization Signal and the Secondary Synchronization Signal, 504 types (168× 3) of identification codes are formed. By a terminal device obtaining these Signals transmitted from a base station device, the terminal device can recognize in which sector of which base station device the terminal is present.

A plurality of patterns that can be taken by the above-described Signals are defined in advance in communication standards and are known by each base station device and each terminal device. That is, each of the Signals is a known signal that can take a plurality of patterns. In the following, the Primary Synchronization Signal is referred to as a first known signal and the Secondary Synchronization Signal is referred to as a second known signal.

In the present embodiment, the first known signal and the second known signal are used not only for the case in which a terminal device achieves synchronization with a base station device, but also for the aforementioned inter-base-station-device synchronization, which will be described later.

[3.3 Configuration of a Base Station Device]

Figure 28:
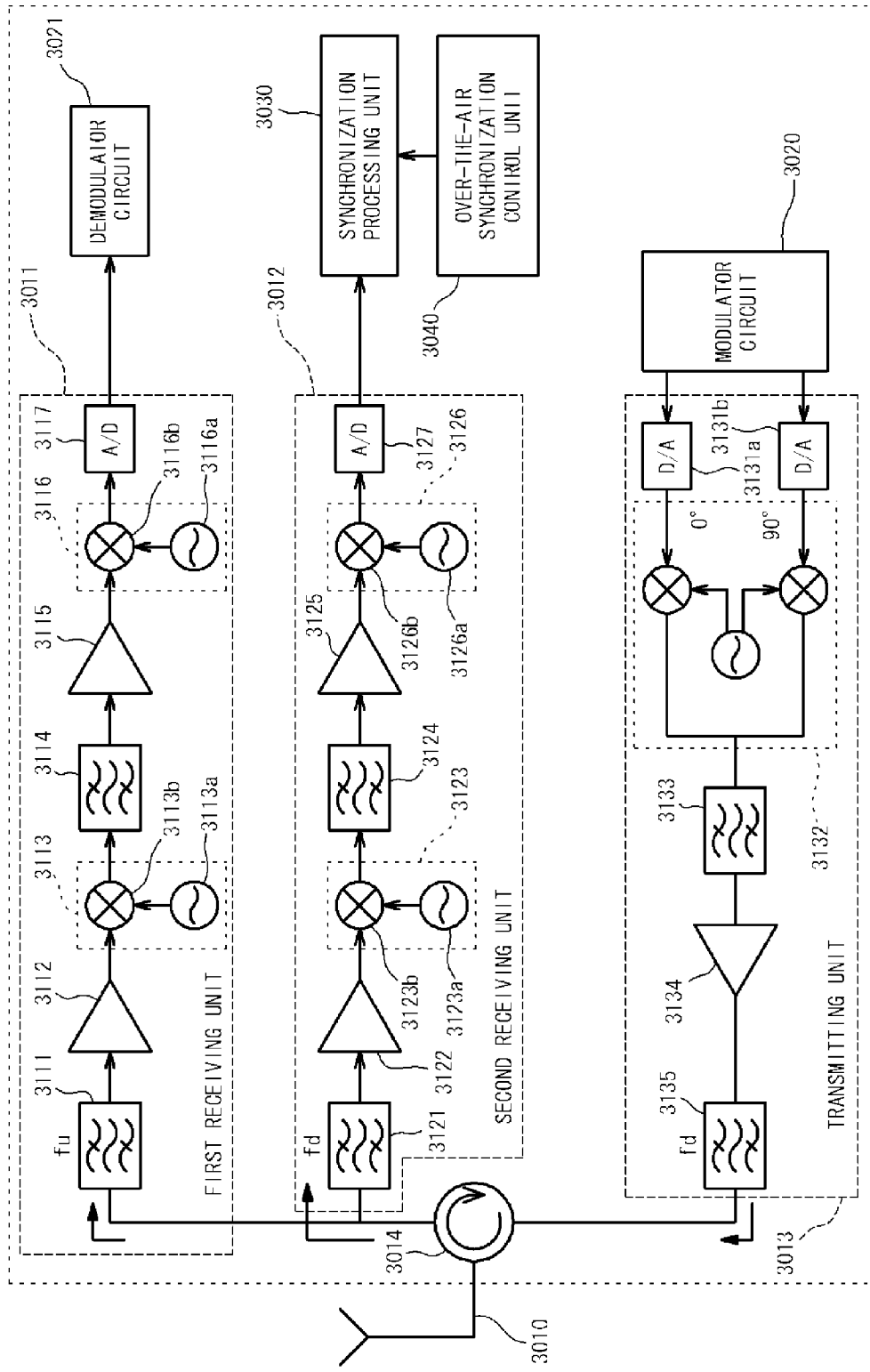
FIG. 28 is a circuit configuration diagram of a base station device in Chapter 3.

FIG. 28 shows an example of the configuration of a base station device (in particular, a salve BS). A slave BS includes an antenna 3010, a first receiving unit 3011, a second receiving unit 3012, and a transmitting unit 3013. The first receiving unit 3011 is to receive uplink signals from terminal devices and the second receiving unit 3012 is to receive a downlink signal transmitted from another base station device. The transmitting unit 3013 is to transmit downlink signals to the terminal devices.

In addition, the slave BS includes a circulator 3014. The circulator 3014 is to provide receive signals from the antenna 3010, to the side of the first receiving unit 3011 and the second receiving unit 3012 and to provide a transmit signal outputted from the transmitting unit 3013, to the side of the antenna 3010. By the circulator 3014 and a fourth filter 3135 in the transmitting unit 3013, a receive signal from the antenna 3010 is prevented from being conveyed to the side of the transmitting unit 3013.

In addition, by the circulator 3014 and a first filter 3111 in the first receiving unit, a transmit signal outputted from the transmitting unit 3013 is prevented from being conveyed to the first receiving unit 3011. Furthermore, by the circulator 3014 and a fifth filter 30121, a transmit signal outputted from the transmitting unit 3013 is prevented from being conveyed to the second receiving unit 3012.

The first receiving unit 3011 is configured as a superheterodyne receiver and is configured to perform IF (Intermediate Frequency) sampling. More specifically, the first receiving unit 3011 includes the first filter 3111, a first amplifier 3112, a first frequency converting unit 3113, a second filter 3114, a second amplifier 3115, a second frequency converting unit 3116, and an A/D converting unit 3117.

The first filter 3111 is to allow only uplink signals from terminal devices to pass therethrough, and is configured by a band-pass filter that allows only the frequency $f_u$ of an uplink signal to pass therethrough. The receive signal having passed through the first filter 3111 is amplified by the first amplifier (high-frequency amplifier) 3112 and is then subjected to conversion from the frequency $f_u$ to a first intermediate frequency by the first frequency converting unit 3113. Note that the first frequency converting unit 3113 is configured by an oscillator 3113a and a mixer 3113b.

The output from the first frequency converting unit 3113 passes through the second filter 3114 that allows only the first intermediate frequency to pass therethrough and is then amplified again by the second amplifier (intermediate frequency amplifier) 3115. The output from the second amplifier 3115 is converted from the first intermediate frequency to a second intermediate frequency by the second frequency converting unit 3116 and is further converted to a digital signal by the A/D converting unit 3117. Note that the second frequency converting unit 3116 is also configured by an oscillator 3116a and a mixer 3116b.

The output from the A/D converting unit 3117 (the output from the first receiving unit 3011) is provided to a demodulator circuit 3021 (digital signal processing device) and a demodulation process for the receive signal from a terminal device is performed.

As such, the first receiving unit 3011 converts an analog uplink signal received by the antenna 3010 to a digital signal and provides the digital uplink signal to the demodulator circuit 3021 configured as a digital signal processing device.

The transmitting unit 3013 receives modulating signals I and Q which are outputted from a modulator circuit 3020 (digital signal processing device) and transmits the signals from the antenna 3010, and is configured as a direct conversion transmitter. The transmitting unit 3013 includes D/A converters 3131a and 3131b, an orthogonal modulator 3132, a third filter 3133, a third amplifier (high power amplifier; HPA) 3134, and the fourth filter 3135.

The D/A converters 3131a and 3131b perform D/A conversion on the modulating signals I and Q, respectively. The outputs from the D/A converters 3131a and 3131b are provided to the orthogonal modulator 3132, and a transmit signal whose carrier wave frequency is $f_d$ (downlink signal frequency) is generated by the orthogonal modulator 3132.

The output from the orthogonal modulator 3132 passes through the third filter 3133 that allows only the frequency $f_d$ to pass therethrough and is then amplified by the third amplifier 3134 and further passes through the fourth filter 3135 that allows only the frequency $f_d$ to pass therethrough and is then transmitted from the antenna 3010, serving as a downlink signal to a terminal device.

The above-described first receiving unit 3011 and transmitting unit 3013 serve the functions required to perform essential communication with terminal devices. A slave BS 3001b in the present embodiment further includes the second receiving unit 3012. The second receiving unit 3012 receives a downlink signal transmitted from another base station device, to achieve over-the-air synchronization.

Here, to achieve, by the slave BS, synchronization with another base station device by over-the-air synchronization, the slave BS 3001 needs to receive a downlink signal transmitted from another base station device. However, since the frequency of a downlink signal is $f_d$ and thus is different from the frequency $f_u$ of an uplink signal, the downlink signal cannot be received by the first receiving unit 3011.

That is, since the first receiving unit 3011 includes the first filter 3111 that allows only a signal with the frequency $f_u$ to pass therethrough and the second filter 3114 that allows only the first intermediate frequency having been converted from the frequency $f_u$ to pass therethrough, even if a signal with a frequency other than the frequency $f_u$ (the frequency $f_d$ of a downlink signal) is provided to the first receiving unit 3011, the signal cannot pass through the first receiving unit 3011.

Namely, the first receiving unit 3011 is compatible with reception of a signal with the uplink signal frequency $f_u$, by the presence of the filters 3111 and 3114 included in the first receiving unit 11 and thus cannot receive signals with other frequencies.

Hence, the slave BS in the present embodiment includes, separately from the first receiving unit 3011, the second receiving unit 3012 for performing reception of a downlink signal with the frequency $f_d$ which is transmitted from another base station device.

The second receiving unit 3012 includes a fifth filter 3121, a fourth amplifier (high-frequency amplifier) 3122, a third frequency converting unit 3123, a sixth filter 3124, a fifth amplifier (intermediate frequency amplifier) 3125, a fourth frequency converting unit 3126, and an A/D converting unit 3127.

The fifth filter 3121 is to allow only a downlink signal from another base station device to pass therethrough, and is configured by a band-pass filter that allows only the frequency $f_d$ of a downlink signal to pass therethrough. The receive signal having passed through the fifth filter 3121 is amplified by the fourth amplifier (high-frequency amplifier) 3122, and the output from the fourth amplifier 3122 is subjected to conversion from the downlink signal frequency $f_d$ to the first intermediate frequency by the third frequency converting unit 3123. Note that the third frequency converting unit 3123 is configured by an oscillator 3123a and a mixer 3123b.

The output from the third frequency converting unit 3123 passes through the sixth filter 3124 that allows only the first intermediate frequency which is outputted from the third frequency converting unit 3123 to pass therethrough, and is then amplified again by the fifth amplifier (intermediate frequency amplifier) 3125. The output from the fifth amplifier 3125 is converted from the first intermediate frequency to the second intermediate frequency by the fourth frequency converting unit 3126 and is further converted to a digital signal by the A/D converting unit 3127. Note that the fourth frequency converting unit 3126 is also configured by an oscillator 3126a and a mixer 3126b.

The signal outputted from the A/D converting unit 3127 is provided to a synchronization processing unit 3030. Accordingly, the synchronization processing unit 3030 can obtain the downlink signal transmitted from another base station device.

The synchronization processing unit 3030 performs processes for achieving synchronization of the communication timing and communication frequency of the base station device 1b, based on a first known signal (Primary Synchronization Signal) and a second known signal (Secondary Synchronization Signal) which are included in a frame of the downlink signal obtained from the master BS 3001a.

Figure 29:
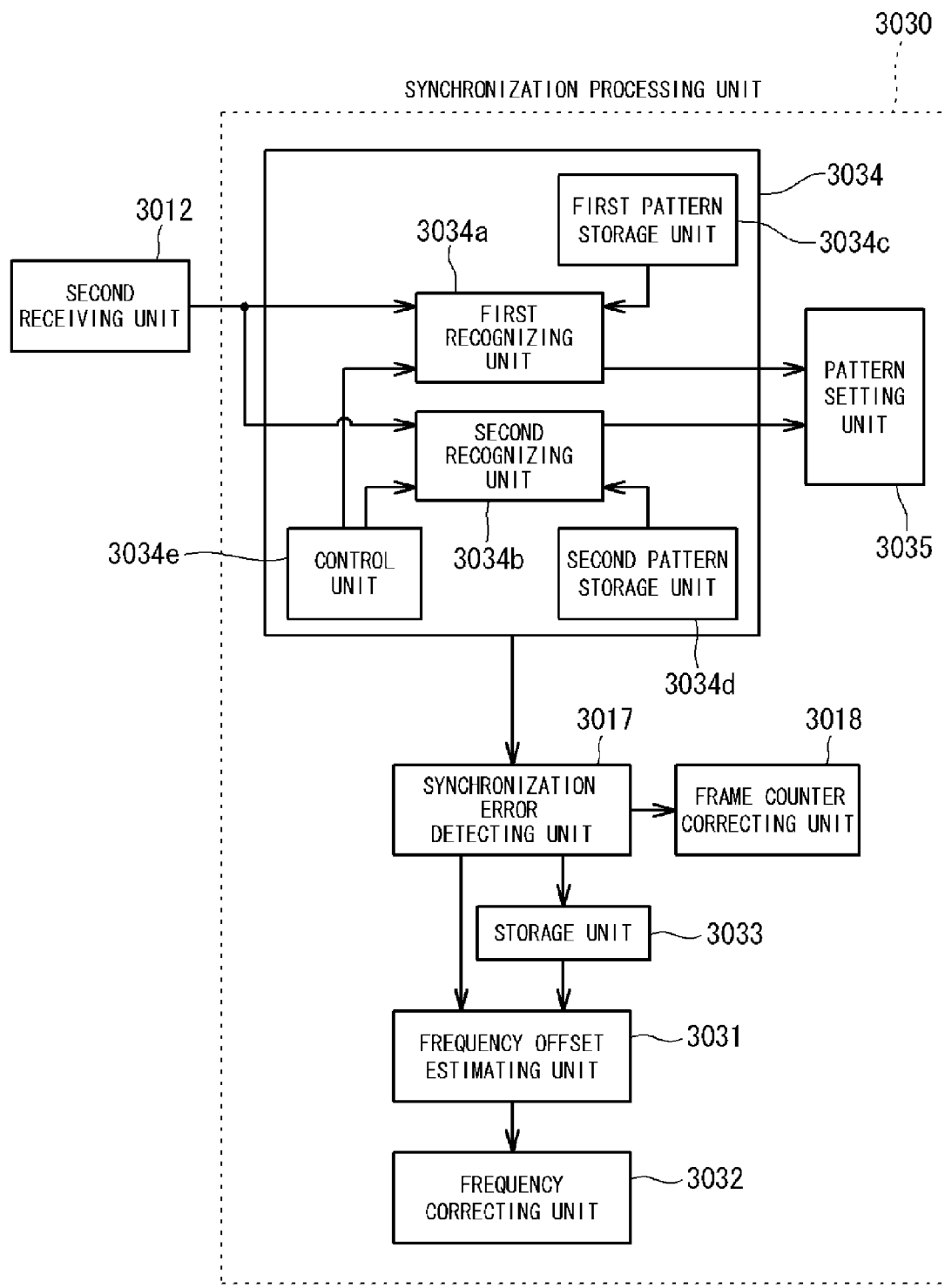
FIG. 29 is a configuration diagram of a synchronization processing unit in Chapter 3.

As shown in FIG. 29, the synchronization processing unit 3030 has a recognizing unit 3034, a frame synchronization error detecting unit 3017, a frame counter correcting unit 3018, a frequency offset estimating unit 3031, a frequency correcting unit 3032, a storage unit 3033, and a pattern setting unit 3035.

The recognizing unit 3034 is to recognize, based on the patterns of the two known signals, a hierarchical level L in a hierarchical structure for inter-base-station-device synchronization (see FIG. 1), at which another base station device is located. In addition, the recognizing unit 3034 is to identify another base station device with the smallest value of the hierarchical level L, and recognize the another base station device as the target of synchronization.

The recognizing unit 3034 includes a first recognizing unit 3034a that detects the first known signal from a signal (downlink signal) which is received by the second receiving unit 3012; and a second recognizing unit 3034b that detects the second known signal from the signal received by the second receiving unit 3012. The recognizing unit 3034 recognizes the hierarchical level L of another base station device by a combination of a first known signal pattern and a second known signal pattern which are included in the receive signal.

The first recognizing unit 3034a recognizes which one of 3 patterns that can be taken by the first known signal is included in the receive signal received by the second receiving unit 3012. This recognition is performed by taking correlation between each of the known 3 patterns and the receive signal (downlink signal).

More specifically, 3 patterns that can be taken by the first known signal are stored in a first pattern storage unit 3034c. The first recognizing unit 3034a sequentially reads the patterns stored in the first pattern storage unit 3034c and searches whether the read pattern is included in the receive signal within a predetermined time, and thereby pattern-recognizes which pattern is included in the receive signal. In addition, upon this search, correlation (sliding correlation) between the receive signal and the pattern is taken and the timing at which the correlation between the two is high is recognized as the timing of the first known signal in the receive signal.

The second recognizing unit 3034b recognizes which one of 168 patterns that can be taken by the second known signal is included in the receive signal received by the second receiving unit 3012. A method for this recognition is substantially the same as that for the first recognizing unit 3034a. Note, however, that the second recognizing unit 3034b sequentially reads, from a second pattern storage unit 3034d that stores 168 patterns that can be taken by the second known signal, the patterns that can be taken by the second known signal, and recognizes which one of the 168 patterns is included in the receive signal. In addition, the second recognizing unit 3034b can also recognize the timing of the second known signal in the receive signal.

Note that, since the number of patterns that can be taken by the second known signal is larger than the number of patterns that can be taken by the first known signal, a pattern recognition process performed by the second recognizing unit 3034b requires a longer time on average than a pattern recognition process performed by the first recognizing unit 3034a.

In addition, the recognizing unit 3034 has a control unit 3034e for controlling recognition by the first recognizing unit 3034a and the second recognizing unit 3034b. Control performed by the control unit 3034e will be described later.

The frame synchronization error detecting unit 3017 detects frame transmission timing of another base station device serving as the target of synchronization, using the timing of the first known signal which is recognized by the recognizing unit 3034 (and, if necessary, the timing of the second known signal), and detects an error (frame synchronization error) between the frame transmission timing and frame transmission timing of the base station device.

The detected frame synchronization error is provided to the frame counter correcting unit 3018. The frame counter correcting unit 3018 corrects the value of a frame counter which determines frame transmission timing, according to the detected frame synchronization error. In this manner, the slave BS can be synchronized with the master BS 3001a. Note that the target for detection and correction of a synchronization error is not limited to frame timing and may be symbol timing or slot timing.

The synchronization error detected by the frame synchronization error detecting unit 3017 is provided to the storage unit 3033 each time it is detected, and is accumulated in the storage unit 3033.

The frequency offset estimating unit 3031 estimates, based on the synchronization error detected by the detecting unit 3017, a difference (clock frequency error) between a clock frequency of a built-in clock generator (not shown) included in the base station device, the receiving side, and a clock frequency of a built-in clock generator of the base station device serving as the target of synchronization, the transmitting side, and estimates a carrier frequency error (carrier frequency offset) from the clock frequency error.

The frequency offset estimating unit 3031 estimates, under circumstances where over-the-air synchronization is periodically performed, a clock error based on a frame synchronization error t1 detected in the last over-the-air synchronization and a frame synchronization error t2 detected in the current over-the-air synchronization. Note that the last frame synchronization error t1 can be obtained from the storage unit 3029.

For example, it is assumed that, when the carrier frequency $f_d$ of a downlink signal is 2.6 [GHz], T1 is detected as a frame synchronization error at the last over-the-air synchronization timing (synchronization timing=t1) and timing is modified by an amount corresponding to T1. The synchronization error (timing offset) after the modification is 0 [msec]. Then, it is assumed that also at the current over-the-air synchronization timing which is T=10 seconds later (synchronization timing=t2), a synchronization error (timing offset) is detected again and the synchronization error (timing offset) is T2=0.1 [msec].

At this time, a synchronization error (timing offset) of 0.1 [msec] having occurred in 10 seconds is an accumulated value of the error between the clock period of the master BS 1a and the clock period of the slave BS.

That is, the following equality is established between the synchronization error (timing offset) and the clock period:

the clock period of the base station device serving as the origin of synchronization:the clock period of the base station device serving as the target of synchronization=$T$:$(T+T2)$=10:(10+0.0001).

Then, since the clock frequency is the reciprocal of the clock period, (the clock frequency of the base station device serving as the origin of synchronization−the clock frequency of the base station device serving as the target of synchronization) =the clock frequency of the base station device serving as the origin of synchronization×$T2/(T+T2)$ ≈the clock frequency of the base station device serving as the origin of synchronization×0.00001.

Therefore, in this case, there is an error of 0.00001=10 [ppm] between the clock frequency of the base station device serving as the target of synchronization, the transmitting side, and the clock frequency of the base station device, the receiving side. The frequency offset estimating unit 31 estimates a clock frequency error in the above-described manner.

Then, since the carrier frequency and the synchronization error (timing offset) are shifted in the same manner, a mismatch of an amount corresponding to 10 [ppm], i.e., a mismatch of 2.6 [GHz]×1×10$^{-5}$=26 [kHz], also occurs in the carrier frequency. In this manner, the frequency offset estimating unit 31 can also estimate a carrier frequency error (carrier frequency offset) from the clock frequency error.

The carrier frequency error estimated by the frequency offset estimating unit 3031 is provided to the carrier frequency correcting unit 32. A carrier frequency correction can be made not only to the carrier frequency of an uplink signal but also to the carrier frequency of a downlink signal.

When synchronization is achieved between two base station devices, the target of synchronization and the origin of synchronization, in the above-described manner, even if broadcast transmission where information of the same content is simultaneously transmitted to numbers of terminal devices from the two base station devices, signals from the two base station devices can be prevented from interfering with each other.

In addition, since synchronization between the two base station devices is achieved, by transmitting signals of the same content from the two base station devices, macrodiversity or spatial multiplexing transmission can be performed on the terminal device side.

Note that the second receiving unit 3012 does not need to be provided completely independently of the first receiving unit 3011, as shown in FIG. 28, and those elements that can be shared may be shared. Note also that when the base station device is of a time-division duplex system, reception for over-the-air synchronization can also be performed by the first receiving unit 3011.

The pattern setting unit 3035 determines a hierarchical level L of the base station device, based on a hierarchical level L of a base station device serving as the target of synchronization which is recognized by the recognizing unit 3034, and sets a combination of a first known signal pattern and a second known signal pattern which represents the determined hierarchical level L. The first known signal and the second known signal whose patterns are set by the pattern setting unit 3035 are used as a first known signal and a second known signal in a downlink signal to be transmitted to a terminal device.

[3.4 Relationship Between the Hierarchical Level in the Hierarchical Structure and the Known Signals]

There are 504 combinations of the first known signal (3 patterns) and the second known signal (168 patterns) and correspondingly the hierarchical level L in the communication system in the present embodiment can take values of 1 to 504.

Here, 3 patterns that can be taken by the first known signal are represented by n (n: 0 to 3) and 168 patterns that can be taken by the second known signal are represented by m (m: 0 to 167).

As shown in FIG. 30, of 504 hierarchical levels L, for L=1 to 168, combinations of the first known signal pattern n=0 and the second known signal of 168 patterns are allocated. For L=169 to 336, combinations of the first known signal pattern N=1 and the second known signal of 168 patterns are allocated. Then, for L=337 to 504, combinations of the first known signal pattern N=2 and the second known signal of 168 patterns are allocated.

As a result, the smaller the first known signal pattern (primary code) n the higher the hierarchical level (the smaller the "L"), and the larger the "n" the lower the hierarchical level (the larger the "L"). Even when the first known signal patterns (primary codes) n are the same, the smaller the second known signal pattern (secondary code) m the higher the hierarchical level (the smaller the "L"), and the larger the "m" the lower the hierarchical level (the larger the "L").

Since the relationship between the hierarchical level L and the first known signal pattern (primary code) n and the second known signal pattern (secondary code) m is defined in the above-described manner, if the recognizing unit 3043 can determine a first known signal pattern (primary code) n and a second known signal pattern (secondary code) m which are included in a downlink signal transmitted from another base station device, then a hierarchical level L of the another base station device can be recognized.

In addition, the first known signal and the second known signal are transmitted at different timings. By thus transmitting the two known signals at different timings, a process required to identify the known signals is facilitated.

Note that the relationship shown in FIG. 30 is stored in a storage unit included in the base station device, and the recognizing unit 3043 can also determine a hierarchical level L by referring to the relationship shown in FIG. 30.

[3.5 Over-the-air Synchronization Process]

As shown in FIG. 28, the base station device includes an over-the-air synchronization control unit 3040 that controls timing at which over-the-air synchronization is performed. The over-the-air synchronization control unit 3040 performs an over-the-air synchronization process periodically or on an irregular basis as necessary. While an over-the-air synchronization process is performed, transmission performed by the transmitting unit 13 is suspended and the second receiving unit 3012 is allowed to receive a downlink signal transmitted from another base station device. Then, the synchronization processing unit 3030 performs an over-the-air synchronization process based on the signal received by the second receiving unit 3012.

Figure 31:
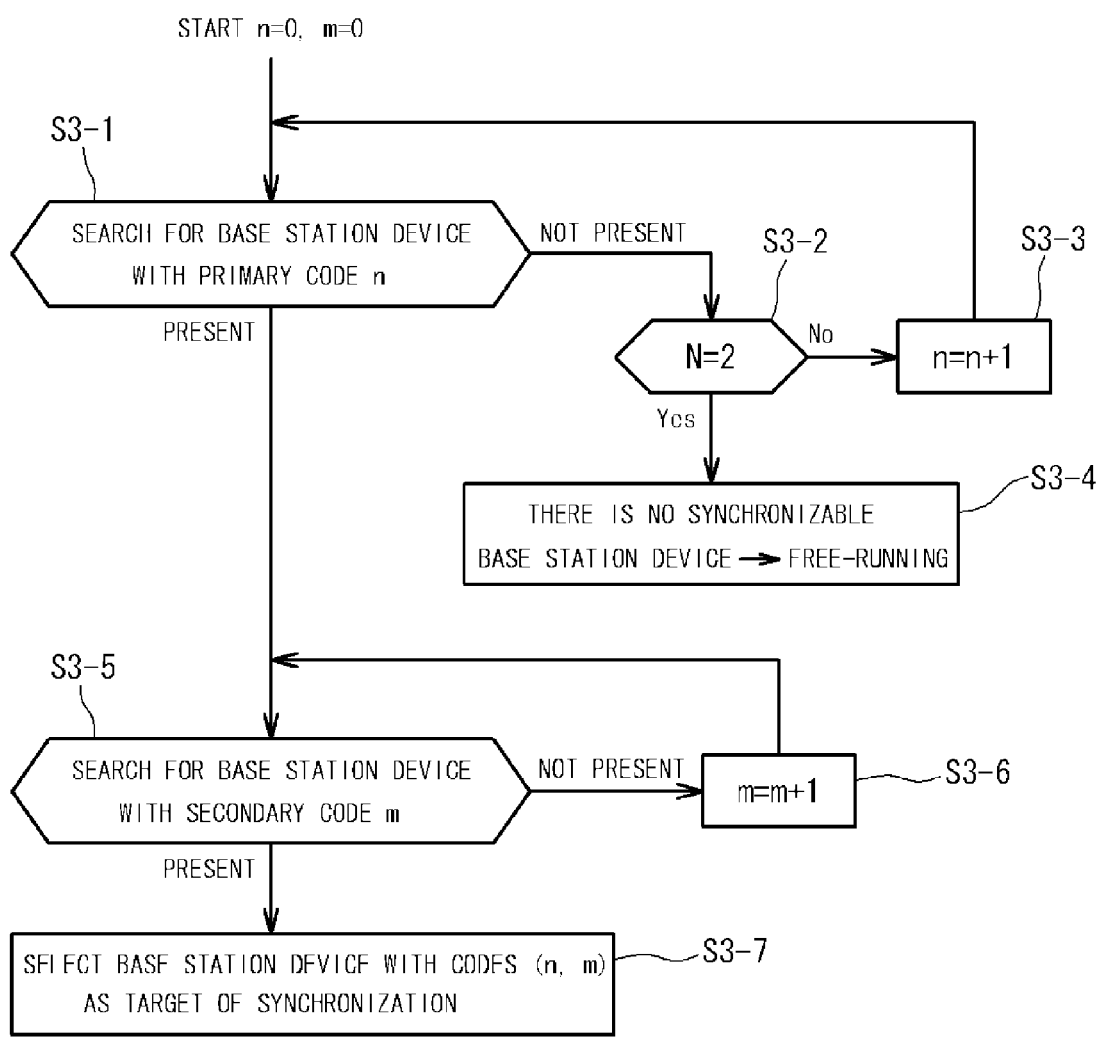
FIG. 31 is a flowchart of a target-of-synchronization selection process.

FIG. 31 shows a process performed by the recognizing unit 3043 of a base station device that is to perform an over-the-air synchronization process, to select another base station device serving as the target of synchronization. Note that in FIG. 31 the process starts with n=0 and m=0.

Upon over-the-air synchronization, first, the control unit 3034e in the recognizing unit 3043 allows the first recognizing unit 3043a to search for a base station device with a primary code n=0 (step S3-1). That is, the first recognizing unit 3043a recognizes whether a first known signal pattern corresponding to a primary code n=0 is included in a signal received by the second receiving unit 3012. If a first known signal pattern corresponding to a primary code n=0 is not included in the received signal, then the control unit 3034e allows the first recognizing unit 3034a to search for a base station device with a primary code n=1 (steps S3-1, S3-2, and S3-3). If a first known signal pattern corresponding to a primary code n=1 is not included in the received signal, either, then the control unit 3034e allows the first recognizing unit 3034a to search for a base station device with a primary code n=2 (steps S3-1, S3-2, and S3-3).

When none of the primary codes n=0 to 2 can be detected, it means that another base station device that can serve as the target of synchronization is not present. In this case, the base station device goes into a free-running mode in which the base station device determines transmission timing, etc., using a clock of the device itself, instead of over-the-air synchronization (step S3-4).

If a first known signal pattern corresponding to any one of the primary codes n=0 to 2 is included in a signal received by the second receiving unit 3012, then the control unit 3034e subsequently allows the second recognizing unit 3043b to search whether a secondary code (second known signal pattern) m in the signal is any one of 0 to 167 (steps S3-5 and S3-6).

If, by this search, a secondary code m of another base station device is found, then the control unit 3034e selects the another base station device having a hierarchical level L associated with the codes (n, m) (see FIG. 30), as the target of synchronization for over-the-air synchronization (step S3-7).

Then, the synchronization error detecting unit 3017 detects a synchronization error between the target of synchronization and the base station device, based on the timing of the first known signal (or the second known signal) included in the signal transmitted from the target of synchronization. Based on the synchronization error, a frame counter is corrected by the frame counter correcting unit 3018 and the transmission and reception frequencies of the base station device are corrected by the frequency correcting unit 3032.

Note that in FIG. 31, when a base station device with a small primary code n can be detected, a search for a base station device with a larger primary code m than that is not performed; however, taking into account the case in which a plurality of base station devices may be detected, a search may be performed for all of the plurality of primary codes n=0 to 2 first and then a base station device having a primary code n with the highest received power may be selected.

By performing searches such as those described above, even if there is a large number of hierarchical levels that can be taken by another base station device, a process for known signal recognition can be performed easily or rapidly. For example, when one known signal takes 504 patterns, the recognizing unit 3043 needs to perform pattern recognition using 504 known patterns at the maximum each time over-the-air synchronization is performed, thereby increasing processing time.

On the other hand, in the present embodiment, pattern recognition for the first known signal with a small number of patterns is performed first and then pattern recognition for the second known signal is performed. Thus, the recognizing unit 3043 can recognize a hierarchical level L of the target of synchronization only by performing pattern recognition using 171 (=3+168) known patterns at the maximum during over-the-air synchronization, thereby enabling to reduce processing time.

When another base station device serving as the target of synchronization is selected in the above-described manner, the pattern setting unit 3035 determines a combination of a first known signal pattern and a second known signal pattern to be included in a downlink signal which is transmitted to a terminal device from the base station device.

Figure 32:
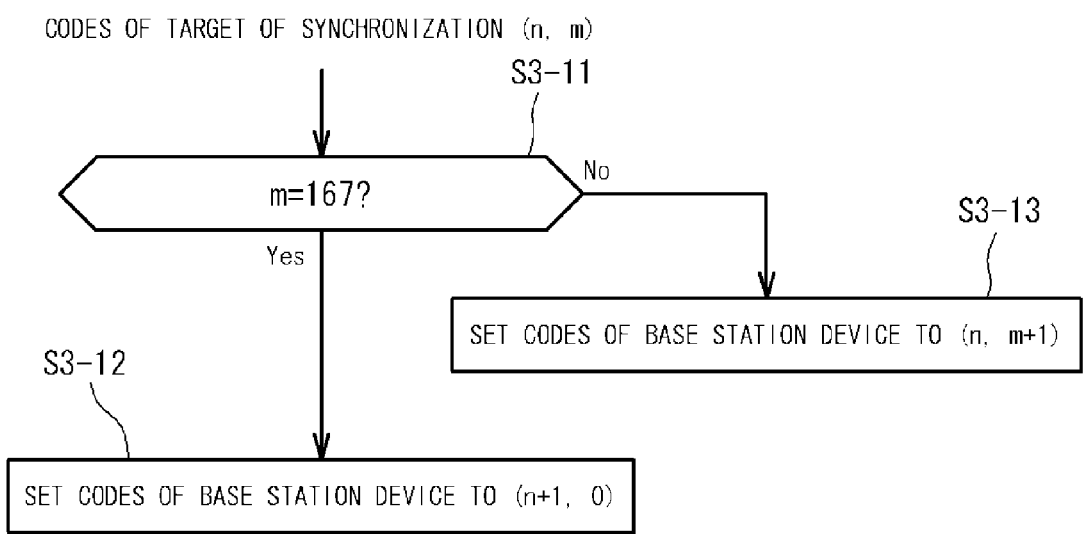
FIG. 32 is a flowchart of a hierarchical level setting process for a base station device.
Figure 33:
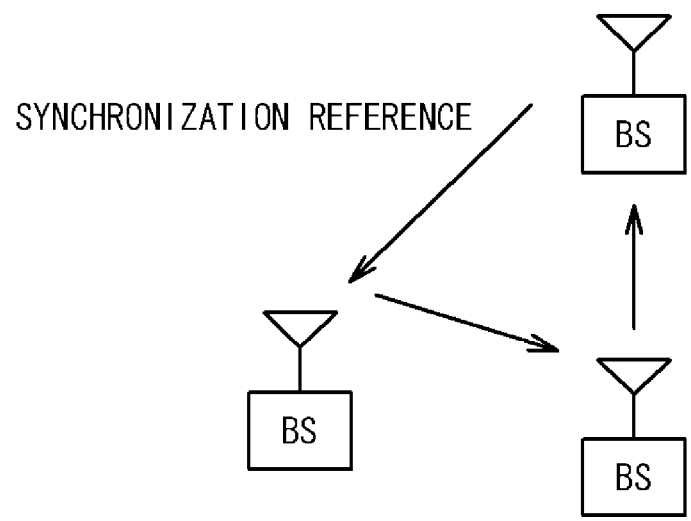
FIG. 33 is a diagram showing a loop-like target-of-synchronization reference structure.

Namely, as shown in FIG. 32, when the codes of the target of synchronization (hierarchical level L) are (n, m), if m in the codes of the target of synchronization is 167 then the codes of the base station device are set to (n+1, 0) (steps S3-11 and S3-12)), and if m is other than 167 then the codes of the base station device are set to (n, m+1) (steps S3-11 and S3-13). That is, a hierarchical level L+1 which is lower by one than the hierarchical level L of the target of synchronization is set as the hierarchical level of the base station device, and a first known signal and a second known signal having patterns associated with the hierarchical level are transmitted included in a downlink signal to be transmitted to a terminal device in a communication area of the base station device.

By performing a process such as that described above, a certain base station device is set with a hierarchical level which is lower by one than that of the target of synchronization, and a base station device whose target of synchronization is the certain base station device is set with a hierarchical level which is lower by one than that of the certain base station device. As a result, even if each base station device autonomously determines its target of synchronization, a hierarchical structure such as that in FIG. 25 is naturally constructed.

[Chapter 4 Resource Allocation for Over-the-air Synchronization]

In base station devices which are described in this Chapter 4, the techniques for base station devices described in Chapter 1, 2, or 3 are employed within the technically consistent scope. In this Chapter 4, for those points that are not particularly described, the matters described in Chapters 1, 2, and 3 are incorporated.

[4.1 Necessity for Resource Allocation for Over-the-air Synchronization]

When over-the-air synchronization is attempted, a base station device that attempts to achieve synchronization with another base station device needs to receive a signal transmitted from the another base station device to a mobile terminal. Thus, during the reception, the base station device is unable to perform transmission or reception with mobile terminals, which may inhibit smooth communication.

Hence, a technique is required for minimizing inhibition of smooth communication even when over-the-air synchronization is performed.

[4.2 Disclosure of a Resource Allocation Technique for Over-the-air Synchronization]

(1) An invention disclosed here is a base station device including a resource allocation control unit that performs resource allocation in a communication channel which is used for communication with user terminals. The base station device is characterized in that the resource allocation control unit includes: a determining unit that determines whether a resource which is an allocation target in the communication channel is included in a synchronization section where a signal transmitted from another base station device is to be received for synchronization with another base station device; and an allocating unit that performs a resource allocation process such that a resource that has been determined by the determining unit to be included in the synchronization section is not allocated with user terminals, or the number of user terminals that can be allocated to the resource is less than the number of user terminals that can be allocated to the resource in an asynchronization section.

While a base station device which is a communication partner of user terminals receives a signal transmitted from another base station device for synchronization with another base station device, the base station device cannot transmit signals to the user terminals.

Therefore, when user terminal allocation control such as that described above is not performed, in the synchronization section, even if resource allocation is performed, the user terminals are unable to perform communication with the base station device. As a result, the user terminals may wastefully perform scanning to search for a base station device or may recognize that some kind of abnormality has occurred.

However, since the synchronization section merely occurs temporarily during communication with the user terminals, and when the synchronization section is terminated, the base station device can normally perform communication in the usual manner. Thus, the occurrence of wasteful scanning or the recognition of the occurrence of abnormality should be avoided.

Here, the user terminals cannot get a chance to perform communication with the base station device unless the user terminals are allocated with a resource of a communication channel.

Therefore, also in the synchronization section, when the user terminals are not allocated with a resource of the communication channel, even if the user terminals cannot communicate with the base station device in the synchronization section, the possibility that the user terminals wastefully perform scanning to search for a base station device or recognize that some kind of abnormality has occurred is eliminated.

The above-described invention is made based on such an idea. According to the above-described invention, of those resources which are allocation targets in a communication channel, a resource that is included in a synchronization section is not allocated with user terminals, or the number of user terminals that can be allocated to the resource is less than that for an asynchronization section.

By not allocating user terminals to a resource included in the synchronization section, even if user terminals present in a communication area of the base station device cannot communicate with the base station device in the synchronization section, the possibility that the user terminals wastefully perform scanning to search for a base station device or recognize that some kind of abnormality has occurred is eliminated. Accordingly, smooth communication can be maintained for all the user terminals in the communication area.

In addition, by making the number of user terminals allocated to the resource included in the synchronization section less than that for an asynchronization section (a section other than the synchronization section; a state in which the base station device performs communication with the user terminals), the number of user terminals that wastefully perform scanning to search for a base station device or recognize that some kind of abnormality has occurred can be reduced because the user terminals cannot communicate with the base station device in the synchronization section. Accordingly, inhibition of smooth communication can be suppressed.

(2) It is preferred that the allocating unit be configured such that a resource that has been determined by the determining unit to be included in a synchronization section in a downlink communication channel is not allocated with user terminals, and a resource that has been determined by the determining unit to be included in a synchronization section in an uplink communication channel is allocated with user terminals.

In this case, in the synchronization section, allocation of user terminals is not performed in a downlink (transmission from the base station device to the user terminals) communication channel and allocation of user terminals is performed in an uplink (transmission from the user terminals to the base station device) communication channel.

Accordingly, there can be performed resource allocation which is suitable for the case in which in the synchronization section downlink communication is suspended but uplink communication is performed.

(3) It is preferred that the allocating unit be configured such that resources that have been determined by the determining unit to be included in synchronization sections in a downlink communication channel and an uplink communication channel are not allocated with user terminals.

In this case, in the synchronization section, allocation of user terminals is not performed in both the downlink and uplink.

Accordingly, resource allocation can be performed which is suitable for the case in which in the synchronization section both downlink communication and uplink communication are suspended.

(4) It is preferred that an array antenna including a plurality of antennas be included and the allocating unit control allocation of a resource that has been determined by the determining unit to be included in a synchronization section, according to the number of those of the plurality of antennas that are allocated for communication with the user terminals in the synchronization section.

In the case of a base station device having an array antenna, in the synchronization section, not all of a plurality of antennas need to be used for reception of a signal transmitted from another base station device, and some of the plurality of antennas can be allocated for communication with user terminals.

When, in the synchronization section, only some of the plurality of antennas are used for communication with the user terminals, the number of antennas is less than that for the case in which all of the plurality of antennas are used for communication with the user terminals in the asynchronization section.

Hence, by controlling, in the above-described manner, resource allocation according to the number of those of the plurality of antennas that are allocated for communication with the user terminals in the synchronization section, even if the number of antennas allocated for communication with the user terminals in the synchronization section is reduced, appropriate resource allocation can be performed.

(5) It is preferred that an adjusting unit be further included that adjusts the number of those of the plurality of antennas that are used for communication with the user terminals in the synchronization section and the number of antennas used for reception of a signal transmitted from another base station device.

In this case, the number of antennas used for communication with the user terminals in the synchronization section and the number of antennas used for reception of a signal transmitted from another base station device can be adjusted.

[4.3 Embodiment of the Resource Allocation Technique for Over-the-air Synchronization]

[4.3.1 Configuration of a Communication System]

Figure 34:
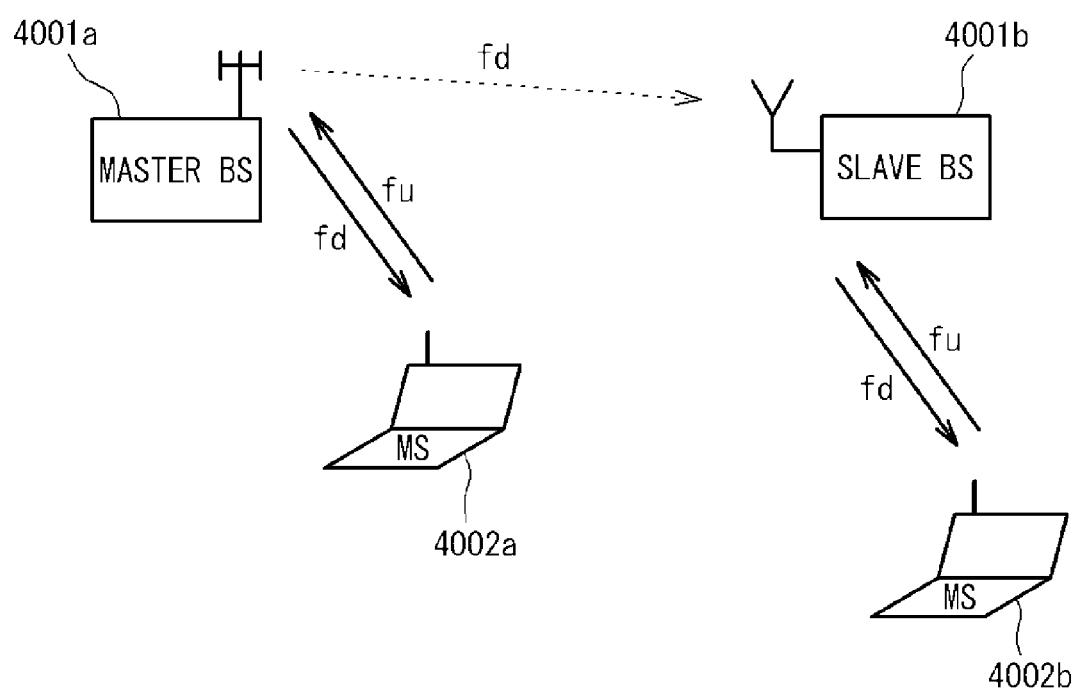
FIG. 34 is an overall view of a wireless communication system in Chapter 4.

FIG. 34 shows a communication system in which wireless communication is performed between base station devices 4001a and 4001b and user terminals (mobile terminals; MSs; Mobile Stations) 4002a and 4002b. In the communication system, the plurality of base station devices (BSs; Base Stations) 1a and 1b are installed and can perform communication with the user terminals 4002a and 4002b present in their respective cells.

The communication system is, for example, a system to which LTE (Long Term Evolution) is applied, as with a communication system in Chapter 3.

[4.3.2 Configuration of a Base Station Device (First Example)]

Figure 35:
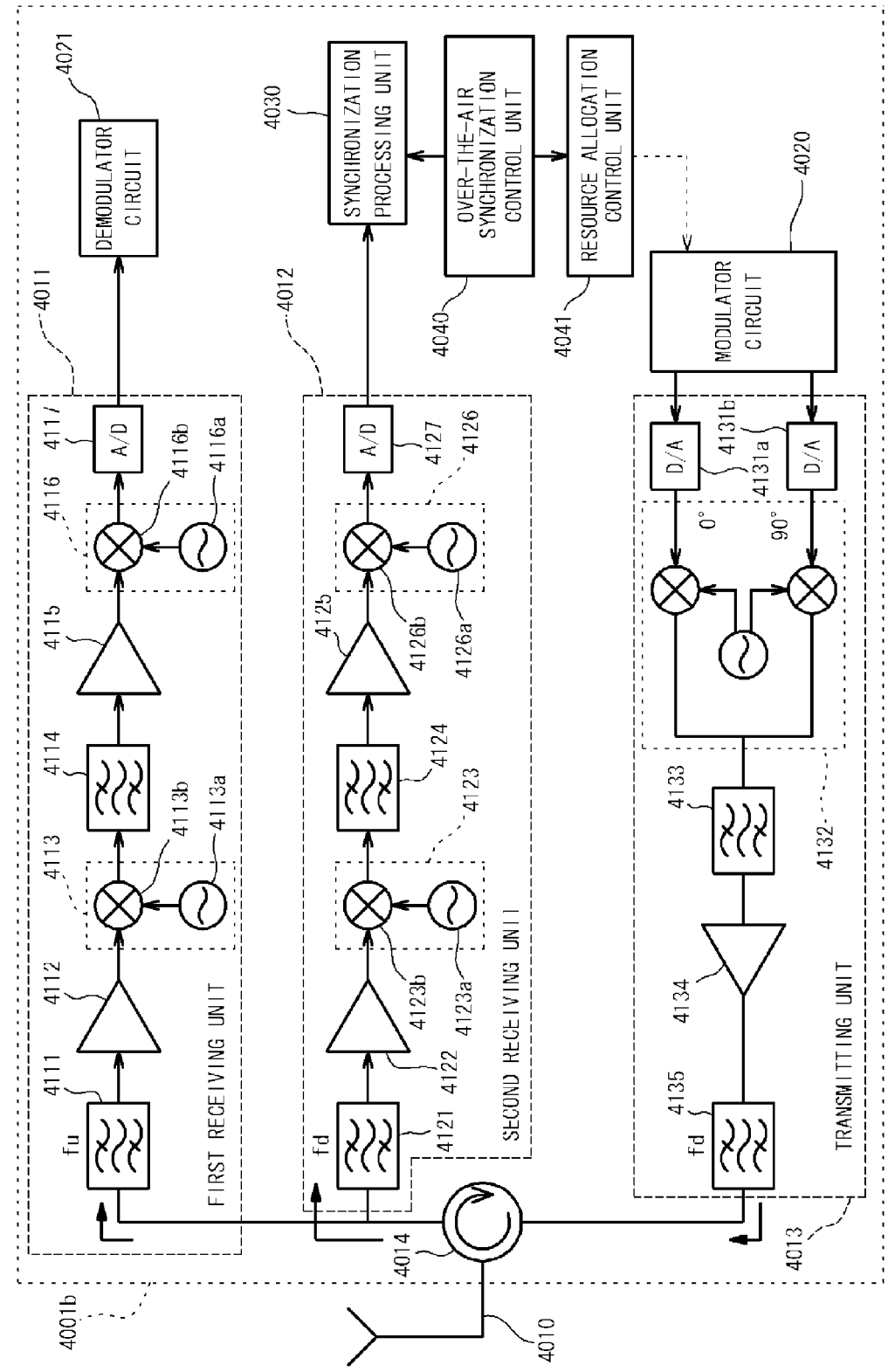
FIG. 35 is a circuit configuration diagram of a slave BS according to a first example in Chapter 4.

FIG. 35 shows a configuration of the base station device (slave BS) 4001b (first example). The slave BS 4001b has substantially the same configuration as the slave BS shown in FIG. 28.

Figure 36:
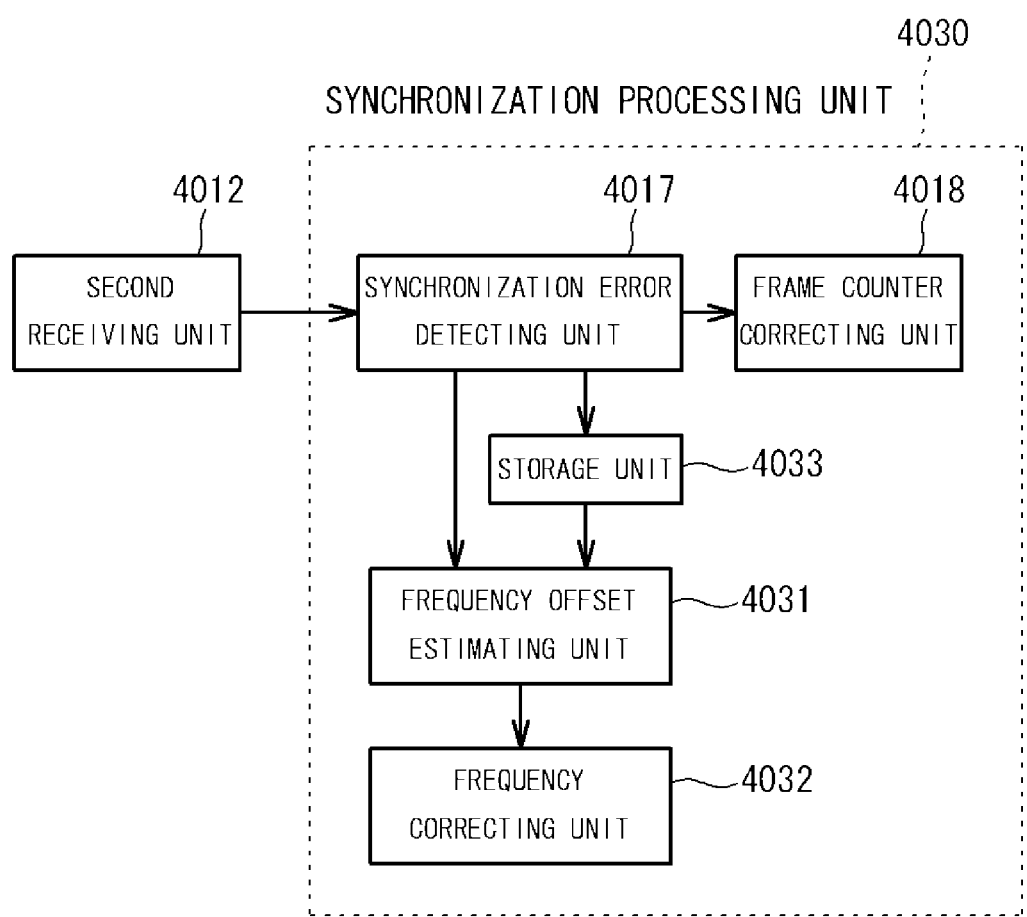
FIG. 36 is a configuration diagram of a synchronization processing unit.

Note, however, that a synchronization processing unit 4030 in FIG. 35 is configured as shown in FIG. 36. The synchronization processing unit 4030 in FIG. 36 is equivalent to one in which the recognizing unit 3034 and the pattern setting unit 3035 are removed from the synchronization processing unit 3030 in FIG. 29, but the same configurations as the recognizing unit 3034 and the pattern setting unit 3035 may be provided.

The synchronization processing unit 4030 in FIG. 36 also performs the processes for achieving synchronization of the communication timing and communication frequency of the device 4001b, based on a Primary Synchronization Signal and a Secondary Synchronization Signal which are included in a frame of a downlink signal obtained from the master BS 1a.

[4.3.3 Configuration of a Base Station Device (Second Example)]

Figure 37:
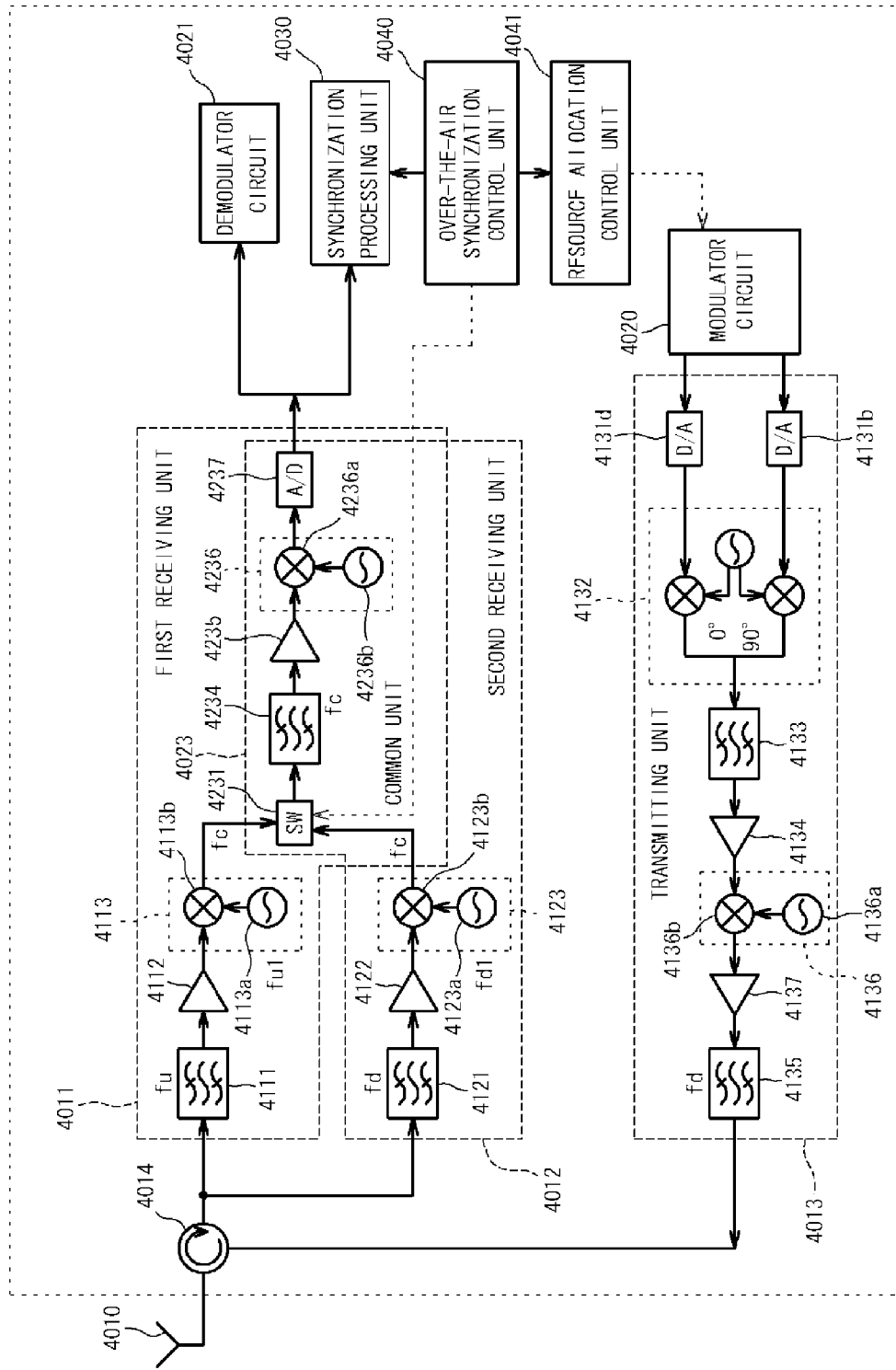
FIG. 37 is a circuit configuration diagram of a slave BS according to a second example in Chapter 4.

FIG. 37 shows a second example of the configuration of the slave BS 4001b. The slave BS 4001b shown in FIG. 37 is similar to the slave BS 4001b according to the first example.

In the slave BS 4001b according to the second example, instead of a first receiving unit 4011 and a second receiving unit 4012 being provided independently of each other, the first receiving unit 4011 and the second receiving unit 4012 share some of their circuit configurations. That is, the first receiving unit 4011 and the second receiving unit 4012 have a common unit 4023 which is used by both the first receiving unit 4011 and the second receiving unit 4012. In terms of this point, the circuit configuration is common to that shown in FIG. 16.

[4.3.4 Configuration of a Base Station Device (Third Example)]

Figure 38:
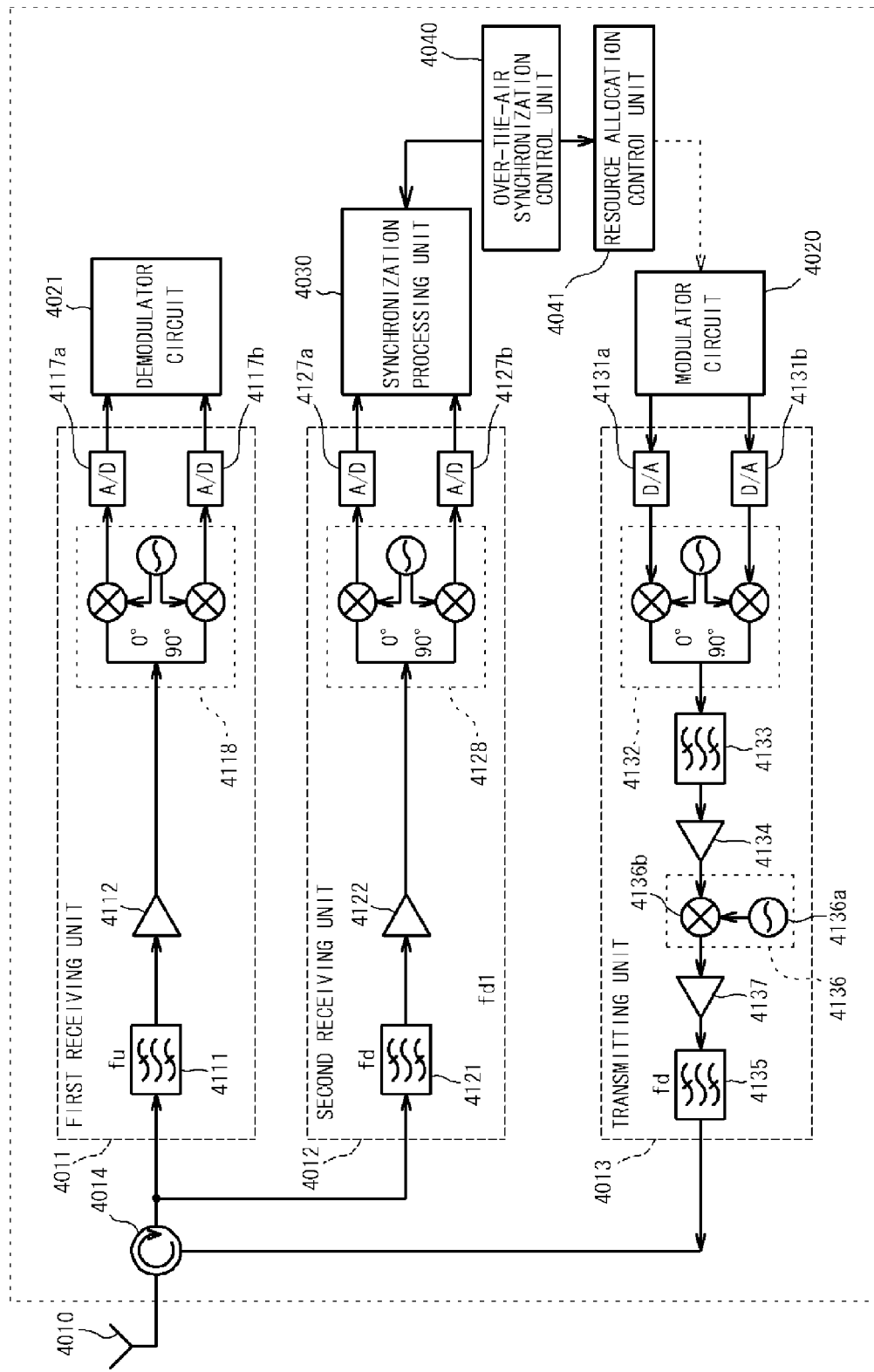
FIG. 38 is a circuit configuration diagram of a slave BS according to a third example in Chapter 4.

FIG. 38 shows a third example of the configuration of the slave BS 4001b. In the slave BS 4001b according to the third example, as with the slave BS 4001b according to the first example shown in FIG. 35, a first receiving unit 4011 and a second receiving unit 4012 are provided independently of each other, and the first receiving unit 4011 and the second receiving unit 4012 are configured as direct conversion receivers. That is, the circuit configuration of the first receiving unit 4011 and the second receiving unit 4012 is common to that shown in FIG. 18.

[4.3.5 Configuration of a Base Station Device (Fourth Example)]

Figure 39:
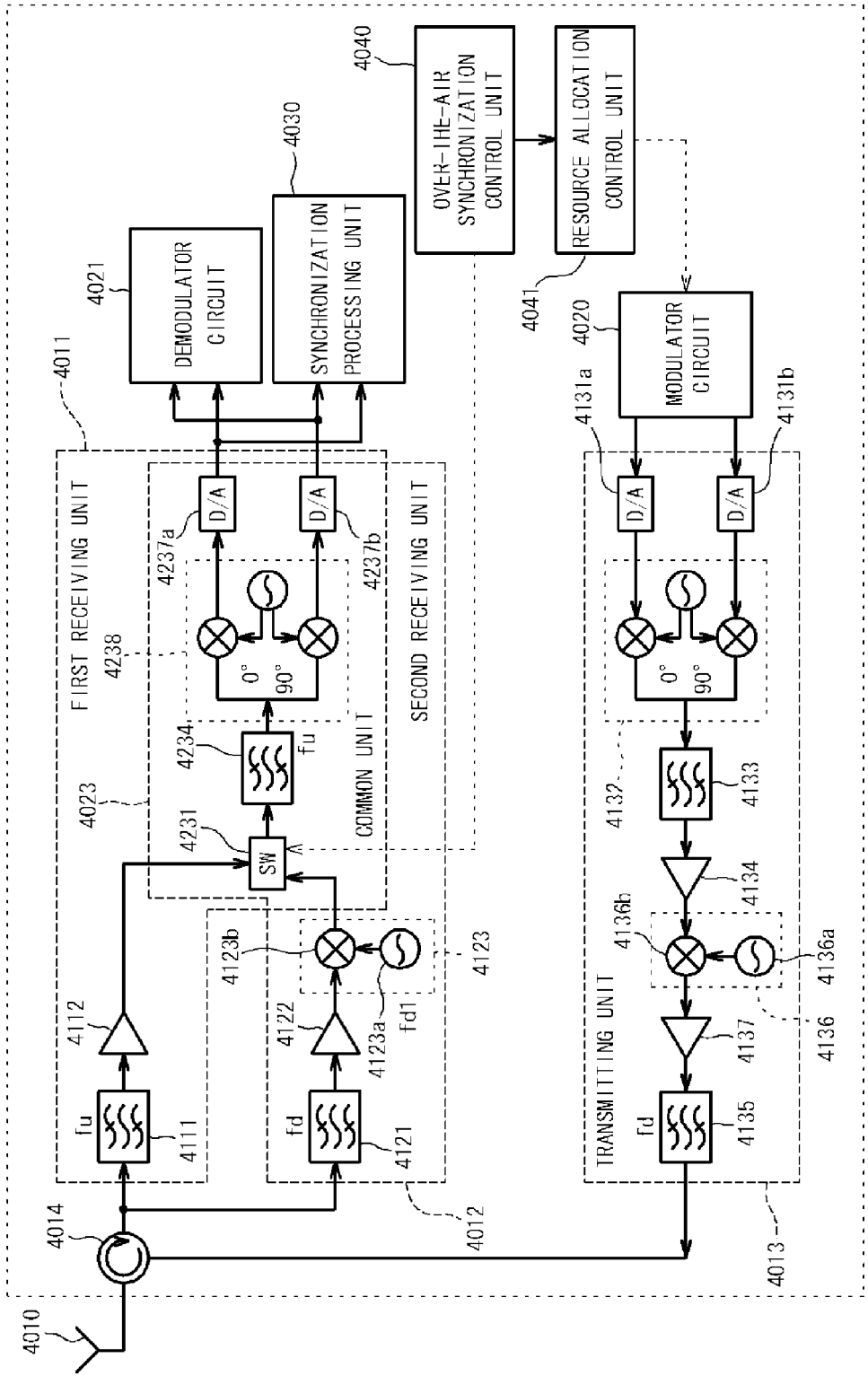
FIG. 39 is a circuit configuration diagram of a slave BS according to a fourth example in Chapter 4.

FIG. 39 shows a fourth example of the configuration of the slave BS 4001b. The slave BS 1b according to the fourth example is such that a common unit 4023 which is similar to the common unit 4023 in the first receiving unit 4011 and the second receiving unit 4012 in the second example shown in FIG. 37 is provided in the first receiving unit 4011 and the second receiving unit 4012 which are of a direct conversion system in the third example shown in FIG. 38. That is, the circuit configuration of the first receiving unit 4011 and the second receiving unit 4012 is common to that shown in FIG. 19.

[4.3.6 Configuration of a Base Station Device (Fifth Example)]

Figure 40:
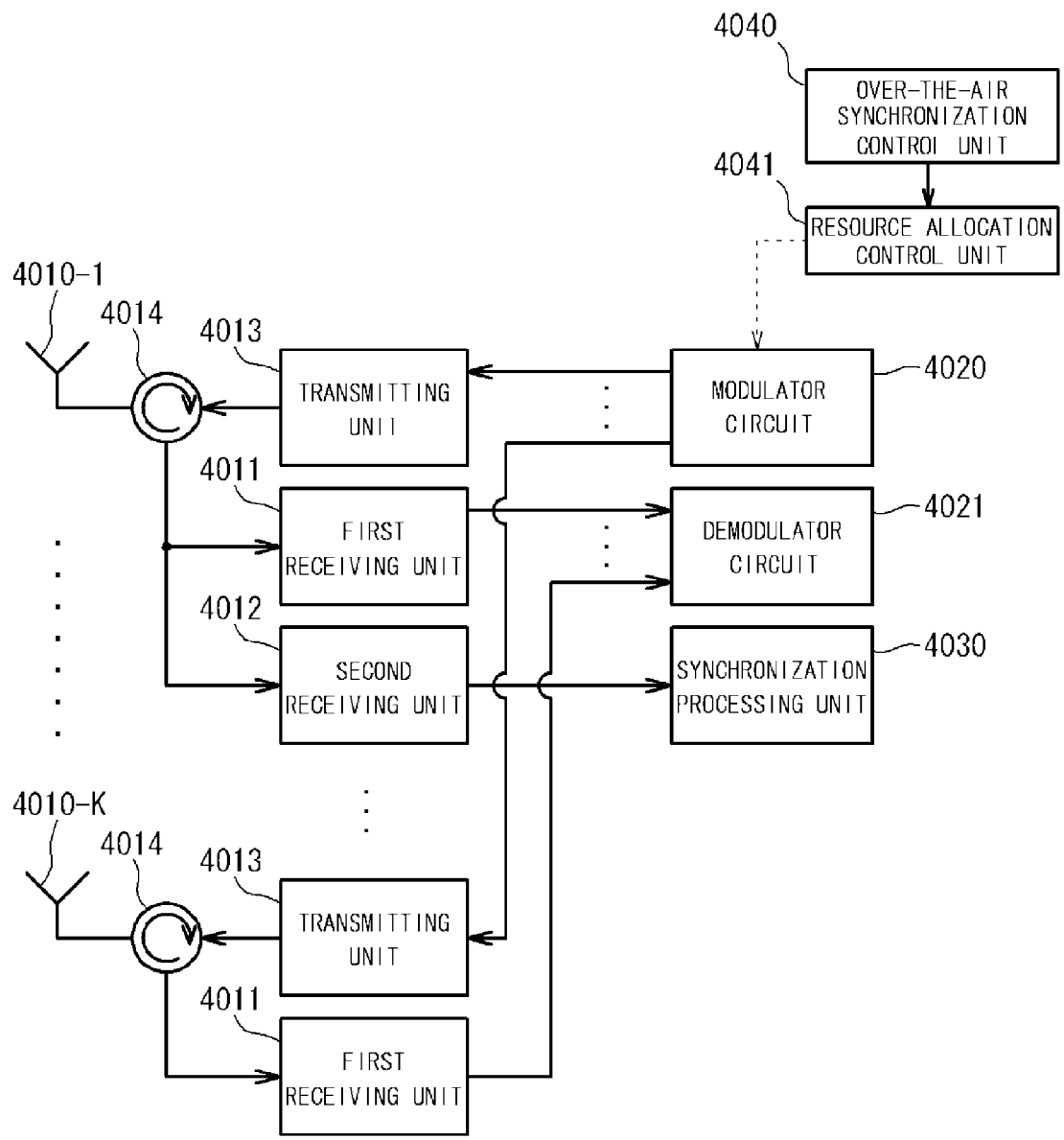
FIG. 40 is a circuit configuration diagram of a slave BS according to a fifth example in Chapter 4.

FIG. 40 shows a fifth example of the configuration of the slave BS 1b. The slave BS 1b according to the fifth example includes an array antenna having a plurality of (K) antennas 4010-1 to 4010-K. The circuit configuration is common to that shown in FIG. 20.

[4.3.7 Configuration of a Base Station Device (Sixth Example)]

Figure 41:
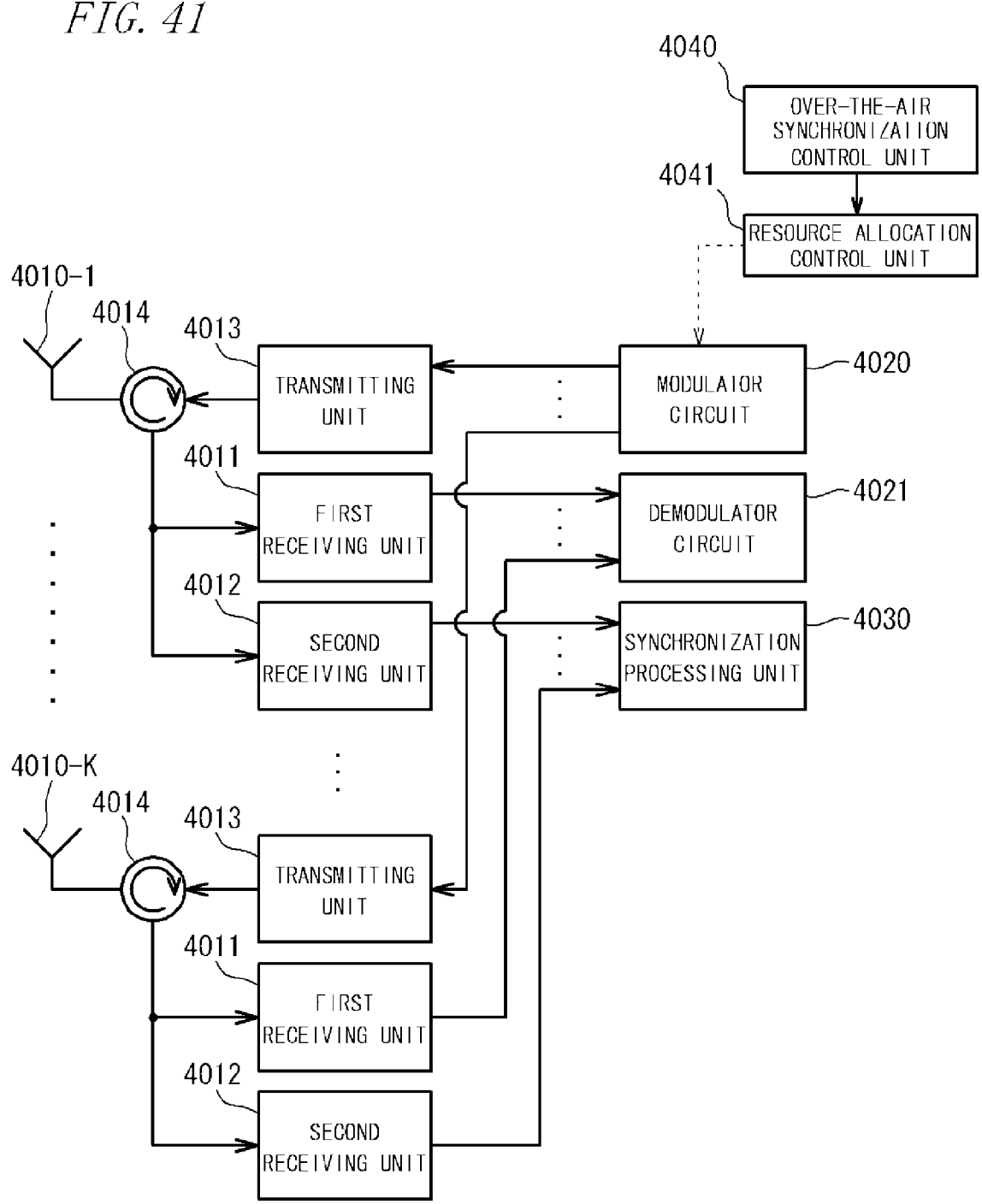
FIG. 41 is a circuit configuration diagram of a slave BS according to a sixth example in Chapter 4.

A slave BS 1b according to a sixth example in FIG. 41 is, unlike the fifth example, provided with second receiving units 4012 in all antenna systems in an array antenna system. The circuit configuration is common to that shown in FIG. 21.

[4.3.8 For Over-the-air Synchronization and Resource Allocation]

Each of the slave BSs 4001b according to the above-described first to sixth examples includes an over-the-air synchronization control unit 4040 and a resource allocation control unit 4041.

Figure 42:
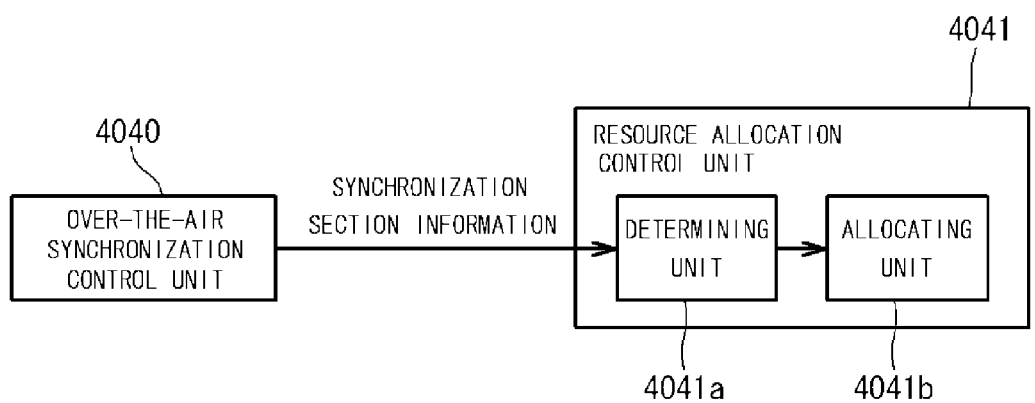
FIG. 42 is a configuration diagram of a resource allocation control unit.

As shown in FIG. 42, the resource allocation control unit 4041 includes a determining unit 4041a that determines whether the current section is an over-the-air synchronization section; and an allocating unit 4041 that allocates resource blocks in a shared communication channel which is shared among a plurality of user terminals 4002b, to the respective user terminals 4002b.

The above-described modulator circuit 4020 modulates data received from an upper network, based on resource block allocation information which is received from the resource allocation control unit 4041, and passes the modulated data to a transmitting unit 4013. Note that the resource blocks may be in any of frame units, slot units, and symbol units.

Figure 43:
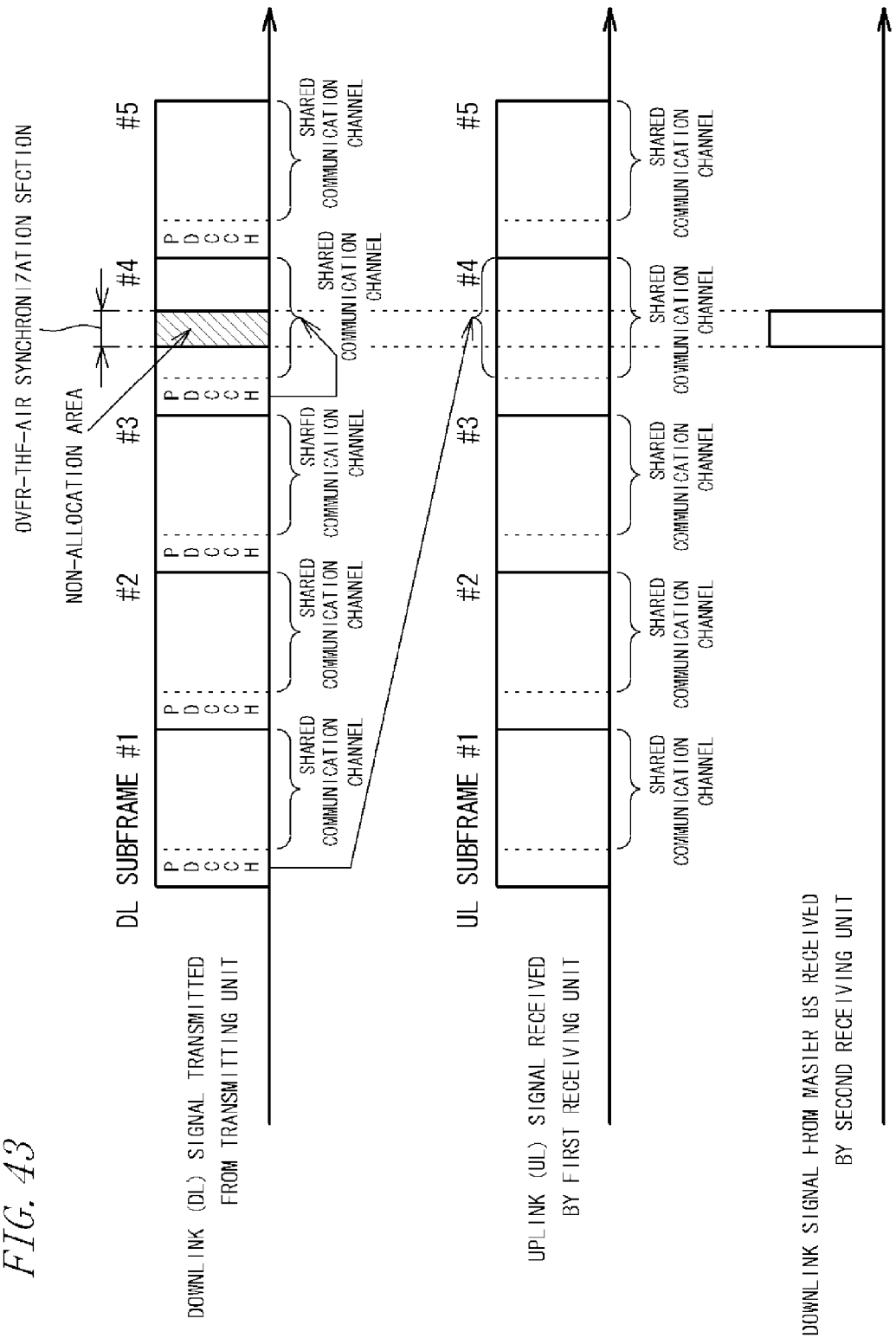
FIG. 43 is a diagram showing how to allocate a resource.

As shown in FIG. 43, in LTE, a control channel called PDCCH (Physical Downlink Control Channel) is provided at the beginning of a downlink (DL) subframe.

Note that here, in the downlink (DL) subframe, an area other than the PDCCH is a shared communication channel (PDSCH; Physical Downlink Shared Channel). In an uplink (UL) subframe, also, a control channel is reserved at the beginning thereof and an area other than the control channel is a shared communication channel (PUSCH; Physical Uplink Shared Channel).

The shared communication channel is an area (resource) shared among a plurality of user terminals for communication, and consists of a plurality of resource blocks which are the minimum unit of allocation to the user terminals. The resource blocks are small areas into which the shared communication channel is divided. One or a plurality of resource blocks are allocated to a single user terminal, whereby a plurality of user terminals can simultaneously perform communication using one shared communication channel (subframe) (Multiple Access).

The PDCCH included in the DL subframe includes Downlink Scheduling Information which is resource block allocation information for the downlink; Uplink Scheduling Grant which is resource block allocation information for the uplink; and other control information.

As shown in FIG. 43, Downlink Scheduling Information (hereinafter, referred to as "DSI") defines resource block allocation in a shared communication channel in a DL subframe having a PDCCH in which the DSI is included. For example, DSI in a PDCCH of DL subframe #4 in FIG. 43 defines resource block allocation in a shared communication channel in this DL subframe #4.

Uplink Scheduling Grant (hereinafter, referred to as "USG") defines resource block allocation in a shared communication channel in a UL subframe which is three subframes later than a DL subframe having a PDCCH in which the USG is included. For example, USG in a PDCCH of DL subframe #1 in FIG. 43 defines resource block allocation in a shared communication channel in UL subframe #4.

Resource block allocation for the downlink and uplink is performed by the allocating unit 4041*a* in the resource allocation control unit 4041. The allocating unit 4041 in the present embodiment performs a special process for allocation of resource blocks in an over-the-air synchronization section, separately from normal resource allocation.

Figure 44:
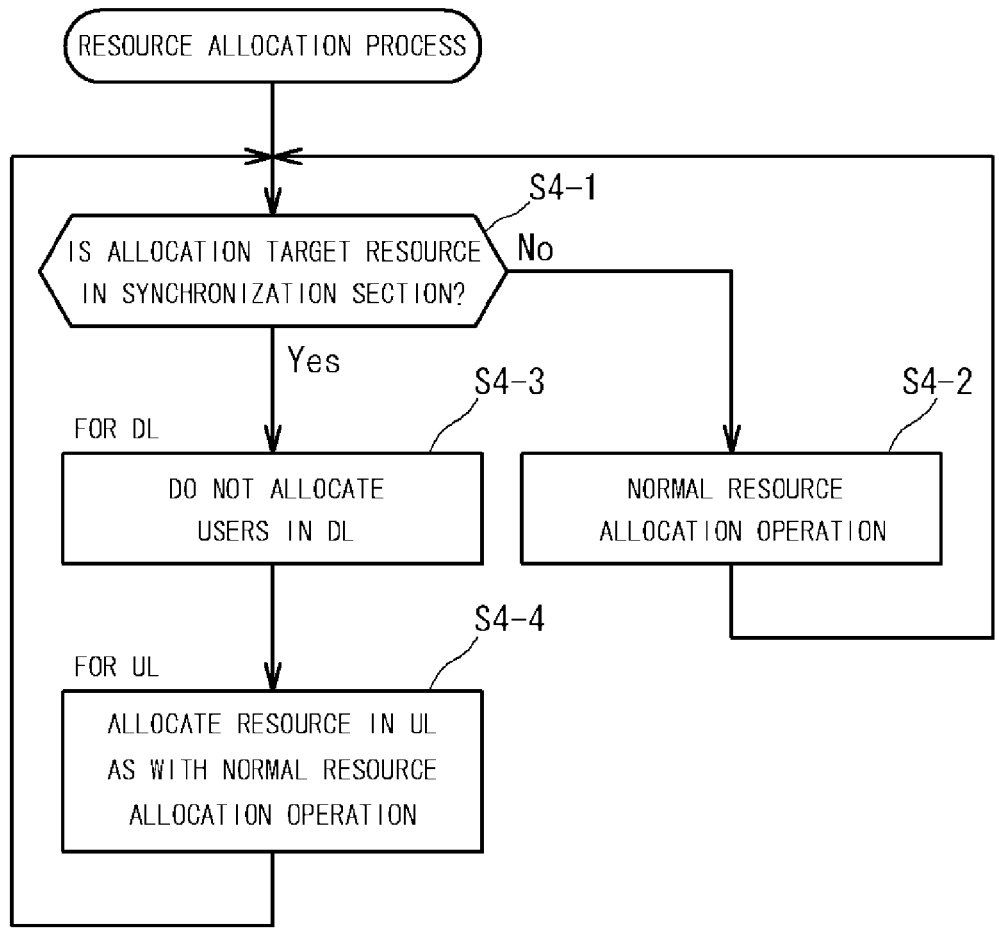
FIG. 44 is a flowchart of a resource allocation process.

FIGS. 43 and 44 show an example of how to perform resource allocation in the base station devices 4001*b* according to the first example shown in FIG. 35 and the third example shown in FIG. 38.

Note that, in the base station devices 4001*b* according to the first and third examples, the second receiving unit 4012 for over-the-air synchronization is provided independently of the first receiving unit 4011 for reception of uplink signals from user terminals 4002*b*.

As shown in FIG. 44, first, the determining unit 4041*a* in the resource allocation control unit 4041 determines whether resource blocks which are the allocation target are those in an over-the-air synchronization section (step S4-1). This determination is made in a manner such that the resource allocation control unit 4041 obtains information indicating over-the-air synchronization timing (over-the-air synchronization section information) from the over-the-air synchronization control unit 4040, and determines whether the resource blocks which are the allocation target belong in the time indicated by the over-the-air synchronization section information.

Note that the over-the-air synchronization control unit 4040 suspends transmission of downlink signals to the user terminals 4002*b* periodically in a fixed cycle or as necessary, to perform over-the-air synchronization and goes into an over-the-air synchronization state in which a downlink signal transmitted from a master BS 4001*a* is received. Information indicating a time period during which the over-the-air synchronization state occurs is the above-described over-the-air synchronization section information.

If it is determined in step S4-1 that resource blocks which are the allocation target are not those in an over-the-air synchronization section, then as a normal resource allocation operation, allocation of user terminals to the resource blocks is performed irrespective of the downlink or uplink (step S4-2). That is, allocation of user terminals to the resource blocks is performed, and information indicating the allocation (DSI and USG) is stored in a PDCCH.

On the other hand, if it is determined in step S4-1 that (some or all) resource blocks which are the allocation target belong in an over-the-air synchronization section, then when the resource blocks are those for the downlink (DL), allocation of user terminals is not performed (step S4-3); on the other hand, when the resource blocks are those for the uplink (UL), user allocation is performed (step S4-4).

As a result, when, as shown in FIG. 43, an over-the-air synchronization section is present in subframe #4, an area corresponding to the over-the-air synchronization section is treated as a non-allocation area, and thus, allocation information about the non-allocation area is not present in a PDCCH of downlink DL subframe #4 having resource allocation information (DSI) about a shared communication channel of downlink (DL) subframe #4.

On the other hand, in a PDCCH of downlink DL subframe #1 having resource allocation information (USG) about a shared communication channel of uplink (UL) subframe #4, resource allocation information about the entire shared communication channel of uplink (UL) subframe #4, including an over-the-air synchronization section, is present.

The resource allocation information determined in the above-described manner is provided to the modulator circuit 4020. The modulator circuit 4020 modulates data received from an upper network, based on the resource allocation information and passes the modulated data to the transmitting unit 4013.

By performing resource allocation in the above-described manner, since, in the over-the-air synchronization section, allocation to the user terminals 4002*b* itself is not performed in the downlink (DL), even if, in the over-the-air synchronization section, signal transmission from the transmitting unit 4013 itself is suspended to prevent interference with a downlink signal from the master BS 4001*a*, since there is no resource allocation to the user terminals 4002*b*, even if the user terminals 4002*b* cannot receive signals from the base station device 4001*b*, the user terminals 4002*b* can be prevented from recognizing such an event as an abnormal event.

In addition, since, in the first and third examples, the second receiving unit 4012 is provided separately from the first receiving unit 4011, even in the over-the-air synchronization section, reception from the user terminals 4002*b* can be performed in the usual manner. Accordingly, as shown in FIG. 43, for the uplink, even in the over-the-air synchronization section, resource allocation can be performed.

Note that, in the above-described non-allocation area, no user terminals may be allocated, or alternatively, a smaller number of user terminals than the number of user terminals allocated in a normal allocation operation may be allocated. In this case, in those user terminals allocated with resource blocks in the non-allocation area, when signal transmission from the transmitting unit 4011 itself is suspended in an over-the-air synchronization section, those user terminals 4002*b* allocated with a resource in the over-the-air synchronization section may recognize that an abnormal event has occurred; however, the number of user terminals 4002*b* allocated with the resource in the over-the-air synchronization section is small and thus adverse influence can be suppressed.

Figure 45:
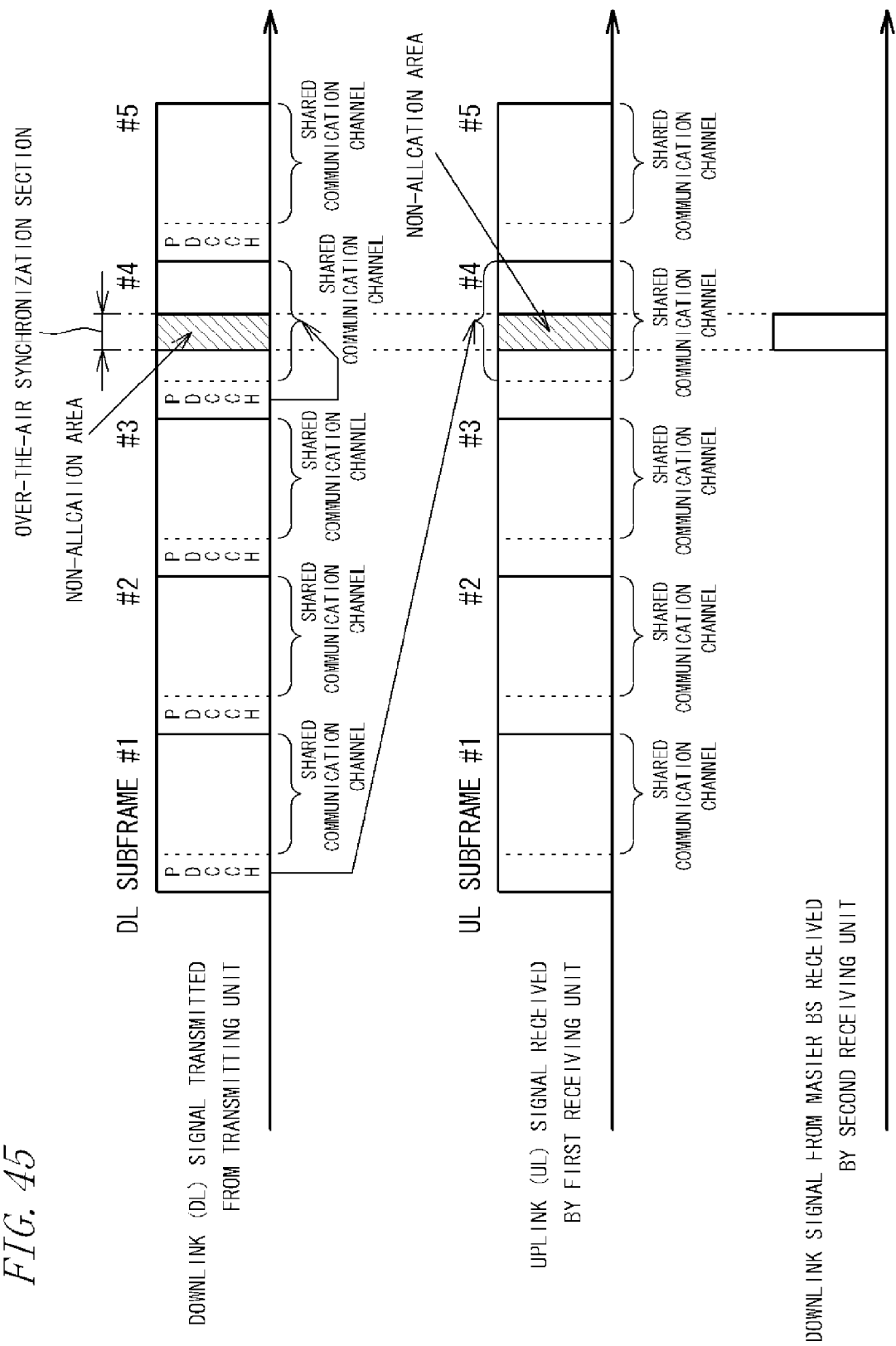
FIG. 45 is a diagram showing how to allocate a resource.
Figure 46:
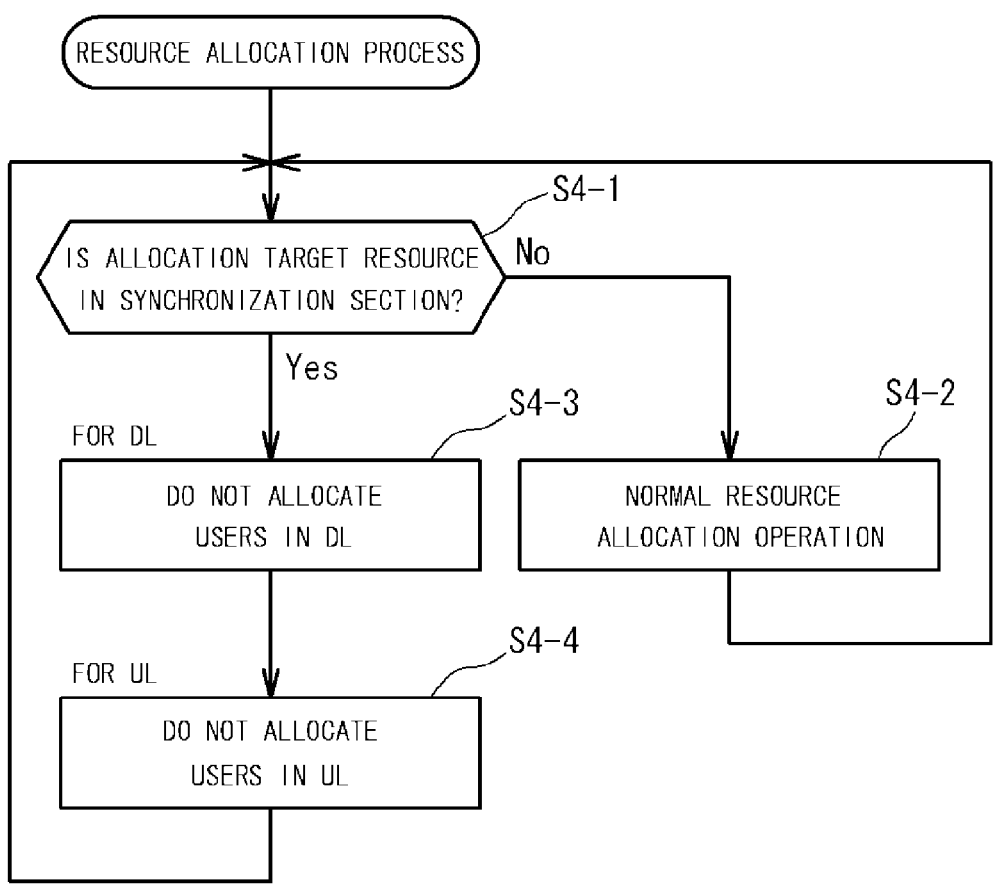
FIG. 46 is a flowchart of a resource allocation process.

FIGS. 45 and 46 show an example of how to perform resource allocation in the base station devices 4001*b* according to the second example shown in FIG. 37 and the fourth example shown in FIG. 39.

Note that, in the base station devices 4001*b* according to the second and fourth examples, the second receiving unit 4012 for over-the-air synchronization and the first receiving unit 4011 for reception of uplink signals from user terminals 402*b* have the common unit 4023 and thus some of their configurations are shared therebetween.

A resource allocation process in FIG. 46 is substantially the same as the resource allocation process shown in FIG. 44, but step S4-4 is different.

In step S4-4 in FIG. 44, when (some or all) resource blocks which are the allocation target are determined to belong in an over-the-air synchronization section and the resource blocks are those for the uplink (UL), user allocation is performed; on the other hand, in step S4-4 in FIG. 46, when (some or all) resource blocks which are the allocation target are determined to belong in an over-the-air synchronization section and the resource blocks are those for the uplink (UL), allocation of user terminals is not performed.

That is, in the base station devices 4001*b* according to the second and fourth examples, as shown in FIG. 45, while the second receiving unit 4012 receives a downlink signal transmitted from a master BS 4001*a* for over-the-air synchronization, the first receiving unit 4011 cannot receive uplink signals from user terminals 4002*b*. Thus, uplink resource blocks belonging in an over-the-air synchronization section are also in a non-allocation area.

Accordingly, the occurrence of an event can be prevented where, in a section in which the base station device 4001*b* cannot receive uplink signals from user terminals 4002*b* due to over-the-air synchronization, the user terminals 4002 transmit information to the base station device 4001b using allocated resource blocks and the base station device 4001b cannot receive the information.

Figure 47:
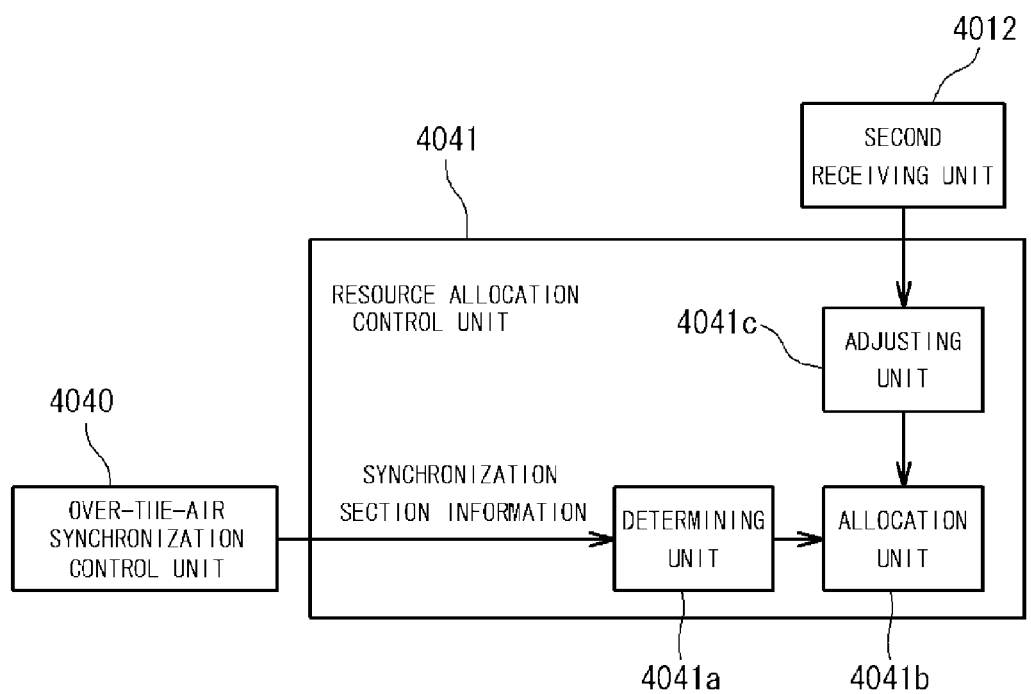
FIG. 47 is a configuration diagram of a resource allocation control unit.
Figure 48:
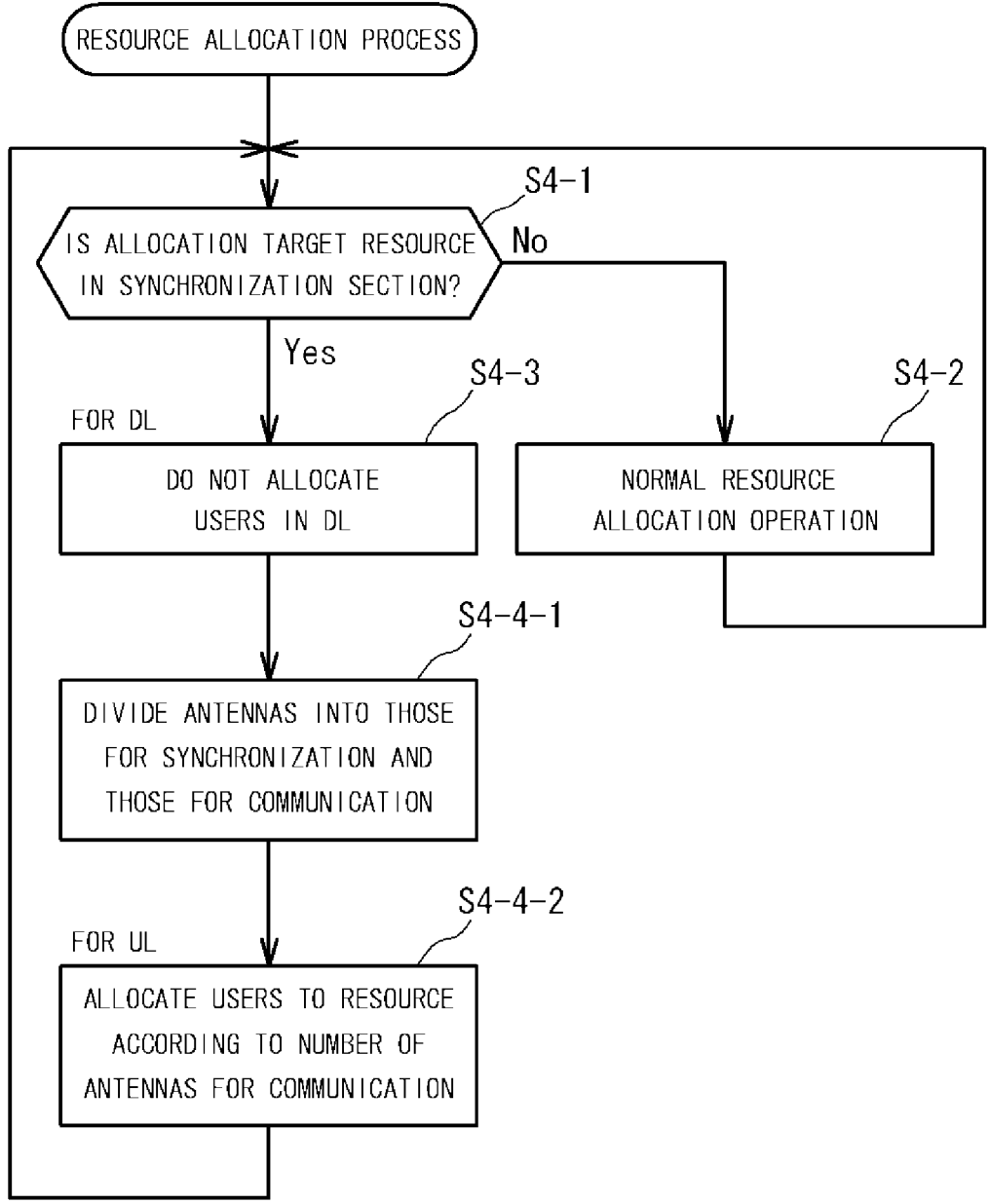
FIG. 48 is a flowchart of a resource allocation process.

FIGS. 47 and 48 show resource allocation in the base station device 4001b according to the sixth example shown in FIG. 41.

As shown in FIG. 47, a resource allocation control unit 4041 of the base station device 4001b shown in FIG. 41 includes an adjusting unit 4041c.

The adjusting unit 4041c is to adjust the number of antennas, among the plurality of antennas 4010-1 to 4010-K in the array antenna, that are used to receive a downlink signal transmitted from a master BS 4001a in an over-the-air synchronization section.

The adjusting unit 4041c determines a sufficient and minimum number of antennas for receiving a downlink signal from the master BS 4001a. The number of antennas can be increased when a propagation path environment between the base station device 4001b and the master BS 4001a is poor, and can be reduced when the propagation path environment is excellent. A propagation path environment can be estimated by, for example, obtaining from a second receiving unit 4012 an index indicating a propagation path environment, such as an SNR (signal-to-noise ratio) of a signal received by the second receiving unit 4012.

Those antennas whose number is determined by the adjusting unit 4041c are used to receive a downlink signal from the master BS 4001a and the remaining antennas are used to receive uplink signals from user terminals 4002b.

The resource allocation control unit 4041 having the configuration in FIG. 47 performs, as shown in FIG. 48, the same process as the processing steps shown in FIG. 44 for steps S4-1 to S4-3.

Meanwhile, in steps S4-4-1 and S4-4-2 in FIG. 48, the adjusting unit 4041c divides the plurality of antennas into those for over-the-air synchronization that receive a downlink signal from the master BS 4001a and those for communication that receive uplink signals from the user terminals 4002b (step S4-4-1).

Unless the number of those antennas divided for communication is 0, even during the over-the-air synchronization section, the base station device 4001b can receive uplink signals from the user terminals 4002b. When there are a large number of antennas for communication, a resource can be effectively utilized by multiplexing such as spatial multiplexing. That is, when there are a large number of antennas for communication, many users can be allocated to one same resource block.

Hence, an allocating unit 4041b performs allocation of resource blocks taking into account multiplexing such as spatial multiplexing, according to the number of antennas for communication which are the remainder other than those divided for over-the-air synchronization (step S4-4-2).

According to the above, while over-the-air synchronization is reliably performed by dynamically adjusting the number of antennas for over-the-air synchronization, communication with user terminals can continue using the remaining antennas for communication.

Note that the number of antennas for over-the-air synchronization does not need to be dynamically adjusted and may be set in advance as a fixed value at the installment of a base station device, etc.

[Chapter 5 Suppression of a Reduction in Synchronization Accuracy]

In base station devices which are described in this Chapter 5, the techniques for base station devices described in Chapter 1, 2, 3, or 4 are employed within the technically consistent scope. In this Chapter 5, for those points that are not particularly described, the matters described in Chapters 1, 2, 3, and 4 are incorporated.

[5.1 For a Reduction in Synchronization Accuracy]

Even if over-the-air synchronization is performed, due to the difference in accuracy error between clock generation devices included in respective base stations, a mismatch occurs in synchronization with the passage of time.

Figure 57:
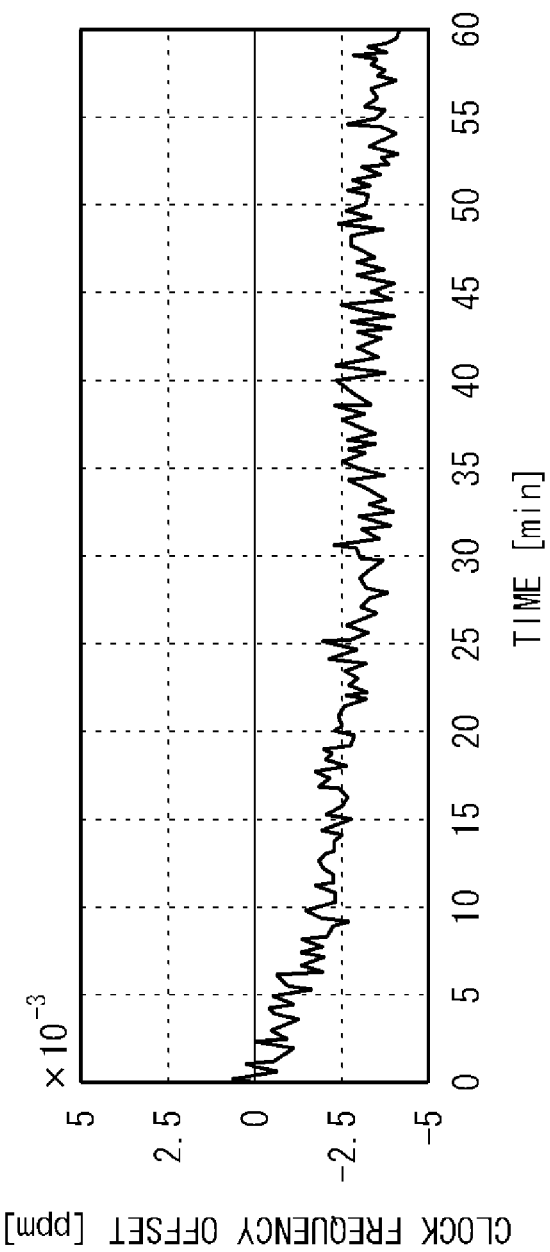
FIG. 57 is a graph showing an example of the change over time of an offset of the clock frequency of another base station device with respect to the clock frequency of one base station device.

FIG. 57 is a graph showing an example of the change over time of an offset of the clock frequency of another base station device with respect to the clock frequency of one base station device. As shown in the figure, the clock frequency offset value between the clock frequency of one base station device and another base station device is constantly present while smoothly changing with the passage of time.

Since a base station operates based on the oscillation of its own clock generation device, even if the base station achieves synchronization with another base station at startup of the base station, when thereafter time has passed while communication with mobile terminals (terminal devices) is performed, due to the presence of an offset value by the difference in accuracy between clock generation devices, such as that described above, a relative time measurement mismatch occurs and accordingly a synchronization mismatch occurs.

Hence, a synchronization mismatch such as that described above is considered to be resolved by, for example, temporarily aborting communication with terminal devices and performing a synchronization process with another base station. In this case, while the base station device stops communication with terminal devices, to find again the degree of a synchronization mismatch with another base station device, the base station device detects transmission timing of the another base station using a known signal wave included in a receive wave, and can thereby achieve synchronization at the transmission timing.

Here, since the transmission timing of another base station is detected based on a known signal wave included in a receive wave transmitted from the another base station, the transmission timing of another base station to be obtained is an estimated value that is indirectly obtained through the receive wave.

Namely, upon receiving, by the base station, a signal from another base station adjacent thereto to achieve synchronization, when the signal receives the influence of a receive path such as noise or a delay path, the base station may not be able to properly receive the signal from another base station. If the signal from another base station cannot be properly received, then a large error is included in the transmission timing of another base station which is detected from a receive wave from another base station, causing a problem of a reduction in synchronization accuracy.

Accordingly, a base station device that can suppress a reduction in the accuracy of inter-base-station synchronization is required.

[5.2 Disclosure of a Technique for Suppressing a Reduction in Synchronization Accuracy]

(1) An invention disclosed here is a base station device that obtains, from a signal transmitted from another base station device, communication timing of the another base station device and modifies a synchronization mismatch with respect to the another base station device. The base station device is characterized by including a synchronization mismatch estimating unit that determines an estimated value of a synchronization mismatch between the communication timing of the another base station device and its own communication timing; a correcting unit that determines a corrected value where an error included in the estimated value is suppressed based on the estimated value obtained by the synchronization mismatch estimating unit; and a synchronization modifying unit that modifies the synchronization mismatch based on the corrected value.

According to the base station device configured in the above-described manner, the correcting unit determines a corrected value where an error included in an estimated value is suppressed, and a modification to a synchronization mismatch is made based on the corrected value. Thus, even if a large error is included in an estimated value due to the reception conditions of a signal from another base station device, the error can be suppressed. As a result, the influence of an error at the modification of a synchronization mismatch can be suppressed, enabling to suppress a reduction in the accuracy of the modification of the synchronization mismatch.

(2) The correcting unit may determine the corrected value based on the current and past estimated values. In this case, by taking into account the past estimated value, a corrected value where an error included in the current estimated value is effectively suppressed can be obtained.

(3) More specifically, it is preferred that the correcting unit determine the corrected value by averaging a current estimated value and at least one past estimated value. In this case, even if a large error is included in the current estimated value, by determining, as a corrected value, an average value of the current estimated value and at least one past estimated value, a corrected value where the error included in the current estimated value is suppressed can be obtained.

(4) In addition, the correcting unit may determine the corrected value by multiplying the estimated value by a coefficient which is greater than 0 and less than 1, whereby an error included in the estimated value can be suppressed by the coefficient.

(5) The correcting unit may determine whether the estimated value is greater than a threshold value, and determine a value less than or equal to the threshold value as the corrected value if the estimated value is greater than the threshold value.

In this case, even if an estimated value is obtained including an extremely large error, when the value is greater than the threshold value, a value less than or equal to the threshold value is determined as a corrected value. Thus, a correction can be prevented from being made with an extremely large error being included in a corrected value.

[5.3 Embodiments of the Technique for Suppressing a Reduction in Synchronization Accuracy]

[5.3.1 First Embodiment]

Figure 49:
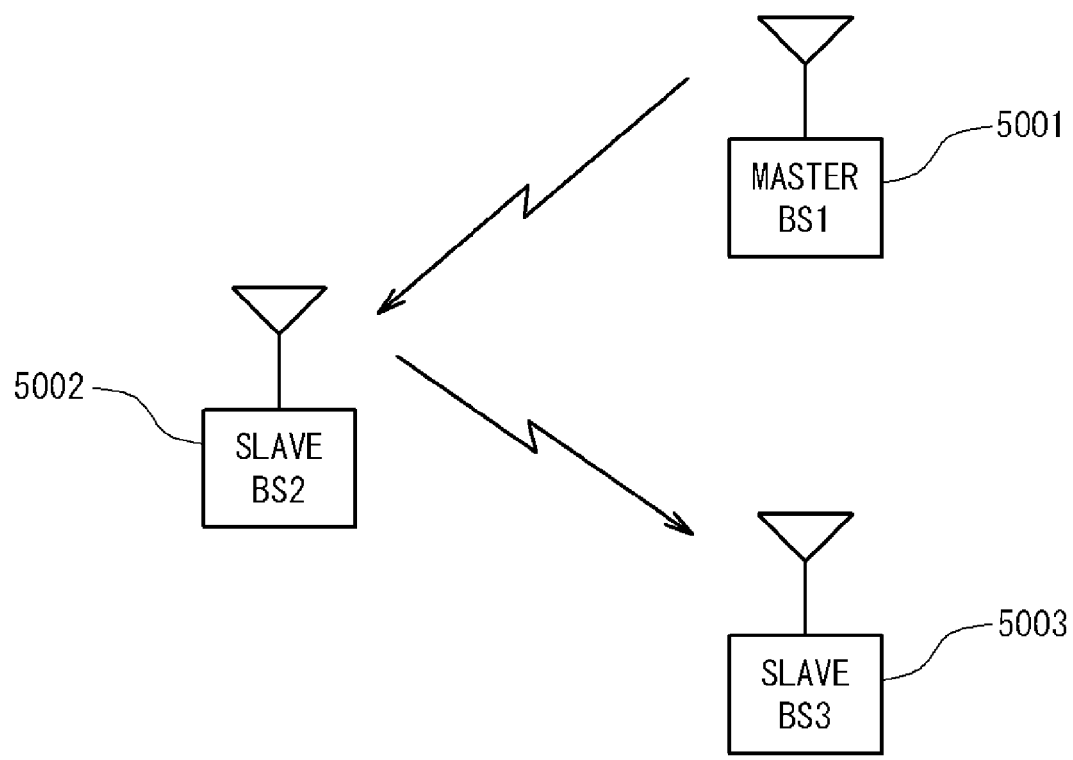
FIG. 49 is an overall view of a wireless communication system in Chapter 5.

FIG. 49 shows a wireless communication system having a plurality of base station devices (BSs: Base Stations) 5001, 5002, 5003, . . . . The wireless communication system adopts, for example, a system complying with "WiMAX" defined in IEEE 802.16 which supports an Orthogonal Frequency Division Multiple Access (OFDMA) system, to implement wideband wireless communication. Note that the WiMAX frame structure is as shown in FIG. 2.

The base station devices 5001, 5002, and 5003 can perform communication with terminal devices (mobile terminals; MSs; Mobile Stations) present in areas (cells) covered by the base station devices 5001, 5002, and 5003, respectively.

The plurality of base station devices 5001, 5002, and 5003 include at least one master base station device and slave base station devices.

The master base station device is a base station device that does not need to detect and obtain timing for inter-base-station synchronization from a receive wave of a signal transmitted from another base station device. For example, the master base station device can be configured as a free-running master base station device that determines the transmission timing of a signal, based on a synchronizing signal (clock) generated by itself. Note that the master base station device may include a GPS receiver and determine the transmission timing of a signal using a GPS signal.

The slave base station devices are base station devices that detect and obtain timing for inter-base-station synchronization from a receive wave of a signal transmitted from another base station device.

In the following, the first base station device 5001 shown in FIG. 49 serves as a master base station device, and the second base station device 5002 and the third base station device 5003 serve as slave base station devices.

The second and third base station devices 5002 and 5003 select, at startup, one base station device from among other base station devices (the master base station device or the other slave base station device) as a source base station device, and detects a receive wave (source receive wave) of a signal (a preamble; a known signal; a synchronizing signal) transmitted from the source base station device serving as another base station device, to obtain timing for inter-base-station synchronization (signal transmission timing). Note that a process for inter-base-station synchronization which is performed when the base station device starts up is referred to as an initial synchronization process. The initial synchronization process is performed at startup, as described above. More specifically, the initial synchronization process is performed during a period between when the base station device starts up and when communication with terminal devices starts. Note, also, that the specific content of the initial synchronization process is substantially the same as a process for "synchronous mode in which communication is suspended" which will be described later.

Note that in the present embodiment the second base station device 5002 selects the first base station device 5001 as a source base station device and the third base station device 5003 selects the second base station device 5002 as a source base station device.

The slave base station device performs communication with terminal devices present in an area of the device while achieving synchronization of the transmission timing (reception timing) of the source base station device. That is, communication (communication mode) performed by the slave base station device with terminal devices after the initial synchronization process is such that the timings coincide with the transmission and reception timings (communication timing) of the source base station device (another base station device).

Note, however, that if the accuracy of a clock generator of the slave base station device is not sufficient or if there are variations in clock accuracy between the base station devices, then a synchronization mismatch occurs with the passage of time. That is, in the course of communication performed by the base station device with terminal devices, a mismatch (synchronization mismatch) gradually occurs in transmission and reception timings (communication timing) between the base station device and another base station device.

Namely, since an error in clock frequency generated by a clock generator included in base station devices is present between the base station devices, the time length (e.g., 5 msec in the standard) of one communication frame (downlink subframe) which is generated based on the clock frequency (reference signal) slightly varies between base station devices. Even if an error in the time length of one frame is small, when transmission of frames to terminal devices is repeated, the error is accumulated, which may result in a relatively large synchronization mismatch (e.g., on the order of 1 μsec).

As such, even if communication timings are caused to coincide with each other between base station devices by the initial synchronization process, a synchronization mismatch increases gradually while communication with terminal devices is performed.

Hence, the second and third base station devices 5002 and 5003 have the function of suspending (stopping), at predetermined timing, a communication mode in which communication with terminal devices (transmit signals; downlink subframes) is performed, and performing a synchronous mode for detecting and resolving a synchronization mismatch (synchronous mode in which communication is suspended).

Note that how switching between the communication mode and the synchronous mode is performed will be described in detail later.

Figure 50:
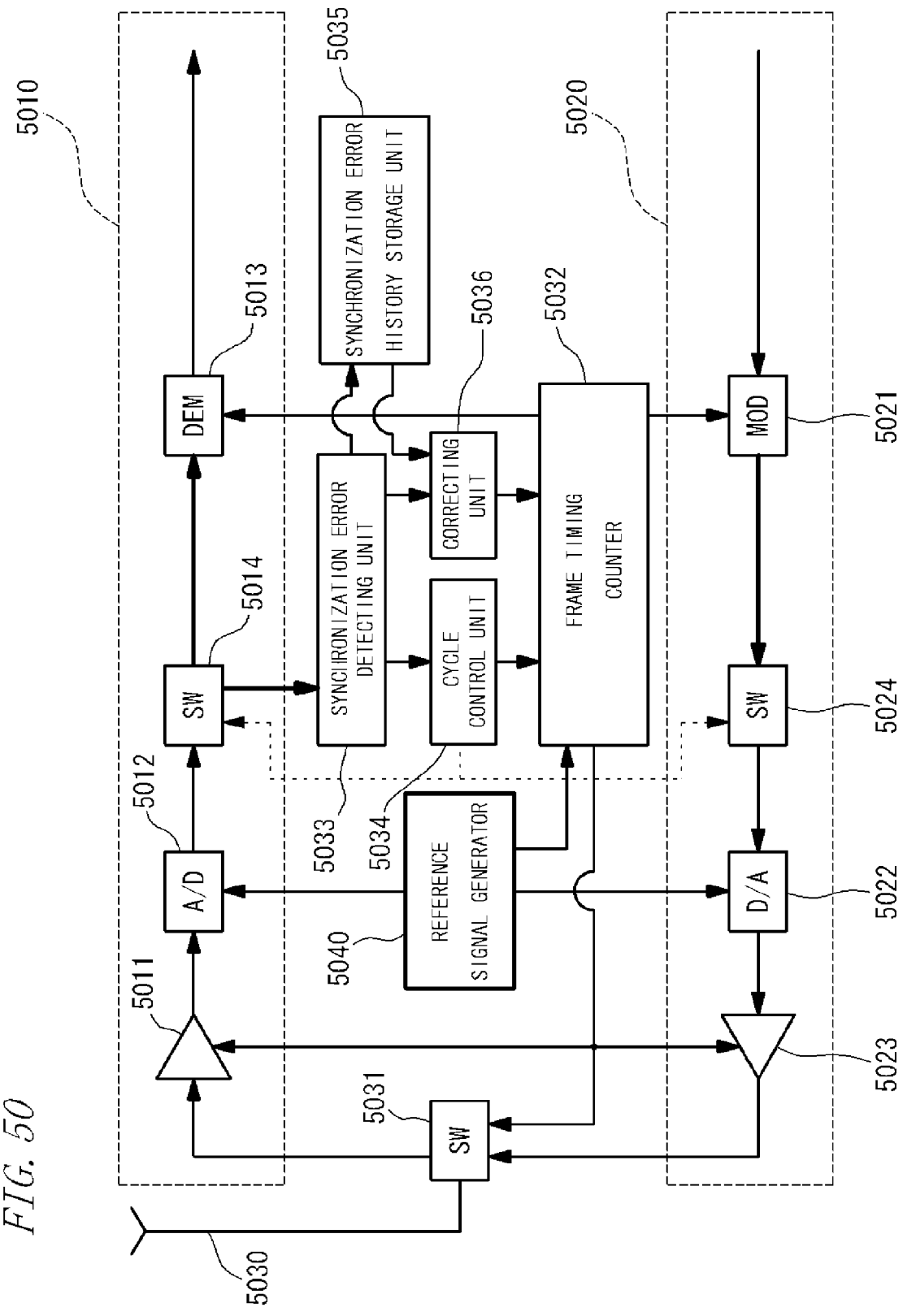
FIG. 50 is a block diagram showing configurations of a receiving unit and a transmitting unit of second and third base station devices in Chapter 5.

FIG. 50 is a block diagram showing configurations of a receiving unit and a transmitting unit of the second and third base station devices 5002 and 5003. In FIG. 50, a receiving unit 5010 includes an amplifier 5011 that amplifies a receive signal; an A/D converting unit 5012 that A/D converts the receive signal; and a demodulating unit (DEM) 5013 that demodulates the receive signal having been converted to a digital signal.

A transmitting unit 5020 includes a modulating unit (MOD) 5021 that modulates a transmit signal which is a digital signal; a D/A converting unit 5022 that D/A converts the transmit signal; and an amplifier 5023 that amplifies the transmit signal.

Each base station device includes a switching switch (SW) 5031 for switching the connection to an antenna 5030 to the side of the receiving unit 5010 or the side of the transmitting unit 5020, to perform communication with terminal devices by TDD (Time-Division Duplex). That is, at timing for a transmit frame (downlink subframe) the switch 5031 is switched to the side of the transmitting unit 5020, and at timing for a receive frame (uplink subframe) the switch 5031 is switched to the side of the receiving unit 5010.

Note that operating clocks for the A/D converting unit 5012 and the D/A converting unit 5022 are provided from a reference signal generator 5040. The reference signal generator 5040 includes a clock generation device such as a crystal resonator, and generates an operating clock with a predetermined frequency. Note that, needless to say, the operating clock also serves as the operating clock of other digital circuits of the second and third base station devices 5002 and 5003, such as a frame timing counter 5032, which will be described later.

Here, the accuracy of the operating clock of the D/A converting unit 5022 affects the accuracy of the time length of a transmit frame (downlink subframe). Therefore, if, as described above, the accuracy of the reference signal generators varies between base station devices, then an error occurs in operating clock between the base station devices and accordingly the time length of a transmit frame to be generated slightly varies between the base station devices.

Switching between transmission and reception is performed according to a counter value of the frame timing counter 5032. That is, the time length of a transmit frame, the time length of a receive frame, and the time interval between those frames are determined in advance. When the counter value matches predetermined transmission and reception switching timing, switching between transmission and reception is performed by the switching switch 5031.

When a synchronization mismatch occurs with the source base station device, by correcting the counter value of the frame timing counter 5032, the synchronization mismatch can be modified. Namely, when the frame timing counter 5032 receives a corrected value for modifying a synchronization mismatch (synchronization error) from a synchronization error detecting unit 5033 and a correcting unit 5036 which will be described later, the frame timing counter 5032 determines a counter corrected value corresponding to the time width of the corrected value and corrects the counter value by shifting the counter value in the right direction using the determined counter corrected value. Accordingly, transmission and reception switching timing can coincide with that of another base station device.

The second and third base station devices 5002 and 5003 have the synchronization error detecting unit 033 for detecting a synchronization mismatch (synchronization error). The synchronization error detecting unit 5033 detects a synchronizing signal (preamble) from a receive signal (receive wave) and detects timing of the preamble. The synchronization error detecting unit 5033 further obtains timing of its own preamble from the frame timing counter 5032, and determines a synchronization mismatch (timing offset) between the detected timing of the preamble of the source base station device and the timing of its own preamble. Here, the synchronization mismatch determined by the synchronization error detecting unit 5033 is a value obtained regarding the detected timing of the synchronizing signal as the timing of the source base station device, and thus, can be said to be an estimated value for the actual synchronization mismatch between the base station device and the source base station device. The synchronization mismatch detected by the synchronization error detecting unit 5033 is hereinafter referred to as a synchronization mismatch estimated value.

The synchronization error detecting unit 5033 outputs the detected synchronization mismatch estimated value to the correcting unit 5036. The correcting unit 5036 having received the synchronization mismatch estimated value outputs a corrected value which is obtained by making a predetermined correction to the synchronization mismatch estimated value, to the frame timing counter 5032. When the frame timing counter 32 receives the corrected value, the frame timing counter 5032 makes a modification to the synchronization mismatch (synchronization error) in the above-described manner and performs a synchronization process. Namely, the frame timing counter 5032 configures a synchronization modifying unit that modifies the synchronization mismatch based on the corrected value.

The synchronization error detecting unit 5033 also outputs the determined synchronization mismatch estimated value to a synchronization error history storage unit 5035. The synchronization error history storage unit 5035 sequentially stores a synchronization mismatch estimated value which is determined every synchronous mode and, if necessary, outputs a stored synchronization mismatch estimated value which is determined in the past to the correcting unit 5036. The correcting unit 5036 requests the synchronization error history storage unit 5035 to output a past synchronization mismatch estimated value when determining a corrected value taking into account a past synchronization mismatch estimated value.

In order to determine a synchronization mismatch estimated value using a signal transmitted from the source base station device, the receiving unit 5010 includes a switching switch 5014 for switching a receive signal to the side of the demodulating unit 5013 or the side of the synchronization error detecting unit 5033. The switching switch 5014 provides a receive signal to the side of the demodulating unit 5013 during a communication mode in which signals from terminal devices can be received, and provides a receive signal to the synchronization error detecting unit 5033 in a synchronous mode in which the communication mode is suspended.

The transmitting unit 5020 also has a switching switch 5024. The switching switch 5024 provides a transmit signal to the D/A converting unit 5022 during a communication mode in which signals can be transmitted to terminal devices, and does not provide a transmit signal to the D/A converting unit 5022 in a synchronous mode in which the communication mode is suspended.

Switching of the switching switches 5014 and 5024 in the receiving unit 5010 and the transmitting unit 5020 is performed by a cycle control unit 5034. Namely, the cycle control unit 5034 controls the cycle in which the communication mode is suspended (synchronization timing). If the cycle control unit 5034 determines that, when the device is in a communication mode in which communication with terminal devices is performed, timing to transition to a synchronous mode has come, then the cycle control unit 5034 performs switching of the switches 5014 and 5024 to switch from the communication mode to a synchronous mode. Then, when the synchronous mode is terminated, the cycle control unit 5034 switches from the synchronous mode to a communication mode again.

Next, there will be described how the second and third base station devices 5002 and 5003 having the above-described configuration are switched from a (normal) communication mode in which communication with terminal devices is performed, to a synchronous mode in which signals from their respective source base station devices (the first and second base station devices 5001 and 5002) are received.

Figure 51:
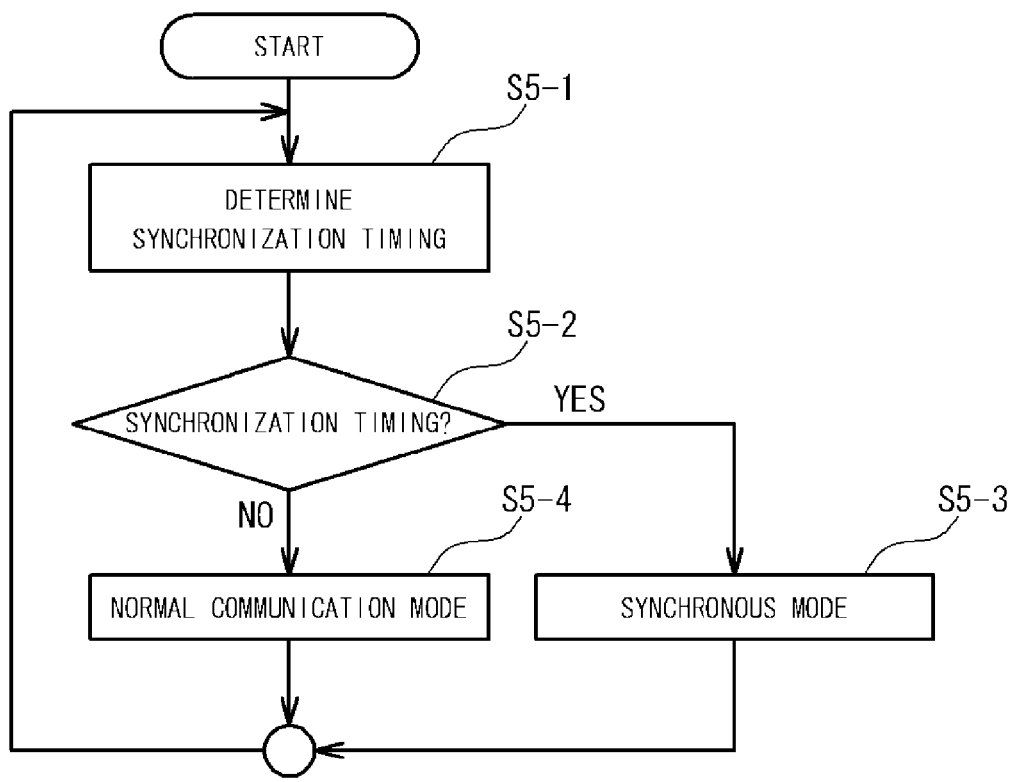
FIG. 51 is a diagram showing a flowchart for when the second and third base station devices are switched from a communication mode to a synchronous mode.

FIG. 51 is a flowchart for when the second and third base station devices 5002 and 5003 are switched from a communication mode to a synchronous mode.

As shown in FIG. 51, the second and third base station devices 5002 and 5003 allow the cycle control unit 50034 to make a determination as to whether synchronization timing at which the devices 5002 and 5003 should go into a synchronous mode has come (step S5-1). The synchronization timing is set as, for example, a cycle in which the devices 5002 and 5003 go into a synchronous mode (every predetermined time or every predetermined number of frames). When the cycle is set using time, the cycle can be set to, for example, about 5 minutes.

If it is determined that, when the devices 5002 and 5003 are in a normal communication mode in which communication with terminal devices is performed, timing to transition to a synchronous mode has come (step S2), then the cycle control unit 5034 performs switching of the switches 5014 and 5024. Accordingly, the second and third base station devices 5002 and 5003 transition to a synchronous mode (step S5-3). When the synchronous mode is terminated, the second and third base station devices 5002 and 5003 return to steps S5-1 and S5-2 and return to a normal communication mode again until it is determined that next timing has come (step S5-4).

The second and third base station devices 5002 and 5003 perform a synchronous mode periodically or at any time as necessary while performing communication with terminal devices, whereby even if a synchronization mismatch occurs between the devices 5002 and 5003 and their respective source base station devices, the synchronization mismatch can be resolved.

Figure 52:
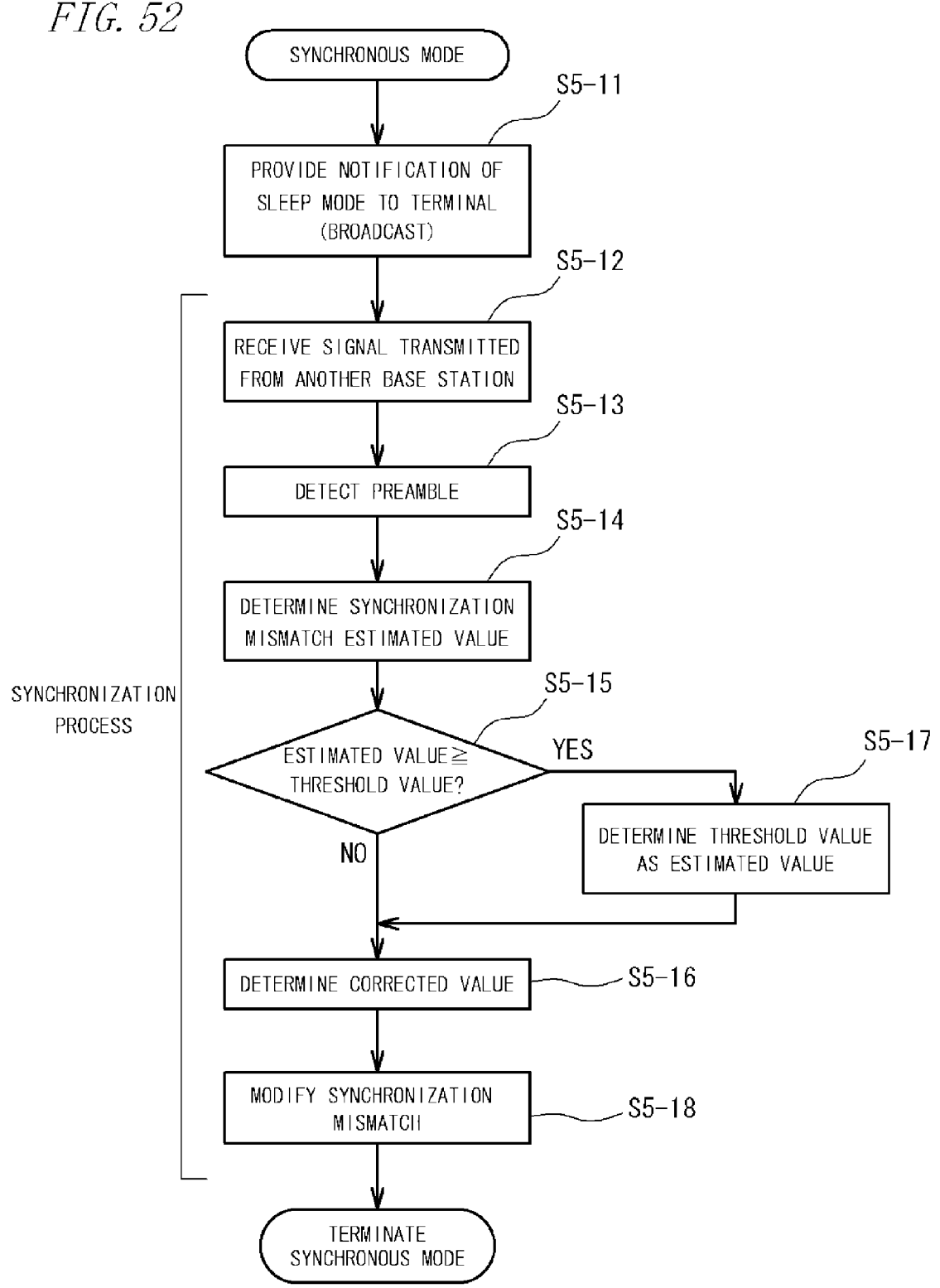
FIG. 52 is a flowchart showing a process for the synchronous mode in FIG. 51.

FIG. 52 is a flowchart showing a process for a synchronous mode in FIG. 51.

As shown in FIG. 52, when the second and third base station devices 5002 and 5003 go into a synchronous mode, first, before starting a synchronization process (steps S5-12 to S5-14), the devices 5002 and 5003 provide, by broadcast, notification to all terminal devices present in their respective areas to place the terminal devices in a sleep mode or an idle mode (power saving mode) (step S5-11).

When the terminal devices receive the notification of a sleep mode, etc., from the second and third base station devices 5002 and 5003, the terminal devices transition to a sleep mode. Since the sleep mode, etc., are management modes for when the terminal devices do not perform communication, power consumption can be suppressed.

In the sleep mode of the terminal devices, sleep time is set such that the sleep mode continues at least while the second and third base station devices 5002 and 5003 perform a synchronization process.

Since the terminal devices are in the sleep mode, etc., while the second and third base station devices 5002 and 5003 perform a synchronization process, even if the terminal devices cannot receive signals from the second and third base station devices 5002 and 5003, there is no possibility that the terminal devices may determine it as an abnormal event.

The second and third base station devices 5002 and 5003 transition to a synchronization process (synchronization process in which communication is suspended) after providing notification of a sleep mode, etc., to the terminal devices. During the synchronization process, communication with the terminal devices (downlink subframe transmission) is suspended, and the devices 5002 and 5003 are in a state of receiving signals even at the time that is originally intended for a downlink subframe.

In the synchronization process (synchronization process in which communication is suspended), the second and third base station devices 5002 and 5003 first receive signals from their respective source base station devices (step S5-12). In the present embodiment, a preamble included at the beginning of a downlink subframe DL which is transmitted from the source base station devices (the first and second base station devices 5001 and 5002) is used as a synchronizing signal for inter-base-station synchronization. Hence, the second and third base station devices 5002 and 5003 each detect timing of the preamble included at the beginning of the downlink subframe DL transmitted from their respective source base station devices.

Note that, for the synchronizing signal, a midamble, a pilot signal, etc., may be used.

The synchronization error detecting unit 5033 of each of the second and third base station devices 5002 and 5003 has the function of scanning a receive wave transmitted from the source base station device adjacent to the device, to detect timing of a preamble.

The base station devices 5002 and 5003 have, in their memories, preamble patterns which are likely to be used by their respective source base station devices, as known patterns. The second and third base station devices 5002 and 5003 detect timing of the preamble using these known preamble patterns (step S5-13). Detection of timing of the preamble can be performed, for example, as shown in FIG. 6.

When timing t of the preamble is detected, the synchronization error detecting unit 5033 of each of the base station devices 5002 and 5003 then determines a synchronization mismatch estimated value (step S5-14).

The synchronization error detecting unit 5033 first obtains timing of a preamble of the base station device from the frame timing counter 5032. Then, the synchronization error detecting unit 5033 regards the detected timing t of the preamble of the source base station device as the timing of the preamble of the source base station device and determines, as an estimated value, a synchronization mismatch between the detected timing t of the preamble of the source base station device and the timing of the preamble of the base station device.

Figure 53:
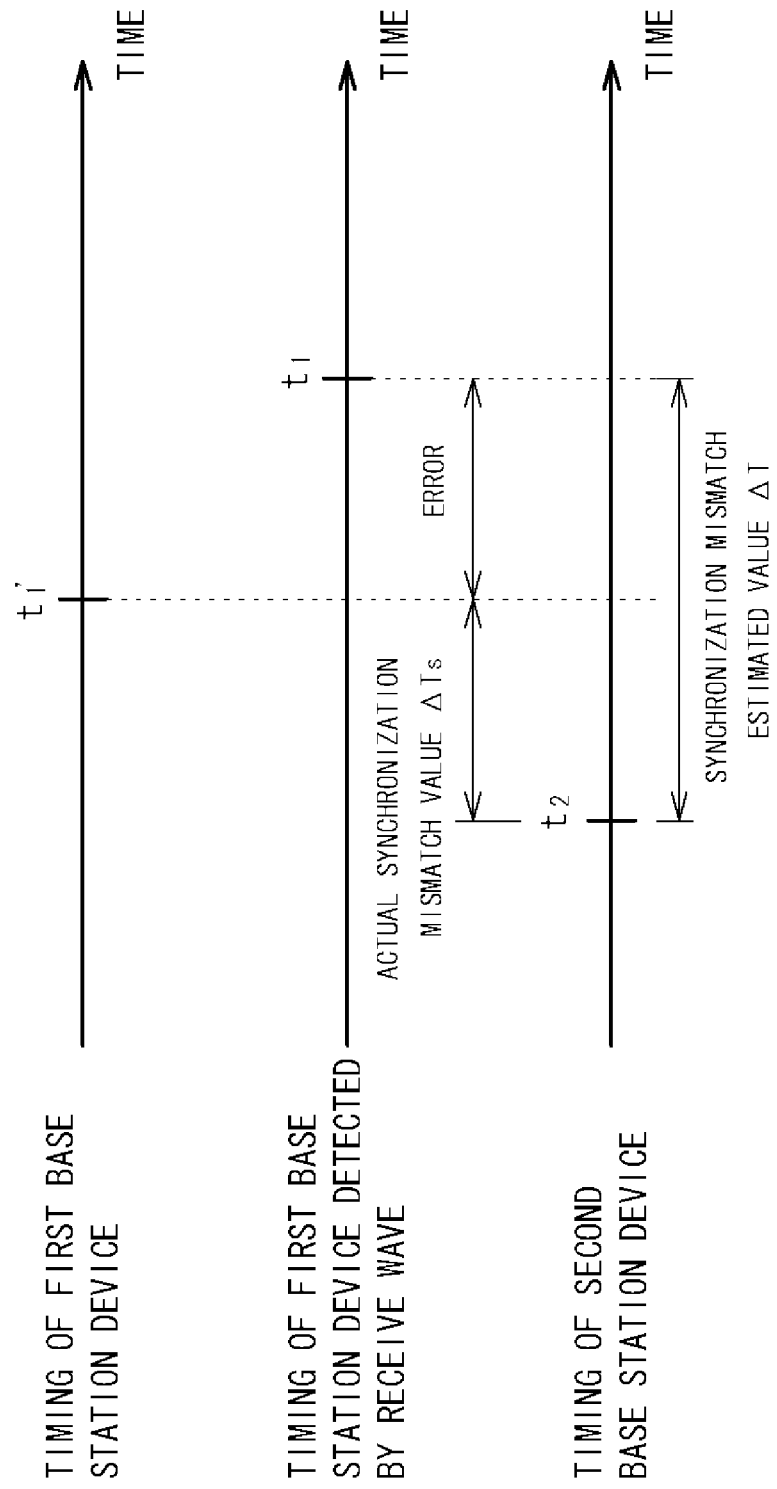
FIG. 53 is a schematic diagram showing a relationship of preamble timing between a source base station device and a base station device that receives a signal transmitted from the source base station device.

FIG. 53 is a schematic diagram showing a relationship of preamble timing between a source base station device and a base station device that receives a signal from the source base station device. Note that FIG. 53 focuses only on a relationship between the first base station device 5001 serving as a source base station device and the second base station device 5002.

In FIG. 53, the synchronization error detecting unit 5033 determines, as described above, a difference between timing (communication timing) t1 of a preamble of the first base station device 1 which is detected at the above-described step S5-13 and timing (communication timing) t2 of a preamble of the base station device (second base station device 2), as a synchronization mismatch estimated value ΔT.

Meanwhile, the above-described timing t1 of the preamble detected by the synchronization error detecting unit 5033 is indirectly obtained as the timing t1 of the first base station device 5001, based on the receive wave which is received by the second base station device 5002, and thus, a mismatch may occur relative to actual timing t1' of the first base station device 5001.

Namely, the receive wave which is received by the second base station device 5002 is under the influence of a receive path between the first base station device 5001 and the second base station device 5002. Thus, when timing t1 is detected based on the receive wave, a slight mismatch occurs relative to the actual timing t1' of the first base station device 5001. This mismatch does not appear significantly when the receive wave from the first base station device 5001 can be received substantially normally. However, when the receive wave receives a significant influence of noise, a delay path, etc., in the receive path, as shown in FIG. 53, a mismatch of the timing t1 based on the receive wave relative to the actual timing t1' may appear significantly.

Accordingly, the synchronization mismatch estimated value ΔT which is determined by the synchronization error detecting unit 5033 may include a mismatch between the detected timing t1 and the actual timing t1', in addition to an actual synchronization mismatch value ΔTs which is the difference between the actual timing t1' of the first base station device 5001 and the timing t2 of the second base station device 5002. This mismatch is an error relative to the actual synchronization mismatch value ΔTs in the synchronization mismatch estimated value ΔT.

Returning to FIG. 52, when the synchronization error detecting unit 5033 determines the above-described synchronization mismatch estimated value ΔT, the synchronization error detecting unit 5033 outputs the synchronization mismatch estimated value ΔT to the correcting unit 5036. The correcting unit 5036 having received the synchronization mismatch estimated value ΔT determines whether the synchronization mismatch estimated value ΔT is greater than or equal to a predetermined threshold value S (step S5-15). If it is determined that the synchronization mismatch estimated value ΔT is less than the threshold value S, then the correcting unit 36 makes a correction to the synchronization mismatch estimated value ΔT and thereby determines a corrected value ΔT' based on the synchronization mismatch estimated value ΔT (step S5-16).

On the other hand, if it is determined that the synchronization mismatch estimated value ΔT is greater than or equal to the predetermined threshold value S, then the correcting unit 5036 determines the threshold value S as a synchronization mismatch estimated value ΔT (step S17) and determines a corrected value ΔT' (step S5-16). Note that how the correcting unit 5036 makes a correction at these steps S5-16 and S5-17 will be described in detail later.

When the corrected value ΔT' is determined, the correcting unit 5036 outputs the corrected value ΔT' to the frame timing counter 5032. When the frame timing counter 5032 receives the corrected value ΔT', the frame timing counter 5032 makes a modification to a synchronization mismatch (step S5-18).

The time length of a transmit frame, the time length of a receive frame, and the time interval between those frames are determined by the counter value of the frame timing counter 32. Thus, the frame timing counter 5032 determines a counter corrected value corresponding to the time width of the corrected value ΔT' and can correct the counter value by shifting the counter value in the right direction using the determined counter corrected value.

In this manner, the second and third base station devices 5002 and 5003 can modify their respective transmission timings to approach the transmission timings of their respective source base station devices. In other words, a synchronization mismatch can be modified by shifting the transmission timing (frame timing) of the device in the right direction, based on a corrected value ΔT' which is obtained from detected timing of a synchronizing signal.

Note that, when a synchronization mismatch between the transmission timings of the respective second and third base station devices 5002 and 5003 and the transmission timings of their respective source base station devices is modified, a synchronization mismatch in reception timing is also naturally modified. Namely, this is a state in which a frame synchronization mismatch has been modified between the second and third base station devices 5002 and 5003 and their respective source base station devices.

As such, the second and third base station devices 5002 and 5003 in the present embodiment achieve synchronization using a synchronizing signal transmitted from their respective source base station devices, with a communication mode, in which communication is performed with terminal devices, being suspended. Thus, even if there is no control channel for achieving synchronization, synchronization can be achieved.

When the above synchronization process is completed, the second and third base station devices 5002 and 5003 terminate the synchronous mode and return to step S5-1 in FIG. 51 to go into a normal communication mode and thereby get into a state of being able to perform communication with terminal devices.

The terminal devices being in the sleep mode, etc., automatically go into a normal communication mode in which communication with the second and third base station devices 5002 and 5003 is performed, when the set sleep time (idle time) has passed. That is, when all of the second and third base station devices 5002 and 5003 and the terminal devices return to a normal communication mode, communication therebetween is resumed.

As described above, the second and third base station devices 5002 and 5003 in the present embodiment suspend a communication mode at anytime or at predetermined time intervals and repeatedly perform a synchronous mode to modify a synchronization mismatch occurring during a communication mode, and thereby maintain synchronization with their respective source base station devices.

Next, how the correcting unit 5036 makes a correction in steps S5-16 and S5-17 in FIG. 52 will be described.

When the correcting unit 5036 determines that the synchronization mismatch estimated value ΔT which is received from the synchronization error detecting unit 5033 is less than the threshold value S (step S5-15), then the correcting unit 5036 makes a correction to the synchronization mismatch estimated value ΔT based on the following equation (2) and thereby determines a corrected value ΔT' where the synchronization mismatch estimated value ΔT is suppressed (step S5-16):

$$\Delta T' = \alpha \times \Delta T \qquad (2).$$

In the above equation (2), the coefficient α is set to a value in the range of 0<α<1. The correcting unit 36 determines a corrected value ΔT' by, as described above, multiplying the synchronization mismatch estimated value ΔT by the coefficient α. As a result, the correcting unit 5036 obtains the corrected value ΔT' which is numerically suppressed to be a smaller value than the synchronization mismatch estimated value ΔT.

Figure 54:
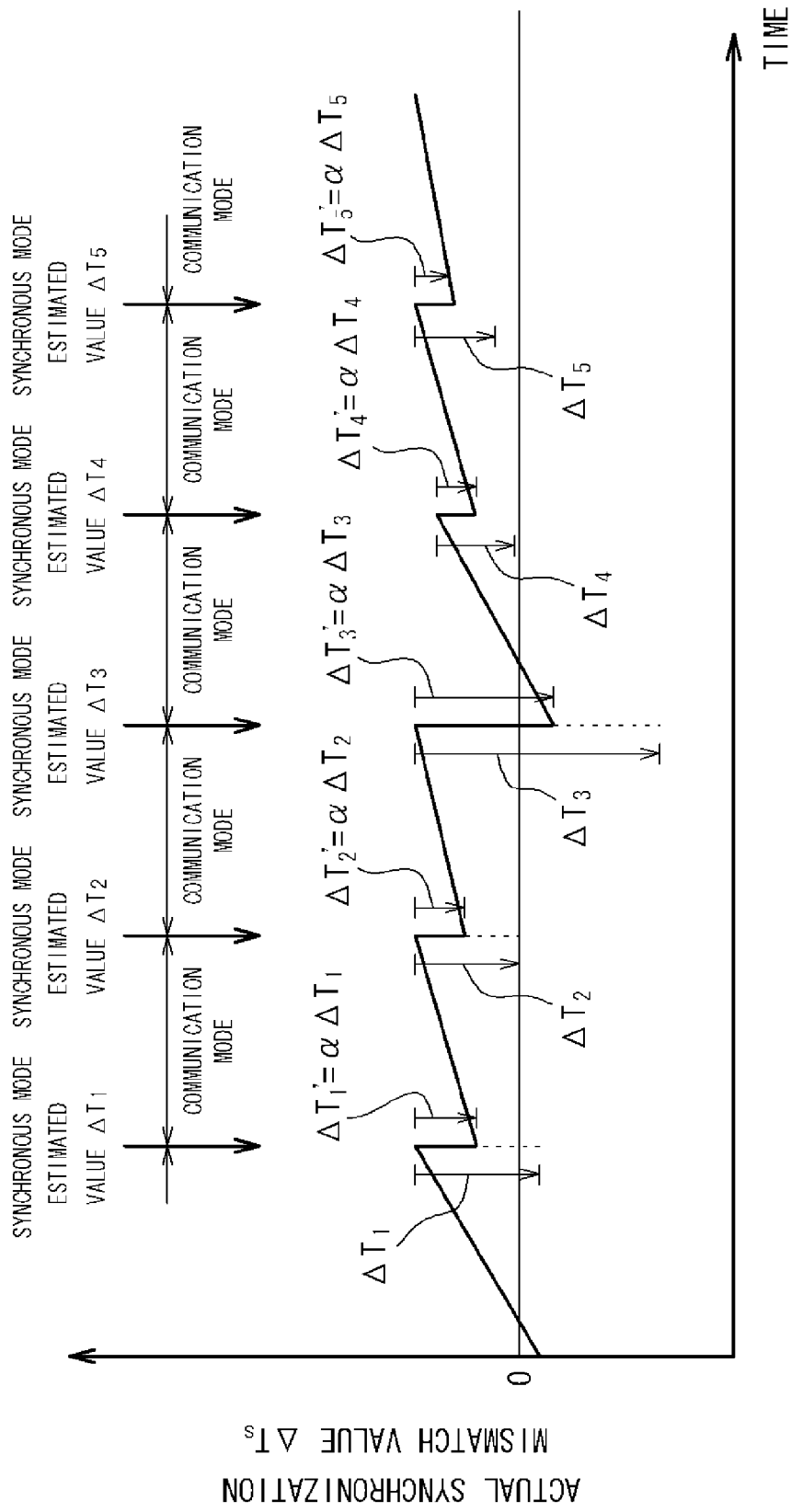
FIG. 54 is a diagram showing an example of the change over time of an actual synchronization mismatch value $\Delta Ts$ relative to a source base station device for when a base station device repeatedly performs a communication mode and a synchronous mode.

FIG. 54 is a diagram showing an example of the change over time of an actual synchronization mismatch value ΔTs relative to a source base station device for when a base station device repeatedly performs a communication mode and a synchronous mode. In FIG. 54, a horizontal axis represents elapsed time and a vertical axis represents actual synchronization mismatch value ΔTs. Note that in FIG. 54 description is made of the actual synchronization mismatch value ΔTs of the second base station device 5002 which achieves synchronization with the first base station device 1 serving as a source base station device.

FIG. 54 shows a state in which the second base station device 5002 repeatedly performs a synchronous mode after performing a communication mode with a predetermined time width. In addition, FIG. 54 shows that, when the synchronization mismatch value ΔTs is 0, synchronization between the first base station device 5001 and the second base station device 5002 is achieved.

In the communication mode, since the second base station device 5002 performs communication with terminal devices, in the relationship with the first base station device 5001, the second base station device 5002 operates separately and independently and thus is in a free-running state. Accordingly, a gradual mismatch occurs in the actual synchronization mismatch value ΔTs due to an error in operating clock between the two base station devices 5001 and 5002.

When the second base station device 5002 goes into a synchronous mode, the second base station device 5002 allows the synchronization error detecting unit 5033 and the correcting unit 5036 to determine a synchronization mismatch estimated value ΔT and a corrected value ΔT', and modifies a synchronization mismatch based on this.

For example, taking a look at the case of a synchronous mode (synchronization process) for a synchronization mismatch estimated value $\Delta T_2$ in FIG. 54, the synchronization error detecting unit 5033 obtains a synchronization mismatch estimated value $\Delta T_2$ which substantially matches the actual synchronization mismatch value ΔTs. The correcting unit 5036 determines a corrected value ΔT' which is obtained by multiplying the synchronization mismatch estimated value $\Delta T_2$ by the coefficient α (0<α<1), and modifies, as shown in the figure, a synchronization mismatch at a rate determined by the coefficient α, instead of making a correction to match the actual synchronization mismatch value ΔTs.

Taking a look at the case of a synchronous mode for a synchronization mismatch estimated value $\Delta T_3$ in FIG. 54, the synchronization error detecting unit 5033 obtains a larger synchronization mismatch estimated value $\Delta T_3$ than the actual synchronization mismatch value ΔTs. In such a case, the synchronization mismatch estimated value $\Delta T_3$ may include the aforementioned error due to the influence of noise, a delay path, etc., in a receive path.

To deal with this, the correcting unit 5036 of the second base station device 5002 determines a corrected value ΔT' which is based on the coefficient α in the above-described manner, and modifies, as shown in the figure, a synchronization mismatch at a rate determined by the coefficient α.

Namely, according to the second base station device 5002 (the third base station device 5003) in the present embodiment, the correcting unit 5036 determines a corrected value ΔT' where a synchronization mismatch estimated value ΔT is suppressed, and a modification to a synchronization mismatch is made based on the corrected value ΔT'. Thus, even if a large error is included in the synchronization mismatch estimated value ΔT due to the reception conditions of a signal from the source base station device, the error can be reduced and an error in the corrected value ΔT' can be suppressed. As a result, the influence of an error at the modification of the synchronization mismatch can be suppressed, enabling to suppress a reduction in the accuracy of the modification of the synchronization mismatch.

In addition, in the above-described embodiment, since the correcting unit 5036 determines a corrected value ΔT' by multiplying a synchronization mismatch estimated value ΔT by the coefficient α, a corrected value ΔT' where an error included in the synchronization mismatch estimated value ΔT is effectively suppressed can be obtained.

Note that the above-described coefficient α can be appropriately set according to a receive path between the source base station device and the base station device. For example, when it is previously obvious that there is a constant influence of noise, the coefficient α can be set to such a value that can suppress such an influence of noise.

In addition, the correcting unit 5036 may be configured to store a preset coefficient α or to appropriately adjust the coefficient α according to the reception conditions of a signal from the source base station device (e.g., a CINR, etc.). In this case, since the coefficient α can be set according to the current reception environment between the source base station device and the base station device, an error included in a synchronization mismatch estimated value ΔT can be more effectively suppressed, enabling to suppress a reduction in the accuracy of a synchronization process.

Alternatively, the correcting unit 5036 may be configured to set the coefficient α based on a past synchronization mismatch estimated value ΔT which is stored in the synchronization error history storage unit 5035.

On the other hand, when the correcting unit 5036 determines that the synchronization mismatch estimated value ΔT which is received from the synchronization error detecting unit 5033 is greater than or equal to the threshold value S (step S5-15), then, as described above, the correcting unit 5036 determines the threshold value S as a synchronization mismatch estimated value ΔT (step S5-17) and determines a corrected value ΔT' (step S5-16).

Figure 55:
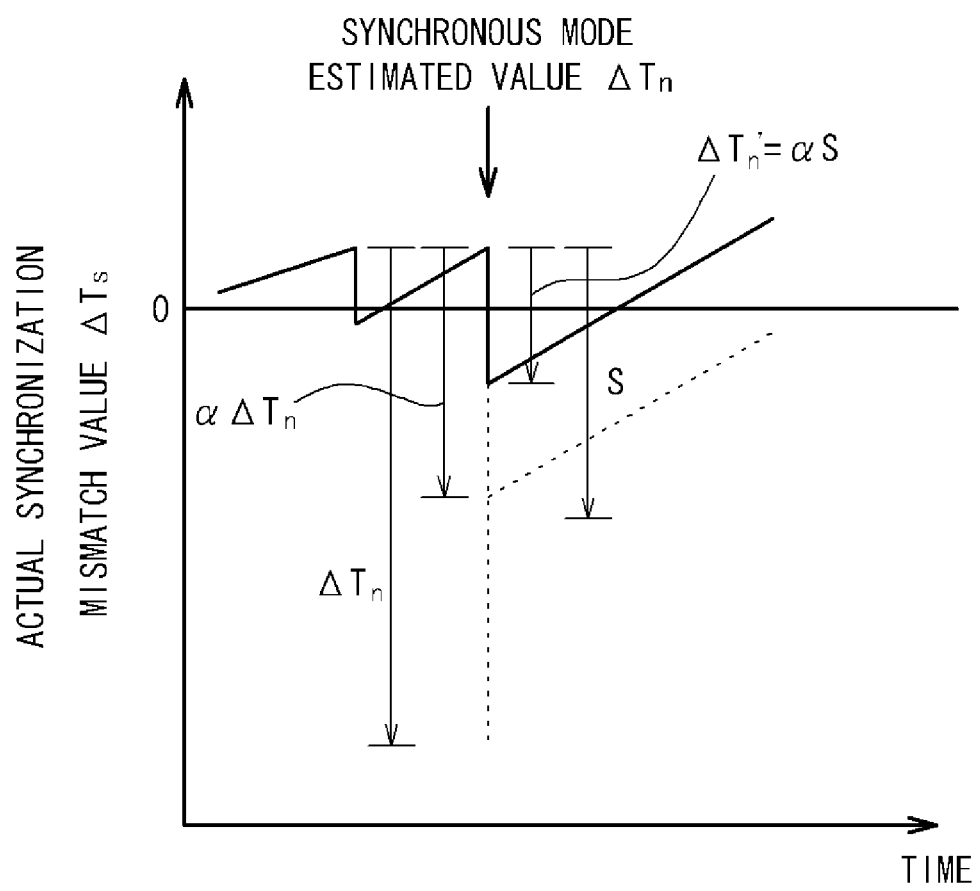
FIG. 55 is a diagram showing another example of the change over time of an actual synchronization mismatch value $\Delta Ts$ relative to a source base station device for when a base station device repeatedly performs a communication mode and a synchronous mode.

FIG. 55 is a diagram showing another example of the change over time of an actual synchronization mismatch value ΔTs relative to a source base station device for when a base station device repeatedly performs a communication mode and a synchronous mode. This FIG. 55 shows the case in which a synchronization mismatch estimated value ΔT which is greater than the threshold value S and which is an extremely large value over the past synchronization mismatch estimated values is obtained.

Normally, extreme numerical fluctuations almost never occur in a synchronization mismatch estimated value ΔT which is detected by the synchronization error detecting unit 5033. This is because a mismatch resulting from an error in operating clock between base station devices gradually fluctuates, and it is unlikely that between base station devices which are fixed to each other large fluctuations occur in a communication path between the devices.

However, when a synchronization mismatch estimated value ΔTn which is an extremely large value is obtained as a result of a sudden influence of a delay path, etc., an event occurs in which, even if a corrected value ΔT' is obtained based on the coefficient α, an error included in the corrected value ΔT' cannot be effectively suppressed. If a synchronization mismatch is modified using the corrected value where the error is not suppressed, as shown in FIG. 55, the corrected value significantly exceeds the actual synchronization mismatch value ΔTs, resulting in that the synchronization mismatch is modified to rather cause a large mismatch.

When, as described above, a synchronization mismatch estimated value ΔTn which is an extremely large value is obtained, the correcting unit 5036 in the present embodiment determines the threshold value S as a synchronization mismatch estimated value ΔT and multiplies the synchronization mismatch estimated value ΔT by the coefficient α, and thereby determines a corrected value ΔT'$_n$. As a result, since the correcting unit 5036 determines a value less than or equal to the threshold value S as a corrected value ΔT'$_n$, a synchronization process can be prevented from being performed with an extremely large error being included in the corrected value ΔT'.

Note that the threshold value S can be determined based on a numeric range width allowable for the actual synchronization mismatch value ΔTs. In this case, the actual synchronization mismatch value ΔTs can be prevented from being suddenly deviated from the allowable numeric range.

Alternatively, a past synchronization mismatch estimated value ΔT is stored and the threshold value S can be determined based on the past synchronization mismatch estimated value ΔT. In this case, an appropriate threshold value S can be set based on the actual communication conditions.

In addition, although, in the present embodiment, when a synchronization mismatch estimated value ΔTn is greater than or equal to the threshold value S, the threshold value S is determined as a synchronization mismatch estimated value ΔT, whereby a corrected value ΔT'$_n$ is set to a value less than or equal to the threshold value S, it is also possible, for example, that a value less than or equal to the threshold value S is determined in advance and the value is adopted as a corrected value ΔT'. Furthermore, the current synchronization mismatch estimated value ΔT is ignored and a past synchronization mismatch estimated value ΔT can be adopted as it is.

[5.3.2 Second Embodiment]

Figure 56:
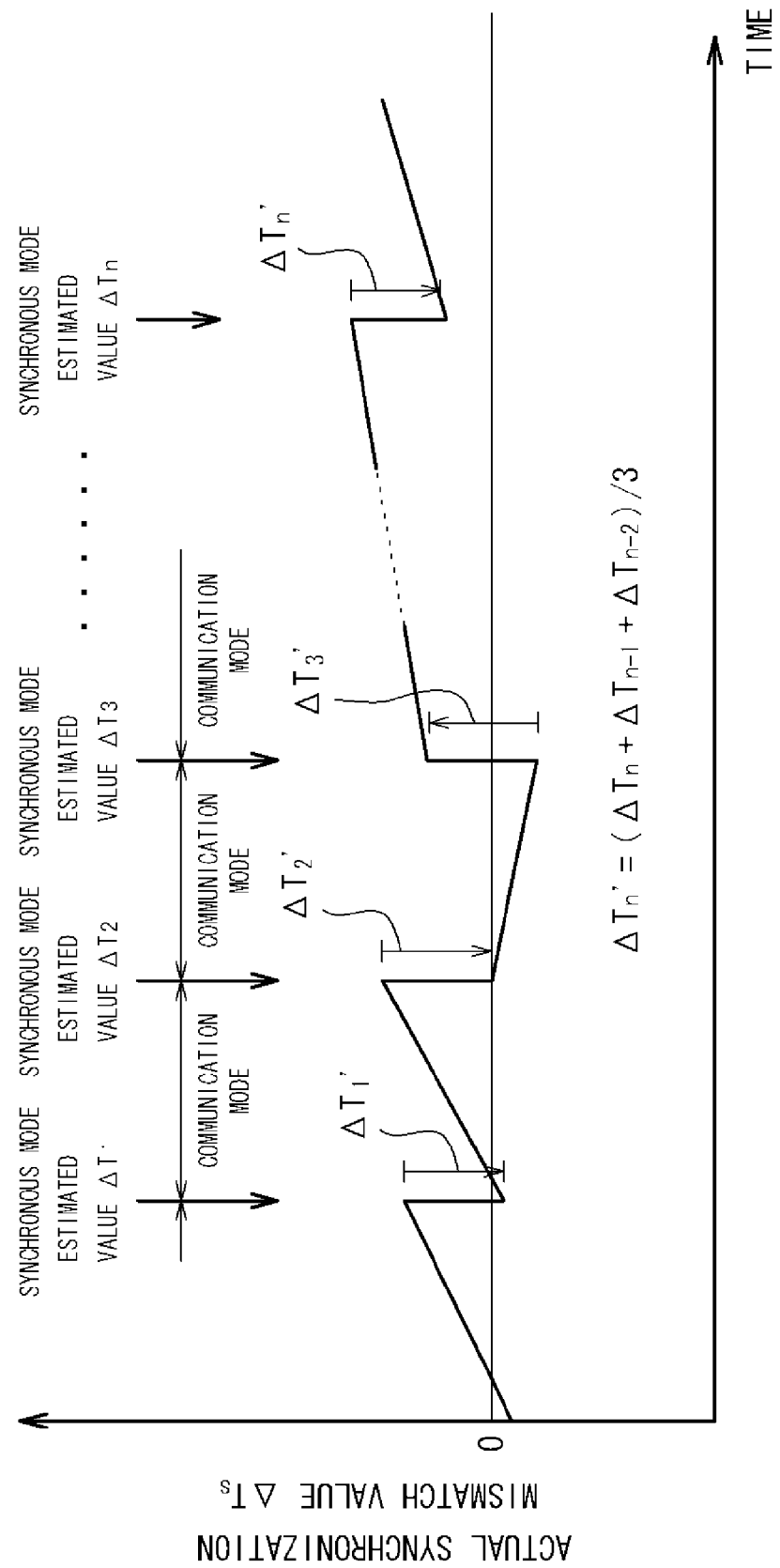
FIG. 56 is a diagram showing an example of the change over time of an actual synchronization mismatch value ΔTs relative to a source base station device for when a base station device according to a second embodiment in Chapter 5 repeatedly performs a communication mode and a synchronous mode.

FIG. 56 is a diagram showing an example of the change over time of an actual synchronization mismatch value ΔTs relative to a source base station device for when a base station device according to a second embodiment in Chapter 5 repeatedly performs a communication mode and a synchronous mode.

The present embodiment differs from the first embodiment in how to determine a corrected value ΔT' by a correcting unit 5036 (step S5-16 in FIG. 52). Other points are the same as those in the first embodiment and thus description thereof is not given.

If the correcting unit 5036 in the present embodiment determines that a synchronization mismatch estimated value ΔT which is received from a synchronization error detecting unit 5033 is less than a threshold value S (step S5-15), then the correcting unit 5036 determines a corrected value ΔT'$_n$ based on the following equation (3):

$$\Delta T'_n = (\Delta T_n + \Delta T_{n-1} + \Delta T_{n-2})/3 \qquad (3).$$

That is, in the present embodiment, the correcting unit 5036 obtains a corrected value ΔT' taking into account past synchronization mismatch estimated values ΔT. Specifically, the correcting unit 5036 obtains, from a synchronization error history storage unit 5035, a synchronization mismatch estimated value ΔT$_{n-1}$ which is determined in the last synchronous mode and a synchronization mismatch estimated value ΔT$_{n-2}$ which is determined in the synchronous mode before the last one, and determines an average value of a current estimated value ΔT and the past synchronization mismatch estimated values ΔT$_{n-1}$ and ΔT$_{n-2}$ as a corrected value ΔT'.

In this case, even if a large error is included in the current synchronization mismatch estimated value ΔT$_M$, by determining an average value of the current synchronization mismatch estimated value ΔT and the past synchronization mismatch estimated values ΔT$_{n-1}$ and ΔT$_{n-2}$ as a corrected value ΔT', a corrected value ΔT' where the error included in the current synchronization mismatch estimated value ΔT is suppressed can be obtained. By thus obtaining a corrected value ΔT' taking into account the past synchronization mismatch estimated values ΔT$_{n-1}$ and ΔT$_{n-2}$, the influence of an error at the modification of the synchronization mismatch can be suppressed, enabling to suppress a reduction in the accuracy of a synchronization process.

Note that although, in the above-described embodiment, the configuration is such that a corrected value ΔT' is determined by averaging a current synchronization mismatch estimated value ΔT and past synchronization mismatch estimated values ΔT which are obtained in the last synchronous mode and the synchronous mode before the last one, a corrected value ΔT' may be obtained by averaging a current synchronization mismatch estimated value and at least one past synchronization mismatch estimated value.

Alternatively, a larger number of past synchronization mismatch estimated values ΔT can be taken into account. In this case, even if a large error is included in a current synchronization mismatch estimated value ΔT$_M$, the influence of the error can be effectively suppressed.

Although, in the present embodiment, past synchronization mismatch estimated values ΔT are taken into account by determining, as a corrected value ΔT', an average value of a current synchronization mismatch estimated value ΔT and past synchronization mismatch estimated values ΔT, for example, a least mean square of the current synchronization mismatch estimated value ΔT and the past synchronization mismatch estimated values ΔT can be determined as a corrected value ΔT'.

In addition, as shown in the following equation (4), a value obtained by multiplying an average value of a current synchronization mismatch estimated value ΔT and past synchronization mismatch estimated values ΔT, which is obtained in the present embodiment, by a forgetting factor shown in the first embodiment can be determined as a corrected value ΔT'. In this case, the influence of an error included in the corrected value ΔT' can be suppressed, enabling to more effectively suppress a reduction in the accuracy of a synchronization process:

$$\Delta T'_n = \alpha \times (\Delta T_n + \Delta T_{n-n} + \Delta T_{n-2})/3 \qquad (4).$$

Furthermore, as shown in the following equation (5), a corrected value ΔT' can be determined using a forgetting factor β and based on a current synchronization mismatch estimated value ΔT and a past synchronization mismatch estimated value ΔT$_{n-1}$ which are determined in the present embodiment:

$$\Delta T'_n = \beta \times \Delta T_n + (1-\beta) \times \Delta T_{n-1} \qquad (5).$$

In this case, also, the influence of an error at the modification of the synchronization mismatch can be effectively suppressed.

Note that although, in the above-described equation (5), a corrected value ΔT' is determined using the current synchronization mismatch estimated value ΔT and the immediate past synchronization mismatch estimated values $\Delta T_{n-1}$, a computation can be performed using a larger number of past synchronization mismatch estimated values.

In addition, as with the above-described coefficient α, the forgetting factor β can be appropriately set according to a receive path between the source base station device and the base station device. For example, when it is previously obvious that there is a constant influence of noise, the forgetting factor β can be set to such a value that can suppress such an influence of noise.

Furthermore, the correcting unit 5036 may be configured to store a preset forgetting factor β or to appropriately adjust the forgetting factor β according to the reception conditions of a signal from the source base station device (e.g., a CINR, etc.). In this case, since the forgetting factor β can be set according to the current reception environment between the source base station device and the base station device, an error included in a synchronization mismatch estimated value ΔT can be more effectively suppressed, enabling to suppress a reduction in the accuracy of a synchronization process.

Alternatively, the correcting unit 5036 may be configured to set the forgetting factor β based on a past synchronization mismatch estimated value ΔT which is stored in the synchronization error history storage unit 5035.

[5.3.3. Third Embodiment]

Figure 58:
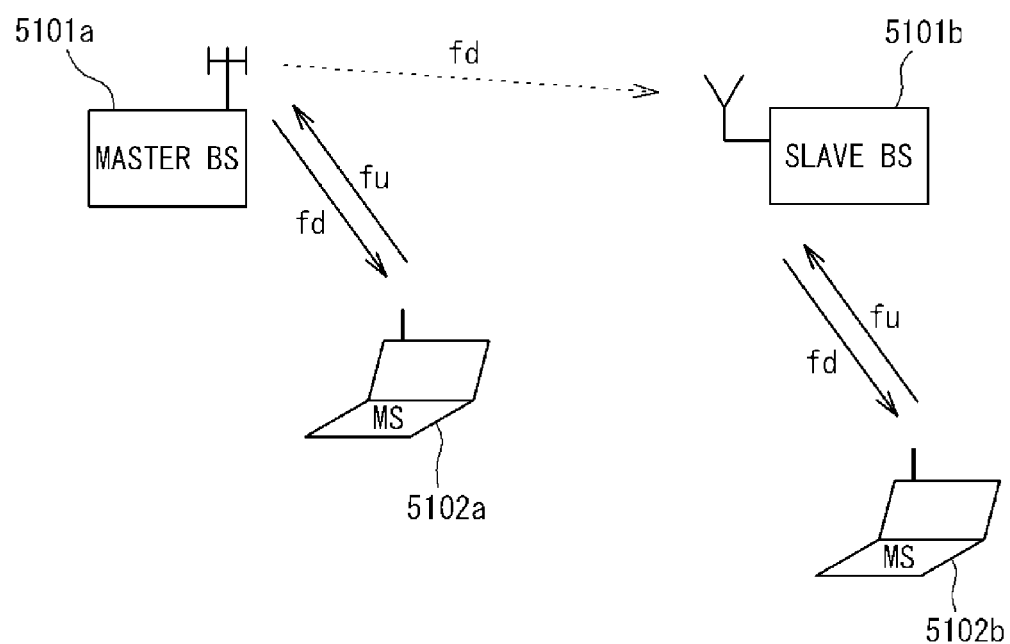
FIG. 58 is a diagram showing an overall configuration of a wireless communication system according to a third embodiment in Chapter 5.

FIG. 58 is a diagram showing the overall configuration of a wireless communication system according to a third embodiment in Chapter 5. FIG. 58 shows a communication system in which wireless communication is performed between base station devices 5101a and 5101b and user terminals (mobile terminals; MSs; Mobile Stations) 5102a and 5102b. In the communication system, the plurality of base station devices (BSs; Base Stations) 5101a and 5101b are installed and can perform communication with the user terminals 5102a and 5102b present in their respective cells.

The communication system is a system to which, for example, LTE (Long Term Evolution) is applied. In LTE, frequency-division duplex (FDD) can be adopted. In the following, the communication system is described assuming that a frequency-division duplex system is adopted. In addition, in the communication system, not only LTE but also WCDMA or CDMA2000 may be adopted.

In the communication system in the present embodiment, inter-base-station synchronization where synchronization is achieved between the plurality of base station devices 5101a and 5101b is performed. In the present embodiment, inter-base-station synchronization is performed by "over-the-air synchronization" where synchronization is achieved such that a signal which is transmitted from the base station device, a master, which serves as another base station device (hereinafter, referred to as "master BS") 5101a to the terminal device 5102a present in a cell of the master BS 5101a is received by another base station device (hereinafter, referred to as "slave BS") 5101b.

Note that the master BS may further achieve over-the-air synchronization with another base station device or may determine frame timing by any other method than over-the-air synchronization, e.g., achieving synchronization using a GPS signal.

Figure 59:
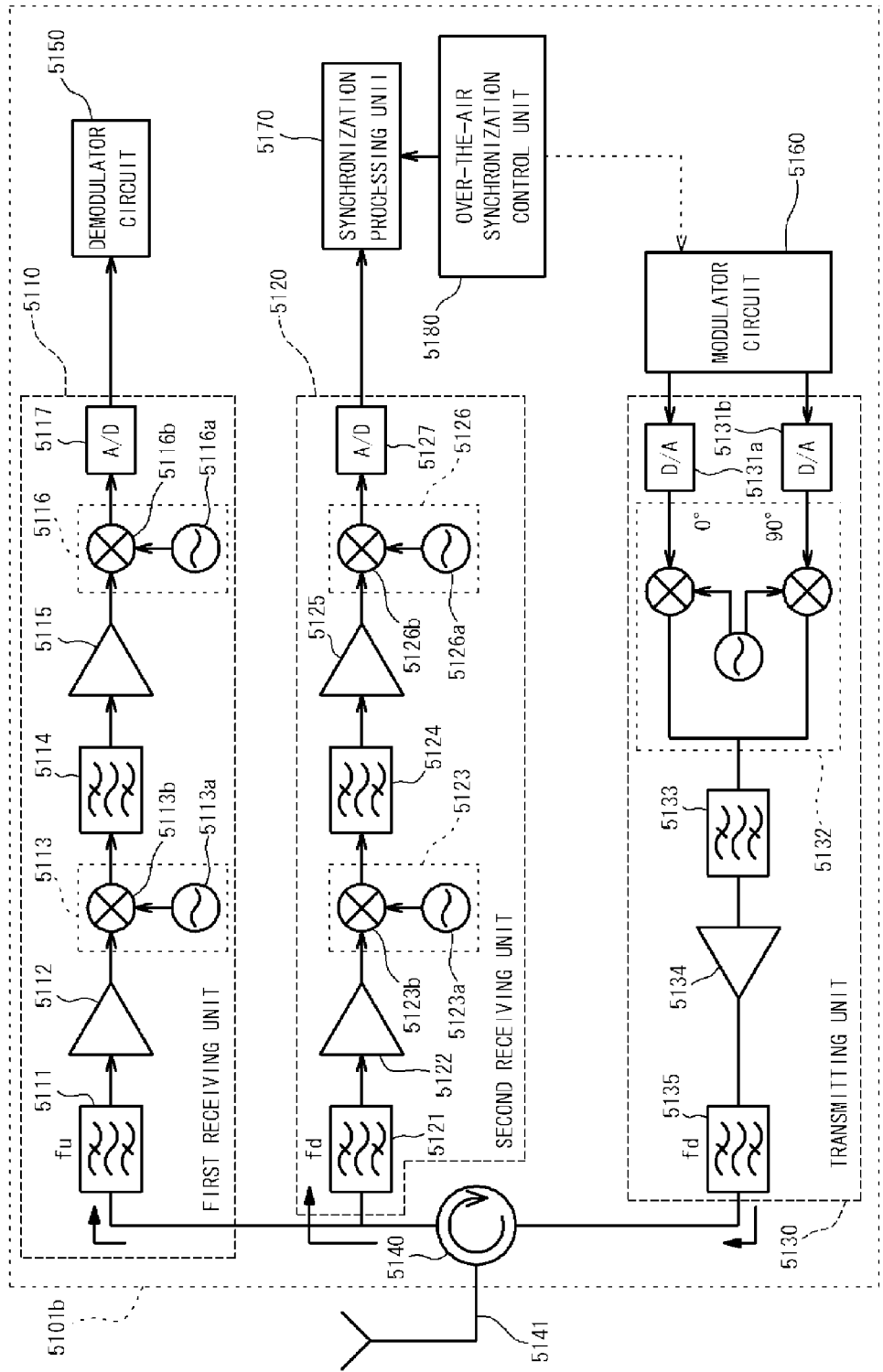
FIG. 59 is a configuration diagram of a base station device (slave BS) in Chapter 5.

FIG. 59 shows a configuration of the base station device (slave BS) 5101b. The circuit in FIG. 59 is similar to, for example, the circuit in FIG. 35. In FIG. 59, a signal outputted from an A/D converting unit 5127 is provided to a synchronization processing unit 5170. Accordingly, the synchronization processing unit 5170 can obtain a downlink signal transmitted from the master BS 5101a.

The synchronization processing unit 5170 performs processes for achieving synchronization of the communication timing and communication frequency of the device 5101b, based on a Primary Synchronization Signal and a Secondary Synchronization Signal which are included in a frame of the downlink signal obtained from the master BS 5101a.

The synchronization processing unit 5170 is controlled by an over-the-air synchronization control unit 5180. The over-the-air synchronization control unit 5180 suspends a communication mode in which transmission of a downlink signal to the user terminal 5102b is performed, periodically in a fixed cycle or as necessary, to perform over-the-air synchronization and goes into an over-the-air synchronization state (synchronous mode) in which a downlink signal transmitted from the master BS 5101a is received. The over-the-air synchronization control unit 5180 outputs over-the-air synchronization section information which is information indicating a time period during which the over-the-air synchronization state occurs, to a modulator circuit 5160 and the synchronization processing unit 5170 and thereby controls the modulator circuit 5160 and the synchronization processing unit 5170.

Figure 60:
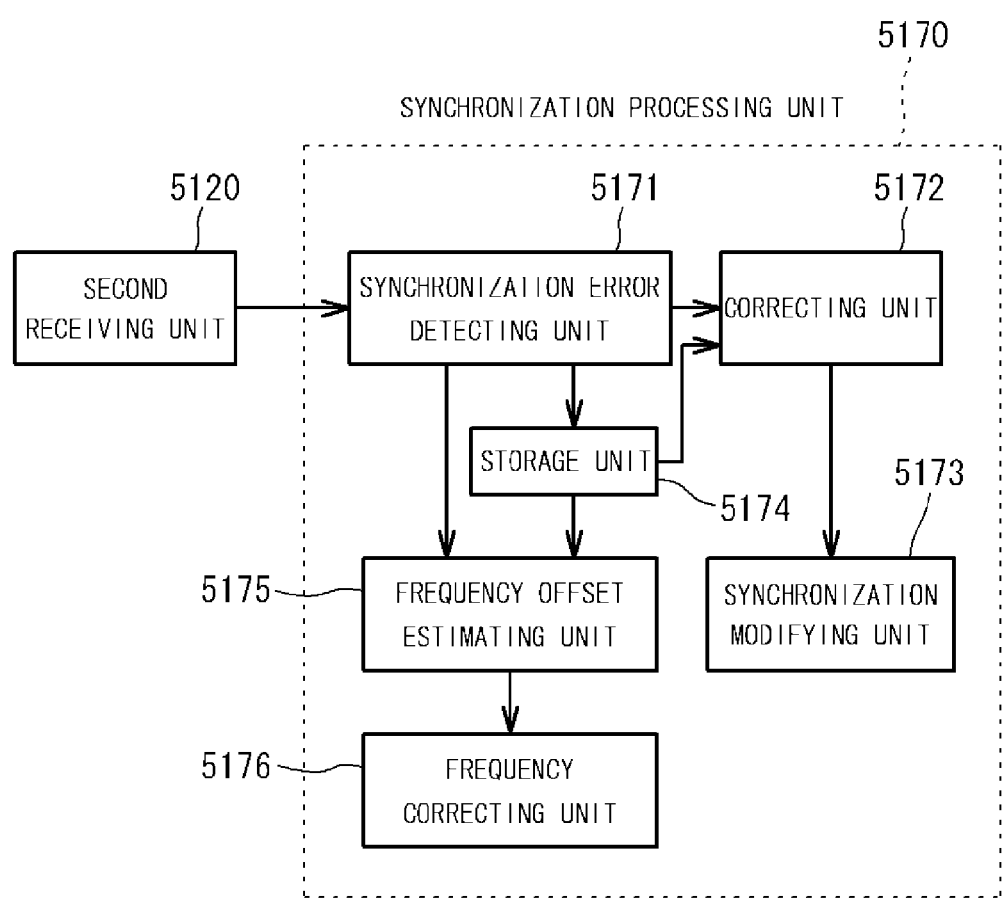
FIG. 60 is a configuration diagram of a synchronization processing unit in Chapter 5.

FIG. 60 is a configuration diagram of the synchronization processing unit. As shown in FIG. 60, the synchronization processing unit 5170 includes a synchronization error detecting unit 5171, a correcting unit 5172, a synchronization modifying unit 5173, and a storage unit 5174.

The synchronization processing unit 5170 recognizes whether the device 5101b is in a communication mode or a synchronous mode, based on the over-the-air synchronization section information which is provided from the over-the-air synchronization control unit 5180, and determines whether to perform over-the-air synchronization.

When it is determined to perform over-the-air synchronization, then the synchronization error detecting unit 5171 obtains a downlink signal transmitted from the master BS 5101a and detects frame transmission timing of the master BS 5101a using a Primary Synchronization Signal and a Secondary Synchronization Signal (hereinafter, the two Signals are collectively referred to as "synchronizing signal") which are included in the downlink signal, and detects a synchronization mismatch estimated value which indicates an error (frame synchronization error) between the detected frame transmission timing and frame transmission timing of the device 5101b.

Specifically, the slave BS 5101b detects timing of the synchronizing signal present at a predetermined location in the received downlink frame, and thereby detects frame transmission timing of the master BS 5101a. Then, the slave BS 5101b compares the detected frame transmission timing of the master BS 5101a with frame transmission timing of the device 5101b to detect a synchronization mismatch estimated value.

The synchronization mismatch estimated value detected by the frame synchronization error detecting unit 5171 is provided to the storage unit 5174 each time it is detected, and is accumulated in the storage unit 5174.

The synchronization error detecting unit 5171, the correcting unit 5172, the synchronization modifying unit 5173, and the storage unit 5174 in the present embodiment respectively correspond to the synchronization error detecting unit 5033, the correcting unit 5036, the frame timing counter 5032, and the synchronization error history storage unit 5035 in the above-described first embodiment, and perform the same process as that performed by the corresponding units and thereby determine a corrected value from the synchronization mismatch estimated value and make a modification to a synchronization mismatch. Then, by the same process as that in the first embodiment, the influence of an error at the modification of the synchronization mismatch can be suppressed, enabling to suppress a reduction in the accuracy of the modification of the synchronization mismatch.

Note that the target for detection and correction of a synchronization error (synchronization mismatch) is not limited to frame timing and may be symbol timing or slot timing.

The synchronization processing unit 5170 further includes a frequency offset estimating unit 5175 and a frequency correcting unit 5176.

The frequency offset estimating unit 5175 estimates, based on the synchronization mismatch estimated value detected by the synchronization error detecting unit 5171, a difference (clock frequency error) between a clock frequency of a built-in clock generator (not shown) included in the slave BS 5101*b*, the receiving side, and a clock frequency of a built-in clock generator of the master BS 5101*a*, the transmitting side, and estimates a carrier frequency error (carrier frequency offset) from the clock frequency error.

In the present embodiment, the slave BS 5101*b* can also employ the configurations shown in FIGS. 37 to 42.

[Chapter 6 Synchronization Correction Divided Into a Plurality of Corrections]

In base station devices which are described in this Chapter 6, the techniques for base station devices described in Chapter 1, 2, 3, 4 or 5 are employed within the technically consistent scope. In this Chapter 6, for those points that are not particularly described, the matters described in Chapters 1, 2, 3, 4, and 5 are incorporated.

[6.1 Necessity for Synchronization Correction Divided Into a Plurality of Corrections]

As described above, an offset value which smoothly changes with the passage of time is constantly present between the clock frequency of one base station device and the clock frequency of another base station device. The offset value also changes by external factors, such as a change in ambient temperature. However, if there are no external factors, the offset value has a tendency to linearly and gradually increase due to the difference in accuracy error between clock generation devices of the base station devices.

The base station device obtains the above-described transmission timing and carrier wave frequency, based on the oscillation of its clock generation device. Thus, when there is an offset value between the clock frequencies of the devices, synchronization mismatches occur in transmission timing and carrier wave frequency between the base station device and another base station device.

Hence, synchronization mismatches such as those described above are considered to be resolved by, for example, temporarily aborting communication with terminal devices and performing a synchronization process with another base station. In this case, while the base station device stops communication with terminal devices, the base station device detects again the degree of a synchronization mismatch with another base station device from a known signal wave, such as a preamble wave, included in a receive wave transmitted from another base station device, and can thereby achieve synchronization.

However, the clock frequency offset value between the base station devices has, as described above, a tendency to linearly and gradually increase. Hence, even if the base station device achieves synchronization with another base station device with communication with terminal devices being aborted, when the base station device thereafter starts communication with the terminal devices, the clock frequency offset value having the above-described tendency gradually increases, causing a synchronization mismatch between the two base station devices.

Namely, although a state in which synchronization between the base station devices is achieved can be temporarily obtained by a synchronization process, while thereafter communication with terminal devices is performed, a synchronization mismatch occurs again. Then, since the synchronization mismatch gradually increases with the passage of time, the longer the communication time during which communication with the terminal devices is performed, the larger the synchronization mismatch occurring during the communication time. Accordingly, from the viewpoint of the overall elapsed time in the base station device, even if a synchronization process is performed periodically, a synchronization mismatch is still present.

To deal with this, by reducing the cycle in which a synchronization process is performed, to achieve synchronization before the synchronization mismatch becomes large, the synchronization mismatch can be suppressed from becoming large. However, to perform a synchronization process, communication with terminal devices needs to be stopped. Thus, when the cycle of a synchronization process is reduced, the throughput between the base station device and the terminal devices decreases.

Accordingly, a technique is required for suppressing a synchronization mismatch between base stations while suppressing a decrease in throughput.

[6.2 Disclosure of a Technique for Synchronization Correction Divided Into a Plurality of Corrections]

(1) An invention disclosed here is characterized by including a control unit that performs, in a switching manner, a communication mode in which communication is performed with terminal devices by transmitting communication signals, and a synchronous mode in which communication with the terminal devices is stopped and a communication signal is received from another base station device and inter-base-station synchronization is performed with the another base station device; an estimating unit that determines an estimated value of a synchronization mismatch between the communication signal from the another base station device and its own communication signal, based on the communication signal from the another base station device received in the synchronous mode; and a correcting unit that makes a synchronization correction where the communication signal to be transmitted from itself is allowed to be synchronized with the communication signal from the another base station device, based on the synchronization mismatch estimated value determined by the estimating unit, wherein the correcting unit makes the synchronization correction during the communication mode before being switched to a next synchronous mode, such that the synchronization correction is divided into a plurality of corrections.

According to a base station device configured in the above-described manner, since a synchronization correction to a communication signal which is transmitted from the base station device in a communication mode is made during the communication mode before being switched to a next synchronous mode, such that the synchronization correction is divided into a plurality of corrections, the occurrence of a large synchronization mismatch can be suppressed throughout the communication mode. Accordingly, since not only the synchronization mismatch is suppressed by inter-base-station synchronization which is performed in the synchronous mode, but also the synchronization mismatch is suppressed in the communication mode, the synchronization mismatch can be effectively suppressed.

In addition, according to the present invention, since the synchronization mismatch is also suppressed in the communication mode for performing communication with terminal devices, there is no need to reduce the cycle of the synchronous mode where communication with the terminal devices needs to be stopped, to suppress the synchronization mismatch. Hence, while a decrease in throughput between the base station device and the terminal devices is suppressed, the synchronization mismatch between the base station devices can be suppressed.

(2) It is preferred that the correcting unit make the synchronization correction such that the synchronization correction is divided into a plurality of corrections on a per unit time basis.

In this case, since a synchronization correction is made uniformly on a per unit time basis throughout the communication mode, a synchronization mismatch which increases with time can be effectively suppressed.

(3) The estimating unit may obtain communication timing of the another base station device from a communication signal from the another base station device, and determine the estimated value of the synchronization mismatch based on a communication timing offset between the obtained communication timing and communication timing of the base station device.

(4) More specifically, it is preferred that the estimating unit determine the communication timing offset as the estimated value of the synchronization mismatch, and the correcting unit have a communication timing correcting unit that makes a synchronization correction to communication timing by adjusting the time lengths of communication frames which form the communication signal. In this case, a synchronization mismatch in communication timing can be suppressed.

The estimating unit may determine, as the estimated value of the synchronization mismatch, a carrier wave frequency offset of the communication signal based on the communication timing offset, and the correcting unit may have a frequency correcting unit that makes a synchronization correction to the carrier wave frequency. In this case, a synchronization mismatch in a carrier wave frequency can be suppressed.

[6.3 Embodiments of the Technique for Synchronization Correction Divided Into a Plurality of Corrections]

[6.3.1 First Embodiment]

Figure 61:
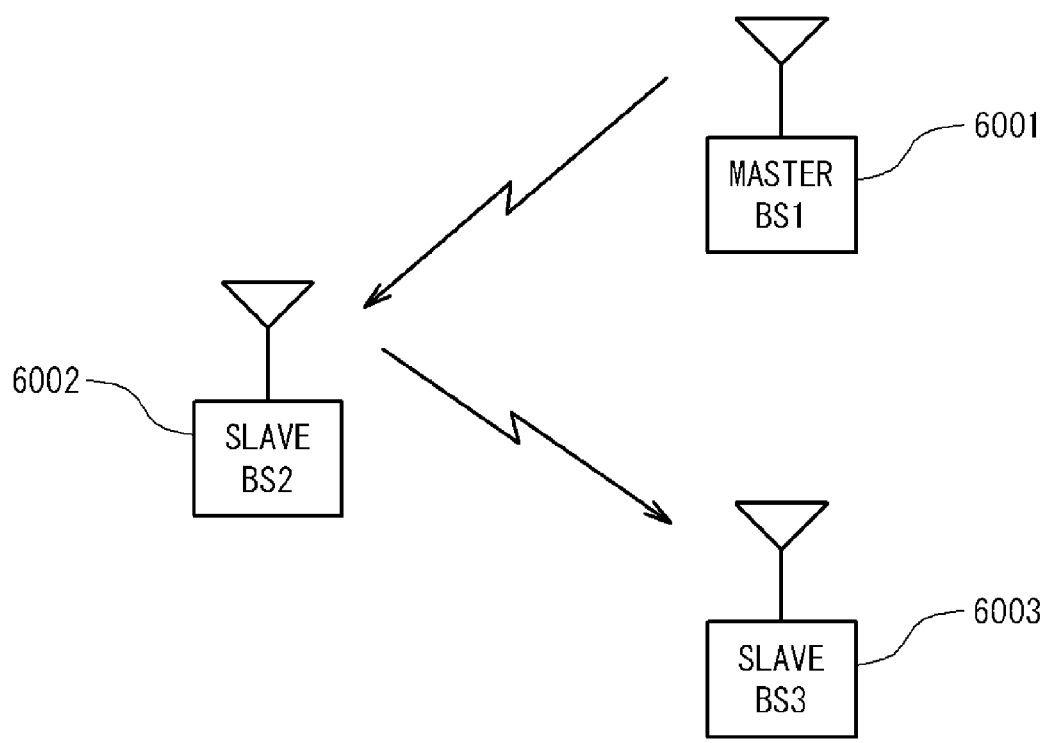
FIG. 61 is an overall view of a wireless communication system according to a first embodiment in Chapter 6.

FIG. 61 shows a wireless communication system having a plurality of base station devices (BSs: Base Stations) 6001, 6002, 6003, . . . according to a first embodiment in Chapter 6. The wireless communication system adopts, for example, a system complying with "WiMAX" defined in IEEE 802.16 which supports an Orthogonal Frequency Division Multiple Access (OFDMA) system, to implement wide-band wireless communication.

The basic functions of the base station devices 6001, 6002, and 6003 are the same as those in Chapter 5.

Figure 62:
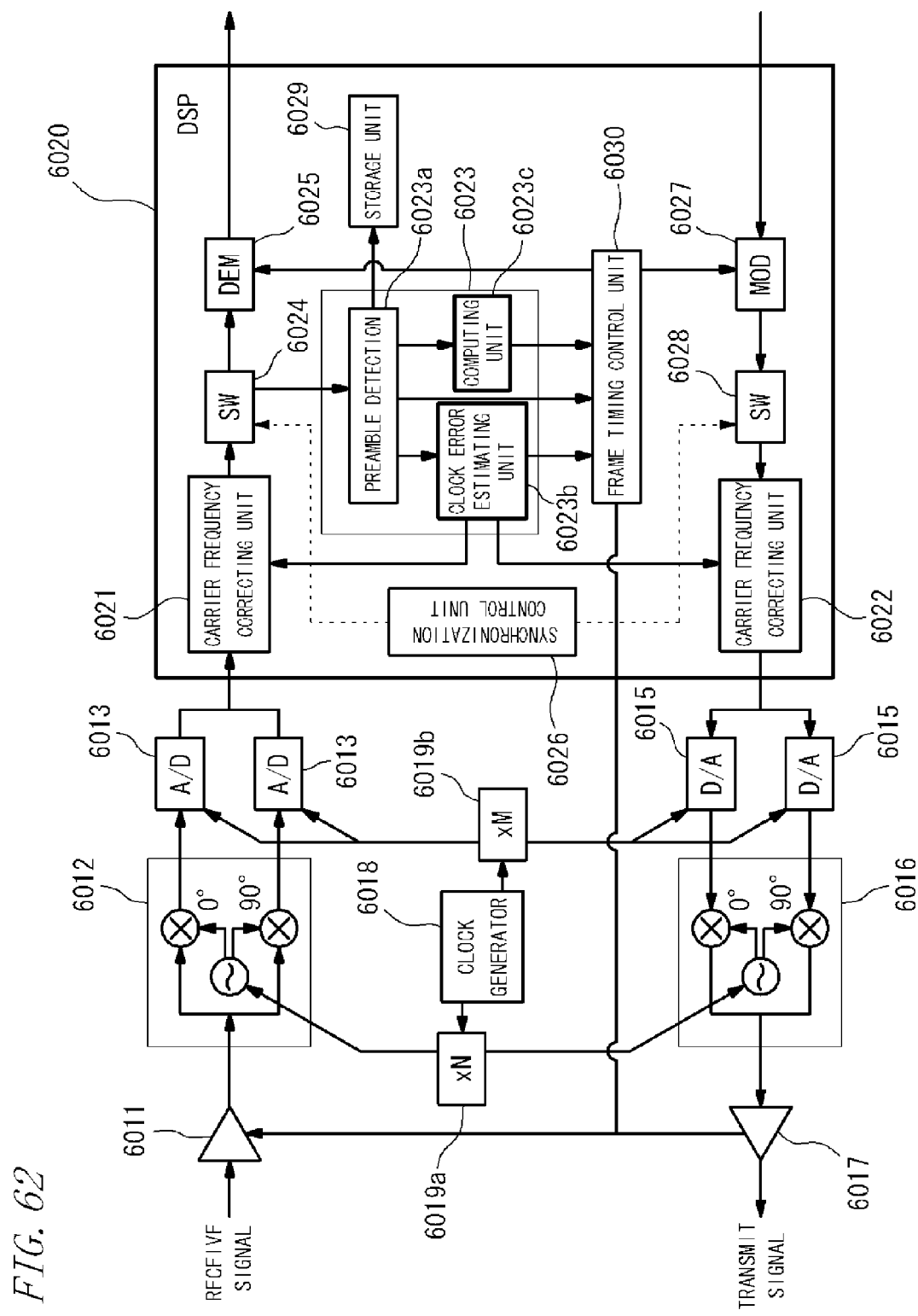
FIG. 62 is a block diagram showing a configuration of second and third base station devices in Chapter 6.

FIG. 62 is a block diagram showing a configuration of the base station devices 6002 and 6003 in Chapter 6.

The base station devices 6002 and 6003 have, for signal reception, an amplifier 6011 that amplifies a receive signal; an orthogonal demodulator 6012 that performs an orthogonal demodulation (orthogonal detection) on the receive signal outputted from the amplifier 6011; and A/D converting units 6013 that perform A/D conversion on the receive signal outputted from the orthogonal demodulator 6012. The receive signal having been converted to a digital signal is provided to a DSP (digital signal processing processor) 6020.

In addition, the base station devices 6002 and 6003 have, for signal transmission, D/A converting units 6015 that perform D/A conversion on a digital transmit signal; an orthogonal modulator 6016 that performs an orthogonal modulation process on the transmit signal outputted from the D/A converting units 6015; and an amplifier 6017 that amplifies the transmit signal outputted from the orthogonal modulator 6016.

Note that operating clocks for the orthogonal demodulating unit 6012, the A/D converting units 6013, the D/A converting units 6015, and the orthogonal modulating unit 6016 are provided from a built-in clock generator (reference signal generator) 6018. The built-in clock generator 6018 includes a crystal resonator, etc., and generates an operating clock with a predetermined frequency. Note that the clock generated by the clock generator 6018 is provided to the A/D converting units 6013, etc., through multiplying units 6019*a* and 6019*b*.

The operating clock generated by the built-in clock generator 6018 is also provided to the DSP 6020 and thus also serves as an operating clock of the DSP 6020.

Here, the accuracy of the operating clock provided to the D/A converting units 6015 affects the accuracy of the time length of a transmit frame (downlink subframe). Therefore, if the accuracy of the clock generator 6018 varies between base station devices, then the time length of a transmit frame to be generated slightly varies between the base station devices. Then, when frame transmission is repeated, the difference in frame time length is accumulated, causing a mismatch in frame timing between the base station devices (communication frame timing offset).

The DSP (signal processing unit) 6020 performs signal processing on a receive signal and/or a transmit signal.

The main functions of the DSP 6020 include a function as an OFDM demodulator for a receive signal, a function as an OFDM modulator for a transmit signal, a function of switching between transmission and reception (a transmit frame and a receive frame), a function of achieving frame timing synchronization between base stations, and a function of achieving carrier frequency synchronization between base station devices. In FIG. 62, blocks shown in the DSP 6020 indicate these functions.

A carrier frequency correcting unit 6021 in FIG. 62 corrects the carrier frequency of a receive signal. In addition, a carrier frequency correcting unit 6022 that corrects the carrier frequency of a transmit signal is also provided.

The carrier frequency correcting units 6021 and 6022 correct the carrier frequencies of a receive signal and/or a transmit signal, based on a carrier frequency offset estimated by an estimating unit 6023.

The output from the carrier frequency correcting unit 6021 for a receive signal is provided to a demodulating unit (DEM) 6025 through a switching switch 6024. The demodulating unit 6025 performs a demodulation (OFDM demodulation) process on the receive signal having been subjected to carrier frequency correction.

The switching switch 6024 is to provide a receive signal to the side of the demodulating unit 6025 during a communication mode in which signals from terminal devices can be received, and to provide a receive signal to the estimating unit 6023 in a synchronous mode in which the communication mode is stopped (suspended). Switching of the switch 6024 is performed by a synchronization control unit 6026.

Note that the communication mode is a mode in which communication is performed with terminal devices by transmitting communication signals to the terminal devices, and the synchronous mode is a mode for performing an inter-base-station synchronization process (synchronization process) with another base station device by receiving a communication signal which is transmitted from the another base station device, with communication with the terminal devices being stopped. These communication and synchronous modes will be described later.

In addition, the DSP 6020 includes a modulating unit (MOD) 6027 that performs a modulation (OFDM modulation) process on a transmit signal. In the modulating unit 6027, since a carrier frequency is determined based on the clock frequency generated by the clock generator 6018, a clock frequency error affects the carrier frequency of a transmit signal. Note that, when a mismatch occurs in the carrier frequency of a transmit signal, although subcarrier frequency spacings do not change, the center frequencies of the respective subcarriers are shifted uniformly.

The transmit signal outputted from the modulating unit 6027 is provided to the carrier frequency correcting unit 6022 through a switching switch 6028.

The switching switch 6028 provides a transmit signal to the D/A converting units 6015 during a communication mode in which signals can be transmitted to terminal devices, and does not provide a transmit signal to the D/A converting units 6015 in a synchronous mode in which the communication mode is suspended.

Switching of the switch 6028 is also performed by the synchronization control unit 6026. Namely, the synchronization control unit 6026 configures a control unit that performs a communication mode and a synchronous mode in a switching manner.

The estimating unit 6023 detects a preamble which is a synchronizing signal from a receive signal (communication signal), and estimates a communication frame timing offset between the base station device and another base station device and a carrier frequency offset (carrier wave frequency offset) between the base station device and another base station device.

Therefore, the estimating unit 6023 has a preamble detecting unit 6023*a* that detects a preamble included in a receive signal; a clock error estimating unit 6023*b* that estimates a clock error between another base station device and the device; and a computing unit 6023*c* that computes a timing offset per unit time between another base station device and the device.

In the present embodiment, a preamble included at the beginning of a downlink subframe DL which is transmitted from another base station device is used as a synchronizing signal for inter-base-station synchronization. Hence, the detecting unit 6023*a* detects timing of a preamble included at the beginning of a downlink subframe DL which is transmitted from another base station device.

Note that, for the synchronizing signal, a midamble, a pilot signal, etc., may be used.

The base station devices 6002 and 6003 have, in their memories, preamble patterns which are likely to be used by their corresponding base station devices 6001 and 6002, as known patterns. The detecting units 6023*a* of the respective base station devices 6002 and 6003 detect timing of a preamble, etc., using these known preamble patterns.

The detecting unit 6023*a* detects a difference between the transmission timing of the device 6002, 6003 and detected preamble timing t, as a communication timing offset (synchronization mismatch). The communication timing offset (communication frame timing offset) is provided to a storage unit 6029 each time it is detected, and is accumulated in the storage unit 6029.

The communication timing offset detected by the detecting unit 6023*a* is provided to the clock error estimating unit 6023*b* and the computing unit 6023*c*.

The computing unit 6023*c* determines how much the timing offset increases per unit time, based on the communication timing offset detected by the preamble detecting unit 6023*a*, and thereby determines a timing offset per unit time.

Note that in the present embodiment the unit time is set to 5 ms which is the time width of one basic frame.

The clock error estimating unit 6023*b* estimates a difference (clock frequency error) between a clock frequency generated by the built-in clock generator 6018 of the device, the receiving side, and a clock frequency generated by the built-in clock generator 6018 of another base station device, the transmitting side, based on the communication timing offset detected by the preamble detecting unit 6023*a*. Then, from the estimated value of the clock frequency error, a carrier frequency offset which is an estimated value of the synchronization mismatch is determined.

The clock error estimating unit 6023*b* estimates, under circumstances where a synchronous mode is performed periodically, a clock error based on a communication timing offset detected in the last synchronous mode and a communication timing offset detected in the current synchronous mode. Note that the last timing offset can be obtained from the storage unit 6029.

Of the timing offsets and carrier frequency offsets determined by the clock error estimating unit 6023*b*, the carrier frequency offsets (the carrier frequency offset occurring between the last and current synchronous modes and the carrier frequency offset per basic frame) are provided to the carrier frequency correcting units 6021 and 6022.

In the present embodiment, not only the carrier frequency of a receive signal is corrected, as does a normal AFC (Automatic Frequency Control) function, but also the carrier frequency of a transmit signal can be corrected.

That is, the carrier frequency offsets between the base station device and another base station device are also provided to the carrier frequency correcting unit 22 on the transmitting side, and the carrier frequency correcting unit 6022 corrects the carrier frequency of a transmit signal to be transmitted to terminal devices.

The carrier frequency correcting unit 6022 performs, in a synchronous mode, a process (synchronization process) of adjusting the carrier frequency, to cancel a carrier frequency offset which occurs currently.

Furthermore, the carrier frequency correcting unit 6022 performs, in a communication mode, a process (synchronization correction process) of adjusting the carrier frequency for each basic frame based on the above-described carrier frequency offset per basic frame, to allow communication signals which are transmitted from the base station device to terminal devices to be synchronized with a communication signal from another base station device.

Specifically, a carrier frequency for each basic frame is adjusted so that a carrier frequency offset per basic frame which is the amount of synchronization mismatch estimated to occur per basic frame can be canceled on a per basic frame basis.

That is, the carrier frequency correcting unit 6022 adjusts the carrier frequency to cancel the carrier frequency offset, which is the estimated value of the synchronization mismatch, occurring between the last and current synchronous modes, by performing a synchronization correction process during the communication mode before being switched to a next synchronous mode, such that the synchronization correction process is divided into a plurality of correction processes on a per basic frame basis (on a per unit time basis).

As such, in the present embodiment, by performing the above-described process as carrier frequency synchronization, even if there is a clock frequency error between the base station device and another base station device, the occurrence of a carrier frequency offset can be suppressed and thus a synchronization mismatch in the carrier frequency of communication signals between the base station device and another base station device can be suppressed.

The communication timing offset detected by the detecting unit 6023a is provided to a frame timing control unit 6030, as an estimated value of the synchronization mismatch. In addition, the timing offset per basic frame (per unit time) determined by the computing unit 6023c is also provided to the frame timing control unit 6030. Based on the timing offsets, the frame timing control unit (TDD control unit) 6030 performs control to switch between transmission and reception and performs a process of adjusting the time lengths of communication frames (a transmit frame and a receive frame).

The frame timing control unit 6030 having received the communication timing offset performs, in a synchronous mode, a process (synchronization process) of shifting the transmission timing of the base station device (transmit subframe timing) in the right direction by an amount corresponding to the communication timing offset detected by the detecting unit 6023a. Accordingly, the transmission timing of the device coincides with the transmission timing of another base station device, enabling to achieve frame timing synchronization between the base station devices.

In addition, the frame timing control unit 6030 makes, in a communication mode, a synchronization correction for allowing communication signals which are transmitted from the base station device to terminal devices to be synchronized with a communication signal from another base station device, by adjusting the time length of each basic frame based on the timing offset per basic frame which is determined by the computing unit 6023c (synchronization correction process).

Specifically, the time length of each basic frame is adjusted so that the timing offset per basic frame which is the amount of synchronization mismatch estimated to occur per basic frame can be canceled on a per basic frame basis.

That is, the frame timing control unit 6030 adjusts the time length of each basic frame to cancel the communication timing offset, which is the estimated value of the synchronization mismatch, occurring between the last and current synchronous modes, by performing a synchronization correction process during the communication mode before being switched to a next synchronous mode, such that the synchronization correction process is divided into a plurality of correction processes on a per basic frame basis (on a per unit time basis).

Note that, by allowing transmission timing to coincide with the transmission timing of another base station device, naturally, reception timings also coincide with each other. Namely, the base station device is in a state in which frame timing synchronization is achieved with another base station device.

As such, in the present embodiment, by performing the above-described process as frame timing synchronization, even if there is a clock frequency error between the base station device and another base station device, the occurrence of a communication frame timing offset can be suppressed and thus a synchronization mismatch in communication timing between the base station device and another base station device can be suppressed.

As described above, the estimating unit 6023 in the present embodiment obtains preamble timing t (communication timing) of another base station device from a communication signal transmitted from the another base station device, detects a difference between the timing t and transmission timing of the device 6002, 6003 as a communication timing offset (synchronization timing error), and determines, based on the communication timing offset, estimated values of synchronization mismatches (a communication timing offset and a carrier frequency offset) between the communication signal from the another base station device and a communication signal from the device.

In addition, the carrier frequency correcting units 6021 and 6022 and the frame timing control unit 6030 which serve as correcting units perform synchronization correction processes (for a timing offset and a carrier frequency offset) for allowing a communication signal transmitted from the base station device in a communication mode to be synchronized with another base station device, based on the above-described estimated values of synchronization mismatches.

In addition, the carrier frequency correcting units 6021 and 6022 and the frame timing control unit 6030 perform synchronization correction processes (for a timing offset and a carrier frequency offset) during the communication mode before being switched to a next synchronous mode, such that each synchronization correction process is divided into a plurality of correction processes.

Note that a synchronization process and a synchronization correction process for frame timing between the base station devices which are performed by the estimating unit 6023 and the frame timing control unit 6030 will be described in detail later.

Returning to FIG. 62, the synchronization control unit 6026 controls, as described above, timing (synchronization timing) at which a communication mode is suspended, and allows the device to perform a synchronous mode.

The synchronous mode is performed in the following manner.

First, the slave base station devices 6002 and 6003 select, at startup, one base station device from among other base station devices (the master base station device or the other slave base station device) as a source base station device, and detects a receive wave (source receive wave) of a signal (a preamble; a known signal; a synchronizing signal) transmitted from the source base station device to achieve frame timing synchronization and carrier frequency synchronization between the base station devices.

Note that a process for inter-base-station synchronization which is performed when the base station device starts up is referred to as an initial synchronous mode. The initial synchronous mode is performed at startup, as described above. More specifically, the initial synchronous mode is performed during a period between when the base station device starts up and when communication with terminal devices starts.

After the initial synchronous mode is performed, the base station device can perform communication with terminal devices present in an area of the base station device.

However, since there is a clock frequency offset between the base station devices due to variations in clock accuracy, mismatches occur in frame timing and carrier frequency between the base station devices with the passage of time.

Hence, the slave base station devices 6002 and 6003 suspend (stop), at predetermined timing, communication with terminal devices (transmit signals; downlink subframes) and go into a synchronous mode for resolving a synchronization mismatch (a synchronous mode in which communication is suspended).

Figure 63:
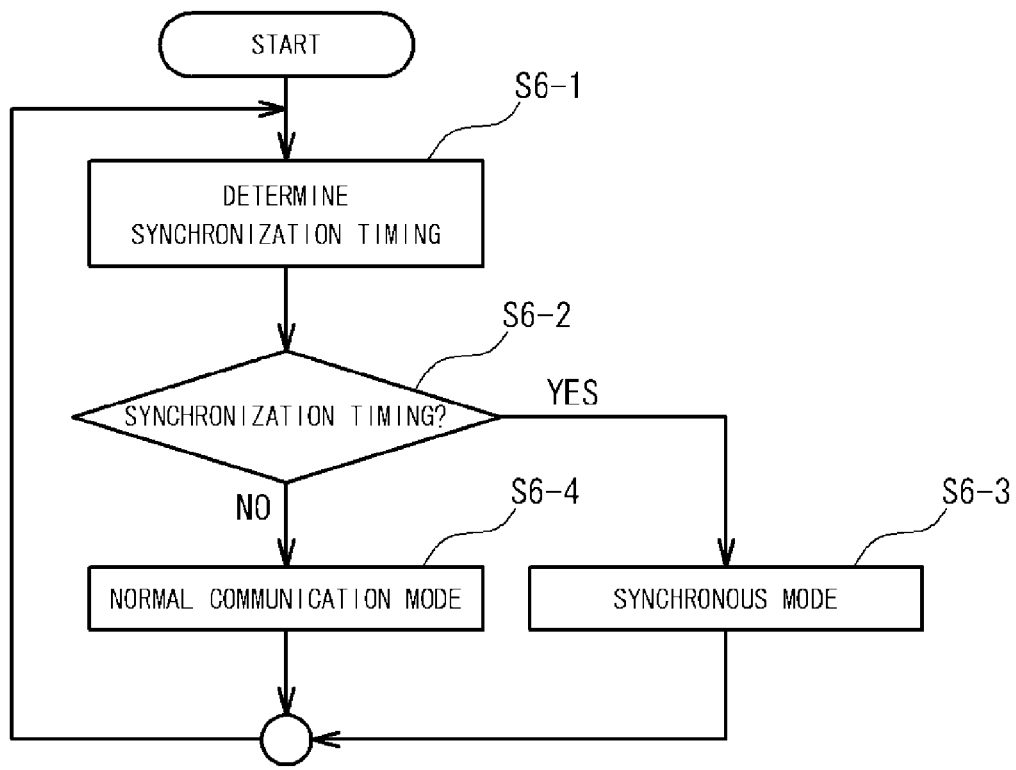
FIG. 63 is a diagram showing a flowchart for when the second and third base station devices are switched from a communication mode to a synchronous mode.

FIG. 63 is a flowchart for switching, by the base station devices 6002 and 6003, from a (normal) communication mode in which communication with terminal devices is performed, to a synchronous mode in which a signal from another base station device (the master base station device or a slave base station device) is received.

As shown in FIG. 63, the base station devices 6002 and 6003 determine whether synchronization timing at which the devices 6002 and 6003 should go into a synchronous mode has come (step S6-1). The synchronization timing is set as, for example, a cycle in which the devices 6002 and 6003 go into a synchronous mode (every predetermined time or every predetermined number of frames). When the cycle is set using time, the cycle can be set to, for example, about 5 minutes.

If it is determined that, when the devices 6002 and 6003 are in a normal communication mode in which communication is performed with terminal devices, timing to transition to a synchronous mode has come (step S6-2), then the base station devices 6002 and 6003 transition to a synchronous mode (step S6-3). When the synchronous mode is terminated, the devices 6002 and 6003 return to a normal communication mode again (step S6-4).

The base station devices 6002 and 6003 perform a synchronous mode periodically or at any time as necessary while performing communication with terminal devices, whereby even if a synchronization mismatch occurs, the synchronization mismatch can be resolved.

When the base station devices 6002 and 6003 go into a synchronous mode, communication with terminal devices (downlink subframe transmission) is stopped (suspended), and the devices 6002 and 6003 are in a state of receiving a signal even at the time that is originally intended for a downlink subframe.

In the synchronous mode, a signal (OFDM signal) transmitted from another base station device 6002 to a terminal device is received. In the present embodiment, a preamble which is included at the beginning of a downlink subframe DL transmitted from another base station device 6002 is used as a synchronizing signal for inter-base-station synchronization, to achieve frame timing synchronization and carrier frequency synchronization.

When the above synchronous mode is terminated, the base station devices 6002 and 6003 return to a normal communication mode from the synchronous mode and get into a state in which the devices 6002 and 6003 can perform communication with terminal devices.

Next, a synchronization process and a synchronization correction process which are performed by the base station devices 6002 and 6003 in the synchronous mode and the normal communication mode will be described in detail.

Figure 64:
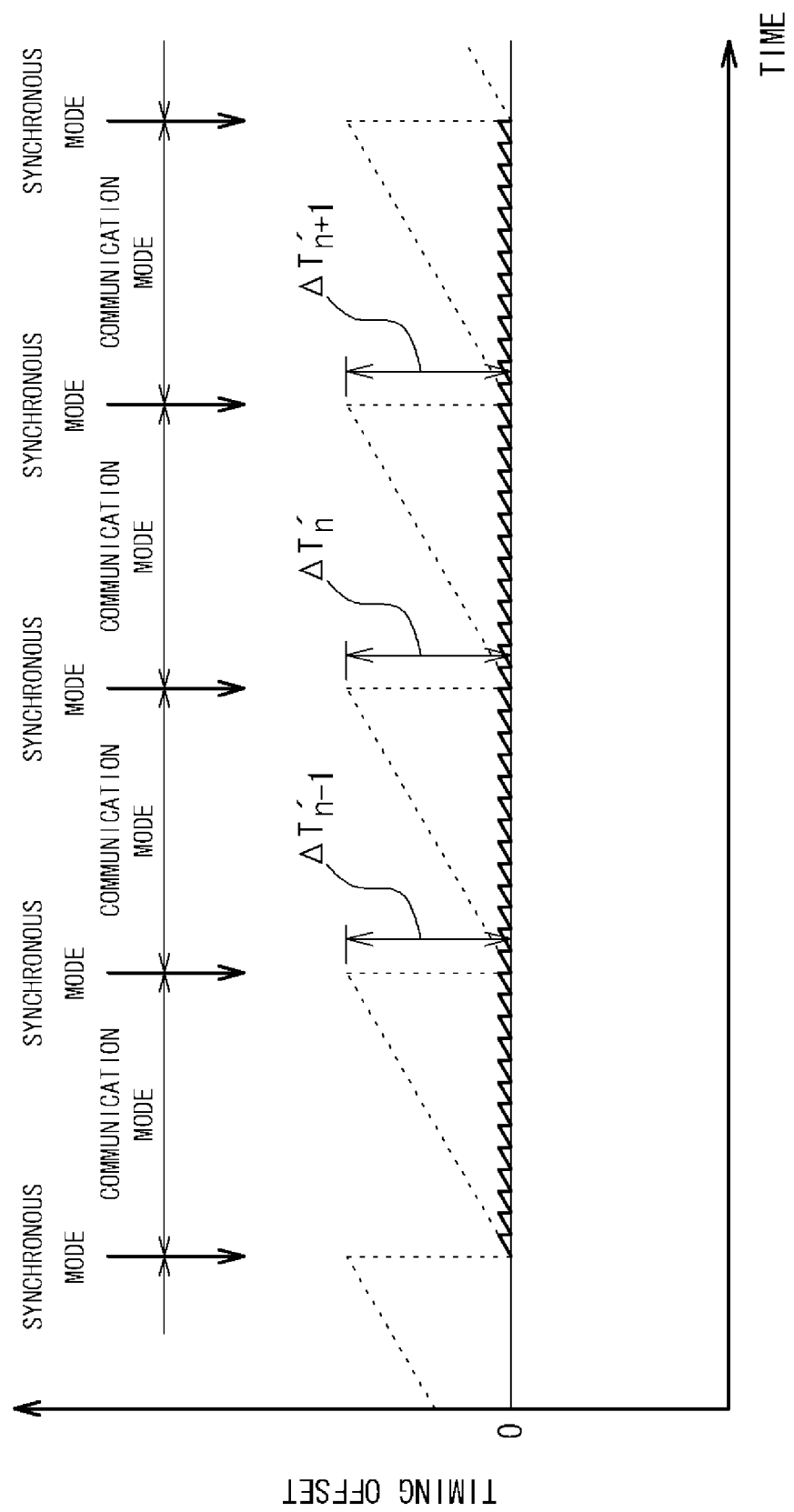
FIG. 64 is a diagram showing the state of the change over time of a communication timing offset relative to a master base station device for when a slave base station device repeatedly performs a communication mode and a synchronous mode.

FIG. 64 is a diagram showing the state of the change over time of a communication timing offset relative to a master base station device for when a slave base station device repeatedly performs a communication mode and a synchronous mode. Note that in FIG. 64 description is made of a communication timing offset between the first base station device 6001 and the second base station device 6002.

FIG. 64 shows a state in which the second base station device 6002 periodically repeats a synchronous mode after performing a communication mode with a predetermined time width. In addition, FIG. 64 shows a state in which, when the communication timing offset is "0", frame timings of the first base station device 6001 and the second base station device 6002 coincide with each other and thus frame timing synchronization is achieved.

In addition, in FIG. 64, a dotted line is a line drawing showing the change over time of the communication timing offset for when frame timing synchronization is achieved only by a synchronization process performed in the synchronous mode, and a solid line is a line drawing showing the change over time of the communication timing offset in the present embodiment where frame timing synchronization is achieved by a synchronization process performed in the synchronous mode and a synchronization correction process performed in the communication mode.

Since in the communication mode the second base station device 6002 performs communication with terminal devices, in the relationship with the first base station device 6001, the second base station device 6002 operates separately and independently and thus is in a free-running state. Accordingly, as shown by the dotted line in FIG. 64, when a synchronization correction process is not performed in the communication mode, the communication timing offset increases with time in the communication mode from a state in which synchronization is achieved by performing a synchronization process in the synchronous mode, due to a clock frequency error between the two base station devices 6001 and 6002, causing a synchronization mismatch. At this time, a communication timing offset value $\Delta T_n'$ which occurs as a synchronization mismatch upon switching from a communication mode to a synchronous mode (at the termination of a communication mode) periodically appears for each communication mode as a roughly comparable value, as a result of a clock frequency error between the two devices being accumulated with time.

On the other hand, in the present embodiment, by performing a synchronization correction process in the communication mode, as shown by the solid line in FIG. 64, a communication timing offset which periodically appears for each communication mode is suppressed from occurring significantly.

Figure 65:
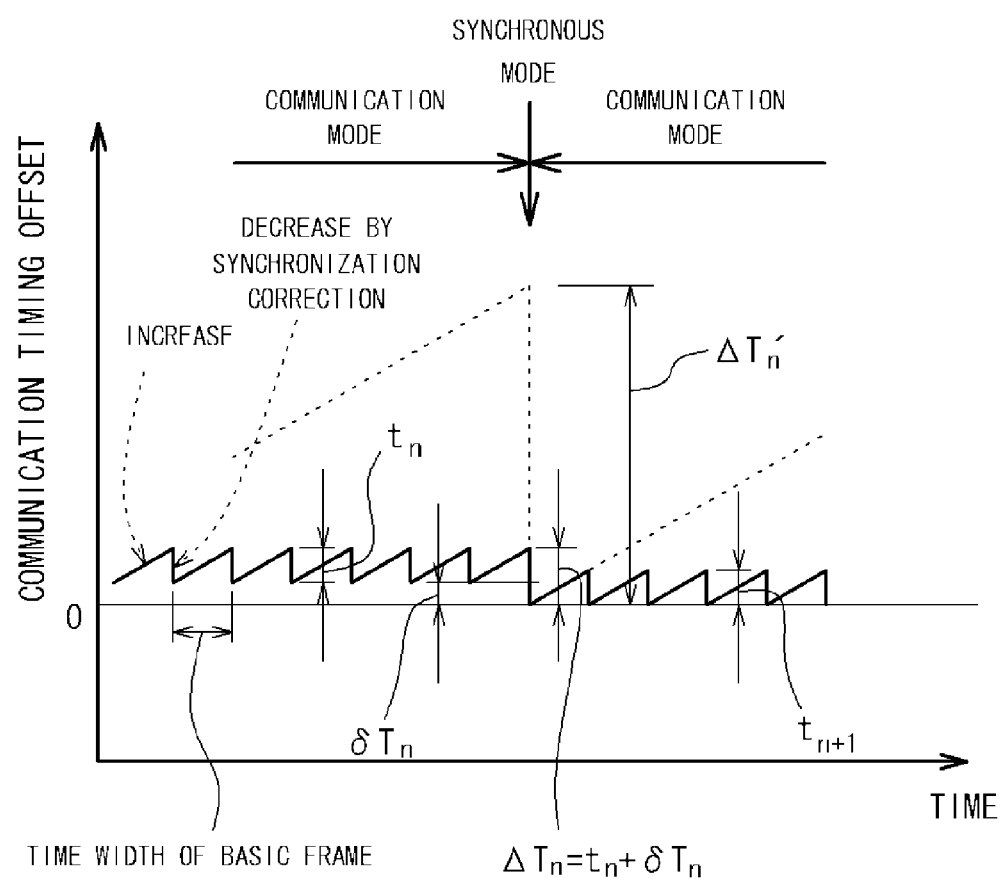
FIG. 65 is an enlarged view of a portion of a synchronous mode in FIG. 64.

FIG. 65 is an enlarged view of a portion of a synchronous mode in FIG. 64.

The second base station device 6002 according to the present embodiment determines, by the estimating unit 6023b and the frame timing control unit 6030, a timing offset $t_n$ per basic frame and makes a synchronization correction on a per basic frame basis to cancel the timing offset $t_n$, the basic frames forming a signal to be transmitted in a communication mode.

Specifically, the frame timing control unit 6030 makes a synchronization correction by shifting transmission start timing of a downlink subframe DL in each basic frame in a direction in which the timing offset $t_n$ is canceled. Namely, the frame timing control unit 6030 can make the synchronization correction by adjusting, in a basic frame, the time width of a transition gap RTG adjacent to a next basic frame.

Since the frame timing control unit 6030 makes a synchronization correction on a per basic frame basis, as shown in FIG. 65, the communication timing offset value in the communication mode increases on a per basic frame time width basis and decreases by an amount corresponding to the timing offset $t_n$ at timing between basic frames, which is repeated.

As such, the frame timing control unit 30 adjusts the time length of each basic frame to cancel the communication timing offset, which is the estimated value of the synchronization mismatch, occurring between the last and current synchronous modes, by making a synchronization correction during the communication mode before being switching to a next synchronous mode, such that the synchronization correction is divided into a plurality of corrections on a per basic frame basis.

By making a synchronization correction in this manner, since a synchronization correction is made uniformly throughout the communication mode, a synchronization mismatch which increases with time can be effectively suppressed.

Note that how to determine a timing offset $t_o$ per basic frame will be described later.

When the mode is switched from the communication mode to a synchronous mode, the preamble detecting unit 6023a in the estimating unit 6023 (FIG. 62) detects a communication timing offset value ΔT as a current synchronization mismatch.

Then, the computing unit 6023c (FIG. 62) receives the communication timing offset value $\Delta T_n$ from the preamble detecting unit 6023a, as an estimated value of the synchronization mismatch for a next communication mode, computes a timing offset $t_{n+1}$ per basic frame, and outputs the timing offset $t_{n+1}$ to the frame timing control unit 6030.

Here, the computing unit 6023c computes the timing offset $t_{n+1}$ per basic frame for the next communication mode in the following manner. Namely, the current communication timing offset value ΔT is a synchronization mismatch which has occurred as a result of a synchronization correction made successively on a per basic frame basis, based on a timing offset $t_n$. If the current communication timing offset value ΔT is the same value as the timing offset $t_n$, then by making a synchronization correction based on the timing offset $t_n$, the synchronization mismatch is supposed to have been properly resolved at the time of the synchronous mode.

However, in the current communication timing offset value $\Delta T_n$, normally, a mismatch value $\delta T_n$ such as that shown in the following equation (2) occurs due to the states of clock generators of the two base station devices or the change in communication environment:

$$\Delta T_n = t_n + \delta T_n \quad (2).$$

Note that a communication timing offset value $\Delta T_n'$ occurring when a synchronization correction is not made in the entire immediately preceding communication mode is represented by a value obtained by multiplying a timing offset $t_n$, which is canceled by a synchronization correction on a per basic frame basis, by the number of basic frames included in one communication mode and adding the mismatch value $\delta T_n$ to the result of the multiplication.

The mismatch value $\delta T_n$ is a synchronization mismatch which has occurred in the entire immediately preceding communication mode while a synchronization correction is made. Thus, as shown in the following equation (3), the computing unit 6023c determines a value per basic frame for the mismatch value $\delta T_n$ by dividing the mismatch value $\delta T_n$ by the number of basic frames included in the time width of the communication mode, and adds the foregoing timing offset $t_n$ per basic frame to the value per basic frame for the mismatch value $\delta T_n$, and thereby determines a timing offset $t_{n+1}$ per basic frame for a next communication mode:

$$t_{n+1} = t_n + \delta T_n/(\text{the number of basic frames included in the communication mode}) \quad (3).$$

The computing unit 6023c determines, as shown in the above equations (2) and (3), a timing offset $t_{n+1}$ per basic frame, based on a communication timing offset value ΔT which is detected by the preamble detecting unit 6023a as an estimated value of the synchronization mismatch for a next communication mode.

Note that, for the number of basic frames included in one communication mode, since the time width of the communication mode is determined in advance by the synchronization control unit 6026 and the time width of the basic frame is determined, as described above, to be 5 ms, the computing unit 6023c can determine the number of basic frames included in one communication mode from these values.

Note that, when the mismatch value $\delta T_n$ is smaller than a predetermined value, the current timing offset $t_n$ can be used as it is as a timing offset $t_{n+1}$ for a next communication mode, without taking into account the mismatch value $\delta T_n$. In this case, a synchronization correction can be prevented from being made based on a very small $\delta T_n$ which does not need to be corrected.

In addition, when the mismatch value $\delta T_n$ appears as an extremely large value, also, the current timing offset $t_n$ can be used as it is as a timing offset $t_{n+1}$ for a next communication mode, without taking into account the mismatch value $\delta T_n$. In this case, even if the mismatch value $\delta T_n$ appears as a sudden, abnormal value due to, for example, a multipath, etc., a synchronization correction based thereon can be avoided from being made.

When the timing offset $t_{n+1}$ per basic frame which is determined in the above-described manner is received from the computing unit 6023c and the communication timing offset value $\Delta T_n$ is received from the preamble detecting unit 6023a, the frame timing control unit 6030 performs a synchronization process by performing a process of shifting its transmission timing which is used upon the start of a communication mode, in a direction in which the current communication timing offset value $\Delta T_n$ is canceled.

In addition, when, after the above-described synchronization process, the mode is switched to a communication mode, the frame timing control unit 6030 makes the above-described synchronization correction on a per basic frame basis in the communication mode, based on the timing offset $t_{n+1}$ per basic frame.

According to the second and third base station devices 6002 and 6003 configured in the above-described manner, since a synchronization correction to a communication signal which is transmitted from the devices 6002 and 6003 in a communication mode is made during the communication mode before being switched to a next synchronous mode, such that the synchronization correction is divided into a plurality of corrections, the occurrence of a significant synchronization mismatch can be suppressed throughout the communication mode. Accordingly, since not only the synchronization mismatch is suppressed by inter-base-station synchronization which is performed in the synchronous mode, but also the synchronization mismatch is suppressed in the communication mode, the synchronization mismatch can be effectively suppressed.

In addition, according to the base station devices 6002 and 6003 in the present embodiment, since the synchronization mismatch is also suppressed in the communication mode for performing communication with terminal devices, there is no need to reduce the cycle of the synchronous mode where communication with the terminal devices needs to be stopped, to suppress the synchronization mismatch. Hence, while a decrease in throughput between the devices and the terminal devices is suppressed, the synchronization mismatch between the base stations can be suppressed.

[6.3.2 Second Embodiment]

Figure 66:
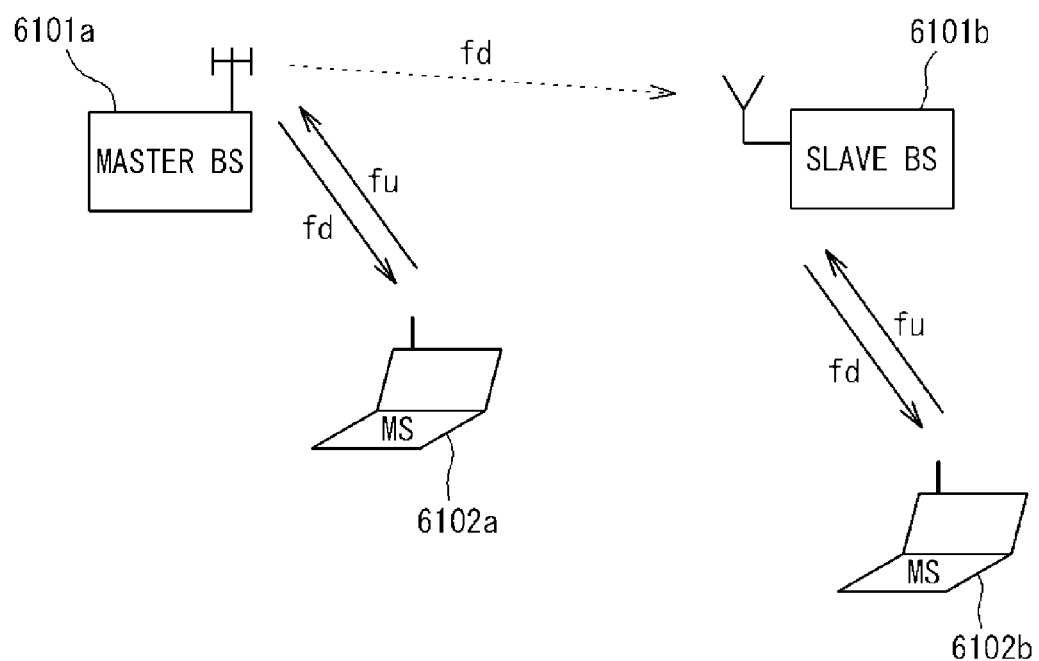
FIG. 66 is a diagram showing an overall configuration of a wireless communication system according to a second embodiment in Chapter 6.

FIG. 66 is a diagram showing the overall configuration of a wireless communication system according to a third embodiment in Chapter 6. FIG. 66 shows a communication system in which wireless communication is performed between base station devices 6101a and 6101b and user terminals (mobile terminals; MSs; Mobile Stations) 6102a and 6102b. In the communication system, the plurality of base station devices (BSs; Base Stations) 6101a and 6101b are installed and can perform communication with the user terminals 6102a and 6102b present in their respective cells.

The communication system is a system to which, for example, LTE (Long Term Evolution) is applied. In LTE, frequency-division duplex (FDD) can be adopted. In the following, the communication system is described assuming that a frequency-division duplex system is adopted. In addition, in the communication system, not only LTE but also WCDMA or CDMA2000 may be adopted.

In the communication system in the present embodiment, inter-base-station synchronization where synchronization is achieved between the plurality of base station devices 101a and 101b is performed. In the present embodiment, inter-base-station synchronization is performed by "over-the-air synchronization" where synchronization is achieved such that a signal which is transmitted from the base station device, a master, which serves as another base station device (hereinafter, referred to as "master BS") 101a to the terminal device 102a present in a cell of the master BS 101a is received by another base station device (hereinafter, referred to as "slave BS") 101b.

Note that the master BS may further achieve over-the-air synchronization with another base station device or may determine frame timing by any other method than over-the-air synchronization, e.g., achieving synchronization using a GPS signal.

[Configuration of a Base Station Device]

Figure 67:
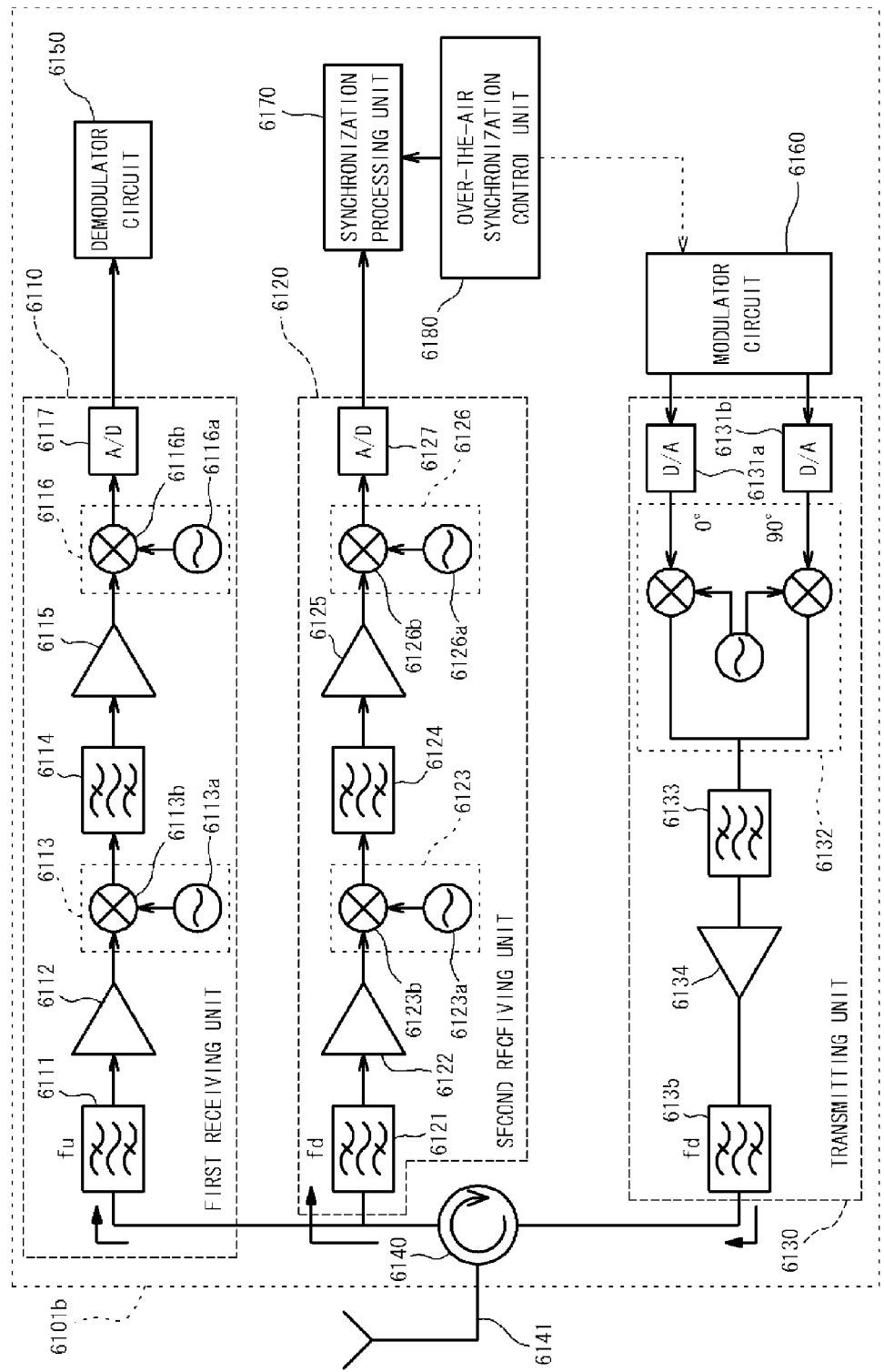
FIG. 67 is a configuration diagram of a base station device (slave BS).

FIG. 67 shows a configuration of the base station device (slave BS) 6101b. The configuration of the slave BS 6101b in FIG. 67 is the same as that of the slave BS 5101b shown in FIG. 59. In FIG. 67, a signal outputted from an A/D converting unit 6127 is provided to a synchronization processing unit 6170. Accordingly, the synchronization processing unit 6170 can obtain a downlink signal transmitted from the master BS 6101a.

The synchronization processing unit 6170 performs processes for achieving synchronization of the communication timing and communication frequency of the device 6101b, based on a Primary Synchronization Signal and a Secondary Synchronization Signal which are included in a frame of the downlink signal obtained from the master BS 6101a.

The synchronization processing unit 6170 is controlled by an over-the-air synchronization control unit 6180. The over-the-air synchronization control unit 6180 has the same function as the synchronization control unit 6026 in the above-described first embodiment.

Namely, the over-the-air synchronization control unit 6180 suspends a communication mode in which transmission of a downlink signal to the user terminal 6102b is performed, periodically in a fixed cycle or as necessary, to perform over-the-air synchronization and goes into an over-the-air synchronization state (synchronous mode) in which a downlink signal transmitted from the master BS 6101a is received. The over-the-air synchronization control unit 6180 outputs over-the-air synchronization section information which is information indicating a time period during which the over-the-air synchronization state occurs, to a modulator circuit 6160 and the synchronization processing unit 6170 and thereby controls the modulator circuit 6160 and the synchronization processing unit 6170.

Figure 68:
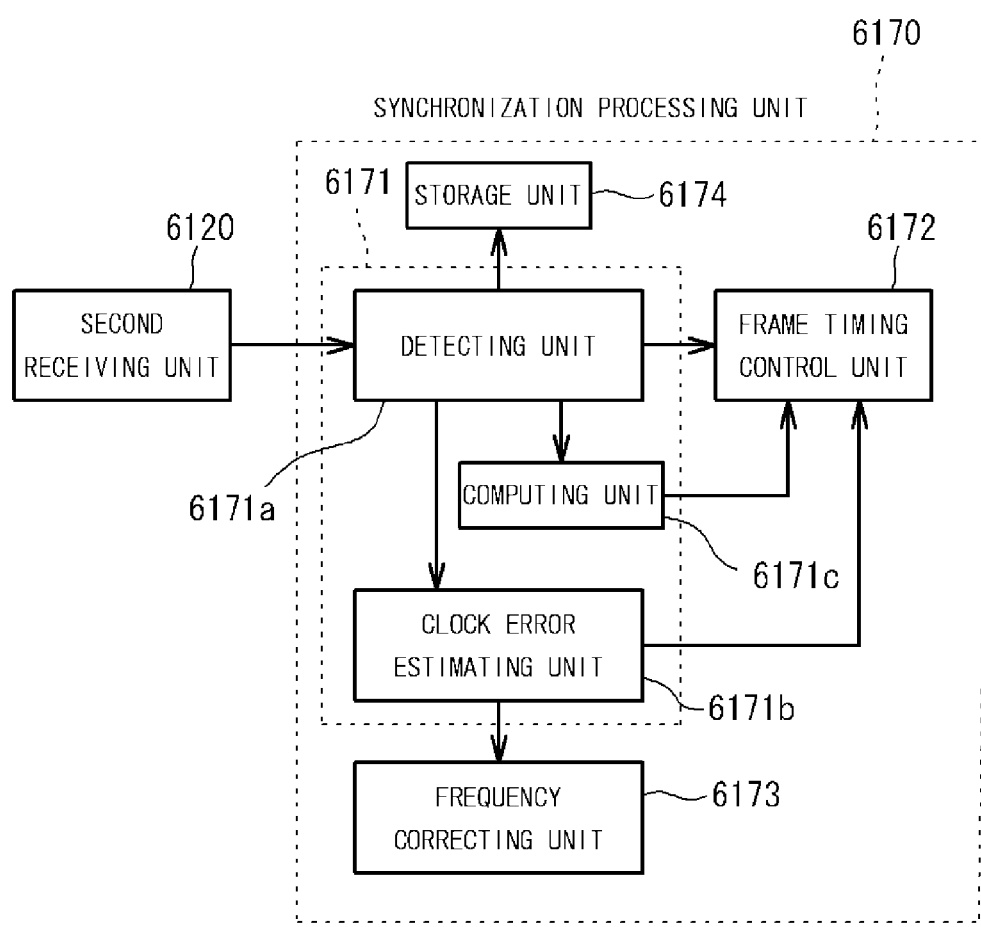
FIG. 68 is a configuration diagram of a synchronization processing unit.

FIG. 68 is a configuration diagram of the synchronization processing unit 6170. As shown in FIG. 68, the synchronization processing unit 6170 includes an estimating unit 6171, a frame timing control unit 6172, a carrier frequency correcting unit 6173, and a storage unit 6174.

The synchronization processing unit 6170 recognizes whether the device 6101b is in a communication mode or a synchronous mode, based on the over-the-air synchronization section information which is provided from the over-the-air synchronization control unit 6180, and determines whether to perform over-the-air synchronization.

When it is determined to perform over-the-air synchronization, then the estimating unit 6171 obtains a downlink signal transmitted from the master BS 6101a and detects frame transmission timing of the master BS 6101a using a Primary Synchronization Signal and a Secondary Synchronization Signal (hereinafter, the two Signals are collectively referred to as "synchronizing signal") which are included in the downlink signal, and estimates a communication frame timing offset and a carrier frequency offset between the master BS 6101a and the device 6101b.

The estimating unit 6171 has the same function as the estimating unit 6023 in the first embodiment, and includes a detecting unit 6171a that detects a synchronizing signal included in a downlink signal; a clock error estimating unit 6171b that estimates a clock error between the master BS 6101a and the device 6101b; and a computing unit 6171c that computes a timing offset per unit time between the master BS 6101a and the device 6101b. These functional units also have the same functions as those in the first embodiment.

The detecting unit 6171a detects timing of the synchronizing signal present at a predetermined location in the received downlink frame, and thereby detects frame transmission timing of the master BS 6101a. Then, the detecting unit 6171a compares the detected frame transmission timing of the master BS 6101a with frame transmission timing of the device 6101b and detects a difference therebetween as a communication timing offset (synchronization mismatch). The communication timing offset is provided to the storage unit 6174 each time it is detected, and is accumulated in the storage unit 6174.

In addition, the frame timing control unit 6172 and the carrier frequency correcting unit 6173 in the present embodiment respectively correspond to the frame timing control unit 6030 and the carrier frequency correcting units 6021 and 6022 in the first embodiment, and have the same functions as the corresponding ones.

That is, the frame timing control unit 6172 and the carrier frequency correcting unit 6173 perform, in the synchronous mode, a synchronization process for canceling the currently detected timing offset and carrier frequency offset, and perform, in the communication mode, a synchronization correction process in which an adjustment is made to time length and carrier frequency on a per basic frame basis, based on a timing offset and a carrier frequency offset per basic frame. Note that these synchronization and synchronization correction processes are performed in the same manner as in the first embodiment.

As a result, according to the present embodiment, synchronization can be achieved between the master BS 6101a and the slave BS 6101b and a synchronization correction to a downlink signal to be transmitted from the slave BS 6101b is made during the communication mode before being switched to a next synchronous mode. Accordingly, the occurrence of a large synchronization mismatch can be suppressed throughout the communication mode.

Note that the target for detection and correction of a synchronization error (synchronization mismatch) is not limited to frame timing and may be symbol timing or slot timing.

In the present embodiment, the slave BS 6101b can also employ the configurations shown in FIGS. 37 to 42.

The invention disclosed in Chapter 6 is not limited to the above-described embodiments. Although in the above-described embodiments a synchronization correction in the communication mode is made based on one communication timing offset $\Delta T_M$, a synchronization correction can also be made such that, for example, a plurality of communication timing offset values $\Delta T$ detected in the past synchronous modes are stored, an average value of the plurality of communication timing offset values $\Delta T$ is determined, and a synchronization correction is made based on the average value.

In addition, although in the above-described embodiments a synchronization correction is made such that the synchronization correction is divided into a plurality of corrections on a per basic frame basis in the communication mode, based on a timing offset $t_{n+1}$ per basic frame with the time width of one basic frame being unit time, a synchronization correction may be made, for example, with the time width of a plurality of basic frames being unit time. In this case, the number of correction processes into which a synchronization correction process is divided can be reduced, thereby increasing the flexibility of the process.

[Chapter 7 Additional Notes]

Note that the embodiments disclosed in Chapters 1 to 6 are to be considered in all respects as illustrative and not restrictive. The scope of the invention is indicated by the appended claims rather than by the foregoing meaning, and all changes which come within the meaning and range of equivalency of the claims are therefore intended to be embraced therein.

The invention claimed is:

1. A base station device configured to perform wireless communication of an OFDM signal with a terminal device and including a built-in clock generator that generates an operating clock, in which accuracy of a carrier frequency of the OFDM signal is affected by accuracy of a clock frequency generated by the built-in clock generator, the base station device comprising:

means for receiving a radio signal transmitted from another base station device while transmission to the terminal device is stopped;

estimation means for determining, based on an OFDM signal received while transmission to the terminal device is stopped, an estimated value of a carrier frequency offset of the OFDM signal as synchronization mismatch between the base station device and another base station device;

frequency correction means for correcting a carrier frequency of an OFDM signal to be transmitted to the terminal device, based on the estimated value;

a storage unit for storing history information of synchronization mismatch between the base station device and another base station device; and a synchronization control unit for changing a cycle in which transmission to the terminal device is stopped, based on the history information of synchronization mismatch stored in the storage unit.

2. The base station device according to claim 1, The base station device according to claim 1, wherein the estimation means is configured to determine, based on an OFDM signal received during a second transmission stop of the terminal device, the second transmission stop to the terminal device being performed again by the synchronization control unit after a first transmission stop to the terminal device being terminated then communication with the terminal device being resumed, an estimated value of a communication timing offset of the OFDM signal and determine an estimated value of a carrier frequency offset of the OFDM signal, based on the estimated value of the communication timing offset and a time period from the first transmission stop to the second transmission stop.

3. The base station device according to claim 2, wherein the estimation means calculated an error in the clock frequency, based on an estimated value of a communication timing offset and the time period from the first transmission stop to the second transmission stop, and determines an estimated value of the carrier frequency offset, based on the calculated error in the clock frequency.

4. The base station device according to claim 2, further comprising means for correcting a communication frame timing based on the estimated value of the communication timing offset.

5. The base station device according to claim 1, wherein an OFDM signal received from another base station device while transmission to the terminal device is stopped is a preamble signal transmitted from the another base station device to a terminal device.

6. The base station device according to claim 1, wherein the base station device is configured to perform wireless communication with the terminal device by frequency division duplex where a frequency of an uplink signal is different from a frequency of a downlink signal, the base station device further comprises:

a first receiving unit that performs uplink signal reception from the terminal device at the frequency of an uplink signal;

a transmitting unit that performs downlink signal transmission to the terminal device at the frequency of a downlink signal; and a second receiving unit that performs downlink signal reception from another base station device at the frequency of a downlink signal, and an OFDM signal transmitted from another base station device is received by the second receiving unit while transmission to the terminal device is stopped.

7. The base station device according to claim 6, further comprising:

a distortion compensating unit that performs distortion compensation for an amplifier included in the transmitting unit; and switching means for switching between a first state in which the distortion compensating unit obtains, through the second receiving unit, a downlink signal outputted from the amplifier and a second state in which the estimation means receives, through the second receiving unit, a downlink signal transmitted from another base station device.

8. The base station device according to claim 6, further comprising:

a signal processing device that generates a signal to be inputted to the transmitting unit; and switching means for switching between a first state in which the signal processing device receives, through the second receiving unit, feedback of a downlink signal generated by the transmitting unit and a second state in which the estimation means receives, through the second receiving unit, a downlink signal transmitted from another base station device.

9. The base station device according to claim 6, wherein a frequency converting unit is provided in at least one of the first receiving unit and the second receiving unit, the frequency converting unit converting a frequency of at least one of signals, including an uplink signal from the terminal device and a downlink signal from another base station device, to allow frequencies of the two signals to match each other, and the first receiving unit and the second receiving unit are configured such that the two signals whose frequencies have matched each other are processed by a common unit which is shared between the first receiving unit and the second receiving unit.

10. The base station device according to claim 1, wherein the base station device is configured to transmit a downlink signal including a first known signal which can take a plurality of patterns and a second known signal which can take a plurality of patterns, to the terminal device, and the base station device further comprises:

a recognizing unit that recognizes, when receiving a downlink signal including the first known signal and the second known signal which is transmitted from another base station device, a hierarchical level at which the another base station device is located in a hierarchical structure for inter-base-station-device synchronization, by a combination of a pattern of the received first known signal and a pattern of the received second known signal.

11. The base station device according to claim 10, wherein the recognizing unit includes:

a first recognizing unit that pattern-recognizes which one of the plurality of patterns that can be taken by the first known signal the pattern of the received first known signal is; and a second recognizing unit that pattern-recognizes which one of the plurality of patterns that can be taken by the second known signal the pattern of the received second known signal is.

12. The base station device according to claim 11, wherein the base station device is configured to:

perform a first pattern recognition by one of the first recognizing unit and the second recognizing unit that recognizes a pattern of a known signal with a small number of patterns that can be taken by the signal; and perform, after a pattern is recognized by the first pattern recognition, a second pattern recognition by one of the first recognizing unit and the second recognizing unit that recognizes a pattern of a known signal with a large number of patterns that can be taken by the signal.

13. The base station device according to claim 12, further comprising a pattern setting unit that sets a pattern of a first known signal and a pattern of a second known signal which are transmitted included in a downlink signal, from the base station device, wherein the pattern setting unit sets the pattern of the first known signal and the pattern of the second known signal such that the patterns indicate a hierarchical level lower than a hierarchical level of another base station device which serves as a target of synchronization in inter-base-station-device synchronization.

14. The base station device according to claim 1, wherein the estimation means calculated an error in the clock frequency to the another base station device based on an OFDM signal received during a second transmission stop to the terminal device, the second transmission stop to the terminal device being performed again according to a cycle controlled by the synchronization control unit after a first transmission stop to the terminal device being terminated then communication with the terminal device being resumed; and determines an estimated value of the carrier frequency offset based on the calculated error in the clock frequency.

* * * * *